(12) United States Patent
Sumitomo et al.

(10) Patent No.: US 12,466,891 B2
(45) Date of Patent: Nov. 11, 2025

(54) BISPECIFIC ANTIBODY BINDING TO CD40 AND GPC3

(71) Applicant: Kyowa Kirin Co., Ltd., Tokyo (JP)

(72) Inventors: Yoshiki Sumitomo, Tokyo (JP); Masayuki Kai, Tokyo (JP)

(73) Assignee: KYOWA KIRIN CO., LTD., Tokyo (JP)

( * ) Notice: Subject to any disclaimer, the term of this patent is extended or adjusted under 35 U.S.C. 154(b) by 1032 days.

(21) Appl. No.: 17/611,344

(22) PCT Filed: May 15, 2020

(86) PCT No.: PCT/JP2020/019547
§ 371 (c)(1),
(2) Date: Nov. 15, 2021

(87) PCT Pub. No.: WO2020/230901
PCT Pub. Date: Nov. 19, 2020

(65) Prior Publication Data
US 2022/0220216 A1 Jul. 14, 2022

(30) Foreign Application Priority Data
May 15, 2019 (JP) ................. 2019-092297

(51) Int. Cl.
*C07K 16/28* (2006.01)
*A61K 39/00* (2006.01)
*A61P 35/00* (2006.01)
*C07K 16/30* (2006.01)
*C07K 16/46* (2006.01)
*C12N 15/63* (2006.01)
*G01N 33/574* (2006.01)

(52) U.S. Cl.
CPC .......... *C07K 16/2878* (2013.01); *A61P 35/00* (2018.01); *C07K 16/303* (2013.01); *C07K 16/46* (2013.01); *C12N 15/63* (2013.01); *G01N 33/574* (2013.01); *A61K 2039/505* (2013.01)

(58) Field of Classification Search
None
See application file for complete search history.

(56) References Cited

U.S. PATENT DOCUMENTS

| 11,485,790 B2 * | 11/2022 | Igawa | A61P 35/00 |
| 2011/0076722 A1 | 3/2011 | Takahashi | |
| 2017/0022287 A1 | 1/2017 | Igawa et al. | |
| 2017/0335016 A1 | 11/2017 | Takahashi | |
| 2021/0380713 A1* | 12/2021 | Nakayama | C07K 16/30 |

FOREIGN PATENT DOCUMENTS

| WO | 99/61057 | 12/1999 |
| WO | 2009/131239 | 10/2009 |
| WO | 2015/156268 | 10/2015 |
| WO | 2017/205738 | 11/2017 |
| WO | 2018/140831 | 8/2018 |
| WO | 2018/185045 | 10/2018 |
| WO | 2019/093342 | 5/2019 |

OTHER PUBLICATIONS

Argiriadi et al. CD40/anti-CD40 antibody complexes which illustrate agonist and antagonist structural switches. BMC Molecular and Cell Biology. 2019; 20(29):1-13. (Year: 2019).*
International Search Report issued Aug. 11, 2020 in corresponding International (PCT) Application No. PCT/JP2020/019547, with English Translation.
Written Opinion issued Aug. 11, 2020 in corresponding International (PCT) Application No. PCT/JP2020/019547, with English Translation.
Diehl, L. et al., "CD40 activation in vivo overcomes peptide-induced peripheral cytotoxic T-lymphocyte tolerance and augments anti-tumor vaccine efficacy", Nature Medicine, Jul. 1999, vol. 5, No. 7, pp. 774-779.
Nakatsura, T. et al., "Glypican-3, overexpressed specifically in human hepatocellular carcinoma, is a novel tumor marker", Biochemical and Biophysical Research Communications, 2003, 306, pp. 16-25.
Ho, M. and H. Kim, "Glypican-3: A new target for cancer immunotherapy", European Journal of Cancer, 2011, vol. 47, No. 3, pp. 333-338.
Beatty, G.L. et al., "Cancer immunotherapy: activating innate and adaptive immunity through CD40 agonists", Expert Review of Anticancer Therapy, 2017, vol. 17, No. 2, pp. 175-186.
Vonderheide, R.H. et al., "Phase I study of the CD40 agonist antibody CP-870,893 combined with carboplatin and paclitaxel in patients with advanced solid tumors", OncoImmunology, 2013, vol. 2, No. 1, e23033, 10 pages.
Extended European Search Report issued Jan. 12, 2023 in corresponding European Patent Application No. 20805625.9.
Carpenter, Erica L. et al., "Activation of human B cells by the agonist CD40 antibody CP-870,893 and augmentation with simultaneous toll-like receptor 9 stimulation", Journal of Translational Medicine, vol. 7, No. 1, pp. 1-10, 2009.

(Continued)

*Primary Examiner* — Daniel E Kolker
*Assistant Examiner* — Maureen Varina Driscoll
(74) *Attorney, Agent, or Firm* — Wenderoth, Lind & Ponack, L.L.P.

(57) ABSTRACT

An object of the present invention is to provide a bispecific antibody including an antigen binding domain that binds to CD40 and an antigen binding domain that binds to GPC3. The present invention relates to a bispecific antibody including an antigen binding domain that binds to CD40 and an antigen binding domain that binds to GPC3, a bispecific antibody fragment thereof, a DNA encoding the bispecific antibody or the bispecific antibody fragment, a vector containing the DNA, and the like.

20 Claims, 11 Drawing Sheets
Specification includes a Sequence Listing.

(56) References Cited

OTHER PUBLICATIONS

Walters, Matthew, "AB928, a dual antagonist of the $A_{2a}R$ and $A_{2b}R$ adenosine receptors for the treatment of cancer", Abstract P498 on p. 240 of Journal for Immunotherapy of Cancer, vol. 5, No. S2, pp. 117-244, 2017.

* cited by examiner (A)

(B)

(C)

SEQUENCE LISTING

```
<160> NUMBER OF SEQ ID NOS: 129

<210> SEQ ID NO 1
<211> LENGTH: 522
<212> TYPE: DNA
<213> ORGANISM: Homo sapiens

<400> SEQUENCE: 1
gaaccaccca ctgcatgcag agaaaaacag tacctaataa acagtcagtg ctgttctttg      60
tgccagccag gacagaaact ggtgagtgac tgcacagagt tcactgaaac ggaatgcctt     120
ccttgcggtg aaagcgaatt cctagacacc tggaacagag agacacactg ccaccagcac     180
aaatactgcg accccaacct agggcttcgg gtccagcaga gggcacctc agaaacagac      240 accatctgca cctgtgaaga aggctggcac tgtacgagtg aggcctgtga gagctgtgtc     300
```

```
ctgcaccgct catgctcgcc cggctttggg gtcaagcaga ttgctacagg ggtttctgat    360
accatctgcg agccctgccc agtcggcttc ttctccaatg tgtcatctgc tttcgaaaaa    420
tgtcacccct tggacaagctg tgagaccaaa gacctggttg tgcaacaggc aggcacaaac    480
aagactgatg ttgtctgtgg tccccaggat cggctgagag cc                        522
```

<210> SEQ ID NO 2
<211> LENGTH: 174
<212> TYPE: PRT
<213> ORGANISM: Homo sapiens

<400> SEQUENCE: 2

```
Glu Pro Pro Thr Ala Cys Arg Glu Lys Gln Tyr Leu Ile Asn Ser Gln
1               5                   10                  15

Cys Cys Ser Leu Cys Gln Pro Gly Gln Lys Leu Val Ser Asp Cys Thr
            20                  25                  30

Glu Phe Thr Glu Thr Glu Cys Leu Pro Cys Gly Glu Ser Glu Phe Leu
        35                  40                  45

Asp Thr Trp Asn Arg Glu Thr His Cys His Gln His Lys Tyr Cys Asp
    50                  55                  60

Pro Asn Leu Gly Leu Arg Val Gln Gln Lys Gly Thr Ser Glu Thr Asp
65                  70                  75                  80

Thr Ile Cys Thr Cys Glu Glu Gly Trp His Cys Thr Ser Glu Ala Cys
                85                  90                  95

Glu Ser Cys Val Leu His Arg Ser Cys Ser Pro Gly Phe Gly Val Lys
            100                 105                 110

Gln Ile Ala Thr Gly Val Ser Asp Thr Ile Cys Glu Pro Cys Pro Val
        115                 120                 125

Gly Phe Phe Ser Asn Val Ser Ser Ala Phe Glu Lys Cys His Pro Trp
    130                 135                 140

Thr Ser Cys Glu Thr Lys Asp Leu Val Val Gln Gln Ala Gly Thr Asn
145                 150                 155                 160

Lys Thr Asp Val Val Cys Gly Pro Gln Asp Arg Leu Arg Ala
                165                 170
```

<210> SEQ ID NO 3
<211> LENGTH: 522
<212> TYPE: DNA
<213> ORGANISM: Macaca fascicularis

<400> SEQUENCE: 3

```
gaaccaccca ctgcatgcag agaaaaacag tacctaataa acagtcagtg ctgttctttg    60
tgccagccag gacagaaact ggtgagtgac tgcacagagt tcaccgaaac agaatgcctt    120
ccttgcggtg aaagcgaatt cctagacacc tggaatagag agacacgctg ccaccagcac    180
aaatactgcg accccaacct agggcttcgg gtccagcaga agggcacctc agaaacagac    240
accatctgca cctgtgaaga aggcctgcac tgtacgagtg agtcctgtga gagctgtgtc    300
ccgcaccgct catgcttgcc tggctttggg gtcaagcaga ttgctacagg ggtttctgat    360
accatctgtg agccctgccc ggtcggcttc ttctccaatg tgtcatctgc ttttgaaaag    420
tgtcgcccct tggacaagctg tgagaccaaa gacctggttg tgcaacaggc aggcacaaac    480
aagactgatg ttgtctgtgg tccccaggat cggcagagag cc                        522
```

<210> SEQ ID NO 4
<211> LENGTH: 174

```
<212> TYPE: PRT
<213> ORGANISM: Macaca fascicularis

<400> SEQUENCE: 4

Glu Pro Pro Thr Ala Cys Arg Glu Lys Gln Tyr Leu Ile Asn Ser Gln
1               5                   10                  15

Cys Cys Ser Leu Cys Gln Pro Gly Gln Lys Leu Val Ser Asp Cys Thr
            20                  25                  30

Glu Phe Thr Glu Thr Glu Cys Leu Pro Cys Gly Glu Ser Glu Phe Leu
        35                  40                  45

Asp Thr Trp Asn Arg Glu Thr Arg Cys His Gln His Lys Tyr Cys Asp
    50                  55                  60

Pro Asn Leu Gly Leu Arg Val Gln Gln Lys Gly Thr Ser Glu Thr Asp
65                  70                  75                  80

Thr Ile Cys Thr Cys Glu Glu Gly Leu His Cys Thr Ser Glu Ser Cys
                85                  90                  95

Glu Ser Cys Val Pro His Arg Ser Cys Leu Pro Gly Phe Gly Val Lys
            100                 105                 110

Gln Ile Ala Thr Gly Val Ser Asp Thr Ile Cys Glu Pro Cys Pro Val
        115                 120                 125

Gly Phe Phe Ser Asn Val Ser Ser Ala Phe Glu Lys Cys Arg Pro Trp
    130                 135                 140

Thr Ser Cys Glu Thr Lys Asp Leu Val Val Gln Gln Ala Gly Thr Asn
145                 150                 155                 160

Lys Thr Asp Val Val Cys Gly Pro Gln Asp Arg Gln Arg Ala
                165                 170

<210> SEQ ID NO 5
<211> LENGTH: 834
<212> TYPE: DNA
<213> ORGANISM: Homo sapiens

<400> SEQUENCE: 5
atggttcgtc tgcctctgca gtgcgtcctc tggggctgct tgctgaccgc tgtccatcca       60
gaaccaccca ctgcatgcag agaaaaacag tacctaataa acagtcagtg ctgttctttg      120
tgccagccag acagaaaact ggtgagtgac tgcacagagt tcactgaaac ggaatgcctt      180
ccttgcggtg aaagcgaatt cctagacacc tggaacagag agacacactg ccaccagcac      240
aaatactgcg accccaacct agggcttcgg gtccagcaga agggcacctc agaaacagac      300
accatctgca cctgtgaaga aggctggcac tgtacgagtg aggcctgtga gagctgtgtc      360
ctgcaccgct catgctcgcc cggctttggg gtcaagcaga ttgctacagg ggtttctgat      420
accatctgcg agccctgccc agtcggcttc ttctccaatg tgtcatctgc tttcgaaaaa      480
tgtcacccct tggacaagctg tgagaccaaa gacctggttg tgcaacaggc aggcacaaac      540
aagactgatg ttgtctgtgg tccccaggat cggctgagag ccctggtggt gatccccatc      600
atcttcggga tcctgtttgc catcctcttg gtgctggtct ttatcaaaaa ggtggccaag      660
aagccaacca ataaggcccc ccaccccaag caggaacccc aggagatcaa ttttcccgac      720
gatcttcctg ctccaacac tgctgctcca gtgcaggaga ctttacatgg atgccaaccg      780
gtcacccagg aggatggcaa agagagtcgc atctcagtgc aggagagaca gtga           834

<210> SEQ ID NO 6
<211> LENGTH: 277
<212> TYPE: PRT
<213> ORGANISM: Homo sapiens
```

<400> SEQUENCE: 6

```
Met Val Arg Leu Pro Leu Gln Cys Val Leu Trp Gly Cys Leu Leu Thr
1               5                   10                  15
Ala Val His Pro Glu Pro Pro Thr Ala Cys Arg Glu Lys Gln Tyr Leu
            20                  25                  30
Ile Asn Ser Gln Cys Cys Ser Leu Cys Gln Pro Gly Gln Lys Leu Val
        35                  40                  45
Ser Asp Cys Thr Glu Phe Thr Glu Thr Glu Cys Leu Pro Cys Gly Glu
    50                  55                  60
Ser Glu Phe Leu Asp Thr Trp Asn Arg Glu Thr His Cys His Gln His
65                  70                  75                  80
Lys Tyr Cys Asp Pro Asn Leu Gly Leu Arg Val Gln Gln Lys Gly Thr
                85                  90                  95
Ser Glu Thr Asp Thr Ile Cys Thr Cys Glu Glu Gly Trp His Cys Thr
            100                 105                 110
Ser Glu Ala Cys Glu Ser Cys Val Leu His Arg Ser Cys Ser Pro Gly
        115                 120                 125
Phe Gly Val Lys Gln Ile Ala Thr Gly Val Ser Asp Thr Ile Cys Glu
    130                 135                 140
Pro Cys Pro Val Gly Phe Phe Ser Asn Val Ser Ser Ala Phe Glu Lys
145                 150                 155                 160
Cys His Pro Trp Thr Ser Cys Glu Thr Lys Asp Leu Val Val Gln Gln
                165                 170                 175
Ala Gly Thr Asn Lys Thr Asp Val Val Cys Gly Pro Gln Asp Arg Leu
            180                 185                 190
Arg Ala Leu Val Val Ile Pro Ile Ile Phe Gly Ile Leu Phe Ala Ile
        195                 200                 205
Leu Leu Val Leu Val Phe Ile Lys Lys Val Ala Lys Lys Pro Thr Asn
    210                 215                 220
Lys Ala Pro His Pro Lys Gln Glu Pro Gln Glu Ile Asn Phe Pro Asp
225                 230                 235                 240
Asp Leu Pro Gly Ser Asn Thr Ala Ala Pro Val Gln Glu Thr Leu His
                245                 250                 255
Gly Cys Gln Pro Val Thr Gln Glu Asp Gly Lys Glu Ser Arg Ile Ser
            260                 265                 270
Val Gln Glu Arg Gln
        275
```

<210> SEQ ID NO 7
<211> LENGTH: 849
<212> TYPE: DNA
<213> ORGANISM: Macaca fascicularis

<400> SEQUENCE: 7

```
atggttcgtc tgcctctgca gtgcgtcctc tggggctgct tgctgaccgc tgtctatcca      60
gaaccaccca ctgcatgcag agaaaaacag tacctaataa acagtcagtg ctgttctttg     120
tgccagccag acagaaaact ggtgagtgac tgcacagagt tcaccgaaac agaatgcctt     180
ccttgcggtg aaagcgaatt cctagacacc tggaatagag agacacgctg ccaccagcac     240
aaatactgcg accccaacct agggcttcgg gtccagcaga agggcacctc agaaacagac     300
accatctgca cctgtgaaga aggcctgcac tgtacgagtg agtcctgtga gagctgtgtc     360
ccgcaccgct catgcttgcc tggctttggg gtcaagcaga ttgctacagg ggtttctgat     420
```

```
accatctgtg agccctgccc ggtcggcttc ttctccaatg tgtcatctgc ttttgaaaag    480
tgtcgccctt ggacaagctg tgagaccaaa gacctggttg tgcaacaggc aggcacaaac    540
aagactgatg ttgtctgtgg tccccaggat cggcagagag ccctggtggt gatccccatc    600
tgcttgggga tcctgtttgt catcctcctc ttggtgctgg tctttatcag tgagtcctca    660
gaaaaggtgg ccaagaagcc aaacgataag gccccccacc caagcagga accccaggag     720 atcaattttc tggacgatct tcctggctcc aaccctgccg ctccagtgca ggagacttta    780
catggatgcc aaccggtcac ccaggaggat ggcaaagaga gtcgcatctc agtgcaggag    840
agacagtga                                                             849
```

<210> SEQ ID NO 8
<211> LENGTH: 282
<212> TYPE: PRT
<213> ORGANISM: Macaca fascicularis

<400> SEQUENCE: 8

```
Met Val Arg Leu Pro Leu Gln Cys Val Leu Trp Gly Cys Leu Leu Thr
1               5                   10                  15

Ala Val Tyr Pro Glu Pro Pro Thr Ala Cys Arg Glu Lys Gln Tyr Leu
            20                  25                  30

Ile Asn Ser Gln Cys Cys Ser Leu Cys Gln Pro Gly Gln Lys Leu Val
        35                  40                  45

Ser Asp Cys Thr Glu Phe Thr Glu Thr Glu Cys Leu Pro Cys Gly Glu
    50                  55                  60

Ser Glu Phe Leu Asp Thr Trp Asn Arg Glu Thr Arg Cys His Gln His
65                  70                  75                  80

Lys Tyr Cys Asp Pro Asn Leu Gly Leu Arg Val Gln Gln Lys Gly Thr
                85                  90                  95

Ser Glu Thr Asp Thr Ile Cys Thr Cys Glu Glu Gly Leu His Cys Thr
            100                 105                 110

Ser Glu Ser Cys Glu Ser Cys Val Pro His Arg Ser Cys Leu Pro Gly
        115                 120                 125

Phe Gly Val Lys Gln Ile Ala Thr Gly Val Ser Asp Thr Ile Cys Glu
    130                 135                 140

Pro Cys Pro Val Gly Phe Phe Ser Asn Val Ser Ser Ala Phe Glu Lys
145                 150                 155                 160

Cys Arg Pro Trp Thr Ser Cys Glu Thr Lys Asp Leu Val Val Gln Gln
                165                 170                 175

Ala Gly Thr Asn Lys Thr Asp Val Val Cys Gly Pro Gln Asp Arg Gln
            180                 185                 190

Arg Ala Leu Val Val Ile Pro Ile Cys Leu Gly Ile Leu Phe Val Ile
        195                 200                 205

Leu Leu Leu Val Leu Val Phe Ile Ser Glu Ser Ser Glu Lys Val Ala
    210                 215                 220

Lys Lys Pro Asn Asp Lys Ala Pro His Pro Lys Gln Glu Pro Gln Glu
225                 230                 235                 240

Ile Asn Phe Leu Asp Asp Leu Pro Gly Ser Asn Pro Ala Ala Pro Val
                245                 250                 255

Gln Glu Thr Leu His Gly Cys Gln Pro Val Thr Gln Glu Asp Gly Lys
            260                 265                 270

Glu Ser Arg Ile Ser Val Gln Glu Arg Gln
        275                 280
```

```
<210> SEQ ID NO 9
<211> LENGTH: 321
<212> TYPE: DNA
<213> ORGANISM: Artificial Sequence
<220> FEATURE:
<223> OTHER INFORMATION: description of the artificial sequence: the
      base sequence of L6 VL

<400> SEQUENCE: 9
gaaatagtgt tgacgcagtc tccagccacc ctgtctttgt ctccagggga aagagccacc    60
ctctcctgca gggccagtca gagtgttagc agctacttag cctggtacca acagaaacct   120
ggccaggctc ccaggctcct catctatgat gcatccaaca gggccactgg catcccagcc   180
aggttcagtg gcagtgggtc tgggacagac ttcactctca ccatcagcag cctagagcct   240
gaagattttg cagttttatta ctgtcagcag cgtagcaact ggcctccgac gttcggccaa   300
gggaccaagg tggaaatcaa a                                              321

<210> SEQ ID NO 10
<211> LENGTH: 107
<212> TYPE: PRT
<213> ORGANISM: Artificial Sequence
<220> FEATURE:
<223> OTHER INFORMATION: description of the artificial sequence: the
      amino acid sequence of L6 VL

<400> SEQUENCE: 10

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Thr Phe Gly Gln Gly Thr Lys Val Glu Ile Lys
            100                 105

<210> SEQ ID NO 11
<211> LENGTH: 11
<212> TYPE: PRT
<213> ORGANISM: Artificial Sequence
<220> FEATURE:
<223> OTHER INFORMATION: description of the artificial sequence: the
      amino acid sequence of L6 LCDR1

<400> SEQUENCE: 11

Arg Ala Ser Gln Ser Val Ser Ser Tyr Leu Ala
1               5                   10

<210> SEQ ID NO 12
<211> LENGTH: 7
<212> TYPE: PRT
<213> ORGANISM: Artificial Sequence
<220> FEATURE:
<223> OTHER INFORMATION: description of the artificial sequence: the
      amino acid sequence of L6 LCDR2

<400> SEQUENCE: 12
```

Asp Ala Ser Asn Arg Ala Thr
1               5

<210> SEQ ID NO 13
<211> LENGTH: 9
<212> TYPE: PRT
<213> ORGANISM: Artificial Sequence
<220> FEATURE:
<223> OTHER INFORMATION: description of the artificial sequence: the
      amino acid sequence of L6 LCDR3

<400> SEQUENCE: 13

Gln Gln Arg Ser Asn Trp Pro Pro Thr
1               5

<210> SEQ ID NO 14
<211> LENGTH: 354
<212> TYPE: DNA
<213> ORGANISM: Artificial Sequence
<220> FEATURE:
<223> OTHER INFORMATION: description of the artificial sequence: the
      base sequence of R1090S55A VH

<400> SEQUENCE: 14

```
gaagtgcagc ttgtgcagtc cggggctgaa gtgaagaagc ccggggaatc cctgaagatc    60
tcctgtaagg gctccggcta ctccttcatc atctactgga tcggctgggt tcgccagatg   120
cctgggaagg gctggagtg atggggatc atctatccca atgatgccga tactcgctac    180
tcccctcct tccagggca ggtgactatc tccgccgaca gtccatctc cactgcctat     240
ctgcagtggt cctccctgaa ggcctccgat actgccatgt actactgcgt gcgcctgggg   300
actcgcgatt ggttcgatcc ttggggcag gggactcttg tgactgtgtc ctcc          354
```

<210> SEQ ID NO 15
<211> LENGTH: 118
<212> TYPE: PRT
<213> ORGANISM: Artificial Sequence
<220> FEATURE:
<223> OTHER INFORMATION: description of the artificial sequence: the
      amino acid sequence of R1090S55A VH

<400> SEQUENCE: 15

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
                20                  25                  30

Trp Ile Gly Trp Val Arg Gln Met Pro Gly Lys Gly Leu Glu Trp Met
            35                  40                  45

Gly Ile Ile Tyr Pro Asn Asp Ala Asp Thr Arg Tyr Ser Pro Ser Phe
        50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Val Arg Leu Gly Thr Arg Asp Trp Phe Asp Pro Trp Gly Gln Gly Thr
            100                 105                 110

Leu Val Thr Val Ser Ser
            115

<210> SEQ ID NO 16
<211> LENGTH: 5
<212> TYPE: PRT

```
<213> ORGANISM: Artificial Sequence
<220> FEATURE:
<223> OTHER INFORMATION: description of the artificial sequence: the
      amino acid sequence of R1090S55A HCDR1

<400> SEQUENCE: 16

Ile Tyr Trp Ile Gly
1               5

<210> SEQ ID NO 17
<211> LENGTH: 17
<212> TYPE: PRT
<213> ORGANISM: Artificial Sequence
<220> FEATURE:
<223> OTHER INFORMATION: description of the artificial sequence: the
      amino acid sequence of R1090S55A HCDR2

<400> SEQUENCE: 17

Ile Ile Tyr Pro Asn Asp Ala Asp Thr Arg Tyr Ser Pro Ser Phe Gln
1               5                   10                  15
Gly

<210> SEQ ID NO 18
<211> LENGTH: 9
<212> TYPE: PRT
<213> ORGANISM: Artificial Sequence
<220> FEATURE:
<223> OTHER INFORMATION: description of the artificial sequence: the
      amino acid sequence of R1090S55A HCDR3

<400> SEQUENCE: 18

Leu Gly Thr Arg Asp Trp Phe Asp Pro
1               5

<210> SEQ ID NO 19
<211> LENGTH: 378
<212> TYPE: DNA
<213> ORGANISM: Artificial Sequence
<220> FEATURE:
<223> OTHER INFORMATION: description of the artificial sequence: the
      base sequence of 21.4.1 VH

<400> SEQUENCE: 19
caggtgcagc tggtgcagtc tggggctgag gtgaagaagc ctggggcctc agtgaaggtc      60
tcctgcaagg cttctggata caccttcacc ggctactata tgcactgggt gcgacaggcc     120
cctggacaag gcttgagtg gatgggatgg atcaaccctg acagtggtgg cacaaactat     180
gcacagaagt tcagggcag gtcaccatg accaggaca cgtccatcag cacagcctac     240
atggagctga acaggctgag atctgacgac acggccgtgt attactgtgc gagagatcag     300
cccctaggat attgtactaa tggtgtatgc tcctactttg actactgggg ccagggaacc     360
ctggtcaccg tctcctca                                                  378

<210> SEQ ID NO 20
<211> LENGTH: 126
<212> TYPE: PRT
<213> ORGANISM: Artificial Sequence
<220> FEATURE:
<223> OTHER INFORMATION: description of the artificial sequence: the
      amino acid sequence of 21.4.1 VH

<400> SEQUENCE: 20

Gln Val Gln Leu Val Gln Ser Gly Ala Glu Val Lys Lys Pro Gly Ala
1               5                   10                  15
```

```
Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Trp Ile Asn Pro Asp Ser Gly Gly Thr Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Asn Arg Leu Arg Ser Asp Asp Thr Ala Val Tyr Tyr Cys
                85                  90                  95

Ala Arg Asp Gln Pro Leu Gly Tyr Cys Thr Asn Gly Val Cys Ser Tyr
            100                 105                 110

Phe Asp Tyr Trp Gly Gln Gly Thr Leu Val Thr Val Ser Ser
        115                 120                 125
```

<210> SEQ ID NO 21
<211> LENGTH: 321
<212> TYPE: DNA
<213> ORGANISM: Artificial Sequence
<220> FEATURE:
<223> OTHER INFORMATION: description of the artificial sequence: the
      base sequence of 21.4.1 VL

<400> SEQUENCE: 21

```
gacatccaga tgacccagtc tccatcttcc gtgtctgcat ctgtaggaga cagagtcacc    60
atcacttgtc gggcgagtca gggtatttac agctggttag cctggtatca gcagaaacca   120
gggaaagccc ctaacctcct gatctatact gcatccactt tacaaagtgg ggtcccatca   180
aggttcagcg gcagtggatc tgggacagat tcactctca ccatcagcag cctgcaacct    240
gaagattttg caacttacta ttgtcaacag gctaacattt tcccgctcac tttcggcgga   300
gggaccaagg tcgagatcaa a                                              321
```

<210> SEQ ID NO 22
<211> LENGTH: 107
<212> TYPE: PRT
<213> ORGANISM: Artificial Sequence
<220> FEATURE:
<223> OTHER INFORMATION: description of the artificial sequence: the
      amino acid sequence of 21.4.1 VL

<400> SEQUENCE: 22

```
Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Tyr Ser Trp
            20                  25                  30

Leu Ala Trp Tyr Gln Gln Lys Pro Gly Lys Ala Pro Asn Leu Leu Ile
        35                  40                  45

Tyr Thr Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ile Phe Pro Leu
                85                  90                  95

Thr Phe Gly Gly Gly Thr Lys Val Glu Ile Lys
            100                 105
```

<210> SEQ ID NO 23
<211> LENGTH: 2376

<212> TYPE: DNA
<213> ORGANISM: Homo sapiens

<400> SEQUENCE: 23

```
atggccggaa ctgtacggac agcatgtctc gtggtggcca tgctcttgag tctggacttt      60
cccggccaag cccaacctcc ccctcctccc ccgatgcca cctgccatca ggttaggtca     120
tttttccaaa ggcttcagcc cgggctgaag tgggttcctg aaaccnctgt ccctgggtcc     180
gatcttcagg tctgcctccc caagggcct acctgctgtt cccgtaaaat ggaggagaag     240
taccagttga ccgctagact caacatggag cagctgctcc agtcagcatc tatggagttg     300
aagttcctga ttatacaaaa cgccgcagtt ttccaggagg catttgaaat tgtagtacgt     360
cacgcaaaaa actacaccaa tgcaatgttc aagaataact atccctctct gaccctcaa      420
gcctttgagt tcgtaggcga gttcttcacc gatgtgagtc tctatatcct cgggtcagat    480
atcaacgtag atgacatggt aaatgaactt tttgacagcc tgtttcccgt tatttatacc    540
cagctgatga cnctggcct tccagactca gcactcgaca taaatgaatg cctgcggggg     600
gccagacgcg acttgaaggt ttttgggaac tttccaaagc ttatcatgac acaagtttca    660
aagtctttgc aagtgacccg tattttcctt caagctctca accttggcat tgaggtcata    720
aataccaccg atcaccttaa gttcagcaaa gactgcggga gaatgctgac tcgcatgtgg    780
tactgcagct attgccaggg gctgatgatg gtgaagcctt gtggaggcta ttgtaatgtg    840
gtgatgcagg gatgtatggc aggcgtagta gagatcgaca aatattggcg tgagtacatc    900
ctctcttttgg aggaacttgt aaacggtatg taccgaatat atgacatgga aaacgtgctt    960
ctgggactct tctcaaccat ccacgactca atccaatatg ttcaaaagaa cgcaggaaaa   1020
cttactacaa ctattggaaa gctgtgtgca cattcacagc agcgtcagta taggagcgca   1080
tattaccccg aagatttgtt tatcgacaag aaagtcttga aggtagccca tgttgaacac   1140
gaagaaactc tctcctccag acgccgtgaa ctcattcaga aacttaagtc attcatatca   1200
ttttactctg ctcttcccgg ctatatctgt tctcactcac cagtagccga gaatgatact   1260
ctctgctgga acggtcagga gcttgttgag aggtactcac aaaaagctgc taggaacggc   1320
atgaagaacc agtttaactt gcacgaattg aaaatgaaag ccctgagcc cgtagttagt    1380
cagattatcg ataagttgaa gcacatcaac cagctgctca ggacaatgtc aatgcctaaa   1440
gggcgcgtac ttgataagaa cttggacgag gagggttttg aatcaggtga ctgtggtgac   1500
gatgaggacg agtgcatagg tggaagcgga gatggcatga taaggttaa gaaccagctg   1560
agatttctcg ctgaattggc ctatgatttg gatgtcgatg acgcccctgg aaatagtcaa   1620
caggccaccc ctaaagacaa cgagatttcc acatttcaca atcttggcaa tgttcacagc   1680
ccacttaaaa caatcaagcc ctgtcctcca tgcaaatgcc cagcacctaa cctcttgggt   1740
ggaccatccg tcttcatctt ccctccaaag atcaaggatg tactcatgat ctccctgagc   1800
cccatagtca catgtgtggt ggtggatgtg agcgaggatg acccagatgt ccagatcagc   1860
tggtttgtga caacgtgga agtacacaca gctcagacac aaacccatag agaggattac   1920
aacagtactc tccgggtggt cagtgccctc cccatccagc accaggactg gatgagtggc   1980
aaggagttca aatgcaaggt caacaacaaa gacctcccag cgcccatcga gaaccatc    2040
tcaaaaccca agggtcagt aagagctcca caggtatatg tcttgcctcc accagaagaa   2100
gagatgacta gaaacaggt cactctgacc tgcatggtca cagacttcat gcctgaagac   2160
atttacgtgg agtggaccaa caacgggaaa acagagctaa actacaagaa cactgaacca   2220
```

```
gtcctggact ctgatggttc ttacttcatg tacagcaagc tgagagtgga aaagaagaac    2280
tgggtggaaa gaaatagcta ctcctgttca gtggtccacg agggtctgca caatcaccac    2340
acgactaaga gcttctcccg gactccgggt aaatga                              2376
```

<210> SEQ ID NO 24
<211> LENGTH: 766
<212> TYPE: PRT
<213> ORGANISM: Homo sapiens

<400> SEQUENCE: 24

```
Gln Pro Pro Pro Pro Pro Asp Ala Thr Cys His Gln Val Arg Ser
1               5                   10                  15

Phe Phe Gln Arg Leu Gln Pro Gly Leu Lys Trp Val Pro Glu Thr Pro
                20                  25                  30

Val Pro Gly Ser Asp Leu Gln Val Cys Leu Pro Lys Gly Pro Thr Cys
                35                  40                  45

Cys Ser Arg Lys Met Glu Glu Lys Tyr Gln Leu Thr Ala Arg Leu Asn
        50                  55                  60

Met Glu Gln Leu Leu Gln Ser Ala Ser Met Glu Leu Lys Phe Leu Ile
65                  70                  75                  80

Ile Gln Asn Ala Ala Val Phe Gln Glu Ala Phe Glu Ile Val Val Arg
                85                  90                  95

His Ala Lys Asn Tyr Thr Asn Ala Met Phe Lys Asn Asn Tyr Pro Ser
                100                 105                 110

Leu Thr Pro Gln Ala Phe Glu Phe Val Gly Glu Phe Phe Thr Asp Val
                115                 120                 125

Ser Leu Tyr Ile Leu Gly Ser Asp Ile Asn Val Asp Asp Met Val Asn
        130                 135                 140

Glu Leu Phe Asp Ser Leu Phe Pro Val Ile Tyr Thr Gln Leu Met Asn
145                 150                 155                 160

Pro Gly Leu Pro Asp Ser Ala Leu Asp Ile Asn Glu Cys Leu Arg Gly
                165                 170                 175

Ala Arg Arg Asp Leu Lys Val Phe Gly Asn Phe Pro Lys Leu Ile Met
                180                 185                 190

Thr Gln Val Ser Lys Ser Leu Gln Val Thr Arg Ile Phe Leu Gln Ala
        195                 200                 205

Leu Asn Leu Gly Ile Glu Val Ile Asn Thr Thr Asp His Leu Lys Phe
210                 215                 220

Ser Lys Asp Cys Gly Arg Met Leu Thr Arg Met Trp Tyr Cys Ser Tyr
225                 230                 235                 240

Cys Gln Gly Leu Met Met Val Lys Pro Cys Gly Gly Tyr Cys Asn Val
                245                 250                 255

Val Met Gln Gly Cys Met Ala Gly Val Val Glu Ile Asp Lys Tyr Trp
                260                 265                 270

Arg Glu Tyr Ile Leu Ser Leu Glu Glu Leu Val Asn Gly Met Tyr Arg
        275                 280                 285

Ile Tyr Asp Met Glu Asn Val Leu Leu Gly Leu Phe Ser Thr Ile His
290                 295                 300

Asp Ser Ile Gln Tyr Val Gln Lys Asn Ala Gly Lys Leu Thr Thr Thr
305                 310                 315                 320

Ile Gly Lys Leu Cys Ala His Ser Gln Gln Arg Gln Tyr Arg Ser Ala
                325                 330                 335

Tyr Tyr Pro Glu Asp Leu Phe Ile Asp Lys Lys Val Leu Lys Val Ala
                340                 345                 350
```

```
His Val Glu His Glu Thr Leu Ser Ser Arg Arg Glu Leu Ile
        355                 360             365

Gln Lys Leu Lys Ser Phe Ile Ser Phe Tyr Ser Ala Leu Pro Gly Tyr
        370                 375             380

Ile Cys Ser His Ser Pro Val Ala Glu Asn Asp Thr Leu Cys Trp Asn
385                 390                 395                 400

Gly Gln Glu Leu Val Glu Arg Tyr Ser Gln Lys Ala Ala Arg Asn Gly
                405                 410                 415

Met Lys Asn Gln Phe Asn Leu His Glu Leu Lys Met Lys Gly Pro Glu
        420                 425                 430

Pro Val Val Ser Gln Ile Ile Asp Lys Leu Lys His Ile Asn Gln Leu
            435                 440                 445

Leu Arg Thr Met Ser Met Pro Lys Gly Arg Val Leu Asp Lys Asn Leu
    450                 455                 460

Asp Glu Glu Gly Phe Glu Ser Gly Asp Cys Gly Asp Asp Glu Asp Glu
465                 470                 475                 480

Cys Ile Gly Gly Ser Gly Asp Gly Met Ile Lys Val Lys Asn Gln Leu
                485                 490                 495

Arg Phe Leu Ala Glu Leu Ala Tyr Asp Leu Asp Val Asp Ala Pro
                500                 505                 510

Gly Asn Ser Gln Gln Ala Thr Pro Lys Asp Asn Glu Ile Ser Thr Phe
            515                 520                 525

His Asn Leu Gly Asn Val His Ser Pro Leu Lys Ile Lys Pro Cys Pro
    530                 535                 540

Pro Cys Lys Cys Pro Ala Pro Asn Leu Leu Gly Gly Pro Ser Val Phe
545                 550                 555                 560

Ile Phe Pro Pro Lys Ile Lys Asp Val Leu Met Ile Ser Leu Ser Pro
                565                 570                 575

Ile Val Thr Cys Val Val Val Asp Val Ser Glu Asp Asp Pro Asp Val
                580                 585                 590

Gln Ile Ser Trp Phe Val Asn Asn Val Glu Val His Thr Ala Gln Thr
    595                 600                 605

Gln Thr His Arg Glu Asp Tyr Asn Ser Thr Leu Arg Val Val Ser Ala
    610                 615                 620

Leu Pro Ile Gln His Gln Asp Trp Met Ser Gly Lys Glu Phe Lys Cys
625                 630                 635                 640

Lys Val Asn Asn Lys Asp Leu Pro Ala Pro Ile Glu Arg Thr Ile Ser
                645                 650                 655

Lys Pro Lys Gly Ser Val Arg Ala Pro Gln Val Tyr Val Leu Pro Pro
                660                 665                 670

Pro Glu Glu Glu Met Thr Lys Lys Gln Val Thr Leu Thr Cys Met Val
            675                 680                 685

Thr Asp Phe Met Pro Glu Asp Ile Tyr Val Glu Trp Thr Asn Asn Gly
    690                 695                 700

Lys Thr Glu Leu Asn Tyr Lys Asn Thr Glu Pro Val Leu Asp Ser Asp
705                 710                 715                 720

Gly Ser Tyr Phe Met Tyr Ser Lys Leu Arg Val Glu Lys Lys Asn Trp
                725                 730                 735

Val Glu Arg Asn Ser Tyr Ser Cys Ser Val Val His Glu Gly Leu His
                740                 745                 750

Asn His His Thr Thr Lys Ser Phe Ser Arg Thr Pro Gly Lys
            755                 760                 765
```

<210> SEQ ID NO 25
<211> LENGTH: 2373
<212> TYPE: DNA
<213> ORGANISM: Mus musculus

<400> SEQUENCE: 25

| | | | | | |
|---|---|---|---|---|---|
| atggctggta | ctgttagaac | cgcttgcctg | ctcgttgcca | tgctcctggg | tcttggctgt | 60 |
| cttggccaag | cacagccacc | acccccacca | gacgctacct | gtcaccaagt | gcgttcattc | 120 |
| ttccaaaggc | tccagcccgg | tctcaagtgg | gttcccgaaa | ccctgtacc | aggttccgac | 180 |
| ctccaggttt | gcttgccaaa | agggcctaca | tgttgttctc | gcaagatgga | agagaaatac | 240 |
| caactcactg | ccaggctcaa | tatggagcaa | ctgctccaat | cagcatctat | ggagcttaag | 300 |
| ttcctcataa | ttcaaaatgc | agccgtattc | caggaagcct | tcgagatcgt | cgtccgacac | 360 |
| gcaaagaact | atacaaatgc | catgtttaag | aacaactacc | cttcactcac | accccaagca | 420 |
| ttcgaatttg | taggagagtt | ctttacagat | gttagcttgt | atattctcgg | ttctgacata | 480 |
| aatgttgacg | acatggtaaa | cgaactgttt | gattctcttt | ttccagtaat | ctatacacaa | 540 |
| atgatgaatc | cagggttgcc | agaaagtgtt | ttggacataa | atgagtgttt | gcgcggggct | 600 |
| agaagggatt | tgaaggtttt | tgggtcattt | cccaagctca | ttatgactca | agttagtaaa | 660 |
| tctttgcagg | ttacaaggat | cttccttcag | gccttgaatc | tggggatcga | agtgattaac | 720 |
| actaccgatc | atctgaagtt | tagcaaggac | tgtggtcgaa | tgctcactag | aatgtggtat | 780 |
| tgcagttatt | gtcaaggtct | catgatggtc | aagccttgcg | ggggttactg | taacgtcgtg | 840 |
| atgcaaggtt | gtatggccgg | tgtagttgaa | atagataaat | attggagaga | gtacatcctc | 900 |
| tctctcgaag | aactggtcaa | tggtatgtac | cggatatatg | acatggaaaa | tgtgctcctc | 960 |
| ggtctctttt | ctacaatcca | tgattctatt | caatacgtgc | aaaagaacgg | aggtaagctt | 1020 |
| acaactacta | ttgggaaact | gtgtgcccac | agccagcaac | gccagtatcg | aagcgcttat | 1080 |
| tatcccgaag | acttgtttat | agataagaag | atccttaaag | ttgcacacgt | cgagcacgaa | 1140 |
| gagactctct | catctcgccg | acgcgagctc | attcaaaagt | tgaagagctt | tattaatttt | 1200 |
| tactctgcac | tgccagggta | catctgttcc | cacagcccag | tagcagaaaa | tgacaccctg | 1260 |
| tgctggaatg | gtcaagagct | cgtggagagg | tactctcaaa | aagctgcacg | gaacggcatg | 1320 |
| aagaatcaat | tcaatcttca | tgaattgaag | atgaaaggcc | ctgaaccagt | tgtatcccag | 1380 |
| attatcgata | agcttaagca | tattaatcaa | cttctccgta | ctatgagcgt | ccctaaaggt | 1440 |
| aaagtactcg | acaaaagcct | tgatgaagaa | ggactggaaa | gtggcgattg | tggagacgat | 1500 |
| gaggacgagt | gtattggatc | atccggggac | ggaatggtaa | aggtaaaaaa | tcaattgcgc | 1560 |
| ttccttgcag | aattggctta | cgaccttgac | gttgatgacg | ctccaggcaa | taaacagcac | 1620 |
| gggaatcaga | aggacaacga | gataactaca | tctcatagtg | ttggcaacat | gccctctcca | 1680 |
| cttaaaacaa | tcaagcccctg | tcctccatgc | aaatgcccag | cacctaacct | cttgggtgga | 1740 |
| ccatccgtct | tcatcttccc | tccaaagatc | aaggatgtac | tcatgatctc | cctgagcccc | 1800 |
| atagtcacat | gtgtggtggt | ggatgtgagc | gaggatgacc | cagatgtcca | gatcagctgg | 1860 |
| tttgtgaaca | acgtggaagt | acacacagct | cagacacaaa | cccatagaga | ggattacaac | 1920 |
| agtactctcc | gggtggtcag | tgccctcccc | atccagcacc | aggactggat | gagtggcaag | 1980 |
| gagttcaaat | gcaaggtcaa | caacaaagac | ctcccagcgc | ccatcgagag | aaccatctca | 2040 |
| aaacccaaag | ggtcagtaag | agctccacag | gtatatgtct | tgcctccacc | agaagaagag | 2100 |
| atgactaaga | aacaggtcac | tctgacctgc | atggtcacag | acttcatgcc | tgaagacatt | 2160 |

```
tacgtggagt ggaccaacaa cgggaaaaca gagctaaact acaagaacac tgaaccagtc    2220
ctggactctg atggttctta cttcatgtac agcaagctga gagtgaaaaa gaagaactgg    2280
gtggaaagaa atagctactc ctgttcagtg gtccacgagg gtctgcacaa tcaccacacg    2340
actaagagct ctcccggac tccgggtaaa tga                                  2373
```

<210> SEQ ID NO 26
<211> LENGTH: 766
<212> TYPE: PRT
<213> ORGANISM: Mus musculus

<400> SEQUENCE: 26

```
Gln Pro Pro Pro Pro Asp Ala Thr Cys His Gln Val Arg Ser Phe
1               5                   10                  15

Phe Gln Arg Leu Gln Pro Gly Leu Lys Trp Val Pro Glu Thr Pro Val
            20                  25                  30

Pro Gly Ser Asp Leu Gln Val Cys Leu Pro Lys Gly Pro Thr Cys Cys
        35                  40                  45

Ser Arg Lys Met Glu Glu Lys Tyr Gln Leu Thr Ala Arg Leu Asn Met
50                  55                  60

Glu Gln Leu Leu Gln Ser Ala Ser Met Glu Leu Lys Phe Leu Ile Ile
65                  70                  75                  80

Gln Asn Ala Ala Val Phe Gln Glu Ala Phe Glu Ile Val Val Arg His
                85                  90                  95

Ala Lys Asn Tyr Thr Asn Ala Met Phe Lys Asn Asn Tyr Pro Ser Leu
            100                 105                 110

Thr Pro Gln Ala Phe Glu Phe Val Gly Glu Phe Phe Thr Asp Val Ser
        115                 120                 125

Leu Tyr Ile Leu Gly Ser Asp Ile Asn Val Asp Asp Met Val Asn Glu
        130                 135                 140

Leu Phe Asp Ser Leu Phe Pro Val Ile Tyr Thr Gln Met Met Asn Pro
145                 150                 155                 160

Gly Leu Pro Glu Ser Val Leu Asp Ile Asn Glu Cys Leu Arg Gly Ala
                165                 170                 175

Arg Arg Asp Leu Lys Val Phe Gly Ser Phe Pro Lys Leu Ile Met Thr
            180                 185                 190

Gln Val Ser Lys Ser Leu Gln Val Thr Arg Ile Phe Leu Gln Ala Leu
        195                 200                 205

Asn Leu Gly Ile Glu Val Ile Asn Thr Thr Asp His Leu Lys Phe Ser
        210                 215                 220

Lys Asp Cys Gly Arg Met Leu Thr Arg Met Trp Tyr Cys Ser Tyr Cys
225                 230                 235                 240

Gln Gly Leu Met Met Val Lys Pro Cys Gly Gly Tyr Cys Asn Val Val
                245                 250                 255

Met Gln Gly Cys Met Ala Gly Val Val Glu Ile Asp Lys Tyr Trp Arg
            260                 265                 270

Glu Tyr Ile Leu Ser Leu Glu Glu Leu Val Asn Gly Met Tyr Arg Ile
        275                 280                 285

Tyr Asp Met Glu Asn Val Leu Leu Gly Leu Phe Ser Thr Ile His Asp
        290                 295                 300

Ser Ile Gln Tyr Val Gln Lys Asn Gly Gly Lys Leu Thr Thr Thr Ile
305                 310                 315                 320

Gly Lys Leu Cys Ala His Ser Gln Gln Arg Gln Tyr Arg Ser Ala Tyr
                325                 330                 335
```

Tyr Pro Glu Asp Leu Phe Ile Asp Lys Lys Ile Leu Lys Val Ala His
            340                 345                 350

Val Glu His Glu Glu Thr Leu Ser Ser Arg Arg Arg Glu Leu Ile Gln
            355                 360                 365

Lys Leu Lys Ser Phe Ile Asn Phe Tyr Ser Ala Leu Pro Gly Tyr Ile
        370                 375                 380

Cys Ser His Ser Pro Val Ala Glu Asn Asp Thr Leu Cys Trp Asn Gly
385                 390                 395                 400

Gln Glu Leu Val Glu Arg Tyr Ser Gln Lys Ala Ala Arg Asn Gly Met
            405                 410                 415

Lys Asn Gln Phe Asn Leu His Glu Leu Lys Met Lys Gly Pro Glu Pro
            420                 425                 430

Val Val Ser Gln Ile Ile Asp Lys Leu Lys His Ile Asn Gln Leu Leu
            435                 440                 445

Arg Thr Met Ser Val Pro Lys Gly Lys Val Leu Asp Lys Ser Leu Asp
        450                 455                 460

Glu Glu Gly Leu Glu Ser Gly Asp Cys Gly Asp Asp Glu Asp Glu Cys
465                 470                 475                 480

Ile Gly Ser Ser Gly Asp Gly Met Val Lys Val Lys Asn Gln Leu Arg
            485                 490                 495

Phe Leu Ala Glu Leu Ala Tyr Asp Leu Asp Val Asp Asp Ala Pro Gly
            500                 505                 510

Asn Lys Gln His Gly Asn Gln Lys Asp Asn Glu Ile Thr Thr Ser His
            515                 520                 525

Ser Val Gly Asn Met Pro Ser Pro Leu Lys Thr Ile Lys Pro Cys Pro
        530                 535                 540

Pro Cys Lys Cys Pro Ala Pro Asn Leu Leu Gly Gly Pro Ser Val Phe
545                 550                 555                 560

Ile Phe Pro Pro Lys Ile Lys Asp Val Leu Met Ile Ser Leu Ser Pro
            565                 570                 575

Ile Val Thr Cys Val Val Val Asp Val Ser Glu Asp Asp Pro Asp Val
            580                 585                 590

Gln Ile Ser Trp Phe Val Asn Asn Val Glu Val His Thr Ala Gln Thr
        595                 600                 605

Gln Thr His Arg Glu Asp Tyr Asn Ser Thr Leu Arg Val Val Ser Ala
        610                 615                 620

Leu Pro Ile Gln His Gln Asp Trp Met Ser Gly Lys Glu Phe Lys Cys
625                 630                 635                 640

Lys Val Asn Asn Lys Asp Leu Pro Ala Pro Ile Glu Arg Thr Ile Ser
                645                 650                 655

Lys Pro Lys Gly Ser Val Arg Ala Pro Gln Val Tyr Val Leu Pro Pro
            660                 665                 670

Pro Glu Glu Glu Met Thr Lys Lys Gln Val Thr Leu Thr Cys Met Val
            675                 680                 685

Thr Asp Phe Met Pro Glu Asp Ile Tyr Val Glu Trp Thr Asn Asn Gly
            690                 695                 700

Lys Thr Glu Leu Asn Tyr Lys Asn Thr Glu Pro Val Leu Asp Ser Asp
705                 710                 715                 720

Gly Ser Tyr Phe Met Tyr Ser Lys Leu Arg Val Glu Lys Lys Asn Trp
            725                 730                 735

Val Glu Arg Asn Ser Tyr Ser Cys Ser Val Val His Glu Gly Leu His
            740                 745                 750

Asn His His Thr Thr Lys Ser Phe Ser Arg Thr Pro Gly Lys
              755                 760                 765

<210> SEQ ID NO 27
<211> LENGTH: 2361
<212> TYPE: DNA
<213> ORGANISM: Homo sapiens

<400> SEQUENCE: 27

| | | | | | |
|---|---|---|---|---|---|
| atggccggaa | ctgtacggac | agcatgtctc | gtggtggcca | tgctcttgag | tctggactt | 60 |
| cccggccaag | cccaacctcc | ccctcctccc | ccgatgcca | cctgccatca | ggttaggtca | 120 |
| ttttccaaa | ggcttcagcc | cgggctgaag | tgggttcctg | aaaccctgt | ccctgggtcc | 180 |
| gatcttcagg | tctgcctccc | caaagggcct | acctgctgtt | cccgtaaaat | ggaggagaag | 240 |
| taccagttga | ccgctagact | caacatggag | cagctgctcc | agtcagcatc | tatggagttg | 300 |
| aagttcctga | ttatacaaaa | cgccgcagtt | ttccaggagg | catttgaaat | tgtagtacgt | 360 |
| cacgcaaaaa | actacaccaa | tgcaatgttc | aagaataact | atccctctct | gacccctcaa | 420 |
| gcctttgagt | tcgtaggcga | gttcttcacc | gatgtgagtc | tctatatcct | cgggtcagat | 480 |
| atcaacgtag | atgacatggt | aaatgaactt | tttgacagcc | tgtttcccgt | tatttatacc | 540 |
| cagctgatga | accctggcct | tccagactca | gcactcgaca | taaatgaatg | cctgcggggg | 600 |
| gccagacgcg | acttgaaggt | ttttgggaac | tttccaaagc | ttatcatgac | acaagtttca | 660 |
| aagtctttgc | aagtgacccg | tatttttcctt | caagctctca | accttggcat | tgaggtcata | 720 |
| aataccaccg | atcaccttaa | gttcagcaaa | gactgcggga | gaatgctgac | tcgcatgtgg | 780 |
| tactgcagct | attgccaggg | gctgatgatg | gtgaagcctt | gtggaggcta | ttgtaatgtg | 840 |
| gtgatgcagg | gatgtatggc | aggcgtagta | gagatcgaca | atattggcg | tgagtacatc | 900 |
| ctctctttgg | aggaacttgt | aaacggtatg | taccgaatat | atgacatgga | aaacgtgctt | 960 |
| ctgggactct | tctcaaccat | ccacgactca | atccaatatg | ttcaaaagaa | cgcaggaaaa | 1020 |
| cttactacaa | ctattggaaa | gctgtgtgca | cattcacagc | agcgtcagta | taggagcgca | 1080 |
| tattccccg | aagatttgtt | tatcgacaag | aaagtcttga | aggtagccca | tgttgaacac | 1140 |
| gaagaaactc | tctcctccag | acgccgtgaa | ctcattcaga | aacttaagtc | attcatatca | 1200 |
| ttttactctg | ctcttcccgg | ctatatctgt | tctcactcac | cagtagccga | gaatgatact | 1260 |
| ctctgctgga | acgtcagga | gcttgttgag | aggtactcac | aaaaagctgc | taggaacggc | 1320 |
| atgaagaacc | agtttaactt | gcacgaattg | aaaatgaaag | cccctgagcc | cgtagttagt | 1380 |
| cagattatcg | ataagttgaa | gcacatcaac | cagctgctca | ggacaatgtc | aatgcctaaa | 1440 |
| gggcgcgtac | ttgataagaa | cttggacgag | gagggttttg | aatcaggtga | ctgtggtgac | 1500 |
| gatgaggacg | agtgcatagg | tggaagcgga | gatggcatga | taaaggttaa | gaaccagctg | 1560 |
| agatttctcg | ctgaattggc | ctatgatttg | gatgtcgatg | acgcccctgg | aaatagtcaa | 1620 |
| caggccaccc | ctaaagacaa | cgagatttcc | acatttcaca | atcttggcaa | tgttcacagc | 1680 |
| ccacttaaaa | gcaagcccac | gtgcccaccc | cctgaactcc | tgggggggacc | gtctgtcttc | 1740 |
| atcttcccc | caaaacccaa | ggacaccctc | atgatctcac | gcaccccga | ggtcacatgc | 1800 |
| gtggtggtgg | acgtgagcca | ggatgacccc | gaggtgcagt | tcatatggta | cataaacaac | 1860 |
| gagcaggtgc | gcaccgcccg | gccgccgcta | cgggagcagc | agttcaacag | cacgatccgc | 1920 |
| gtggtcagca | ccctccccat | cgcgcaccag | gactggctga | ggggcaagga | gttcaagtgc | 1980 |
| aaagtccaca | caaaggcact | cccggccccc | atcgagaaaa | ccatctccaa | agccagaggg | 2040 |

-continued

```
cagcccctgg agccgaaggt ctacaccatg ggccctcccc gggaggagct gagcagcagg    2100
tcggtcagcc tgacctgcat gatcaacggc ttctacccct tccacatctc ggtggagtgg    2160
gagaagaacg ggaaggcaga ggacaactac aagaccacgc cggccgtgct ggacagcgac    2220
ggctcctact tcctctacag caagctctca gtgccacga gtgagtggca gcggggcgac     2280
gtcttcacct gctccgtgat gcacgaggcc ttgcacaacc actacacgca gaagtccatc    2340
tcccgctctc cgggtaaatg a                                              2361
```

<210> SEQ ID NO 28
<211> LENGTH: 762
<212> TYPE: PRT
<213> ORGANISM: Homo sapiens

<400> SEQUENCE: 28

```
Gln Pro Pro Pro Pro Pro Asp Ala Thr Cys His Gln Val Arg Ser
1               5                   10                  15

Phe Phe Gln Arg Leu Gln Pro Gly Leu Lys Trp Val Pro Glu Thr Pro
            20                  25                  30

Val Pro Gly Ser Asp Leu Gln Val Cys Leu Pro Lys Gly Pro Thr Cys
        35                  40                  45

Cys Ser Arg Lys Met Glu Glu Lys Tyr Gln Leu Thr Ala Arg Leu Asn
    50                  55                  60

Met Glu Gln Leu Leu Gln Ser Ala Ser Met Glu Leu Lys Phe Leu Ile
65                  70                  75                  80

Ile Gln Asn Ala Ala Val Phe Gln Glu Ala Phe Glu Ile Val Val Arg
                85                  90                  95

His Ala Lys Asn Tyr Thr Asn Ala Met Phe Lys Asn Asn Tyr Pro Ser
            100                 105                 110

Leu Thr Pro Gln Ala Phe Glu Phe Val Gly Glu Phe Phe Thr Asp Val
        115                 120                 125

Ser Leu Tyr Ile Leu Gly Ser Asp Ile Asn Val Asp Asp Met Val Asn
    130                 135                 140

Glu Leu Phe Asp Ser Leu Phe Pro Val Ile Tyr Thr Gln Leu Met Asn
145                 150                 155                 160

Pro Gly Leu Pro Asp Ser Ala Leu Asp Ile Asn Glu Cys Leu Arg Gly
                165                 170                 175

Ala Arg Arg Asp Leu Lys Val Phe Gly Asn Phe Pro Lys Leu Ile Met
            180                 185                 190

Thr Gln Val Ser Lys Ser Leu Gln Val Thr Arg Ile Phe Leu Gln Ala
        195                 200                 205

Leu Asn Leu Gly Ile Glu Val Ile Asn Thr Thr Asp His Leu Lys Phe
    210                 215                 220

Ser Lys Asp Cys Gly Arg Met Leu Thr Arg Met Trp Tyr Cys Ser Tyr
225                 230                 235                 240

Cys Gln Gly Leu Met Met Val Lys Pro Cys Gly Gly Tyr Cys Asn Val
                245                 250                 255

Val Met Gln Gly Cys Met Ala Gly Val Val Glu Ile Asp Lys Tyr Trp
            260                 265                 270

Arg Glu Tyr Ile Leu Ser Leu Glu Glu Leu Val Asn Gly Met Tyr Arg
        275                 280                 285

Ile Tyr Asp Met Glu Asn Val Leu Leu Gly Leu Phe Ser Thr Ile His
    290                 295                 300

Asp Ser Ile Gln Tyr Val Gln Lys Asn Ala Gly Lys Leu Thr Thr Thr
305                 310                 315                 320
```

```
Ile Gly Lys Leu Cys Ala His Ser Gln Gln Arg Gln Tyr Arg Ser Ala
            325                 330                 335

Tyr Tyr Pro Glu Asp Leu Phe Ile Asp Lys Lys Val Leu Lys Val Ala
            340                 345                 350

His Val Glu His Glu Glu Thr Leu Ser Ser Arg Arg Arg Glu Leu Ile
            355                 360                 365

Gln Lys Leu Lys Ser Phe Ile Ser Phe Tyr Ser Ala Leu Pro Gly Tyr
            370                 375                 380

Ile Cys Ser His Ser Pro Val Ala Glu Asn Asp Thr Leu Cys Trp Asn
385                 390                 395                 400

Gly Gln Glu Leu Val Glu Arg Tyr Ser Gln Lys Ala Ala Arg Asn Gly
                405                 410                 415

Met Lys Asn Gln Phe Asn Leu His Glu Leu Lys Met Lys Gly Pro Glu
            420                 425                 430

Pro Val Val Ser Gln Ile Ile Asp Lys Leu Lys His Ile Asn Gln Leu
            435                 440                 445

Leu Arg Thr Met Ser Met Pro Lys Gly Arg Val Leu Asp Lys Asn Leu
        450                 455                 460

Asp Glu Glu Gly Phe Glu Ser Gly Asp Cys Gly Asp Asp Glu Asp Glu
465                 470                 475                 480

Cys Ile Gly Gly Ser Gly Asp Gly Met Ile Lys Val Lys Asn Gln Leu
                485                 490                 495

Arg Phe Leu Ala Glu Leu Ala Tyr Asp Leu Asp Val Asp Asp Ala Pro
            500                 505                 510

Gly Asn Ser Gln Gln Ala Thr Pro Lys Asp Asn Glu Ile Ser Thr Phe
            515                 520                 525

His Asn Leu Gly Asn Val His Ser Pro Leu Lys Ser Lys Pro Thr Cys
            530                 535                 540

Pro Pro Pro Glu Leu Leu Gly Gly Pro Ser Val Phe Ile Phe Pro Pro
545                 550                 555                 560

Lys Pro Lys Asp Thr Leu Met Ile Ser Arg Thr Pro Glu Val Thr Cys
            565                 570                 575

Val Val Val Asp Val Ser Gln Asp Asp Pro Glu Val Gln Phe Thr Trp
            580                 585                 590

Tyr Ile Asn Asn Glu Gln Val Arg Thr Ala Arg Pro Pro Leu Arg Glu
        595                 600                 605

Gln Gln Phe Asn Ser Thr Ile Arg Val Val Ser Thr Leu Pro Ile Ala
        610                 615                 620

His Gln Asp Trp Leu Arg Gly Lys Glu Phe Lys Cys Lys Val His Asn
625                 630                 635                 640

Lys Ala Leu Pro Ala Pro Ile Glu Lys Thr Ile Ser Lys Ala Arg Gly
            645                 650                 655

Gln Pro Leu Glu Pro Lys Val Tyr Thr Met Gly Pro Pro Arg Glu Glu
            660                 665                 670

Leu Ser Ser Arg Ser Val Ser Leu Thr Cys Met Ile Asn Gly Phe Tyr
        675                 680                 685

Pro Ser Asp Ile Ser Val Glu Trp Glu Lys Asn Gly Lys Ala Glu Asp
690                 695                 700

Asn Tyr Lys Thr Thr Pro Ala Val Leu Asp Ser Asp Gly Ser Tyr Phe
705                 710                 715                 720

Leu Tyr Ser Lys Leu Ser Val Pro Thr Ser Glu Trp Gln Arg Gly Asp
            725                 730                 735
```

Val Phe Thr Cys Ser Val Met His Glu Ala Leu His Asn His Tyr Thr
            740                 745                 750

Gln Lys Ser Ile Ser Arg Ser Pro Gly Lys
        755                 760

<210> SEQ ID NO 29
<211> LENGTH: 2358
<212> TYPE: DNA
<213> ORGANISM: Mus musculus

<400> SEQUENCE: 29

| | | | | | |
|---|---|---|---|---|---|
| atggctggta | ctgttagaac | cgcttgcctg | ctcgttgcca | tgctcctggg | tcttggctgt | 60 |
| cttggccaag | cacagccacc | acccccacca | gacgctacct | gtcaccaagt | gcgttcattc | 120 |
| ttccaaaggc | tccagcccgg | tctcaagtgg | gttcccgaaa | ccctgtacc | aggttccgac | 180 |
| ctccaggttt | gcttgccaaa | agggcctaca | tgttgttctc | gcaagatgga | agagaaatac | 240 |
| caactcactg | ccaggctcaa | tatggagcaa | ctgctccaat | cagcatctat | ggagcttaag | 300 |
| ttcctcataa | ttcaaaatgc | agccgtattc | aggaagcct | cgagatcgt | cgtccgacac | 360 |
| gcaaagaact | atacaaatgc | catgtttaag | aacaactacc | cttcactcac | accccaagca | 420 |
| ttcgaatttg | taggagagtt | ctttacagat | gttagcttgt | atattctcgg | ttctgacata | 480 |
| aatgttgacg | acatggtaaa | cgaactgttt | gattctcttt | ttccagtaat | ctatacacaa | 540 |
| atgatgaatc | caggggttgcc | agaaagtgtt | ttggacataa | atgagtgttt | gcgcggggct | 600 |
| agaagggatt | tgaaggtttt | tgggtcattt | cccaagctca | ttatgactca | agttagtaaa | 660 |
| tctttgcagg | ttacaaggat | cttccttcag | gccttgaatc | tggggatcga | agtgattaac | 720 |
| actaccgatc | atctgaagtt | tagcaaggac | tgtggtcgaa | tgctcactag | aatgtggtat | 780 |
| tgcagttatt | gtcaaggtct | catgatggtc | aagccttgcg | ggggttactg | taacgtcgtg | 840 |
| atgcaaggtt | gtatggccgg | tgtagttgaa | atagataaat | attggagaga | gtacatcctc | 900 |
| tctctcgaag | aactggtcaa | tggtatgtac | cggatatatg | acatggaaaa | tgtgctcctc | 960 |
| ggtctctttt | ctacaatcca | tgattctatt | caatacgtgc | aaaagaacgg | aggtaagctt | 1020 |
| acaactacta | ttgggaaact | gtgtgcccac | agccagcaac | gccagtatcg | aagcgcttat | 1080 |
| tatcccgaag | acttgtttat | agataagaag | atccttaaag | ttgcacacgt | cgagcacgaa | 1140 |
| gagactctct | catctcgccg | acgcgagctc | attcaaaagt | tgaagagctt | tattaatttt | 1200 |
| tactctgcac | tgccagggta | catctgttcc | cacagcccag | tagcagaaaa | tgacaccctg | 1260 |
| tgctggaatg | tcaagagct | cgtggagagg | tactctcaaa | aagctgcacg | gaacggcatg | 1320 |
| aagaatcaat | tcaatcttca | tgaattgaag | atgaaaggcc | ctgaaccagt | tgtatcccag | 1380 |
| attatcgata | agcttaagca | tattaatcaa | cttctccgta | ctatgagcgt | ccctaaaggt | 1440 |
| aaagtactcg | acaaaagcct | tgatgaagaa | ggactggaaa | gtggcgattg | tggagacgat | 1500 |
| gaggacgagt | gtattggatc | atccggggac | ggaatggtaa | aggtaaaaaa | tcaattgcgc | 1560 |
| ttccttgcag | aattggctta | cgaccttgac | gttgatgacg | ctccaggcaa | taaacagcac | 1620 |
| gggaatcaga | aggacaacga | gataactaca | tctcatagtg | ttggcaacat | gccctctcca | 1680 |
| cttaaaagca | agcccacgtg | cccaccccct | gaactcctgg | ggggaccgtc | tgtcttcatc | 1740 |
| ttccccccaa | aacccaagga | caccctcatg | atctcacgca | cccccgaggt | cacatgcgtg | 1800 |
| gtggtggacg | tgagccagga | tgaccccgag | gtgcagttca | catggtacat | aaacaacgag | 1860 |
| caggtgcgca | ccgccggcc | gccgctacgg | gagcagcagt | tcaacagcac | gatccgcgtg | 1920 |
| gtcagcaccc | tccccatcgc | gcaccaggac | tggctgaggg | gcaaggagtt | caagtgcaaa | 1980 |

```
gtccacaaca aggcactccc ggcccccatc gagaaaacca tctccaaagc cagagggcag    2040
cccctggagc cgaaggtcta caccatgggc cctccccggg aggagctgag cagcaggtcg    2100
gtcagcctga cctgcatgat caacggcttc taccctteeg acatctcggt ggagtgggag    2160
aagaacggga aggcagagga caactacaag accacgccgg ccgtgctgga cagcgacggc    2220
tcctacttcc tctacagcaa gctctcagtg cccacgagtg agtggcagcg gggcgacgtc    2280
ttcacctgct ccgtgatgca cgaggccttg cacaaccact acacgcagaa gtccatctcc    2340
cgctctccgg gtaaatga                                                  2358
```

<210> SEQ ID NO 30
<211> LENGTH: 761
<212> TYPE: PRT
<213> ORGANISM: Mus musculus

<400> SEQUENCE: 30

```
Gln Pro Pro Pro Pro Asp Ala Thr Cys His Gln Val Arg Ser Phe
1               5                   10                  15

Phe Gln Arg Leu Gln Pro Gly Leu Lys Trp Val Pro Glu Thr Pro Val
            20                  25                  30

Pro Gly Ser Asp Leu Gln Val Cys Leu Pro Lys Gly Pro Thr Cys Cys
        35                  40                  45

Ser Arg Lys Met Glu Glu Lys Tyr Gln Leu Thr Ala Arg Leu Asn Met
    50                  55                  60

Glu Gln Leu Leu Gln Ser Ala Ser Met Glu Leu Lys Phe Leu Ile Ile
65                  70                  75                  80

Gln Asn Ala Ala Val Phe Gln Glu Ala Phe Glu Ile Val Val Arg His
                85                  90                  95

Ala Lys Asn Tyr Thr Asn Ala Met Phe Lys Asn Asn Tyr Pro Ser Leu
            100                 105                 110

Thr Pro Gln Ala Phe Glu Phe Val Gly Glu Phe Phe Thr Asp Val Ser
        115                 120                 125

Leu Tyr Ile Leu Gly Ser Asp Ile Asn Val Asp Asp Met Val Asn Glu
    130                 135                 140

Leu Phe Asp Ser Leu Phe Pro Val Ile Tyr Thr Gln Met Met Asn Pro
145                 150                 155                 160

Gly Leu Pro Glu Ser Val Leu Asp Ile Asn Glu Cys Leu Arg Gly Ala
                165                 170                 175

Arg Arg Asp Leu Lys Val Phe Gly Ser Phe Pro Lys Leu Ile Met Thr
            180                 185                 190

Gln Val Ser Lys Ser Leu Gln Val Thr Arg Ile Phe Leu Gln Ala Leu
        195                 200                 205

Asn Leu Gly Ile Glu Val Ile Asn Thr Thr Asp His Leu Lys Phe Ser
    210                 215                 220

Lys Asp Cys Gly Arg Met Leu Thr Arg Met Trp Tyr Cys Ser Tyr Cys
225                 230                 235                 240

Gln Gly Leu Met Met Val Lys Pro Cys Gly Gly Tyr Cys Asn Val Val
                245                 250                 255

Met Gln Gly Cys Met Ala Gly Val Val Glu Ile Asp Lys Tyr Trp Arg
            260                 265                 270

Glu Tyr Ile Leu Ser Leu Glu Glu Leu Val Asn Gly Met Tyr Arg Ile
        275                 280                 285

Tyr Asp Met Glu Asn Val Leu Leu Gly Leu Phe Ser Thr Ile His Asp
    290                 295                 300
```

```
Ser Ile Gln Tyr Val Gln Lys Asn Gly Gly Lys Leu Thr Thr Thr Ile
305                 310                 315                 320

Gly Lys Leu Cys Ala His Ser Gln Gln Arg Gln Tyr Arg Ser Ala Tyr
                325                 330                 335

Tyr Pro Glu Asp Leu Phe Ile Asp Lys Lys Ile Leu Lys Val Ala His
            340                 345                 350

Val Glu His Glu Glu Thr Leu Ser Ser Arg Arg Arg Glu Leu Ile Gln
        355                 360                 365

Lys Leu Lys Ser Phe Ile Asn Phe Tyr Ser Ala Leu Pro Gly Tyr Ile
370                 375                 380

Cys Ser His Ser Pro Val Ala Glu Asn Asp Thr Leu Cys Trp Asn Gly
385                 390                 395                 400

Gln Glu Leu Val Glu Arg Tyr Ser Gln Lys Ala Ala Arg Asn Gly Met
                405                 410                 415

Lys Asn Gln Phe Asn Leu His Glu Leu Lys Met Lys Gly Pro Glu Pro
            420                 425                 430

Val Val Ser Gln Ile Ile Asp Lys Leu Lys His Ile Asn Gln Leu Leu
        435                 440                 445

Arg Thr Met Ser Val Pro Lys Gly Lys Val Leu Asp Lys Ser Leu Asp
450                 455                 460

Glu Gly Leu Glu Ser Gly Asp Cys Gly Asp Asp Glu Asp Glu Cys
465                 470                 475                 480

Ile Gly Ser Ser Gly Asp Gly Met Val Lys Val Lys Asn Gln Leu Arg
                485                 490                 495

Phe Leu Ala Glu Leu Ala Tyr Asp Leu Asp Val Asp Ala Pro Gly
            500                 505                 510

Asn Lys Gln His Gly Asn Gln Lys Asp Asn Glu Ile Thr Thr Ser His
        515                 520                 525

Ser Val Gly Asn Met Pro Ser Pro Leu Lys Ser Lys Pro Thr Cys Pro
530                 535                 540

Pro Pro Glu Leu Leu Gly Gly Pro Ser Val Phe Ile Phe Pro Pro Lys
545                 550                 555                 560

Pro Lys Asp Thr Leu Met Ile Ser Arg Thr Pro Glu Val Thr Cys Val
                565                 570                 575

Val Val Asp Val Ser Gln Asp Asp Pro Glu Val Gln Phe Thr Trp Tyr
            580                 585                 590

Ile Asn Asn Glu Gln Val Arg Thr Ala Arg Pro Pro Leu Arg Glu Gln
        595                 600                 605

Gln Phe Asn Ser Thr Ile Arg Val Val Ser Thr Leu Pro Ile Ala His
        610                 615                 620

Gln Asp Trp Leu Arg Gly Lys Glu Phe Lys Cys Lys Val His Asn Lys
625                 630                 635                 640

Ala Leu Pro Ala Pro Ile Glu Lys Thr Ile Ser Lys Ala Arg Gly Gln
                645                 650                 655

Pro Leu Glu Pro Lys Val Tyr Thr Met Gly Pro Pro Arg Glu Glu Leu
            660                 665                 670

Ser Ser Arg Ser Val Ser Leu Thr Cys Met Ile Asn Gly Phe Tyr Pro
        675                 680                 685

Ser Asp Ile Ser Val Glu Trp Glu Lys Asn Gly Lys Ala Glu Asp Asn
        690                 695                 700

Tyr Lys Thr Thr Pro Ala Val Leu Asp Ser Asp Gly Ser Tyr Phe Leu
705                 710                 715                 720
```

```
Tyr Ser Lys Leu Ser Val Pro Thr Ser Glu Trp Gln Arg Gly Asp Val
            725                 730                 735

Phe Thr Cys Ser Val Met His Glu Ala Leu His Asn His Tyr Thr Gln
        740                 745                 750

Lys Ser Ile Ser Arg Ser Pro Gly Lys
        755                 760

<210> SEQ ID NO 31
<211> LENGTH: 539
<212> TYPE: PRT
<213> ORGANISM: Homo sapiens

<400> SEQUENCE: 31

Gln Pro Pro Pro Pro Pro Asp Ala Thr Cys His Gln Val Arg Ser
1               5                   10                  15

Phe Phe Gln Arg Leu Gln Pro Gly Leu Lys Trp Val Pro Glu Thr Pro
                20                  25                  30

Val Pro Gly Ser Asp Leu Gln Val Cys Leu Pro Lys Gly Pro Thr Cys
            35                  40                  45

Cys Ser Arg Lys Met Glu Glu Lys Tyr Gln Leu Thr Ala Arg Leu Asn
    50                  55                  60

Met Glu Gln Leu Leu Gln Ser Ala Ser Met Glu Leu Lys Phe Leu Ile
65                  70                  75                  80

Ile Gln Asn Ala Ala Val Phe Gln Glu Ala Phe Glu Ile Val Val Arg
                85                  90                  95

His Ala Lys Asn Tyr Thr Asn Ala Met Phe Lys Asn Asn Tyr Pro Ser
                100                 105                 110

Leu Thr Pro Gln Ala Phe Glu Phe Val Gly Glu Phe Phe Thr Asp Val
            115                 120                 125

Ser Leu Tyr Ile Leu Gly Ser Asp Ile Asn Val Asp Asp Met Val Asn
    130                 135                 140

Glu Leu Phe Asp Ser Leu Phe Pro Val Ile Tyr Thr Gln Leu Met Asn
145                 150                 155                 160

Pro Gly Leu Pro Asp Ser Ala Leu Asp Ile Asn Glu Cys Leu Arg Gly
                165                 170                 175

Ala Arg Arg Asp Leu Lys Val Phe Gly Asn Phe Pro Lys Leu Ile Met
                180                 185                 190

Thr Gln Val Ser Lys Ser Leu Gln Val Thr Arg Ile Phe Leu Gln Ala
            195                 200                 205

Leu Asn Leu Gly Ile Glu Val Ile Asn Thr Thr Asp His Leu Lys Phe
    210                 215                 220

Ser Lys Asp Cys Gly Arg Met Leu Thr Arg Met Trp Tyr Cys Ser Tyr
225                 230                 235                 240

Cys Gln Gly Leu Met Met Val Lys Pro Cys Gly Gly Tyr Cys Asn Val
                245                 250                 255

Val Met Gln Gly Cys Met Ala Gly Val Val Glu Ile Asp Lys Tyr Trp
            260                 265                 270

Arg Glu Tyr Ile Leu Ser Leu Glu Glu Leu Val Asn Gly Met Tyr Arg
                275                 280                 285

Ile Tyr Asp Met Glu Asn Val Leu Leu Gly Leu Phe Ser Thr Ile His
        290                 295                 300

Asp Ser Ile Gln Tyr Val Gln Lys Asn Ala Gly Lys Leu Thr Thr Thr
305                 310                 315                 320

Ile Gly Lys Leu Cys Ala His Ser Gln Gln Arg Gln Tyr Arg Ser Ala
                325                 330                 335
```

```
Tyr Tyr Pro Glu Asp Leu Phe Ile Asp Lys Lys Val Leu Lys Val Ala
            340                 345                 350

His Val Glu His Glu Thr Leu Ser Ser Arg Arg Glu Leu Ile
            355                 360                 365

Gln Lys Leu Lys Ser Phe Ile Ser Phe Tyr Ser Ala Leu Pro Gly Tyr
    370                 375                 380

Ile Cys Ser His Ser Pro Val Ala Glu Asn Asp Thr Leu Cys Trp Asn
385                 390                 395                 400

Gly Gln Glu Leu Val Glu Arg Tyr Ser Gln Lys Ala Ala Arg Asn Gly
                405                 410                 415

Met Lys Asn Gln Phe Asn Leu His Glu Leu Lys Met Lys Gly Pro Glu
            420                 425                 430

Pro Val Val Ser Gln Ile Ile Asp Lys Leu Lys His Ile Asn Gln Leu
                435                 440                 445

Leu Arg Thr Met Ser Met Pro Lys Gly Arg Val Leu Asp Lys Asn Leu
    450                 455                 460

Asp Glu Glu Gly Phe Glu Ser Gly Asp Cys Gly Asp Asp Glu Asp Glu
465                 470                 475                 480

Cys Ile Gly Gly Ser Gly Asp Gly Met Ile Lys Val Lys Asn Gln Leu
                485                 490                 495

Arg Phe Leu Ala Glu Leu Ala Tyr Asp Leu Asp Val Asp Asp Ala Pro
            500                 505                 510

Gly Asn Ser Gln Gln Ala Thr Pro Lys Asp Asn Glu Ile Ser Thr Phe
                515                 520                 525

His Asn Leu Gly Asn Val His Ser Pro Leu Lys
        530                 535

<210> SEQ ID NO 32
<211> LENGTH: 2304
<212> TYPE: DNA
<213> ORGANISM: Homo sapiens

<400> SEQUENCE: 32
caacccccac ctcctccacc tgatgcaact tgtcatcaag tacgtagttt tttccagcgg    60
ctgcagcccg gactgaagtg ggtgcccgag actcccgtac ctgggtcaga cctgcaggta   120
tgtcttccta aaggccccac ttgttgcagc aggaaaatgg aggagaaata ccaactcacc   180
gccagactta acatggaaca attgctgcag tccgcatcta tggagctcaa attcctgata   240
attcaaaacg ctgcagtgtt ccaggaagca tttgaaatag tggttaggca tgcaaagaac   300
tacacaaatg ccatgtttaa aaataactac ccctccctca ccacaagc cttcgaattt     360
gttggagaat tcttcacaga cgtaagtctt tacatactgg gtagcgacat caacgtcgat   420
gacatggtca atgaactctt cgactccctg ttccctgtga tctataccca actcatgaat   480
ccaggtctgc ccgatagcgc cctcgacata aatgagtgcc ttcgcggagc ccgaagggat   540
ctgaaagttt ttgggaattt tccaaagctc atcatgaccc aagtgagcaa gtctctgcag   600
gtcacccgga ttttttctgca ggccctcaac ctgggcatag aagttataaa cacaacagat   660
catctcaaat ttagcaaaga tgcgggaga atgctgacac ggatgtggta ttgctcttat   720
tgccagggac tgatgatggt taagccctgc ggaggttact gcaacgtagt gatgcaaggg   780
tgcatggctg agtggtgga gatagacaaa tactggaggg aatatatact tagtctggag   840
gagttggtga acgtatgta taggatatat gatatggaga cgttctgtt gggccttttc    900
tcaactatcc atgactccat tcagtatgtt cagaagaacg ctggaaaact gaccacaacc   960
```

-continued

```
attggtaagt tgtgtgccca ttctcagcag cggcaatatc gatccgctta ctaccccgag    1020
gatctgttta tcgataagaa agttcttaag gtggctcatg tagagcatga agagactctg    1080
tcaagccgga gacgcgagtt gatacagaag ctgaaatcat ttatttcctt ctactctgct    1140
ctcccaggct acatctgttc tcatagtcct gttgcagaga acgataccct gtgctggaac    1200
gggcaagagc ttgtagaacg ctatagccaa aaagcagctc gcaatggtat gaaaaaccag    1260
ttcaatctgc atgaactgaa gatgaagggc cccgaacctg tagttagcca aatcattgat    1320
aagttgaagc atataaatca acttctccga actatgtcca tgcccaaagg gcgcgtcctt    1380
gacaaaaacc tggacgaaga ggggtttgag tccggcgact gcggtgatga cgaggacgaa    1440
tgtatcggag ggtccggtga cggcatgata aagtaaaga atcagctcag attcctcgca    1500
gaacttgcat acgatcttga tgtagacgat gcccctggga attctcagca ggcaactcct    1560
aaagataatg aaatttccac ttttcacaat ctcggaaatg tgcatagtcc cctgaaactt    1620
gaggtattgt tccagggacc catgagccct atccttggat actggaaaat aaaaggactc    1680
gtgcaaccca cccgcctgct gctggagtat ctggaagaaa agtacgagga gcatctttat    1740
gaaagagacg aaggtgacaa gtggcgaaac aagaagtttg agcttggact tgagtttccc    1800
aaccttccct attatatcga cggcgacgtt aaacttaccc aatcaatggc cattattaga    1860
tatatagctg ataaacataa tatgctcggt ggatgtccca aagagcgcgc cgaaataagt    1920
atgctggagg gcgctgtgct ggacattcgt tacggagtgt ccagaatcgc ttactcaaaa    1980
gactttgaaa ccctcaaggt agacttcctc tcaaaattgc cagagatgtt gaagatgttt    2040
gaagatcgac tctgtcataa aacttatctc aatggtgatc acgttacaca ccccgatttc    2100
atgctttacg acgccttgga tgtcgtcttg tatatggatc ctatgtgtct tgatgctttc    2160
cctaagttgg tatgcttcaa aaagagaatt gaagctattc cccagatcga caaatacctg    2220
aaatccagca agtatattgc ctggcctctt caaggatggc aagccacatt cggaggtggc    2280
gatcatcccc caaaatccga ttga                                           2304
```

<210> SEQ ID NO 33
<211> LENGTH: 767
<212> TYPE: PRT
<213> ORGANISM: Homo sapiens

<400> SEQUENCE: 33

```
Gln Pro Pro Pro Pro Pro Asp Ala Thr Cys His Gln Val Arg Ser
1               5                   10                  15

Phe Phe Gln Arg Leu Gln Pro Gly Leu Lys Trp Val Pro Glu Thr Pro
                20                  25                  30

Val Pro Gly Ser Asp Leu Gln Val Cys Leu Pro Lys Gly Pro Thr Cys
            35                  40                  45

Cys Ser Arg Lys Met Glu Glu Lys Tyr Gln Leu Thr Ala Arg Leu Asn
        50                  55                  60

Met Glu Gln Leu Leu Gln Ser Ala Ser Met Glu Leu Lys Phe Leu Ile
65                  70                  75                  80

Ile Gln Asn Ala Ala Val Phe Gln Glu Ala Phe Glu Ile Val Val Arg
                85                  90                  95

His Ala Lys Asn Tyr Thr Asn Ala Met Phe Lys Asn Asn Tyr Pro Ser
            100                 105                 110

Leu Thr Pro Gln Ala Phe Glu Phe Val Gly Glu Phe Phe Thr Asp Val
        115                 120                 125
```

```
Ser Leu Tyr Ile Leu Gly Ser Asp Ile Asn Val Asp Asp Met Val Asn
130                 135                 140

Glu Leu Phe Asp Ser Leu Phe Pro Val Ile Tyr Thr Gln Leu Met Asn
145                 150                 155                 160

Pro Gly Leu Pro Asp Ser Ala Leu Asp Ile Asn Glu Cys Leu Arg Gly
                165                 170                 175

Ala Arg Arg Asp Leu Lys Val Phe Gly Asn Phe Pro Lys Leu Ile Met
            180                 185                 190

Thr Gln Val Ser Lys Ser Leu Gln Val Thr Arg Ile Phe Leu Gln Ala
        195                 200                 205

Leu Asn Leu Gly Ile Glu Val Ile Asn Thr Thr Asp His Leu Lys Phe
210                 215                 220

Ser Lys Asp Cys Gly Arg Met Leu Thr Arg Met Trp Tyr Cys Ser Tyr
225                 230                 235                 240

Cys Gln Gly Leu Met Met Val Lys Pro Cys Gly Gly Tyr Cys Asn Val
                245                 250                 255

Val Met Gln Gly Cys Met Ala Gly Val Val Glu Ile Asp Lys Tyr Trp
            260                 265                 270

Arg Glu Tyr Ile Leu Ser Leu Glu Glu Leu Val Asn Gly Met Tyr Arg
        275                 280                 285

Ile Tyr Asp Met Glu Asn Val Leu Leu Gly Leu Phe Ser Thr Ile His
290                 295                 300

Asp Ser Ile Gln Tyr Val Gln Lys Asn Ala Gly Lys Leu Thr Thr Thr
305                 310                 315                 320

Ile Gly Lys Leu Cys Ala His Ser Gln Gln Arg Gln Tyr Arg Ser Ala
                325                 330                 335

Tyr Tyr Pro Glu Asp Leu Phe Ile Asp Lys Lys Val Leu Lys Val Ala
            340                 345                 350

His Val Glu His Glu Thr Leu Ser Ser Arg Arg Arg Glu Leu Ile
        355                 360                 365

Gln Lys Leu Lys Ser Phe Ile Ser Phe Tyr Ser Ala Leu Pro Gly Tyr
370                 375                 380

Ile Cys Ser His Ser Pro Val Ala Glu Asn Asp Thr Leu Cys Trp Asn
385                 390                 395                 400

Gly Gln Glu Leu Val Glu Arg Tyr Ser Gln Lys Ala Ala Arg Asn Gly
                405                 410                 415

Met Lys Asn Gln Phe Asn Leu His Glu Leu Lys Met Lys Gly Pro Glu
            420                 425                 430

Pro Val Val Ser Gln Ile Ile Asp Lys Leu Lys His Ile Asn Gln Leu
        435                 440                 445

Leu Arg Thr Met Ser Met Pro Lys Gly Arg Val Leu Asp Lys Asn Leu
450                 455                 460

Asp Glu Glu Gly Phe Glu Ser Gly Asp Cys Gly Asp Asp Glu Asp Glu
465                 470                 475                 480

Cys Ile Gly Gly Ser Gly Asp Gly Met Ile Lys Val Lys Asn Gln Leu
                485                 490                 495

Arg Phe Leu Ala Glu Leu Ala Tyr Asp Leu Asp Val Asp Asp Ala Pro
            500                 505                 510

Gly Asn Ser Gln Gln Ala Thr Pro Lys Asp Asn Glu Ile Ser Thr Phe
        515                 520                 525

His Asn Leu Gly Asn Val His Ser Pro Leu Lys Leu Glu Val Leu Phe
530                 535                 540

Gln Gly Pro Met Ser Pro Ile Leu Gly Tyr Trp Lys Ile Lys Gly Leu
```

```
                545                 550                 555                 560
            Val Gln Pro Thr Arg Leu Leu Glu Tyr Leu Glu Glu Lys Tyr Glu
                            565                 570                 575

Glu His Leu Tyr Glu Arg Asp Glu Gly Asp Lys Trp Arg Asn Lys Lys
                            580                 585                 590

Phe Glu Leu Gly Leu Glu Phe Pro Asn Leu Pro Tyr Tyr Ile Asp Gly
                            595                 600                 605

Asp Val Lys Leu Thr Gln Ser Met Ala Ile Ile Arg Tyr Ile Ala Asp
                            610                 615                 620

Lys His Asn Met Leu Gly Gly Cys Pro Lys Glu Arg Ala Glu Ile Ser
            625                 630                 635                 640

Met Leu Glu Gly Ala Val Leu Asp Ile Arg Tyr Gly Val Ser Arg Ile
                            645                 650                 655

Ala Tyr Ser Lys Asp Phe Glu Thr Leu Lys Val Asp Phe Leu Ser Lys
                            660                 665                 670

Leu Pro Glu Met Leu Lys Met Phe Glu Asp Arg Leu Cys His Lys Thr
                            675                 680                 685

Tyr Leu Asn Gly Asp His Val Thr His Pro Asp Phe Met Leu Tyr Asp
                            690                 695                 700

Ala Leu Asp Val Val Leu Tyr Met Asp Pro Met Cys Leu Asp Ala Phe
            705                 710                 715                 720

Pro Lys Leu Val Cys Phe Lys Lys Arg Ile Glu Ala Ile Pro Gln Ile
                            725                 730                 735

Asp Lys Tyr Leu Lys Ser Ser Lys Tyr Ile Ala Trp Pro Leu Gln Gly
                            740                 745                 750

Trp Gln Ala Thr Phe Gly Gly Gly Asp His Pro Pro Lys Ser Asp
                            755                 760                 765

<210> SEQ ID NO 34
<211> LENGTH: 2412
<212> TYPE: DNA
<213> ORGANISM: Homo sapiens

<400> SEQUENCE: 34
atggctggca cagtgaggac tgcttgtctc gtagtcgcaa tgttgcttag cttggacttc        60
ccaggtcaag cacaaccccc accccacccc ccagatgcaa cttgtcacca ggttcggagc       120
ttcttccagc gactgcagcc tggattgaag tgggttcctg agacaccagt tcctgggagt       180
gatctccaag tctgtctccc taagggtccc acatgttgtt cacgaaagat ggaggaaaag       240
tatcaattga cagcaagact gaacatggaa caacttctgc agtcagcatc aatggagctt       300
aaattcctca ttatacaaaa tgctgctgtc ttccaggaag ccttcgaaat agtggttagg       360
cacgccaaaa attacacaaa tgccatgttc aaaaacaact atccttccct caccccacag       420
gcctttgaat tgttggaga gttttttcact gatgttagtt tgtatatatt gggatcagac       480
ataaatgtgg atgatatggt gaacgaattg tttgatagcc tgttccctgt catatacacc       540
cagcttatga accccggttt gcctgacagt gcacttgaca ttaatgagtg tctgagaggt       600
gctcgtaggg atctcaaggt gttcgggaac tttccaaagc ttataatgac tcaggtttca       660
aagagtctgc aagtaactag gatcttttg caagccttga acttgggaat tgaggtaata       720
aataccactg atcacctgaa attcagtaaa gattgtggga ggatgttgac tcgcatgtgg       780
tattgcagtt attgtcaggg tttgatgatg gtcaaaccct gtggcggtta ttgcaacgta       840
gtgatgcagg gctgcatggc tggagtagta gaaatagata agtactggcg cgagtacata       900
```

```
ctgtcacttg aggagcttgt caatggaatg tataggatct atgacatgga aaatgttctc    960
cttgggcttt tcagtacaat ccatgatagc atccaatacg ttcaaaagaa cgccgggaag   1020
cttacaacca ccataggaaa attgtgcgct cattcacaac aacggcaata ccgcagcgca   1080
tattatcctg aagacctctt tattgacaag aaggttctta aggtcgccca cgttgagcat   1140
gaagaaacac tgagttcccg gcgccgcgag ctgatacaaa aattgaagtc tttcataagt   1200
ttctactccg ccctgcccgg ttacatctgt tctcattccc ccgtagccga gaacgacact   1260
ctctgctgga acggtcaaga gctggtcgag cggtacagtc aaaaggcagc caggaatgga   1320
atgaaaaacc aatttaatct ccatgagttg aaaatgaagg gtcccgaacc agtggtcagt   1380
cagataatag ataaacttaa acacataaat caacttctcc gaacaatgtc tatgcccaag   1440
ggccgcgtac ttgacaagaa tttgacgag aaggcttcg aggccgggga ttgcggcgac   1500
gatgaggatg agtgtatcgg aggagctggg gatgggatga tcaaagttaa gaatcaactc   1560
cgtttcctgg ctgagcttgc atacgacctt gatgtagacg acgccccgg gaattcccag   1620
caagctaccc caaaggacaa cgaaattagt acatttcata atctggggaa tgtgcactca   1680
cctctgaaat ctagagcaga ctacaaggac gacgatgaca agactagtga caaaactcac   1740
acatgcccac cgtgcccagc acctgaactc ctggggggac cgtcagtctt cctcttcccc   1800
ccaaaaccca aggacaccct catgatctcc cggacccctg aggtcacatg cgtggtggtg   1860
gacgtgagcc acgaagaccc tgaggtcaag ttcaactggt acgtggacgg cgtggaggtg   1920
cataatgcca agacaaagcc gcgggaggag cagtacaaca gcacgtaccg tgtggtcagc   1980
gtcctcaccg tcctgcacca ggactggctg aatggcaagg agtacaagtg caaggtctcc   2040
aacaaagccc tcccagcccc catcgagaaa accatctcca agccaaagg gcagccccga   2100
gaaccacagg tgtacaccct gcccccatcc cgggatgagc tgaccaagaa ccaggtcagc   2160
ctgacctgcc tggtcaaagg cttctatccc agcgacatcg ccgtggagtg ggagagcaat   2220
gggcagccgg agaacaacta caagaccacg cctcccgtgc tggactccga cggctccttc   2280
ttcctctaca gcaagctcac cgtggacaag agcaggtggc agcaggggaa cgtcttctca   2340
tgctccgtga tgcatgaggc tctgcacaac cactacacgc agaagagcct ctccctgtct   2400
ccgggtaaat ga                                                      2412
```

<210> SEQ ID NO 35
<211> LENGTH: 779
<212> TYPE: PRT
<213> ORGANISM: Homo sapiens

<400> SEQUENCE: 35

```
Gln Pro Pro Pro Pro Pro Asp Ala Thr Cys His Gln Val Arg Ser
 1               5                  10                  15

Phe Phe Gln Arg Leu Gln Pro Gly Leu Lys Trp Val Pro Glu Thr Pro
                20                  25                  30

Val Pro Gly Ser Asp Leu Gln Val Cys Leu Pro Lys Gly Pro Thr Cys
            35                  40                  45

Cys Ser Arg Lys Met Glu Glu Lys Tyr Gln Leu Thr Ala Arg Leu Asn
        50                  55                  60

Met Glu Gln Leu Leu Gln Ser Ala Ser Met Glu Leu Lys Phe Leu Ile
    65                  70                  75                  80

Ile Gln Asn Ala Ala Val Phe Gln Glu Ala Phe Glu Ile Val Val Arg
                85                  90                  95

His Ala Lys Asn Tyr Thr Asn Ala Met Phe Lys Asn Asn Tyr Pro Ser
```

```
                100             105                 110
Leu Thr Pro Gln Ala Phe Glu Phe Val Gly Glu Phe Phe Thr Asp Val
            115                 120                 125
Ser Leu Tyr Ile Leu Gly Ser Asp Ile Asn Val Asp Asp Met Val Asn
            130                 135             140
Glu Leu Phe Asp Ser Leu Phe Pro Val Ile Tyr Thr Gln Leu Met Asn
145                 150                 155                 160
Pro Gly Leu Pro Asp Ser Ala Leu Asp Ile Asn Glu Cys Leu Arg Gly
                165                 170                 175
Ala Arg Arg Asp Leu Lys Val Phe Gly Asn Phe Pro Lys Leu Ile Met
            180                 185                 190
Thr Gln Val Ser Lys Ser Leu Gln Val Thr Arg Ile Phe Leu Gln Ala
            195                 200                 205
Leu Asn Leu Gly Ile Glu Val Ile Asn Thr Thr Asp His Leu Lys Phe
            210                 215                 220
Ser Lys Asp Cys Gly Arg Met Leu Thr Arg Met Trp Tyr Cys Ser Tyr
225                 230                 235                 240
Cys Gln Gly Leu Met Met Val Lys Pro Cys Gly Gly Tyr Cys Asn Val
                245                 250                 255
Val Met Gln Gly Cys Met Ala Gly Val Val Glu Ile Asp Lys Tyr Trp
            260                 265                 270
Arg Glu Tyr Ile Leu Ser Leu Glu Glu Leu Val Asn Gly Met Tyr Arg
            275                 280                 285
Ile Tyr Asp Met Glu Asn Val Leu Leu Gly Leu Phe Ser Thr Ile His
            290                 295                 300
Asp Ser Ile Gln Tyr Val Gln Lys Asn Ala Gly Lys Leu Thr Thr Thr
305                 310                 315                 320
Ile Gly Lys Leu Cys Ala His Ser Gln Gln Arg Gln Tyr Arg Ser Ala
                325                 330                 335
Tyr Tyr Pro Glu Asp Leu Phe Ile Asp Lys Lys Val Leu Lys Val Ala
                340                 345                 350
His Val Glu His Glu Thr Leu Ser Ser Arg Arg Arg Glu Leu Ile
            355                 360                 365
Gln Lys Leu Lys Ser Phe Ile Ser Phe Tyr Ser Ala Leu Pro Gly Tyr
            370                 375                 380
Ile Cys Ser His Ser Pro Val Ala Glu Asn Asp Thr Leu Cys Trp Asn
385                 390                 395                 400
Gly Gln Glu Leu Val Glu Arg Tyr Ser Gln Lys Ala Ala Arg Asn Gly
                405                 410                 415
Met Lys Asn Gln Phe Asn Leu His Glu Leu Lys Met Lys Gly Pro Glu
            420                 425                 430
Pro Val Ser Gln Ile Ile Asp Lys Leu Lys His Ile Asn Gln Leu
            435                 440                 445
Leu Arg Thr Met Ser Met Pro Lys Gly Arg Val Leu Asp Lys Asn Leu
450                 455                 460
Asp Glu Glu Gly Phe Glu Ala Gly Asp Cys Gly Asp Asp Glu Asp Glu
465                 470                 475                 480
Cys Ile Gly Gly Ala Gly Asp Gly Met Ile Lys Val Lys Asn Gln Leu
                485                 490                 495
Arg Phe Leu Ala Glu Leu Ala Tyr Asp Leu Asp Val Asp Asp Ala Pro
            500                 505                 510
Gly Asn Ser Gln Gln Ala Thr Pro Lys Asp Asn Glu Ile Ser Thr Phe
            515                 520                 525
```

His Asn Leu Gly Asn Val His Ser Pro Leu Lys Ser Arg Ala Asp Tyr
        530                 535                 540

Lys Asp Asp Asp Lys Thr Ser Asp Lys Thr His Thr Cys Pro Pro
545                 550                 555                 560

Cys Pro Ala Pro Glu Leu Leu Gly Gly Pro Ser Val Phe Leu Phe Pro
                565                 570                 575

Pro Lys Pro Lys Asp Thr Leu Met Ile Ser Arg Thr Pro Glu Val Thr
            580                 585                 590

Cys Val Val Val Asp Val Ser His Glu Asp Pro Glu Val Lys Phe Asn
        595                 600                 605

Trp Tyr Val Asp Gly Val Glu Val His Asn Ala Lys Thr Lys Pro Arg
        610                 615                 620

Glu Glu Gln Tyr Asn Ser Thr Tyr Arg Val Val Ser Val Leu Thr Val
625                 630                 635                 640

Leu His Gln Asp Trp Leu Asn Gly Lys Glu Tyr Lys Cys Lys Val Ser
                645                 650                 655

Asn Lys Ala Leu Pro Ala Pro Ile Glu Lys Thr Ile Ser Lys Ala Lys
            660                 665                 670

Gly Gln Pro Arg Glu Pro Gln Val Tyr Thr Leu Pro Pro Ser Arg Asp
        675                 680                 685

Glu Leu Thr Lys Asn Gln Val Ser Leu Thr Cys Leu Val Lys Gly Phe
    690                 695                 700

Tyr Pro Ser Asp Ile Ala Val Glu Trp Glu Ser Asn Gly Gln Pro Glu
705                 710                 715                 720

Asn Asn Tyr Lys Thr Thr Pro Pro Val Leu Asp Ser Asp Gly Ser Phe
                725                 730                 735

Phe Leu Tyr Ser Lys Leu Thr Val Asp Lys Ser Arg Trp Gln Gln Gly
            740                 745                 750

Asn Val Phe Ser Cys Ser Val Met His Glu Ala Leu His Asn His Tyr
        755                 760                 765

Thr Gln Lys Ser Leu Ser Leu Ser Pro Gly Lys
        770                 775

<210> SEQ ID NO 36
<211> LENGTH: 538
<212> TYPE: PRT
<213> ORGANISM: Mus musculus

<400> SEQUENCE: 36

Gln Pro Pro Pro Pro Asp Ala Thr Cys His Gln Val Arg Ser Phe
1               5                   10                  15

Phe Gln Arg Leu Gln Pro Gly Leu Lys Trp Val Pro Glu Thr Pro Val
            20                  25                  30

Pro Gly Ser Asp Leu Gln Val Cys Leu Pro Lys Gly Pro Thr Cys Cys
        35                  40                  45

Ser Arg Lys Met Glu Glu Lys Tyr Gln Leu Thr Ala Arg Leu Asn Met
    50                  55                  60

Glu Gln Leu Leu Gln Ser Ala Ser Met Glu Leu Lys Phe Leu Ile Ile
65                  70                  75                  80

Gln Asn Ala Ala Val Phe Gln Glu Ala Phe Glu Ile Val Val Arg His
                85                  90                  95

Ala Lys Asn Tyr Thr Asn Ala Met Phe Lys Asn Asn Tyr Pro Ser Leu
            100                 105                 110

Thr Pro Gln Ala Phe Glu Phe Val Gly Glu Phe Phe Thr Asp Val Ser

-continued

```
            115                 120                 125
Leu Tyr Ile Leu Gly Ser Asp Ile Asn Val Asp Met Val Asn Glu
            130                 135                 140
Leu Phe Asp Ser Leu Phe Pro Val Ile Tyr Thr Gln Met Met Asn Pro
145                 150                 155                 160
Gly Leu Pro Glu Ser Val Leu Asp Ile Asn Glu Cys Leu Arg Gly Ala
                    165                 170                 175
Arg Arg Asp Leu Lys Val Phe Gly Ser Phe Pro Lys Leu Ile Met Thr
                    180                 185                 190
Gln Val Ser Lys Ser Leu Gln Val Thr Arg Ile Phe Leu Gln Ala Leu
                    195                 200                 205
Asn Leu Gly Ile Glu Val Ile Asn Thr Thr Asp His Leu Lys Phe Ser
210                 215                 220
Lys Asp Cys Gly Arg Met Leu Thr Arg Met Trp Tyr Cys Ser Tyr Cys
225                 230                 235                 240
Gln Gly Leu Met Met Val Lys Pro Cys Gly Gly Tyr Cys Asn Val Val
                    245                 250                 255
Met Gln Gly Cys Met Ala Gly Val Val Glu Ile Asp Lys Tyr Trp Arg
                    260                 265                 270
Glu Tyr Ile Leu Ser Leu Glu Glu Leu Val Asn Gly Met Tyr Arg Ile
                    275                 280                 285
Tyr Asp Met Glu Asn Val Leu Leu Gly Leu Phe Ser Thr Ile His Asp
                    290                 295                 300
Ser Ile Gln Tyr Val Gln Lys Asn Gly Gly Lys Leu Thr Thr Thr Ile
305                 310                 315                 320
Gly Lys Leu Cys Ala His Ser Gln Gln Arg Gln Tyr Arg Ser Ala Tyr
                    325                 330                 335
Tyr Pro Glu Asp Leu Phe Ile Asp Lys Lys Ile Leu Lys Val Ala His
                    340                 345                 350
Val Glu His Glu Glu Thr Leu Ser Ser Arg Arg Arg Glu Leu Ile Gln
                    355                 360                 365
Lys Leu Lys Ser Phe Ile Asn Phe Tyr Ser Ala Leu Pro Gly Tyr Ile
                    370                 375                 380
Cys Ser His Ser Pro Val Ala Glu Asn Asp Thr Leu Cys Trp Asn Gly
385                 390                 395                 400
Gln Glu Leu Val Glu Arg Tyr Ser Gln Lys Ala Ala Arg Asn Gly Met
                    405                 410                 415
Lys Asn Gln Phe Asn Leu His Glu Leu Lys Met Lys Gly Pro Glu Pro
                    420                 425                 430
Val Val Ser Gln Ile Ile Asp Lys Leu Lys His Ile Asn Gln Leu Leu
                    435                 440                 445
Arg Thr Met Ser Val Pro Lys Gly Lys Val Leu Asp Lys Ser Leu Asp
                    450                 455                 460
Glu Glu Gly Leu Glu Ser Gly Asp Cys Gly Asp Asp Glu Asp Glu Cys
465                 470                 475                 480
Ile Gly Ser Ser Gly Asp Gly Met Val Lys Val Lys Asn Gln Leu Arg
                    485                 490                 495
Phe Leu Ala Glu Leu Ala Tyr Asp Leu Asp Val Asp Asp Ala Pro Gly
                    500                 505                 510
Asn Lys Gln His Gly Asn Gln Lys Asp Asn Glu Ile Thr Thr Ser His
                    515                 520                 525
Ser Val Gly Asn Met Pro Ser Pro Leu Lys
                    530                 535
```

<210> SEQ ID NO 37
<211> LENGTH: 2409
<212> TYPE: DNA
<213> ORGANISM: Mus musculus

<400> SEQUENCE: 37

| | | | | | |
|---|---|---|---|---|---|
| atggcaggaa | ctgtaaggac | tgcctgtttg | ctcgtagcca | tgcttctcgg | ccttggatgt | 60 |
| ttgggtcaag | cccagccccc | cccaccacca | gacgcaacat | gccatcaagt | ccgctcattc | 120 |
| ttccaaagac | ttcaaccagg | gcttaagtgg | gtgcccgaga | ccccgtgcc | aggcagtgat | 180 |
| ctccaggtct | gtctgcctaa | aggtcccacc | tgttgttctc | gtaaaatgga | agagaaatac | 240 |
| caactgacag | ctcgacttaa | catggaacag | cttctccaat | ctgcaagtat | ggagttgaag | 300 |
| ttccttataa | tacagaacgc | cgccgtgttc | caggaagctt | tgagatcgt | tgtacggcac | 360 |
| gccaagaatt | atacaaacgc | aatgtttaag | aataactatc | cttctcttac | acctcaggct | 420 |
| tttgagttcg | ttggtgagtt | tttcaccgat | gtgtccctct | acatacttgg | ttctgatata | 480 |
| aatgtggacg | acatggtcaa | cgagctcttc | gattctttgt | ttcctgtaat | ctacactcag | 540 |
| atgatgaatc | ccggcctccc | agagagtgtg | cttgacatca | acgaatgtct | tcgtggcgct | 600 |
| cgtcgagatc | ttaaggtatt | tgggtcattc | cctaagctca | tcatgaccca | ggtgtctaag | 660 |
| agtcttcagg | tcacaagaat | cttcctgcaa | gccctcaacc | tgggaataga | agtgatcaac | 720 |
| acaactgacc | atctcaaatt | ctcaaaggac | tgcgggcgaa | tgcttaccag | gatgtggtat | 780 |
| tgtagttatt | gccaaggact | catgatggtc | aaaccctgcg | gtggatattg | caatgtagta | 840 |
| atgcagggtt | gtatggctgg | ggtggtggag | attgacaaat | actggcgtga | gtacatactg | 900 |
| tcccttgagg | aacttgtgaa | cggtatgtac | cgaatttacg | atatggagaa | tgtgttgctc | 960 |
| gggctgttta | gtactattca | tgatagcatt | cagtacgtgc | aaaaaaacgg | aggcaaactc | 1020 |
| accactacaa | taggaaaatt | gtgcgcacac | tcccagcaaa | ggcagtaccg | gtccgcctac | 1080 |
| tacccagagg | accttttat | tgataaaaag | atcttgaagg | tcgcccacgt | agagcacgaa | 1140 |
| gaaacactga | gctctagacg | ccgcgagttg | atccaaaaat | tgaagtcctt | catcaacttt | 1200 |
| tactctgccc | tcccagggta | catctgctcc | cactcacccg | tcgctgaaaa | tgacaccttg | 1260 |
| tgttggaacg | gacaggagct | tgttgagcgt | tatagtcaaa | aggctgcacg | caatgggatg | 1320 |
| aagaaccaat | tcaacctgca | tgaactgaag | atgaagggtc | ctgagcctgt | tgtatcacaa | 1380 |
| ataattgaca | gttgaagca | cataaatcaa | ctgcttagga | caatgagcgt | ccccaaaggc | 1440 |
| aaagtcctcg | ataagagcct | tgacgaggag | ggcttggaag | caggggattg | cggagacgac | 1500 |
| gaggatgaat | gtatcggtag | tgctggcgat | ggcatggtaa | aagtgaagaa | tcagcttcgg | 1560 |
| tttcttgcag | agttggctta | tgatcttgat | gtcgatgatg | cacccggtaa | taaacagcac | 1620 |
| ggtaaccaga | aagacaatga | aataactacc | tcacatagtg | tcggaaacat | gccctctcca | 1680 |
| cttaagtcta | gagcagacta | caaggacgac | gatgacaaga | ctagtgacaa | aactcacaca | 1740 |
| tgcccaccgt | gcccagcacc | tgaactcctg | ggggaccgt | cagtcttcct | cttccccca | 1800 |
| aaacccaagg | acaccctcat | gatctcccgg | accctgagg | tcacatgcgt | ggtggtggac | 1860 |
| gtgagccacg | aagaccctga | ggtcaagttc | aactggtacg | tggacggcgt | ggaggtgcat | 1920 |
| aatgccaaga | caaagccgcg | ggaggagcag | tacaacagca | cgtaccgtgt | ggtcagcgtc | 1980 |
| ctcaccgtcc | tgcaccagga | ctggctgaat | ggcaaggagt | acaagtgcaa | ggtctccaac | 2040 |
| aaagccctcc | cagcccccat | cgagaaaacc | atctccaaag | ccaagggca | gccccgagaa | 2100 |

```
ccacaggtgt acaccctgcc cccatcccgg gatgagctga ccaagaaccca ggtcagcctg    2160 acctgcctgg tcaaaggctt ctatcccagc gacatcgccg tggagtggga gagcaatggg    2220
cagccggaga caactacaa gaccacgcct cccgtgctgg actccgacgg ctccttcttc    2280
ctctacagca agctcaccgt ggacaagagc aggtggcagc aggggaacgt cttctcatgc    2340
tccgtgatgc atgaggctct gcacaaccac tacacgcaga agagcctctc cctgtctccg    2400
ggtaaatga                                                             2409
```

<210> SEQ ID NO 38
<211> LENGTH: 778
<212> TYPE: PRT
<213> ORGANISM: Mus musculus

<400> SEQUENCE: 38

```
Gln Pro Pro Pro Pro Asp Ala Thr Cys His Gln Val Arg Ser Phe
1               5                   10                  15

Phe Gln Arg Leu Gln Pro Gly Leu Lys Trp Val Pro Glu Thr Pro Val
            20                  25                  30

Pro Gly Ser Asp Leu Gln Val Cys Leu Pro Lys Gly Pro Thr Cys Cys
        35                  40                  45

Ser Arg Lys Met Glu Glu Lys Tyr Gln Leu Thr Ala Arg Leu Asn Met
    50                  55                  60

Glu Gln Leu Leu Gln Ser Ala Ser Met Glu Leu Lys Phe Leu Ile Ile
65                  70                  75                  80

Gln Asn Ala Ala Val Phe Gln Glu Ala Phe Glu Ile Val Val Arg His
                85                  90                  95

Ala Lys Asn Tyr Thr Asn Ala Met Phe Lys Asn Asn Tyr Pro Ser Leu
            100                 105                 110

Thr Pro Gln Ala Phe Glu Phe Val Gly Glu Phe Phe Thr Asp Val Ser
        115                 120                 125

Leu Tyr Ile Leu Gly Ser Asp Ile Asn Val Asp Asp Met Val Asn Glu
    130                 135                 140

Leu Phe Asp Ser Leu Phe Pro Val Ile Tyr Thr Gln Met Met Asn Pro
145                 150                 155                 160

Gly Leu Pro Glu Ser Val Leu Asp Ile Asn Glu Cys Leu Arg Gly Ala
                165                 170                 175

Arg Arg Asp Leu Lys Val Phe Gly Ser Phe Pro Lys Leu Ile Met Thr
            180                 185                 190

Gln Val Ser Lys Ser Leu Gln Val Thr Arg Ile Phe Leu Gln Ala Leu
        195                 200                 205

Asn Leu Gly Ile Glu Val Ile Asn Thr Thr Asp His Leu Lys Phe Ser
    210                 215                 220

Lys Asp Cys Gly Arg Met Leu Thr Arg Met Trp Tyr Cys Ser Tyr Cys
225                 230                 235                 240

Gln Gly Leu Met Met Val Lys Pro Cys Gly Gly Tyr Cys Asn Val Val
                245                 250                 255

Met Gln Gly Cys Met Ala Gly Val Val Glu Ile Asp Lys Tyr Trp Arg
            260                 265                 270

Glu Tyr Ile Leu Ser Leu Glu Glu Leu Val Asn Gly Met Tyr Arg Ile
        275                 280                 285

Tyr Asp Met Glu Asn Val Leu Leu Gly Leu Phe Ser Thr Ile His Asp
    290                 295                 300

Ser Ile Gln Tyr Val Gln Lys Asn Gly Gly Lys Leu Thr Thr Thr Ile
305                 310                 315                 320
```

```
Gly Lys Leu Cys Ala His Ser Gln Gln Arg Gln Tyr Arg Ser Ala Tyr
                325                 330                 335

Tyr Pro Glu Asp Leu Phe Ile Asp Lys Lys Ile Leu Lys Val Ala His
                340                 345                 350

Val Glu His Glu Glu Thr Leu Ser Ser Arg Arg Arg Glu Leu Ile Gln
                355                 360                 365

Lys Leu Lys Ser Phe Ile Asn Phe Tyr Ser Ala Leu Pro Gly Tyr Ile
                370                 375                 380

Cys Ser His Ser Pro Val Ala Glu Asn Asp Thr Leu Cys Trp Asn Gly
385                 390                 395                 400

Gln Glu Leu Val Glu Arg Tyr Ser Gln Lys Ala Ala Arg Asn Gly Met
                405                 410                 415

Lys Asn Gln Phe Asn Leu His Glu Leu Lys Met Lys Gly Pro Glu Pro
                420                 425                 430

Val Val Ser Gln Ile Ile Asp Lys Leu Lys His Ile Asn Gln Leu Leu
                435                 440                 445

Arg Thr Met Ser Val Pro Lys Gly Lys Val Leu Asp Lys Ser Leu Asp
                450                 455                 460

Glu Glu Gly Leu Glu Ala Gly Asp Cys Gly Asp Asp Glu Asp Glu Cys
465                 470                 475                 480

Ile Gly Ser Ala Gly Asp Gly Met Val Lys Val Lys Asn Gln Leu Arg
                485                 490                 495

Phe Leu Ala Glu Leu Ala Tyr Asp Leu Asp Val Asp Asp Ala Pro Gly
                500                 505                 510

Asn Lys Gln His Gly Asn Gln Lys Asp Asn Glu Ile Thr Thr Ser His
                515                 520                 525

Ser Val Gly Asn Met Pro Ser Pro Leu Lys Ser Arg Ala Asp Tyr Lys
                530                 535                 540

Asp Asp Asp Asp Lys Thr Ser Asp Lys Thr His Thr Cys Pro Pro Cys
545                 550                 555                 560

Pro Ala Pro Glu Leu Leu Gly Gly Pro Ser Val Phe Leu Phe Pro Pro
                565                 570                 575

Lys Pro Lys Asp Thr Leu Met Ile Ser Arg Thr Pro Glu Val Thr Cys
                580                 585                 590

Val Val Val Asp Val Ser His Glu Asp Pro Glu Val Lys Phe Asn Trp
                595                 600                 605

Tyr Val Asp Gly Val Glu Val His Asn Ala Lys Thr Lys Pro Arg Glu
                610                 615                 620

Glu Gln Tyr Asn Ser Thr Tyr Arg Val Val Ser Val Leu Thr Val Leu
625                 630                 635                 640

His Gln Asp Trp Leu Asn Gly Lys Glu Tyr Lys Cys Lys Val Ser Asn
                645                 650                 655

Lys Ala Leu Pro Ala Pro Ile Glu Lys Thr Ile Ser Lys Ala Lys Gly
                660                 665                 670

Gln Pro Arg Glu Pro Gln Val Tyr Thr Leu Pro Pro Ser Arg Asp Glu
                675                 680                 685

Leu Thr Lys Asn Gln Val Ser Leu Thr Cys Leu Val Lys Gly Phe Tyr
                690                 695                 700

Pro Ser Asp Ile Ala Val Glu Trp Glu Ser Asn Gly Gln Pro Glu Asn
705                 710                 715                 720

Asn Tyr Lys Thr Thr Pro Pro Val Leu Asp Ser Asp Gly Ser Phe Phe
                725                 730                 735
```

| | | | | | | | | | | | | |
|---|---|---|---|---|---|---|---|---|---|---|---|---|
| Leu | Tyr | Ser | Lys | Leu | Thr | Val | Asp | Lys | Ser | Arg | Trp | Gln | Gln | Gly | Asn |
| | | | 740 | | | | | 745 | | | | | 750 | | |
| Val | Phe | Ser | Cys | Ser | Val | Met | His | Glu | Ala | Leu | His | Asn | His | Tyr | Thr |
| | | 755 | | | | | 760 | | | | | 765 | | | |
| Gln | Lys | Ser | Leu | Ser | Leu | Ser | Pro | Gly | Lys | | | | | | |
| | 770 | | | | 775 | | | | | | | | | | |

<210> SEQ ID NO 39
<211> LENGTH: 1743
<212> TYPE: DNA
<213> ORGANISM: Homo sapiens

<400> SEQUENCE: 39

| | |
|---|---|
| atggccggaa ctgtacggac agcatgtctc gtggtggcca tgctcttgag tctggacttt | 60 |
| cccggccaag cccaacctcc ccctcctccc ccgatgcca cctgccatca ggttaggtca | 120 |
| ttttccaaa ggcttcagcc cgggctgaag tgggttcctg aaaccctgt ccctgggtcc | 180 |
| gatcttcagg tctgcctccc caaagggcct acctgctgtt cccgtaaaat ggaggagaag | 240 |
| taccagttga ccgctagact caacatggag cagctgctcc agtcagcatc tatggagttg | 300 |
| aagttcctga ttatacaaaa cgccgcagtt ttccaggagg catttgaaat tgtagtacgt | 360 |
| cacgcaaaaa actacaccaa tgcaatgttc aagaataact atccctctct gaccctcaa | 420 |
| gcctttgagt tcgtaggcga gttcttcacc gatgtgagtc tctatatcct cgggtcagat | 480 |
| atcaacgtag atgacatggt aaatgaactt tttgacagcc tgtttcccgt tatttatacc | 540 |
| cagctgatga accctggcct tccagactca gcactcgaca taaatgaatg cctgcgggg | 600 |
| gccagacgcg acttgaaggt ttttgggaac tttccaaagc ttatcatgac acaagtttca | 660 |
| aagtctttgc aagtgacccg tattttcctt caagctctca accttggcat tgaggtcata | 720 |
| aataccaccg atcaccttaa gttcagcaaa gactgcggga gaatgctgac tcgcatgtgg | 780 |
| tactgcagct attgccaggg gctgatgatg gtgaagcctt gtggaggcta ttgtaatgtg | 840 |
| gtgatgcagg gatgtatggc aggcgtagta gagatcgaca aatattggcg tgagtacatc | 900 |
| ctctctttgg aggaacttgt aaacggtatg taccgaatat atgacatgga aaacgtgctt | 960 |
| ctgggactct tctcaaccat ccacgactca atccaatatg ttcaaaagaa cgcaggaaaa | 1020 |
| cttactacaa ctattggaaa gctgtgtgca cattcacagc agcgtcagta taggagcgca | 1080 |
| tattaccccg aagatttgtt tatcgacaag aaagtcttga aggtagccca tgttgaacac | 1140 |
| gaagaaactc tctcctccag acgccgtgaa ctcattcaga acttaagtc attcatatca | 1200 |
| ttttactctg ctcttcccgg ctatatctgt tctcactcac cagtagccga gaatgatact | 1260 |
| ctctgctgga acggtcagga gcttgttgag aggtactcac aaaaagctgc taggaacggc | 1320 |
| atgaagaacc agtttaactt gcacgaattg aaaatgaaag ccctgagcc cgtagttagt | 1380 |
| cagattatcg ataagttgaa gcacatcaac cagctgctca ggacaatgtc aatgcctaaa | 1440 |
| gggcgcgtac ttgataagaa cttggacgag gagggttttg aatcaggtga ctgtggtgac | 1500 |
| gatgaggacg agtgcatagg tggaagcgga gatggcatga taaggttaa gaaccagctg | 1560 |
| agatttctcg ctgaattggc ctatgatttg gatgtcgatg acgcccctgg aaatagtcaa | 1620 |
| caggccaccc ctaaagacaa cgagatttcc acatttcaca atcttggcaa tgttcacagc | 1680 |
| ccacttaaac ttttgaccctc tatggctatt tccgtagtct gttttttctt ccttgttcat | 1740 |
| tga | 1743 |

<210> SEQ ID NO 40

<211> LENGTH: 369
<212> TYPE: DNA
<213> ORGANISM: Artificial Sequence
<220> FEATURE:
<223> OTHER INFORMATION: description of the artificial sequence: the base sequence of GpS1019VH

<400> SEQUENCE: 40

```
gaggtgcagc tggtgcagtc tggaggaggc ttggtacagc cggggggtc cctgagactc      60
tcctgtgcag cctctggatt cgccttcagt acctatagca ttaactgggt ccgccaggct    120
ccagggaagg ggctggagtg gatttcatac attagtagta gtagtaatac catatactac    180
gcagactctg tgaagggccg attcaccatc tccagagaca tgccaagaa ctcactgtat     240
ctgcaaatga gcagcctgaa agacgaggac acggctgtgt attactgtgc gagaggatat    300
ggttcgggga gttattttag gaactggttc gaccctgg gccagggaac cctggtcacc     360
gtctcctca                                                           369
```

<210> SEQ ID NO 41
<211> LENGTH: 123
<212> TYPE: PRT
<213> ORGANISM: Artificial Sequence
<220> FEATURE:
<223> OTHER INFORMATION: description of the artificial sequence: the amino acid sequence of GpS1019VH

<400> SEQUENCE: 41

```
Glu Val Gln Leu Val Gln Ser Gly Gly Gly Leu Val Gln Pro Gly Gly
1               5                   10                  15

Ser Leu Arg Leu Ser Cys Ala Ala Ser Gly Phe Ala Phe Ser Thr Tyr
            20                  25                  30

Ser Ile Asn Trp Val Arg Gln Ala Pro Gly Lys Gly Leu Glu Trp Ile
        35                  40                  45

Ser Tyr Ile Ser Ser Ser Ser Asn Thr Ile Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Ser Ser Leu Lys Asp Glu Asp Thr Ala Val Tyr Tyr Cys
                85                  90                  95

Ala Arg Gly Tyr Gly Ser Gly Ser Tyr Phe Arg Asn Trp Phe Asp Pro
            100                 105                 110

Trp Gly Gln Gly Thr Leu Val Thr Val Ser Ser
        115                 120
```

<210> SEQ ID NO 42
<211> LENGTH: 5
<212> TYPE: PRT
<213> ORGANISM: Artificial Sequence
<220> FEATURE:
<223> OTHER INFORMATION: description of the artificial sequence: the amino acid sequence of GpS1019 HCDR1

<400> SEQUENCE: 42

```
Thr Tyr Ser Ile Asn
1               5
```

<210> SEQ ID NO 43
<211> LENGTH: 17
<212> TYPE: PRT
<213> ORGANISM: Artificial Sequence
<220> FEATURE:
<223> OTHER INFORMATION: description of the artificial sequence: the amino acid sequence of GpS1019 HCDR2

<400> SEQUENCE: 43

Tyr Ile Ser Ser Ser Ser Asn Thr Ile Tyr Tyr Ala Asp Ser Val Lys
1               5                   10                  15

Gly

<210> SEQ ID NO 44
<211> LENGTH: 14
<212> TYPE: PRT
<213> ORGANISM: Artificial Sequence
<220> FEATURE:
<223> OTHER INFORMATION: description of the artificial sequence: the
      amino acid sequence of GpS1019 HCDR3

<400> SEQUENCE: 44

Gly Tyr Gly Ser Gly Ser Tyr Phe Arg Asn Trp Phe Asp Pro
1               5                   10

<210> SEQ ID NO 45
<211> LENGTH: 372
<212> TYPE: DNA
<213> ORGANISM: Artificial Sequence
<220> FEATURE:
<223> OTHER INFORMATION: description of the artificial sequence: the
      base sequence of GpA6005 VH

<400> SEQUENCE: 45
caggtgcagc tggtggagtc tgggggaggc ttggtacagc ctggggggtc cctgagactc      60
tcctgtgcag cctctggatt caccttcagt agctatagca tgaactgggt ccgccaggct     120
ccagggaagg ggctggagtg ggtgtcctac attaagagta gcggtagttc cacatactac     180
gcagactctg tgaagggccg cttcaccatc tccagagaca tgccaagaa ctcactgaat     240 ctgcaaatga acagcctgag agacgaggac acggctgtgt attactgtgc gagagggacg     300
tattactatg gttcgggaaa ttttttcctt tttgactact ggggccaggg aaccctggtc     360
accgtctcct ca                                                         372

<210> SEQ ID NO 46
<211> LENGTH: 124
<212> TYPE: PRT
<213> ORGANISM: Artificial Sequence
<220> FEATURE:
<223> OTHER INFORMATION: description of the artificial sequence: the
      amino acid sequence of GpA6005 VH

<400> SEQUENCE: 46

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ser Met Asn Trp Val Arg Gln Ala Pro Gly Lys Gly Leu Glu Trp Val
        35                  40                  45

Ser Tyr Ile Lys Ser Ser Gly Ser Ser Thr Tyr Tyr Ala Asp Ser Val
    50                  55                  60

Lys Gly Arg Phe Thr Ile Ser Arg Asp Asn Ala Lys Asn Ser Leu Asn
65                  70                  75                  80

Leu Gln Met Asn Ser Leu Arg Asp Glu Asp Thr Ala Val Tyr Tyr Cys
                85                  90                  95

Ala Arg Gly Thr Tyr Tyr Gly Ser Gly Asn Phe Phe Leu Phe Asp
            100                 105                 110

Tyr Trp Gly Gln Gly Thr Leu Val Thr Val Ser Ser
        115                 120

<210> SEQ ID NO 47
<211> LENGTH: 5
<212> TYPE: PRT
<213> ORGANISM: Artificial Sequence
<220> FEATURE:
<223> OTHER INFORMATION: description of the artificial sequence: the
      amino acid sequence of GpA6005 HCDR1

<400> SEQUENCE: 47

Ser Tyr Ser Met Asn
1               5

<210> SEQ ID NO 48
<211> LENGTH: 17
<212> TYPE: PRT
<213> ORGANISM: Artificial Sequence
<220> FEATURE:
<223> OTHER INFORMATION: description of the artificial sequence: the
      amino acid sequence of GpA6005 HCDR2

<400> SEQUENCE: 48

Tyr Ile Lys Ser Ser Gly Ser Ser Thr Tyr Tyr Ala Asp Ser Val Lys
1               5                   10                  15

Gly

<210> SEQ ID NO 49
<211> LENGTH: 15
<212> TYPE: PRT
<213> ORGANISM: Artificial Sequence
<220> FEATURE:
<223> OTHER INFORMATION: description of the artificial sequence: the
      amino acid sequence of GpA6005 HCDR3

<400> SEQUENCE: 49

Gly Thr Tyr Tyr Tyr Gly Ser Gly Asn Phe Phe Leu Phe Asp Tyr
1               5                   10                  15

<210> SEQ ID NO 50
<211> LENGTH: 372
<212> TYPE: DNA
<213> ORGANISM: Artificial Sequence
<220> FEATURE:
<223> OTHER INFORMATION: description of the artificial sequence: the
      base sequence of GpA6014 VH

<400> SEQUENCE: 50
cagatgcagc tggtgcagtc tgggggaggc ttggtacagc ctggggggtc cctgagactc      60
tcctgtgcag cctctggatt ctccttcagt agttatgcca tgaactgggt ccgccaggct     120
ccagggaagg gactggaatg ggtttcatac attactagtg gtggtagttc cagatactac     180
gcagactctg tgaagggccg attcaccatc tccagagaca acgccaagaa ctcactgtat     240
ctgcaaatga acagcctgag agacgaggac acggctgtgt attactgtgc gagagggacg     300
tattactatg gttcggggaa ttatttcctt tttgaccact ggggccaggg aaccatggtc     360
accgtctcct ca                                                          372

<210> SEQ ID NO 51
<211> LENGTH: 124
<212> TYPE: PRT
<213> ORGANISM: Artificial Sequence
<220> FEATURE:

<223> OTHER INFORMATION: description of the artificial sequence: the
      amino acid sequence of GpA6014 VH

<400> SEQUENCE: 51

Gln Met Gln Leu Val Gln Ser Gly Gly Gly Leu Val Gln Pro Gly Gly
1               5                   10                  15

Ser Leu Arg Leu Ser Cys Ala Ala Ser Gly Phe Ser Phe Ser Ser Tyr
            20                  25                  30

Ala Met Asn Trp Val Arg Gln Ala Pro Gly Lys Gly Leu Glu Trp Val
        35                  40                  45

Ser Tyr Ile Thr Ser Gly Gly Ser Ser Arg Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Ala Arg Gly Thr Tyr Tyr Tyr Gly Ser Gly Asn Tyr Phe Leu Phe Asp
            100                 105                 110

His Trp Gly Gln Gly Thr Met Val Thr Val Ser Ser
        115                 120

<210> SEQ ID NO 52
<211> LENGTH: 5
<212> TYPE: PRT
<213> ORGANISM: Artificial Sequence
<220> FEATURE:
<223> OTHER INFORMATION: description of the artificial sequence: the
      amino acid sequence of GpA6014 HCDR1

<400> SEQUENCE: 52

Ser Tyr Ala Met Asn
1               5

<210> SEQ ID NO 53
<211> LENGTH: 17
<212> TYPE: PRT
<213> ORGANISM: Artificial Sequence
<220> FEATURE:
<223> OTHER INFORMATION: description of the artificial sequence: the
      amino acid sequence of GpA6014 HCDR2

<400> SEQUENCE: 53

Tyr Ile Thr Ser Gly Gly Ser Ser Arg Tyr Tyr Ala Asp Ser Val Lys
1               5                   10                  15

Gly

<210> SEQ ID NO 54
<211> LENGTH: 15
<212> TYPE: PRT
<213> ORGANISM: Artificial Sequence
<220> FEATURE:
<223> OTHER INFORMATION: description of the artificial sequence: the
      amino acid sequence of GpA6014 HCDR3

<400> SEQUENCE: 54

Gly Thr Tyr Tyr Tyr Gly Ser Gly Asn Tyr Phe Leu Phe Asp His
1               5                   10                  15

<210> SEQ ID NO 55
<211> LENGTH: 372
<212> TYPE: DNA
<213> ORGANISM: Artificial Sequence
<220> FEATURE:

<223> OTHER INFORMATION: description of the artificial sequence: the
base sequence of GpA6062 VH

<400> SEQUENCE: 55

```
gaggtgcagc tggtggagac cggggggaggc ttggtacagc ctggggggtc cctgagactc    60
tcctgtgcag cctctggatt ctccttcagt agctatgcca tgaactgggt ccgccaggct   120
ccagggaagg gactggaatg ggtttcatac attactagtg gtggtagttc cagatactac   180
gcagactctg tgaagggccg attcaccatc tccagagaca cgccaagaa ctcactgtat    240 ctgcaaatga acagcctgag agacgaggac acggctgtgt attactgtgc gagagggacg   300
tattactatg gttcggggaa ttatttcctt tttgactact ggggccaggg aaccacggtc   360
accgtctcct ca                                                        372
```

<210> SEQ ID NO 56
<211> LENGTH: 124
<212> TYPE: PRT
<213> ORGANISM: Artificial Sequence
<220> FEATURE:
<223> OTHER INFORMATION: description of the artificial sequence: the
amino acid sequence of GpA6062 VH

<400> SEQUENCE: 56

Glu Val Gln Leu Val Glu Thr Gly Gly Gly Leu Val Gln Pro Gly Gly
1               5                   10                  15

Ser Leu Arg Leu Ser Cys Ala Ala Ser Gly Phe Ser Phe Ser Ser Tyr
            20                  25                  30

Ala Met Asn Trp Val Arg Gln Ala Pro Gly Lys Gly Leu Glu Trp Val
        35                  40                  45

Ser Tyr Ile Thr Ser Gly Gly Ser Ser Arg Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Ala Arg Gly Thr Tyr Tyr Tyr Gly Ser Gly Asn Tyr Phe Leu Phe Asp
            100                 105                 110

Tyr Trp Gly Gln Gly Thr Thr Val Thr Val Ser Ser
        115                 120

<210> SEQ ID NO 57
<211> LENGTH: 5
<212> TYPE: PRT
<213> ORGANISM: Artificial Sequence
<220> FEATURE:
<223> OTHER INFORMATION: description of the artificial sequence: the
amino acid sequence of GpA6062 HCDR1

<400> SEQUENCE: 57

Ser Tyr Ala Met Asn
1               5

<210> SEQ ID NO 58
<211> LENGTH: 17
<212> TYPE: PRT
<213> ORGANISM: Artificial Sequence
<220> FEATURE:
<223> OTHER INFORMATION: description of the artificial sequence: the
amino acid sequence of GpA6062 HCDR2

<400> SEQUENCE: 58

```
Tyr Ile Thr Ser Gly Gly Ser Ser Arg Tyr Tyr Ala Asp Ser Val Lys
1               5                   10                  15

Gly
```

<210> SEQ ID NO 59
<211> LENGTH: 15
<212> TYPE: PRT
<213> ORGANISM: Artificial Sequence
<220> FEATURE:
<223> OTHER INFORMATION: description of the artificial sequence: the
      amino acid sequence of GpA6062 HCDR3

<400> SEQUENCE: 59

```
Gly Thr Tyr Tyr Tyr Gly Ser Gly Asn Tyr Phe Leu Phe Asp Tyr
1               5                   10                  15
```

<210> SEQ ID NO 60
<211> LENGTH: 357
<212> TYPE: DNA
<213> ORGANISM: Artificial Sequence
<220> FEATURE:
<223> OTHER INFORMATION: description of the artificial sequence: the
      base sequence of GpS3003 VH

<400> SEQUENCE: 60

```
caggtgcagc tggtgcagtc tgggggaggc ttggtacagc ctggggggtc cctgagactc      60
tcctgtgcag cctctggatt caccttcagt cactatacca tgaactgggt ccgccaggct     120
ccagggaagg ggctggagtg ggtttcatac attaatagtg gtcgtagtac cataaagtac     180
gcagactctg tgaagggccg attcaccatc tccagagaca atgccaagaa gtcattgtat     240
ctgcaaatga atagtctgag agacgaggac acggctgtgt atttctgtgc gagatgggag     300
tgggagcagg aagcttttga tatctggggc caagggacaa tggtcaccgt ctcttca      357
```

<210> SEQ ID NO 61
<211> LENGTH: 119
<212> TYPE: PRT
<213> ORGANISM: Artificial Sequence
<220> FEATURE:
<223> OTHER INFORMATION: description of the artificial sequence: the
      amino acid sequence of GpS3003 VH

<400> SEQUENCE: 61

```
Gln Val Gln Leu Val Gln Ser Gly Gly Gly Leu Val Gln Pro Gly Gly
1               5                   10                  15

Ser Leu Arg Leu Ser Cys Ala Ala Ser Gly Phe Thr Phe Ser His Tyr
            20                  25                  30

Thr Met Asn Trp Val Arg Gln Ala Pro Gly Lys Gly Leu Glu Trp Val
        35                  40                  45

Ser Tyr Ile Asn Ser Gly Arg Ser Thr Ile Lys Tyr Ala Asp Ser Val
    50                  55                  60

Lys Gly Arg Phe Thr Ile Ser Arg Asp Asn Ala Lys Lys Ser Leu Tyr
65                  70                  75                  80

Leu Gln Met Asn Ser Leu Arg Asp Glu Asp Thr Ala Val Tyr Phe Cys
                85                  90                  95

Ala Arg Trp Glu Trp Glu Gln Glu Ala Phe Asp Ile Trp Gly Gln Gly
            100                 105                 110

Thr Met Val Thr Val Ser Ser
        115
```

<210> SEQ ID NO 62

```
<211> LENGTH: 5
<212> TYPE: PRT
<213> ORGANISM: Artificial Sequence
<220> FEATURE:
<223> OTHER INFORMATION: description of the artificial sequence: the
      amino acid sequence of GpS3003 HCDR1

<400> SEQUENCE: 62

His Tyr Thr Met Asn
1               5

<210> SEQ ID NO 63
<211> LENGTH: 17
<212> TYPE: PRT
<213> ORGANISM: Artificial Sequence
<220> FEATURE:
<223> OTHER INFORMATION: description of the artificial sequence: the
      amino acid sequence of GpS3003 HCDR2

<400> SEQUENCE: 63

Tyr Ile Asn Ser Gly Arg Ser Thr Ile Lys Tyr Ala Asp Ser Val Lys
1               5                   10                  15

Gly

<210> SEQ ID NO 64
<211> LENGTH: 10
<212> TYPE: PRT
<213> ORGANISM: Artificial Sequence
<220> FEATURE:
<223> OTHER INFORMATION: description of the artificial sequence: the
      amino acid sequence of GpS3003 HCDR3

<400> SEQUENCE: 64

Trp Glu Trp Glu Gln Glu Ala Phe Asp Ile
1               5                   10

<210> SEQ ID NO 65
<211> LENGTH: 357
<212> TYPE: DNA
<213> ORGANISM: Artificial Sequence
<220> FEATURE:
<223> OTHER INFORMATION: description of the artificial sequence: the
      base sequence of GPngs18 VH

<400> SEQUENCE: 65
gaggtgcagc tggtggagtc tgggggaggc ttggtacagc ctgggggtc cctgagactc       60 tcctgtgcag cctctggatt caccttcagt agctatagca tgaactgggt ccgccaggct     120
ccagggaagg ggctggagtg ggtttcatac attagaagtg atagtcgtac cataaagtac     180
gcagactctg tgaagggccg attcaccatc tccagagaca atgccaagaa ctcactgttt     240
ctgcaaatga acagcctgag agacgaggac acggctgtgt attactgtgc gagatgggag     300
tgggagctgg atgcttttga tatctggggc caagggacaa tggtcaccgt ctcttca       357

<210> SEQ ID NO 66
<211> LENGTH: 119
<212> TYPE: PRT
<213> ORGANISM: Artificial Sequence
<220> FEATURE:
<223> OTHER INFORMATION: description of the artificial sequence: the
      amino acid sequence of GPngs18 VH

<400> SEQUENCE: 66

Glu Val Gln Leu Val Glu Ser Gly Gly Gly Leu Val Gln Pro Gly Gly
1               5                   10                  15
```

```
Ser Leu Arg Leu Ser Cys Ala Ala Ser Gly Phe Thr Phe Ser Ser Tyr
              20                  25                  30

Ser Met Asn Trp Val Arg Gln Ala Pro Gly Lys Gly Leu Glu Trp Val
         35                  40                  45

Ser Tyr Ile Arg Ser Asp Ser Arg Thr Ile Lys Tyr Ala Asp Ser Val
     50                  55                  60

Lys Gly Arg Phe Thr Ile Ser Arg Asp Asn Ala Lys Asn Ser Leu Phe
 65                 70                  75                  80

Leu Gln Met Asn Ser Leu Arg Asp Glu Asp Thr Ala Val Tyr Tyr Cys
                 85                  90                  95

Ala Arg Trp Glu Trp Glu Leu Asp Ala Phe Asp Ile Trp Gly Gln Gly
            100                 105                 110

Thr Met Val Thr Val Ser Ser
            115
```

<210> SEQ ID NO 67
<211> LENGTH: 5
<212> TYPE: PRT
<213> ORGANISM: Artificial Sequence
<220> FEATURE:
<223> OTHER INFORMATION: description of the artificial sequence: the
      amino acid sequence of GPngs18 HCDR1

<400> SEQUENCE: 67

```
Ser Tyr Ser Met Asn
1               5
```

<210> SEQ ID NO 68
<211> LENGTH: 17
<212> TYPE: PRT
<213> ORGANISM: Artificial Sequence
<220> FEATURE:
<223> OTHER INFORMATION: description of the artificial sequence: the
      amino acid sequence of GPngs18 HCDR2

<400> SEQUENCE: 68

```
Tyr Ile Arg Ser Asp Ser Arg Thr Ile Lys Tyr Ala Asp Ser Val Lys
1               5                   10                  15

Gly
```

<210> SEQ ID NO 69
<211> LENGTH: 10
<212> TYPE: PRT
<213> ORGANISM: Artificial Sequence
<220> FEATURE:
<223> OTHER INFORMATION: description of the artificial sequence: the
      amino acid sequence of GPngs18 HCDR3

<400> SEQUENCE: 69

```
Trp Glu Trp Glu Leu Asp Ala Phe Asp Ile
1               5                   10
```

<210> SEQ ID NO 70
<211> LENGTH: 372
<212> TYPE: DNA
<213> ORGANISM: Artificial Sequence
<220> FEATURE:
<223> OTHER INFORMATION: description of the artificial sequence: the
      base sequence of GPngs62 VH

<400> SEQUENCE: 70

```
gaggtgcagc tggtggagtc cggggggaggc ttggtacagc ctggggggtc cctgagactc      60
tcctgtgcag cctctggatt caccttttagc agctatgcca ggagctgggt ccgccaggct     120
```

-continued

```
ccagggaagg ggctggagtg ggtctcagct attagtggtg gtggtggtcg cacatactac    180
gcagactccg tgaagggccg gttcaccatc tccagagaca attcccagaa cacgctgtat    240
ctgcaaatga acagcctgag agccgaggac acggccgtat attactgtgc gaaaaattac    300
tatggttcgg ggagcgccag ttactggtac ttcgatctct ggggccgtgg caccctggtc    360
accgtctcct ca                                                        372
```

<210> SEQ ID NO 71
<211> LENGTH: 124
<212> TYPE: PRT
<213> ORGANISM: Artificial Sequence
<220> FEATURE:
<223> OTHER INFORMATION: description of the artificial sequence: the
      amino acid sequence of GPngs62 VH

<400> SEQUENCE: 71

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Arg Ser Trp Val Arg Gln Ala Pro Gly Lys Gly Leu Glu Trp Val
        35                  40                  45

Ser Ala Ile Ser Gly Gly Gly Arg Thr Tyr Tyr Ala Asp Ser Val
    50                  55                  60

Lys Gly Arg Phe Thr Ile Ser Arg Asp Asn Ser Gln Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Asn Tyr Tyr Gly Ser Gly Ser Ala Ser Tyr Trp Tyr Phe Asp
            100                 105                 110

Leu Trp Gly Arg Gly Thr Leu Val Thr Val Ser Ser
        115                 120

<210> SEQ ID NO 72
<211> LENGTH: 5
<212> TYPE: PRT
<213> ORGANISM: Artificial Sequence
<220> FEATURE:
<223> OTHER INFORMATION: description of the artificial sequence: the
      amino acid sequence of GPngs62 HCDR1

<400> SEQUENCE: 72

Ser Tyr Ala Arg Ser
1               5

<210> SEQ ID NO 73
<211> LENGTH: 17
<212> TYPE: PRT
<213> ORGANISM: Artificial Sequence
<220> FEATURE:
<223> OTHER INFORMATION: description of the artificial sequence: the
      amino acid sequence of GPngs62 HCDR2

<400> SEQUENCE: 73

Ala Ile Ser Gly Gly Gly Gly Arg Thr Tyr Tyr Ala Asp Ser Val Lys
1               5                   10                  15

Gly

<210> SEQ ID NO 74
<211> LENGTH: 15

```
<212> TYPE: PRT
<213> ORGANISM: Artificial Sequence
<220> FEATURE:
<223> OTHER INFORMATION: description of the artificial sequence: the
      amino acid sequence of GPngs62 HCDR3

<400> SEQUENCE: 74
```

Asn Tyr Tyr Gly Ser Gly Ser Ala Ser Tyr Trp Tyr Phe Asp Leu
1               5                   10                  15

```
<210> SEQ ID NO 75
<211> LENGTH: 645
<212> TYPE: DNA
<213> ORGANISM: Artificial Sequence
<220> FEATURE:
<223> OTHER INFORMATION: description of the artificial sequence: the
      base sequence of L chain containing L6 as VL

<400> SEQUENCE: 75
```
gaaatagtgt tgacgcagtc tccagccacc ctgtctttgt ctccagggga aagagccacc    60
ctctcctgca gggccagtca gagtgttagc agctacttag cctggtacca acagaaacct   120
ggccaggctc ccaggctcct catctatgat gcatccaaca gggccactgg catcccagcc   180
aggttcagtg gcagtgggtc tgggacagac ttcactctca ccatcagcag cctagagcct   240
gaagattttg cagtttatta ctgtcagcag cgtagcaact ggcctccgac gttcggccaa   300
gggaccaagg tggaaatcaa acgtacggtg gctgcaccat ctgtcttcat cttcccgcca   360
tctgatgagc agttgaaatc tggaactgcc tctgttgtgt gcctgctgaa taacttctat   420
cccagagagg ccaaagtaca gtggaaggtg gataacgccc tccaatcggg taactcccag   480
gagagtgtca cagagcagga cagcaaggac agcacctaca gcctcagcag caccctgacg   540
ctgagcaaag cagactacga aaacacaaa gtctacgcct gcgaagtcac ccatcagggc    600
ctgagctcgc ccgtcacaaa gagcttcaac aggggagagt gttga              645

```
<210> SEQ ID NO 76
<211> LENGTH: 214
<212> TYPE: PRT
<213> ORGANISM: Artificial Sequence
<220> FEATURE:
<223> OTHER INFORMATION: description of the artificial sequence: the
      amino acid sequence of L chain containing L6 as VL

<400> SEQUENCE: 76
```

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

```
Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 77
<211> LENGTH: 327
<212> TYPE: PRT
<213> ORGANISM: Artificial Sequence
<220> FEATURE:
<223> OTHER INFORMATION: description of the artificial sequence: the
      amino acid sequence of IgG4PE R409K heavy chain constant region

<400> SEQUENCE: 77

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Glu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270
```

Thr Thr Pro Pro Val Leu Asp Ser Asp Gly Ser Phe Phe Leu Tyr Ser
        275                 280                 285

Lys Leu Thr Val Asp Lys Ser Arg Trp Gln Glu Gly Asn Val Phe Ser
        290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 78
<211> LENGTH: 1353
<212> TYPE: DNA
<213> ORGANISM: Artificial Sequence
<220> FEATURE:
<223> OTHER INFORMATION: description of the artificial sequence: the
      base sequence of GpS1019 H Chain

<400> SEQUENCE: 78

```
gaagtgcagc tcgtgcagtc cggaggagga ctcgtgcagc ccggaggatc cctgcgcctg      60
tcctgtgccg cctccggatt cgccttctcc acctactcca tcaactgggt gaggcaggcc     120
ccaggaaagg gctggagtg gatctcctac atctcctcct cctccaacac catctactac     180
gccgactccg tgaaggggcg cttcacaatc tcccgcgaca cgccaagaa ctccctgtat     240 ctgcagatgt cctccctgaa ggacgaggac acagccgtgt actactgcgc ccgcggctat     300
ggctccggct cctacttccg caactggttc gacccctggg gacagggaac actcgtgaca     360
gtgtcctccg ctagcaccaa ggggccatcc gtcttccccc tggcgccctg ctccaggagc     420
acctccgaga gcacagccgc cctgggctgc ctggtcaagg actacttccc cgaaccggtg     480
acggtgtcgt ggaactcagg cgccctgacc agcggcgtgc acaccttccc ggctgtccta     540
cagtcctcag gactctactc cctcagcagc gtggtgaccg tgccctccag cagcttgggc     600
acgaagacct acacctgcaa cgtagatcac aagcccagca caccaaggt ggacaagaga     660 gttgagtcca aatatggtcc cccatgccca ccatgcccag cacctgagtt cgagggggga     720
ccatcagtct tcctgttccc cccaaaaccc aaggacactc tcatgatctc ccggaccct     780 gaggtcacgt gcgtggtggt ggacgtgagc caggaagacc ccgaggtcca gttcaactgg     840
tacgtggatg gcgtggaggt gcataatgcc aagacaaagc cgcgggagga gcagttcaac     900
agcacgtacc gtgtggtcag cgtcctcacc gtcctgcacc aggactggct gaacggcaag     960
gagtacaagt gcaaggtctc caacaaaggc ctcccgtcct ccatcgagaa aaccatctcc    1020
aaagccaaag gcagccccg agagccacag gtgtacaccc tgcccccatc ccaggaggag    1080
atgaccaaga accaggtcag cctgacctgc ctggtcaaag gcttctaccc cagcgacatc    1140
gccgtggagt gggagagcaa tgggcagccg gagaacaact acaagaccac gcctcccgtg    1200
ctggactccg acggctcctt cttcctctac agcaagctaa ccgtggacaa gagcaggtgg    1260
caggagggga atgtcttctc atgctccgtg atgcatgagg ctctgcacaa ccactacaca    1320
cagaagagcc tctccctgtc tctgggtaaa tga                                1353
```

<210> SEQ ID NO 79
<211> LENGTH: 450
<212> TYPE: PRT
<213> ORGANISM: Artificial Sequence
<220> FEATURE:
<223> OTHER INFORMATION: description of the artificial sequence: the
      amino acid sequence of GpS1019 H Chain

<400> SEQUENCE: 79

```
Glu Val Gln Leu Val Gln Ser Gly Gly Gly Leu Val Gln Pro Gly Gly
1               5                   10                  15

Ser Leu Arg Leu Ser Cys Ala Ala Ser Gly Phe Ala Phe Ser Thr Tyr
            20                  25                  30

Ser Ile Asn Trp Val Arg Gln Ala Pro Gly Lys Gly Leu Glu Trp Ile
        35                  40                  45

Ser Tyr Ile Ser Ser Ser Ser Asn Thr Ile Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Ser Ser Leu Lys Asp Glu Asp Thr Ala Val Tyr Tyr Cys
                85                  90                  95

Ala Arg Gly Tyr Gly Ser Gly Ser Tyr Phe Arg Asn Trp Phe Asp Pro
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Cys Ser Arg Ser Thr Ser Glu Ser
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Lys Thr Tyr Thr Cys Asn Val
        195                 200                 205

Asp His Lys Pro Ser Asn Thr Lys Val Asp Lys Arg Val Glu Ser Lys
    210                 215                 220

Tyr Gly Pro Pro Cys Pro Pro Cys Pro Ala Pro Glu Phe Glu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser Gln Glu
            260                 265                 270

Asp Pro Glu Val Gln Phe Asn Trp Tyr Val Asp Gly Val Glu Val His
        275                 280                 285

Asn Ala Lys Thr Lys Pro Arg Glu Glu Gln Phe Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Gly Leu Pro Ser Ser Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Gln Glu Glu Met Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415
```

Lys Ser Arg Trp Gln Glu Gly Asn Val Phe Ser Cys Ser Val Met His
            420                 425                 430

Glu Ala Leu His Asn His Tyr Thr Gln Lys Ser Leu Ser Leu Ser Leu
        435                 440                 445

Gly Lys
    450

<210> SEQ ID NO 80
<211> LENGTH: 1356
<212> TYPE: DNA
<213> ORGANISM: Artificial Sequence
<220> FEATURE:
<223> OTHER INFORMATION: description of the artificial sequence: the
      base sequence of GpA6005 H Chain

<400> SEQUENCE: 80
caggtgcagc tcgtggagtc cggagggggg ctcgtgcagc ccggaggctc cctgcgcctg      60
tcctgtgccg cctccggctt cacattctcc tcctactcca tgaactgggt gcgccaggcc     120
ccaggaaagg gcctggagtg ggtgtcctac atcaagtcct ccggctcctc cacctactat     180
gccgactccg tgaaggggcg cttcacaatc tcccgcgaca cgccaagaa ctcccctgaac    240 ctgcagatga actccctgcg cgacgaggac acagccgtgt actactgcgc ccgcgggacc     300
tactactatg gctccgggaa cttcttcctg ttcgactact ggggcaggg gacactcgtg     360 acagtgtcct ccgctagcac caaggggcca tccgtcttcc ccctggcgcc ctgctccagg     420
agcacctccg agagcacagc cgccctgggc tgcctggtca aggactactt ccccgaaccg     480
gtgacggtgt cgtggaactc aggcgccctg accagcggcg tgcacacctt cccggctgtc     540
ctacagtcct caggactcta ctccctcagc agcgtggtga ccgtgccctc agcagcttg     600 ggcacgaaga cctacacctg caacgtagat cacaagccca gcaacaccaa ggtggacaag     660
agagttgagt ccaaatatgg tcccccatgc ccaccatgcc cagcacctga gttcgagggg     720
ggaccatcag tcttcctgtt ccccccaaaa cccaaggaca ctctcatgat ctcccggacc     780
cctgaggtca cgtgcgtggt ggtggacgtg agccaggaag accccgaggt ccagttcaac     840
tggtacgtgg atggcgtgga ggtgcataat gccaagacaa agccgcggga ggagcagttc     900
aacagcacgt accgtgtggt cagcgtcctc accgtcctgc accaggactg gctgaacggc     960
aaggagtaca agtgcaaggt ctccaacaaa ggcctcccgt cctccatcga gaaaaccatc    1020
tccaaagcca agggcagcc ccgagagcca caggtgtaca ccctgccccc atcccaggag    1080
gagatgacca gaaccaggt cagcctgacc tgcctggtca aaggcttcta ccccagcgac    1140
atcgccgtgg agtgggagag caatgggcag ccggagaaca actacaagac cacgcctccc    1200
gtgctggact ccgacggctc cttcttcctc tacagcaagc taaccgtgga caagagcagg    1260
tggcaggagg ggaatgtctt ctcatgctcc gtgatgcatg aggctctgca caaccactac    1320
acacagaaga gcctctccct gtctctgggt aaatga                             1356

<210> SEQ ID NO 81
<211> LENGTH: 451
<212> TYPE: PRT
<213> ORGANISM: Artificial Sequence
<220> FEATURE:
<223> OTHER INFORMATION: description of the artificial sequence: the
      amino acid sequence of GpA6005 H Chain

<400> SEQUENCE: 81

Gln Val Gln Leu Val Glu Ser Gly Gly Gly Leu Val Gln Pro Gly Gly

-continued

```
1               5                   10                  15
Ser Leu Arg Leu Ser Cys Ala Ala Ser Gly Phe Thr Phe Ser Ser Tyr
            20                  25                  30

Ser Met Asn Trp Val Arg Gln Ala Pro Gly Lys Gly Leu Glu Trp Val
            35                  40                  45

Ser Tyr Ile Lys Ser Ser Gly Ser Ser Thr Tyr Tyr Ala Asp Ser Val
            50                  55                  60

Lys Gly Arg Phe Thr Ile Ser Arg Asp Asn Ala Lys Asn Ser Leu Asn
65                  70                  75                  80

Leu Gln Met Asn Ser Leu Arg Asp Glu Asp Thr Ala Val Tyr Tyr Cys
            85                  90                  95

Ala Arg Gly Thr Tyr Tyr Gly Ser Gly Asn Phe Phe Leu Phe Asp
            100                 105                 110

Tyr Trp Gly Gln Gly Thr Leu Val Thr Val Ser Ala Ser Thr Lys
            115                 120                 125

Gly Pro Ser Val Phe Pro Leu Ala Pro Cys Ser Arg Ser Thr Ser Glu
            130                 135                 140

Ser Thr Ala Ala Leu Gly Cys Leu Val Lys Asp Tyr Phe Pro Glu Pro
145                 150                 155                 160

Val Thr Val Ser Trp Asn Ser Gly Ala Leu Thr Ser Gly Val His Thr
            165                 170                 175

Phe Pro Ala Val Leu Gln Ser Ser Gly Leu Tyr Ser Leu Ser Ser Val
            180                 185                 190

Val Thr Val Pro Ser Ser Ser Leu Gly Thr Lys Thr Tyr Thr Cys Asn
            195                 200                 205

Val Asp His Lys Pro Ser Asn Thr Lys Val Asp Lys Arg Val Glu Ser
            210                 215                 220

Lys Tyr Gly Pro Pro Cys Pro Pro Cys Pro Ala Pro Glu Phe Glu Gly
225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser Gln
            260                 265                 270

Glu Asp Pro Glu Val Gln Phe Asn Trp Tyr Val Asp Gly Val Glu Val
            275                 280                 285

His Asn Ala Lys Thr Lys Pro Arg Glu Glu Gln Phe Asn Ser Thr Tyr
            290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Gly Leu Pro Ser Ser Ile
            325                 330                 335

Glu Lys Thr Ile Ser Lys Ala Lys Gly Gln Pro Arg Glu Pro Gln Val
            340                 345                 350

Tyr Thr Leu Pro Pro Ser Gln Glu Glu Met Thr Lys Asn Gln Val Ser
            355                 360                 365

Leu Thr Cys Leu Val Lys Gly Phe Tyr Pro Ser Asp Ile Ala Val Glu
            370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
            405                 410                 415

Asp Lys Ser Arg Trp Gln Glu Gly Asn Val Phe Ser Cys Ser Val Met
            420                 425                 430
```

His Glu Ala Leu His Asn His Tyr Thr Gln Lys Ser Leu Ser Leu Ser
            435                 440                 445

Leu Gly Lys
    450

<210> SEQ ID NO 82
<211> LENGTH: 1356
<212> TYPE: DNA
<213> ORGANISM: Artificial Sequence
<220> FEATURE:
<223> OTHER INFORMATION: description of the artificial sequence: the
      base sequence of GpA6014 H Chain

<400> SEQUENCE: 82
cagatgcagc tcgtgcagtc cggaggggg ctcgtgcagc ccggaggctc cctgcgcctg      60
tcctgtgccg cctccggctt ctccttctcc tcctatgcca tgaactgggt gcgccaggcc    120
ccaggaaagg gctggagtg gtgtcctac atcacatccg aggctcctc ccgctactat       180 gccgactccg tgaaggggcg cttcacaatc tcccgcgaca cgccaagaa ctccctgtat     240 ctgcagatga actccctgcg cgacgaggac acagccgtgt actactgcgc ccgcgggacc    300
tactactatg gctccgggaa ctacttcctg ttcgaccact ggggcaggg gacaatggtg     360 acagtgtcct ccgctagcac caaggggcca tccgtcttcc ccctggcgcc ctgctccagg    420
agcacctccg agagcacagc cgccctgggc tgcctggtca aggactactt ccccgaaccg    480
gtgacggtgt cgtggaactc aggcgccctg accagcggcg tgcacacctt cccggctgtc    540
ctacagtcct caggactcta ctccctcagc agcgtggtga ccgtgccctc agcagcttg     600 ggcacgaaga cctacacctg caacgtagat cacaagccca gcaacaccaa ggtggacaag    660
agagttgagt ccaaatatgg tcccccatgc ccaccatgcc cagcacctga gttcgagggg    720
ggaccatcag tcttcctgtt ccccccaaaa cccaaggaca ctctcatgat ctcccggacc    780
cctgaggtca cgtgcgtggt ggtggacgtg agccaggaag accccgaggt ccagttcaac    840
tggtacgtgg atggcgtgga ggtgcataat gccaagacaa agccgcggga ggagcagttc    900
aacagcacgt accgtgtggt cagcgtcctc accgtcctgc accaggactg gctgaacggc    960
aaggagtaca agtgcaaggt ctccaacaaa ggcctcccgt cctccatcga gaaaaccatc   1020
tccaaagcca agggcagcc ccgagagcca caggtgtaca ccctgccccc atcccaggag    1080
gagatgacca agaaccaggt cagcctgacc tgcctggtca aaggcttcta ccccagcgac   1140
atcgccgtgg agtgggagag caatgggcag ccggagaaca actacaagac cacgcctccc   1200
gtgctggact ccgacggctc cttcttcctc tacagcaagc taaccgtgga caagagcagg   1260
tggcaggagg ggaatgtctt ctcatgctcc gtgatgcatg aggctctgca caaccactac   1320
acacagaaga gcctctccct gtctctgggt aaatga                              1356

<210> SEQ ID NO 83
<211> LENGTH: 451
<212> TYPE: PRT
<213> ORGANISM: Artificial Sequence
<220> FEATURE:
<223> OTHER INFORMATION: description of the artificial sequence: the
      amino acid sequence of GpA6014 H Chain

<400> SEQUENCE: 83

Gln Met Gln Leu Val Gln Ser Gly Gly Gly Leu Val Gln Pro Gly Gly
1               5                   10                  15

Ser Leu Arg Leu Ser Cys Ala Ala Ser Gly Phe Ser Phe Ser Ser Tyr

```
                    20                  25                  30
        Ala Met Asn Trp Val Arg Gln Ala Pro Gly Lys Gly Leu Glu Trp Val
                35                  40                  45
        Ser Tyr Ile Thr Ser Gly Gly Ser Arg Tyr Tyr Ala Asp Ser Val
            50                  55                  60
        Lys Gly Arg Phe Thr Ile Ser Arg Asp Asn Ala Lys Asn Ser Leu Tyr
        65                  70                  75                  80
        Leu Gln Met Asn Ser Leu Arg Asp Glu Asp Thr Ala Val Tyr Tyr Cys
                        85                  90                  95
        Ala Arg Gly Thr Tyr Tyr Gly Ser Gly Asn Tyr Phe Leu Phe Asp
                    100                 105                 110
        His Trp Gly Gln Gly Thr Met Val Thr Val Ser Ser Ala Ser Thr Lys
                    115                 120                 125
        Gly Pro Ser Val Phe Pro Leu Ala Pro Cys Ser Arg Ser Thr Ser Glu
        130                 135                 140
        Ser Thr Ala Ala Leu Gly Cys Leu Val Lys Asp Tyr Phe Pro Glu Pro
        145                 150                 155                 160
        Val Thr Val Ser Trp Asn Ser Gly Ala Leu Thr Ser Gly Val His Thr
                        165                 170                 175
        Phe Pro Ala Val Leu Gln Ser Ser Gly Leu Tyr Ser Leu Ser Ser Val
                    180                 185                 190
        Val Thr Val Pro Ser Ser Ser Leu Gly Thr Lys Thr Tyr Thr Cys Asn
                    195                 200                 205
        Val Asp His Lys Pro Ser Asn Thr Lys Val Asp Lys Arg Val Glu Ser
                    210                 215                 220
        Lys Tyr Gly Pro Pro Cys Pro Pro Cys Pro Ala Pro Glu Phe Glu Gly
        225                 230                 235                 240
        Gly Pro Ser Val Phe Leu Phe Pro Pro Lys Pro Lys Asp Thr Leu Met
                        245                 250                 255
        Ile Ser Arg Thr Pro Glu Val Thr Cys Val Val Val Asp Val Ser Gln
                    260                 265                 270
        Glu Asp Pro Glu Val Gln Phe Asn Trp Tyr Val Asp Gly Val Glu Val
                    275                 280                 285
        His Asn Ala Lys Thr Lys Pro Arg Glu Glu Gln Phe Asn Ser Thr Tyr
                    290                 295                 300
        Arg Val Val Ser Val Leu Thr Val Leu His Gln Asp Trp Leu Asn Gly
        305                 310                 315                 320
        Lys Glu Tyr Lys Cys Lys Val Ser Asn Lys Gly Leu Pro Ser Ser Ile
                        325                 330                 335
        Glu Lys Thr Ile Ser Lys Ala Lys Gly Gln Pro Arg Glu Pro Gln Val
                    340                 345                 350
        Tyr Thr Leu Pro Pro Ser Gln Glu Met Thr Lys Asn Gln Val Ser
                    355                 360                 365
        Leu Thr Cys Leu Val Lys Gly Phe Tyr Pro Ser Asp Ile Ala Val Glu
                    370                 375                 380
        Trp Glu Ser Asn Gly Gln Pro Glu Asn Asn Tyr Lys Thr Thr Pro Pro
        385                 390                 395                 400
        Val Leu Asp Ser Asp Gly Ser Phe Phe Leu Tyr Ser Lys Leu Thr Val
                        405                 410                 415
        Asp Lys Ser Arg Trp Gln Glu Gly Asn Val Phe Ser Cys Ser Val Met
                    420                 425                 430
        His Glu Ala Leu His Asn His Tyr Thr Gln Lys Ser Leu Ser Leu Ser
                    435                 440                 445
```

Leu Gly Lys
    450

<210> SEQ ID NO 84
<211> LENGTH: 1356
<212> TYPE: DNA
<213> ORGANISM: Artificial Sequence
<220> FEATURE:
<223> OTHER INFORMATION: description of the artificial sequence: the
      base sequence of GpA6062 H Chain

<400> SEQUENCE: 84

| | | | | | |
|---|---|---|---|---|---|
| gaagtgcagc | tcgtggagac | aggagggggg | ctcgtgcagc | ccggaggctc | cctgcgcctg | 60 |
| tcctgtgccg | cctccggctt | ctccttctcc | tctatgcca | tgaactgggt | gcgccaggcc | 120 |
| ccaggaaagg | ggctggagtg | ggtgtcctac | atcacatccg | gaggctcctc | ccgctactat | 180 |
| gccgactccg | tgaaggggcg | cttcacaatc | tcccgcgaca | acgccaagaa | ctccctgtat | 240 |
| ctgcagatga | actccctgcg | cgacgaggac | acagccgtgt | actactgcgc | ccgcgggacc | 300 |
| tactactatg | gctccgggaa | ctacttcctg | ttcgactact | gggggcaggg | gacaacagtg | 360 |
| acagtgtcct | ccgctagcac | caaggggcca | tccgtcttcc | ccctggcgcc | ctgctccagg | 420 |
| agcacctccg | agagcacagc | cgccctgggc | tgcctggtca | aggactactt | ccccgaaccg | 480 |
| gtgacggtgt | cgtggaactc | aggcgccctg | accagcggcg | tgcacacctt | cccggctgtc | 540 |
| ctacagtcct | caggactcta | ctccctcagc | agcgtggtga | ccgtgccctc | cagcagcttg | 600 |
| ggcacgaaga | cctacacctg | caacgtagat | cacaagccca | gcaacaccaa | ggtggacaag | 660 |
| agagttgagt | ccaaatatgg | tcccccatgc | ccaccatgcc | cagcacctga | gttcgagggg | 720 |
| ggaccatcag | tcttcctgtt | ccccccaaaa | cccaaggaca | ctctcatgat | ctcccggacc | 780 |
| cctgaggtca | cgtgcgtggt | ggtggacgtg | agccaggaag | accccgaggt | ccagttcaac | 840 |
| tggtacgtgg | atggcgtgga | ggtgcataat | gccaagacaa | agccgcggga | ggagcagttc | 900 |
| aacagcacgt | accgtgtggt | cagcgtcctc | accgtcctgc | accaggactg | gctgaacggc | 960 |
| aaggagtaca | agtgcaaggt | ctccaacaaa | ggcctcccgt | cctccatcga | gaaaaccatc | 1020 |
| tccaaagcca | aagggcagcc | ccgagagcca | caggtgtaca | ccctgccccc | atcccaggag | 1080 |
| gagatgacca | agaaccaggt | cagcctgacc | tgcctggtca | aaggcttcta | ccccagcgac | 1140 |
| atcgccgtgg | agtgggagag | caatgggcag | ccggagaaca | actacaagac | cacgcctccc | 1200 |
| gtgctggact | ccgacggctc | cttcttcctc | tacagcaagc | taaccgtgga | caagagcagg | 1260 |
| tggcaggagg | ggaatgtctt | ctcatgctcc | gtgatgcatg | aggctctgca | caaccactac | 1320 |
| acacagaaga | gcctctccct | gtctctgggt | aaatga | | | 1356 |

<210> SEQ ID NO 85
<211> LENGTH: 451
<212> TYPE: PRT
<213> ORGANISM: Artificial Sequence
<220> FEATURE:
<223> OTHER INFORMATION: description of the artificial sequence: the
      amino acid sequence of GpA6062 H Chain

<400> SEQUENCE: 85

Glu Val Gln Leu Val Glu Thr Gly Gly Gly Leu Val Gln Pro Gly Gly
1               5                   10                  15

Ser Leu Arg Leu Ser Cys Ala Ala Ser Gly Phe Ser Phe Ser Ser Tyr
            20                  25                  30

Ala Met Asn Trp Val Arg Gln Ala Pro Gly Lys Gly Leu Glu Trp Val

```
                35                  40                  45
Ser Tyr Ile Thr Ser Gly Gly Ser Arg Tyr Tyr Ala Asp Ser Val
 50                  55                  60
Lys Gly Arg Phe Thr Ile Ser Arg Asp Asn Ala Lys Asn Ser Leu Tyr
 65                      70                  75                  80
Leu Gln Met Asn Ser Leu Arg Asp Glu Asp Thr Ala Val Tyr Tyr Cys
                 85                  90                  95
Ala Arg Gly Thr Tyr Tyr Gly Ser Gly Asn Tyr Phe Leu Phe Asp
            100                 105                 110
Tyr Trp Gly Gln Gly Thr Thr Val Thr Val Ser Ser Ala Ser Thr Lys
            115                 120                 125
Gly Pro Ser Val Phe Pro Leu Ala Pro Cys Ser Arg Ser Thr Ser Glu
130                 135                 140
Ser Thr Ala Ala Leu Gly Cys Leu Val Lys Asp Tyr Phe Pro Glu Pro
145                 150                 155                 160
Val Thr Val Ser Trp Asn Ser Gly Ala Leu Thr Ser Gly Val His Thr
                165                 170                 175
Phe Pro Ala Val Leu Gln Ser Ser Gly Leu Tyr Ser Leu Ser Ser Val
                180                 185                 190
Val Thr Val Pro Ser Ser Ser Leu Gly Thr Lys Thr Tyr Thr Cys Asn
                195                 200                 205
Val Asp His Lys Pro Ser Asn Thr Lys Val Asp Lys Arg Val Glu Ser
210                 215                 220
Lys Tyr Gly Pro Pro Cys Pro Pro Cys Pro Ala Pro Glu Phe Glu Gly
225                 230                 235                 240
Gly Pro Ser Val Phe Leu Phe Pro Pro Lys Pro Lys Asp Thr Leu Met
                245                 250                 255
Ile Ser Arg Thr Pro Glu Val Thr Cys Val Val Val Asp Val Ser Gln
                260                 265                 270
Glu Asp Pro Glu Val Gln Phe Asn Trp Tyr Val Asp Gly Val Glu Val
                275                 280                 285
His Asn Ala Lys Thr Lys Pro Arg Glu Glu Gln Phe Asn Ser Thr Tyr
            290                 295                 300
Arg Val Val Ser Val Leu Thr Val Leu His Gln Asp Trp Leu Asn Gly
305                 310                 315                 320
Lys Glu Tyr Lys Cys Lys Val Ser Asn Lys Gly Leu Pro Ser Ser Ile
                325                 330                 335
Glu Lys Thr Ile Ser Lys Ala Lys Gly Gln Pro Arg Glu Pro Gln Val
                340                 345                 350
Tyr Thr Leu Pro Pro Ser Gln Glu Glu Met Thr Lys Asn Gln Val Ser
            355                 360                 365
Leu Thr Cys Leu Val Lys Gly Phe Tyr Pro Ser Asp Ile Ala Val Glu
            370                 375                 380
Trp Glu Ser Asn Gly Gln Pro Glu Asn Asn Tyr Lys Thr Thr Pro Pro
385                 390                 395                 400
Val Leu Asp Ser Asp Gly Ser Phe Phe Leu Tyr Ser Lys Leu Thr Val
                405                 410                 415
Asp Lys Ser Arg Trp Gln Glu Gly Asn Val Phe Ser Cys Ser Val Met
                420                 425                 430
His Glu Ala Leu His Asn His Tyr Thr Gln Lys Ser Leu Ser Leu Ser
            435                 440                 445
Leu Gly Lys
450
```

<210> SEQ ID NO 86
<211> LENGTH: 1341
<212> TYPE: DNA
<213> ORGANISM: Artificial Sequence
<220> FEATURE:
<223> OTHER INFORMATION: description of the artificial sequence: the
      base sequence of GpS3003 H Chain

<400> SEQUENCE: 86

```
caggtgcagc tggtgcagtc tgggggaggc ttggtacagc ctggggggtc cctgagactc      60
tcctgtgcag cctctggatt caccttcagt cactatacca tgaactgggt ccgccaggct     120
ccagggaagg ggctggagtg ggtttcatac attaatagtg gtcgtagtac cataaagtac     180
gcagactctg tgaagggccg attcaccatc tccagagaca atgccaagaa gtcattgtat     240
ctgcaaatga atagtctgag agacgaggac acggctgtgt atttctgtgc gagatgggag     300
tgggagcagg aagcttttga tatctggggc caagggacaa tggtcaccgt ctcttcagct     360
agcaccaagg ggccatccgt cttccccctg gcgccctgct ccaggagcac ctccgagagc     420
acagccgccc tgggctgcct ggtcaaggac tacttccccg aaccggtgac ggtgtcgtgg     480
aactcaggcg ccctgaccag cggcgtgcac accttcccgg ctgtcctaca gtcctcagga     540
ctctactccc tcagcagcgt ggtgaccgtg ccctccagca gcttgggcac gaagacctac     600
acctgcaacg tagatcacaa gcccagcaac accaaggtgg acaagagagt tgagtccaaa     660
tatggtcccc catgcccacc atgcccagca cctgagttcg aggggggacc atcagtcttc     720
ctgttccccc caaaacccaa ggacactctc atgatctccc ggacccctga ggtcacgtgc     780
gtggtggtgg acgtgagcca ggaagacccc gaggtccagt tcaactggta cgtggatggc     840
gtggaggtgc ataatgccaa gacaaagccg cgggaggagc agttcaacag cacgtaccgt     900
gtggtcagcg tcctcaccgt cctgcaccag gactggctga acggcaagga gtacaagtgc     960
aaggtctcca acaaaggcct cccgtcctcc atcgagaaaa ccatctccaa agccaaaggg    1020
cagccccgag agccacaggt gtacaccctg cccccatccc aggaggagat gaccaagaac    1080
caggtcagcc tgacctgcct ggtcaaaggc ttctacccca gcgacatcgc cgtggagtgg    1140
gagagcaatg ggcagccgga gaacaactac aagaccacgc ctcccgtgct ggactccgac    1200
ggctccttct tcctctacag caagctaacc gtggacaaga gcaggtggca ggaggggaat    1260
gtcttctcat gctccgtgat gcatgaggct ctgcacaacc actacacaca gaagagcctc    1320
tccctgtctc tgggtaaatg a                                              1341
```

<210> SEQ ID NO 87
<211> LENGTH: 446
<212> TYPE: PRT
<213> ORGANISM: Artificial Sequence
<220> FEATURE:
<223> OTHER INFORMATION: description of the artificial sequence: the
      amino acid sequence of GpS3003 H Chain

<400> SEQUENCE: 87

```
Gln Val Gln Leu Val Gln Ser Gly Gly Gly Leu Val Gln Pro Gly Gly
1               5                   10                  15

Ser Leu Arg Leu Ser Cys Ala Ala Ser Gly Phe Thr Phe Ser His Tyr
            20                  25                  30

Thr Met Asn Trp Val Arg Gln Ala Pro Gly Lys Gly Leu Glu Trp Val
        35                  40                  45

Ser Tyr Ile Asn Ser Gly Arg Ser Thr Ile Lys Tyr Ala Asp Ser Val
```

```
              50                  55                  60
Lys Gly Arg Phe Thr Ile Ser Arg Asp Asn Ala Lys Lys Ser Leu Tyr
 65                  70                  75                  80

Leu Gln Met Asn Ser Leu Arg Asp Glu Asp Thr Ala Val Tyr Phe Cys
                 85                  90                  95

Ala Arg Trp Glu Trp Glu Gln Glu Ala Phe Asp Ile Trp Gly Gln Gly
                100                 105                 110

Thr Met Val Thr Val Ser Ser Ala Ser Thr Lys Gly Pro Ser Val Phe
                115                 120                 125

Pro Leu Ala Pro Cys Ser Arg Ser Thr Ser Glu Ser Thr Ala Ala Leu
                130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
                180                 185                 190

Ser Ser Leu Gly Thr Lys Thr Tyr Thr Cys Asn Val Asp His Lys Pro
                195                 200                 205

Ser Asn Thr Lys Val Asp Lys Arg Val Glu Ser Lys Tyr Gly Pro Pro
210                 215                 220

Cys Pro Pro Cys Pro Ala Pro Glu Phe Glu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser Gln Glu Asp Pro Glu Val
                260                 265                 270

Gln Phe Asn Trp Tyr Val Asp Gly Val Glu Val His Asn Ala Lys Thr
                275                 280                 285

Lys Pro Arg Glu Glu Gln Phe Asn Ser Thr Tyr Arg Val Val Ser Val
                290                 295                 300

Leu Thr Val Leu His Gln Asp Trp Leu Asn Gly Lys Glu Tyr Lys Cys
305                 310                 315                 320

Lys Val Ser Asn Lys Gly Leu Pro Ser Ser Ile Glu Lys Thr Ile Ser
                325                 330                 335

Lys Ala Lys Gly Gln Pro Arg Glu Pro Gln Val Tyr Thr Leu Pro Pro
                340                 345                 350

Ser Gln Glu Glu Met Thr Lys Asn Gln Val Ser Leu Thr Cys Leu Val
                355                 360                 365

Lys Gly Phe Tyr Pro Ser Asp Ile Ala Val Glu Trp Glu Ser Asn Gly
                370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Glu Gly Asn Val Phe Ser Cys Ser Val Met His Glu Ala Leu His
                420                 425                 430

Asn His Tyr Thr Gln Lys Ser Leu Ser Leu Ser Leu Gly Lys
                435                 440                 445

<210> SEQ ID NO 88
<211> LENGTH: 1341
<212> TYPE: DNA
<213> ORGANISM: Artificial Sequence
```

<220> FEATURE:
<223> OTHER INFORMATION: description of the artificial sequence: the
      base sequence of GPngs18 H Chain

<400> SEQUENCE: 88

```
gaggtgcagc tggtggagtc tgggggaggc ttggtacagc ctgggggtc cctgagactc     60
tcctgtgcag cctctggatt caccttcagt agctatagca tgaactgggt ccgccaggct    120
ccagggaagg ggctggagtg ggtttcatac attagaagtg atagtcgtac cataaagtac    180
gcagactctg tgaagggccg attcaccatc tccagagaca atgccaagaa ctcactgttt    240
ctgcaaatga acagcctgag agacgaggac acggctgtgt attactgtgc gagatgggag    300
tgggagctgg atgcttttga tatctggggc caagggacaa tggtcaccgt ctcttcagct    360
agcaccaagg ggccatccgt cttccccctg gcgccctgct ccaggagcac ctccgagagc    420
acagccgccc tgggctgcct ggtcaaggac tacttccccg aaccggtgac ggtgtcgtgg    480
aactcaggcg ccctgaccag cggcgtgcac accttcccgg ctgtcctaca gtcctcagga    540
ctctactccc tcagcagcgt ggtgaccgtg ccctccagca gcttgggcac gaagacctac    600
acctgcaacg tagatcacaa gcccagcaac accaaggtgg acaagagagt tgagtccaaa    660
tatggtcccc catgcccacc atgcccagca cctgagttcg agggggaccc atcagtcttc    720
ctgttccccc caaaacccaa ggacactctc atgatctccc ggacccctga ggtcacgtgc    780
gtggtggtgg acgtgagcca ggaagacccc gaggtccagt tcaactggta cgtggatggc    840
gtggaggtgc ataatgccaa gacaaagccg cgggaggagc agttcaacag cacgtaccgt    900
gtggtcagcg tcctcaccgt cctgcaccag gactggctga acggcaagga gtacaagtgc    960
aaggtctcca acaaaggcct cccgtcctcc atcgagaaaa ccatctccaa agccaaaggg   1020
cagccccgag agccacaggt gtacaccctg cccccatccc aggaggagat gaccaagaac   1080
caggtcagcc tgacctgcct ggtcaaaggc ttctacccca gcgacatcgc cgtggagtgg   1140
gagagcaatg ggcagccgga gaacaactac aagaccacgc ctcccgtgct ggactccgac   1200
ggctccttct tcctctacag caagctaacc gtggacaaga gcaggtggca ggaggggaat   1260
gtcttctcat gctccgtgat gcatgaggct ctgcacaacc actacacaca gaagagcctc   1320
tccctgtctc tgggtaaatg a                                             1341
```

<210> SEQ ID NO 89
<211> LENGTH: 446
<212> TYPE: PRT
<213> ORGANISM: Artificial Sequence
<220> FEATURE:
<223> OTHER INFORMATION: description of the artificial sequence: the
      amino acid sequence of GPngs18 H Chain

<400> SEQUENCE: 89

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ser Met Asn Trp Val Arg Gln Ala Pro Gly Lys Gly Leu Glu Trp Val
        35                  40                  45

Ser Tyr Ile Arg Ser Asp Ser Arg Thr Ile Lys Tyr Ala Asp Ser Val
    50                  55                  60

Lys Gly Arg Phe Thr Ile Ser Arg Asp Asn Ala Lys Asn Ser Leu Phe
65                  70                  75                  80

Leu Gln Met Asn Ser Leu Arg Asp Glu Asp Thr Ala Val Tyr Tyr Cys
```

85                  90                  95
Ala Arg Trp Glu Trp Glu Leu Asp Ala Phe Asp Ile Trp Gly Gln Gly
                100                 105                 110

Thr Met Val Thr Val Ser Ser Ala Ser Thr Lys Gly Pro Ser Val Phe
            115                 120                 125

Pro Leu Ala Pro Cys Ser Arg Ser Thr Ser Glu Ser Thr Ala Ala Leu
        130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Lys Thr Tyr Thr Cys Asn Val Asp His Lys Pro
        195                 200                 205

Ser Asn Thr Lys Val Asp Lys Arg Val Glu Ser Lys Tyr Gly Pro Pro
210                 215                 220

Cys Pro Pro Cys Pro Ala Pro Glu Phe Glu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser Gln Glu Asp Pro Glu Val
            260                 265                 270

Gln Phe Asn Trp Tyr Val Asp Gly Val Glu Val His Asn Ala Lys Thr
        275                 280                 285

Lys Pro Arg Glu Glu Gln Phe Asn Ser Thr Tyr Arg Val Val Ser Val
290                 295                 300

Leu Thr Val Leu His Gln Asp Trp Leu Asn Gly Lys Glu Tyr Lys Cys
305                 310                 315                 320

Lys Val Ser Asn Lys Gly Leu Pro Ser Ser Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Gln Glu Glu Met Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
        370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Glu Gly Asn Val Phe Ser Cys Ser Val Met His Glu Ala Leu His
            420                 425                 430

Asn His Tyr Thr Gln Lys Ser Leu Ser Leu Ser Leu Gly Lys
        435                 440                 445

<210> SEQ ID NO 90
<211> LENGTH: 1356
<212> TYPE: DNA
<213> ORGANISM: Artificial Sequence
<220> FEATURE:
<223> OTHER INFORMATION: description of the artificial sequence: the
      base sequence of GPngs62 H Chain

<400> SEQUENCE: 90

-continued

| | |
|---|---|
| gaggtgcagc tggtggagtc cggggggagc ttggtacagc ctggggggtc cctgagactc | 60 |
| tcctgtgcag cctctggatt cacctttagc agctatgcca ggagctgggt ccgccaggct | 120 |
| ccagggaagg gctggagtg gtctcagct attagtggtg gtggtggtcg cacatactac | 180 |
| gcagactccg tgaagggccg gttcaccatc tccagagaca attcccagaa cacgctgtat | 240 |
| ctgcaaatga acagcctgag agccgaggac acggccgtat attactgtgc gaaaaattac | 300 |
| tatggttcgg ggagcgccag ttactggtac ttcgatctct ggggccgtgg caccctggtc | 360 |
| accgtctcct cagctagcac caaggggcca tccgtcttcc ccctggcgcc ctgctccagg | 420 |
| agcacctccg agagcacagc cgccctgggc tgcctggtca aggactactt ccccgaaccg | 480 |
| gtgacggtgt cgtggaactc aggcgccctg accagcggcg tgcacacctt cccggctgtc | 540 |
| ctacagtcct caggactcta ctccctcagc agcgtggtga ccgtgccctc agcagcttg | 600 |
| ggcacgaaga cctacacctg caacgtagat cacaagccca gcaacaccaa ggtggacaag | 660 |
| agagttgagt ccaaatatgg tcccccatgc ccaccatgcc cagcacctga gttcgagggg | 720 |
| ggaccatcag tcttcctgtt ccccccaaaa cccaaggaca ctctcatgat ctcccggacc | 780 |
| cctgaggtca cgtgcgtggt ggtggacgtg agccaggaag accccgaggt ccagttcaac | 840 |
| tggtacgtga tggcgtgga ggtgcataat gccaagacaa agccgcggga ggagcagttc | 900 |
| aacagcacgt accgtgtggt cagcgtcctc accgtcctgc accaggactg gctgaacggc | 960 |
| aaggagtaca agtgcaaggt ctccaacaaa ggcctcccgt cctccatcga gaaaaccatc | 1020 |
| tccaaagcca agggcagcc ccgagagcca caggtgtaca ccctgccccc atcccaggag | 1080 |
| gagatgacca gaaccaggt cagcctgacc tgcctggtca aaggcttcta ccccagcgac | 1140 |
| atcgccgtgg agtgggagag caatgggcag ccggagaaca actacaagac cacgcctccc | 1200 |
| gtgctggact ccgacggctc cttcttcctc tacagcaagc taaccgtgga caagagcagg | 1260 |
| tggcaggagg ggaatgtctt ctcatgctcc gtgatgcatg aggctctgca caaccactac | 1320 |
| acacagaaga gcctctccct gtctctgggt aaatga | 1356 |

<210> SEQ ID NO 91
<211> LENGTH: 451
<212> TYPE: PRT
<213> ORGANISM: Artificial Sequence
<220> FEATURE:
<223> OTHER INFORMATION: description of the artificial sequence: the
      amino acid sequence of GPngs62 H Chain

<400> SEQUENCE: 91

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Arg Ser Trp Val Arg Gln Ala Pro Gly Lys Gly Leu Glu Trp Val
        35                  40                  45

Ser Ala Ile Ser Gly Gly Gly Gly Arg Thr Tyr Tyr Ala Asp Ser Val
    50                  55                  60

Lys Gly Arg Phe Thr Ile Ser Arg Asp Asn Ser Gln Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Asn Tyr Tyr Gly Ser Gly Ser Ala Ser Tyr Trp Tyr Phe Asp
            100                 105                 110

Leu Trp Gly Arg Gly Thr Leu Val Thr Val Ser Ser Ala Ser Thr Lys

|  |  |  | 115 |  |  |  | 120 |  |  |  | 125 |  |  |
|---|---|---|---|---|---|---|---|---|---|---|---|---|---|

Gly Pro Ser Val Phe Pro Leu Ala Pro Cys Ser Arg Ser Thr Ser Glu
    130                    135              140

Ser Thr Ala Ala Leu Gly Cys Leu Val Lys Asp Tyr Phe Pro Glu Pro
145                    150                    155                    160

Val Thr Val Ser Trp Asn Ser Gly Ala Leu Thr Ser Gly Val His Thr
                  165                    170                    175

Phe Pro Ala Val Leu Gln Ser Ser Gly Leu Tyr Ser Leu Ser Ser Val
            180                    185                    190

Val Thr Val Pro Ser Ser Leu Gly Thr Lys Thr Tyr Thr Cys Asn
            195                    200                    205

Val Asp His Lys Pro Ser Asn Thr Lys Val Asp Lys Arg Val Glu Ser
    210                    215                    220

Lys Tyr Gly Pro Pro Cys Pro Pro Cys Pro Ala Pro Glu Phe Glu Gly
225                    230                    235                    240

Gly Pro Ser Val Phe Leu Phe Pro Pro Lys Pro Lys Asp Thr Leu Met
            245                    250                    255

Ile Ser Arg Thr Pro Glu Val Thr Cys Val Val Val Asp Val Ser Gln
            260                    265                    270

Glu Asp Pro Glu Val Gln Phe Asn Trp Tyr Val Asp Gly Val Glu Val
              275                  280                    285

His Asn Ala Lys Thr Lys Pro Arg Glu Glu Gln Phe Asn Ser Thr Tyr
    290                    295                    300

Arg Val Val Ser Val Leu Thr Val Leu His Gln Asp Trp Leu Asn Gly
305                    310                    315                    320

Lys Glu Tyr Lys Cys Lys Val Ser Asn Lys Gly Leu Pro Ser Ser Ile
              325                  330                    335

Glu Lys Thr Ile Ser Lys Ala Lys Gly Gln Pro Arg Glu Pro Gln Val
            340                    345                    350

Tyr Thr Leu Pro Pro Ser Gln Glu Glu Met Thr Lys Asn Gln Val Ser
              355                  360                    365

Leu Thr Cys Leu Val Lys Gly Phe Tyr Pro Ser Asp Ile Ala Val Glu
    370                    375                    380

Trp Glu Ser Asn Gly Gln Pro Glu Asn Asn Tyr Lys Thr Thr Pro Pro
385                    390                    395                    400

Val Leu Asp Ser Asp Gly Ser Phe Phe Leu Tyr Ser Lys Leu Thr Val
              405                  410                    415

Asp Lys Ser Arg Trp Gln Glu Gly Asn Val Phe Ser Cys Ser Val Met
            420                    425                    430

His Glu Ala Leu His Asn His Tyr Thr Gln Lys Ser Leu Ser Leu Ser
            435                    440                    445

Leu Gly Lys
    450

<210> SEQ ID NO 92
<211> LENGTH: 981
<212> TYPE: DNA
<213> ORGANISM: Artificial Sequence
<220> FEATURE:
<223> OTHER INFORMATION: description of the artificial sequence: the
     base sequence of IgG4PE R409K heavy chain constant region

<400> SEQUENCE: 92

```
gcaagtacca agggccatc  cgtcttcccc ctggcgccct gctccaggag cacctccgag    60
agcacagccg ccctgggctg cctggtcaag gactacttcc ccgaaccggt gacggtgtcg   120
```

```
tggaactcag gcgccctgac cagcggcgtg cacaccttcc cggctgtcct acagtcctca    180
ggactctact ccctcagcag cgtggtgacc gtgccctcca gcagcttggg cacgaagacc    240
tacacctgca acgtagatca caagcccagc aacaccaagg tggacaagag agttgagtcc    300
aaatatggtc cccatgccc accatgccca gcacctgagt tcgagggggg accatcagtc    360
ttcctgttcc ccccaaaacc caaggacact ctcatgatct cccggacccc tgaggtcacg    420
tgcgtggtgg tggacgtgag ccaggaagac cccgaggtcc agttcaactg gtacgtggat    480
ggcgtggagg tgcataatgc caagacaaag ccgcgggagg agcagttcaa cagcacgtac    540
cgtgtggtca gcgtcctcac cgtcctgcac caggactggc tgaacggcaa ggagtacaag    600
tgcaaggtct ccaacaaagg cctcccgtcc tccatcgaga aaaccatctc caaagccaaa    660
gggcagcccc gagagccaca ggtgtacacc ctgcccccat cccaggagga gatgaccaag    720
aaccaggtca gcctgacctg cctggtcaaa ggcttctacc ccagcgacat cgccgtggag    780
tgggagagca atgggcagcc ggagaacaac tacaagacca cgcctcccgt gctggactcc    840
gacggctcct tcttcctcta cagcaagcta accgtggaca agagcaggtg gcaggagggg    900
aatgtcttct catgctccgt gatgcatgag gctctgcaca accactacac acagaagagc    960 ctctcccctgt ccctaggtaa a    981
```

```
<210> SEQ ID NO 93
<211> LENGTH: 297
<212> TYPE: DNA
<213> ORGANISM: Artificial Sequence
<220> FEATURE:
<223> OTHER INFORMATION: description of the artificial sequence: the
      base sequence of IgG4 CH1

<400> SEQUENCE: 93
```

```
gctagcacca aaggaccttc tgtatttcct cttgcgccat gctctcgctc tacgtcagaa     60
tcaactgccg ctctggggtg cctggttaaa gactacttcc cggagcctgt gacagtgagt    120
tggaactccg gcgccctgac atcaggagtg catacatttc ccgccgtgct tcagagcagc    180
ggactttata gcctcagcag tgtggtgacc gtgccatctt ccagcctggg gaccaagacc    240
tacacctgta acgtggacca caaacccagc aacaccaagg ttgataagag ggtctga       297
```

```
<210> SEQ ID NO 94
<211> LENGTH: 98
<212> TYPE: PRT
<213> ORGANISM: Artificial Sequence
<220> FEATURE:
<223> OTHER INFORMATION: description of the artificial sequence: the
      amino acid sequence of IgG4 CH1

<400> SEQUENCE: 94
```

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys 85                  90                  95

Arg Val

<210> SEQ ID NO 95
<211> LENGTH: 2001
<212> TYPE: DNA
<213> ORGANISM: Artificial Sequence
<220> FEATURE:
<223> OTHER INFORMATION: description of the artificial sequence: the
      base sequence of Ct-R1090-GpS1019-FL H Chain

<400> SEQUENCE: 95

| | | |
|---|---|---|
| gaggtgcagc tggtgcagtc cggagcagag gtgaaaaagc ccggggagtc tctgaagatc | 60 |
| tcctgtaagg gttctggata cagctttatc atctactgga tcggctgggt gcgccagatg | 120 |
| cccgggaaag gcctggagtg gatggggatc atctatccta tgacgctga taccagatac | 180 |
| agcccgtcct tccaaggcca ggtcaccatc tcagccgaca gtccatcag caccgcctac | 240 |
| ctgcagtgga gcagcctgaa ggcctcggac accgccatgt attactgtgt gagactgggt | 300 |
| acgagggact ggttcgaccc ctggggccag ggaaccctgg tcaccgtctc ctcagcaagt | 360 |
| accaaggggc catccgtctt ccccctggcg ccctgctcca ggagcacctc cgagagcaca | 420 |
| gccgccctgg gctgcctggt caaggactac ttccccgaac cggtgacggt gtcgtggaac | 480 |
| tcaggcgccc tgaccagcgg cgtgcacacc ttcccggctg tcctacagtc ctcaggactc | 540 |
| tactccctca gcagcgtggt gaccgtgccc tccagcagct gggcacgaa gacctacacc | 600 |
| tgcaacgtag atcacaagcc cagcaacacc aaggtggaca gagagttga gtccaaatat | 660 |
| ggtcccccat gcccaccatg cccagcacct gagttcgagg ggggaccatc agtcttcctg | 720 |
| ttccccccaa aacccaagga cactctcatg atctcccgga cccctgaggt cacgtgcgtg | 780 |
| gtggtggacg tgagccagga agaccccgag gtccagttca actggtacgt ggatggcgtg | 840 |
| gaggtgcata atgccaagac aaagccgcgg gaggagcagt tcaacagcac gtaccgtgtg | 900 |
| gtcagcgtcc tcaccgtcct gcaccaggac tggctgaacg gcaaggagta caagtgcaag | 960 |
| gtctccaaca aaggcctccc gtcctccatc gagaaaacca tctccaaagc caaagggcag | 1020 |
| ccccgagagc cacaggtgta caccctgccc ccatcccagg aggagatgac caagaaccag | 1080 |
| gtcagcctga cctgcctggt caaaggcttc taccccagcg acatcgccgt ggagtgggag | 1140 |
| agcaatgggc agccggagaa caactacaag accacgcctc ccgtgctgga ctccgacggc | 1200 |
| tccttcttcc tctacagcaa gctaaccgtg gacaagagca ggtggcagga ggggaatgtc | 1260 |
| ttctcatgct ccgtgatgca tgaggctctg cacaaccact acacacagaa gagcctctcc | 1320 |
| ctgtccctag gtaaagaggt gcagctggtg cagtctggag gaggcttggt acagccgggg | 1380 |
| gggtccctga gactctcctg tgcagcctct ggattcgcct tcagtaccta tagcattaac | 1440 |
| tgggtccgcc aggctccagg aaggggctg gagtggattt catacattag tagtagtagt | 1500 |
| aataccatat actacgcaga ctctgtgaag ggccgattca ccatctccag agacaatgcc | 1560 |
| aagaactcac tgtatctgca aatgagcagc ctgaaagacg aggacacggc tgtgtattac | 1620 |
| tgtgcgagag gatatggttc ggggagttat tttaggaact ggttcgaccc ctggggccag | 1680 |
| ggaaccctgg tcaccgtctc ctcagctagc accaaaggac cttctgtatt tcctcttgcg | 1740 |
| ccatgctctc gctctacgtc agaatcaact gccgctctgg ggtgcctggt aaagactac | 1800 |
| ttcccggagc ctgtgacagt gagttggaac tccggcgccc tgacatcagg agtgcataca | 1860 |
| tttcccgccg tgcttcagag cagcggactt tatagcctca gcagtgtggt gaccgtgcca | 1920 | tcttccagcc tgggggaccaa gacctacacc tgtaacgtgg accacaaacc cagcaacacc    1980 aaggttgata agagggtctg a                                                  2001

<210> SEQ ID NO 96
<211> LENGTH: 666
<212> TYPE: PRT
<213> ORGANISM: Artificial Sequence
<220> FEATURE:
<223> OTHER INFORMATION: description of the artificial sequence: the
      amino acid sequence of Ct-R1090-GpS1019-FL H Chain

<400> SEQUENCE: 96

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
            20                  25                  30

Trp Ile Gly Trp Val Arg Gln Met Pro Gly Lys Gly Leu Glu Trp Met
        35                  40                  45

Gly Ile Ile Tyr Pro Asn Asp Ala Asp Thr Arg Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Val Arg Leu Gly Thr Arg Asp Trp Phe Asp Pro Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Cys Ser Arg Ser Thr Ser Glu Ser Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Lys Thr Tyr Thr Cys Asn Val Asp His Lys Pro Ser
        195                 200                 205

Asn Thr Lys Val Asp Lys Arg Val Glu Ser Lys Tyr Gly Pro Pro Cys
    210                 215                 220

Pro Pro Cys Pro Ala Pro Glu Phe Glu Gly Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser Gln Glu Asp Pro Glu Val Gln
            260                 265                 270

Phe Asn Trp Tyr Val Asp Gly Val Glu Val His Asn Ala Lys Thr Lys
        275                 280                 285

Pro Arg Glu Glu Gln Phe Asn Ser Thr Tyr Arg Val Val Ser Val Leu
    290                 295                 300

Thr Val Leu His Gln Asp Trp Leu Asn Gly Lys Glu Tyr Lys Cys Lys
305                 310                 315                 320

Val Ser Asn Lys Gly Leu Pro Ser Ser Ile Glu Lys Thr Ile Ser Lys
                325                 330                 335

Ala Lys Gly Gln Pro Arg Glu Pro Gln Val Tyr Thr Leu Pro Pro Ser
```

```
            340                 345                 350
Gln Glu Glu Met Thr Lys Asn Gln Val Ser Leu Thr Cys Leu Val Lys
        355                 360                 365
Gly Phe Tyr Pro Ser Asp Ile Ala Val Glu Trp Glu Ser Asn Gly Gln
    370                 375                 380
Pro Glu Asn Asn Tyr Lys Thr Thr Pro Pro Val Leu Asp Ser Asp Gly
385                 390                 395                 400
Ser Phe Phe Leu Tyr Ser Lys Leu Thr Val Asp Lys Ser Arg Trp Gln
            405                 410                 415
Glu Gly Asn Val Phe Ser Cys Ser Val Met His Glu Ala Leu His Asn
        420                 425                 430
His Tyr Thr Gln Lys Ser Leu Ser Leu Ser Leu Gly Lys Glu Val Gln
    435                 440                 445
Leu Val Gln Ser Gly Gly Gly Leu Val Gln Pro Gly Gly Ser Leu Arg
450                 455                 460
Leu Ser Cys Ala Ala Ser Gly Phe Ala Phe Ser Thr Tyr Ser Ile Asn
465                 470                 475                 480
Trp Val Arg Gln Ala Pro Gly Lys Gly Leu Glu Trp Ile Ser Tyr Ile
            485                 490                 495
Ser Ser Ser Ser Asn Thr Ile Tyr Tyr Ala Asp Ser Val Lys Gly Arg
        500                 505                 510
Phe Thr Ile Ser Arg Asp Asn Ala Lys Asn Ser Leu Tyr Leu Gln Met
    515                 520                 525
Ser Ser Leu Lys Asp Glu Asp Thr Ala Val Tyr Tyr Cys Ala Arg Gly
530                 535                 540
Tyr Gly Ser Gly Ser Tyr Phe Arg Asn Trp Phe Asp Pro Trp Gly Gln
545                 550                 555                 560
Gly Thr Leu Val Thr Val Ser Ser Ala Ser Thr Lys Gly Pro Ser Val
            565                 570                 575
Phe Pro Leu Ala Pro Cys Ser Arg Ser Thr Ser Glu Ser Thr Ala Ala
        580                 585                 590
Leu Gly Cys Leu Val Lys Asp Tyr Phe Pro Glu Pro Val Thr Val Ser
    595                 600                 605
Trp Asn Ser Gly Ala Leu Thr Ser Gly Val His Thr Phe Pro Ala Val
    610                 615                 620
Leu Gln Ser Ser Gly Leu Tyr Ser Leu Ser Ser Val Val Thr Val Pro
625                 630                 635                 640
Ser Ser Ser Leu Gly Thr Lys Thr Tyr Thr Cys Asn Val Asp His Lys
            645                 650                 655
Pro Ser Asn Thr Lys Val Asp Lys Arg Val
        660                 665

<210> SEQ ID NO 97
<211> LENGTH: 2004
<212> TYPE: DNA
<213> ORGANISM: Artificial Sequence
<220> FEATURE:
<223> OTHER INFORMATION: description of the artificial sequence: the
      base sequence of Ct-R1090-GpA6005-FL H Chain

<400> SEQUENCE: 97
gaggtgcagc tggtgcagtc cggagcagag gtgaaaaagc ccggggagtc tctgaagatc      60
tcctgtaagg gttctggata cagctttatc atctactgga tcggctgggt gcgccagatg     120
cccgggaaag gcctggagtg gatggggatc atctatccta tgacgctga taccagatac     180
```

```
agcccgtcct tccaaggcca ggtcaccatc tcagccgaca agtccatcag caccgcctac    240
ctgcagtgga gcagcctgaa ggcctcggac accgccatgt attactgtgt gagactgggt    300
acgagggact ggttcgaccc ctggggccag ggaaccctgg tcaccgtctc ctcagcaagt    360
accaaggggc catccgtctt cccctggcg ccctgctcca ggagcacctc cgagagcaca    420
gccgccctgg gctgcctggt caaggactac ttccccgaac cggtgacggt gtcgtggaac    480
tcaggcgccc tgaccagcgg cgtgcacacc ttcccggctg tcctacagtc ctcaggactc    540
tactccctca gcagcgtggt gaccgtgccc tccagcagct gggcacgaa gacctacacc    600 tgcaacgtag atcacaagcc cagcaacacc aaggtggaca gagagttga gtccaaatat    660 ggtcccccat gcccaccatg cccagcacct gagttcgagg ggggaccatc agtcttcctg    720 ttcccccaa aacccaagga cactctcatg atctcccgga cccctgaggt cacgtgcgtg    780
gtggtggacg tgagccagga agaccccgag gtccagttca actggtacgt ggatggcgtg    840
gaggtgcata atgccaagac aaagccgcgg gaggagcagt tcaacagcac gtaccgtgtg    900
gtcagcgtcc tcaccgtcct gcaccaggac tggctgaacg gcaaggagta caagtgcaag    960
gtctccaaca aaggcctccc gtcctccatc gagaaaacca tctccaaagc caaagggcag    1020
ccccgagagc cacaggtgta caccctgccc ccatcccagg aggagatgac caagaaccag    1080
gtcagcctga cctgcctggt caaaggcttc taccccagcg acatcgccgt ggagtgggag    1140
agcaatgggc agccggagaa caactacaag accacgcctc ccgtgctgga ctccgacggc    1200
tccttcttcc tctacagcaa gctaaccgtg gacaagagca ggtggcagga ggggaatgtc    1260
ttctcatgct ccgtgatgca tgaggctctg cacaaccact acacacagaa gagcctctcc    1320
ctgtccctag gtaaacaggt gcagctggtg gagtctgggg gaggcttggt acagcctggg    1380
gggtccctga gactctcctg tgcagcctct ggattcacct tcagtagcta tagcatgaac    1440
tgggtccgcc aggctccagg gaaggggctg gagtgggtgt cctacattaa gagtagcggt    1500
agttccacat actacgcaga ctctgtgaag ggccgcttca ccatctccag agacaatgcc    1560
aagaactcac tgaatctgca aatgaacagc ctgagagacg aggacacggc tgtgtattac    1620
tgtgcgagag ggacgtatta ctatggttcg ggaaattttt tccttttga ctactggggc    1680 cagggaaccc tggtcaccgt ctcctcagct agcaccaaag gaccttctgt atttcctctt    1740
gcgccatgct ctcgctctac gtcagaatca actgccgctc tggggtgcct ggttaaagac    1800
tacttcccgg agcctgtgac agtgagttgg aactccggcg ccctgacatc aggagtgcat    1860
acatttcccg ccgtgcttca gagcagcgga ctttatagcc tcagcagtgt ggtgaccgtg    1920
ccatcttcca gcctggggac caagacctac acctgtaacg tggaccacaa acccagcaac    1980
accaaggttg ataagagggt ctga                                            2004
```

<210> SEQ ID NO 98
<211> LENGTH: 667
<212> TYPE: PRT
<213> ORGANISM: Artificial Sequence
<220> FEATURE:
<223> OTHER INFORMATION: description of the artificial sequence: the
amino acid sequence of Ct-R1090-GpA6005-FL H Chain

<400> SEQUENCE: 98

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
            20                  25                  30
```

-continued

```
Trp Ile Gly Trp Val Arg Gln Met Pro Gly Lys Gly Leu Glu Trp Met
         35                  40                  45
Gly Ile Ile Tyr Pro Asn Asp Ala Asp Thr Arg Tyr Ser Pro Ser Phe
 50                  55                  60
Gln Gly Gln Val Thr Ile Ser Ala Asp Lys Ser Ile Ser Thr Ala Tyr
 65                  70                  75                  80
Leu Gln Trp Ser Ser Leu Lys Ala Ser Asp Thr Ala Met Tyr Tyr Cys
                 85                  90                  95
Val Arg Leu Gly Thr Arg Asp Trp Phe Asp Pro Trp Gly Gln Gly Thr
            100                 105                 110
Leu Val Thr Val Ser Ser Ala Ser Thr Lys Gly Pro Ser Val Phe Pro
        115                 120                 125
Leu Ala Pro Cys Ser Arg Ser Thr Ser Glu Ser Thr Ala Ala Leu Gly
    130                 135                 140
Cys Leu Val Lys Asp Tyr Phe Pro Glu Pro Val Thr Val Ser Trp Asn
145                 150                 155                 160
Ser Gly Ala Leu Thr Ser Gly Val His Thr Phe Pro Ala Val Leu Gln
                165                 170                 175
Ser Ser Gly Leu Tyr Ser Leu Ser Ser Val Val Thr Val Pro Ser Ser
            180                 185                 190
Ser Leu Gly Thr Lys Thr Tyr Thr Cys Asn Val Asp His Lys Pro Ser
        195                 200                 205
Asn Thr Lys Val Asp Lys Arg Val Glu Ser Lys Tyr Gly Pro Pro Cys
    210                 215                 220
Pro Pro Cys Pro Ala Pro Glu Phe Glu Gly Gly Pro Ser Val Phe Leu
225                 230                 235                 240
Phe Pro Pro Lys Pro Lys Asp Thr Leu Met Ile Ser Arg Thr Pro Glu
                245                 250                 255
Val Thr Cys Val Val Val Asp Val Ser Gln Glu Asp Pro Glu Val Gln
            260                 265                 270
Phe Asn Trp Tyr Val Asp Gly Val Glu Val His Asn Ala Lys Thr Lys
        275                 280                 285
Pro Arg Glu Glu Gln Phe Asn Ser Thr Tyr Arg Val Val Ser Val Leu
    290                 295                 300
Thr Val Leu His Gln Asp Trp Leu Asn Gly Lys Glu Tyr Lys Cys Lys
305                 310                 315                 320
Val Ser Asn Lys Gly Leu Pro Ser Ser Ile Glu Lys Thr Ile Ser Lys
                325                 330                 335
Ala Lys Gly Gln Pro Arg Glu Pro Gln Val Tyr Thr Leu Pro Pro Ser
            340                 345                 350
Gln Glu Glu Met Thr Lys Asn Gln Val Ser Leu Thr Cys Leu Val Lys
        355                 360                 365
Gly Phe Tyr Pro Ser Asp Ile Ala Val Glu Trp Glu Ser Asn Gly Gln
    370                 375                 380
Pro Glu Asn Asn Tyr Lys Thr Thr Pro Pro Val Leu Asp Ser Asp Gly
385                 390                 395                 400
Ser Phe Phe Leu Tyr Ser Lys Leu Thr Val Asp Lys Ser Arg Trp Gln
                405                 410                 415
Glu Gly Asn Val Phe Ser Cys Ser Val Met His Glu Ala Leu His Asn
            420                 425                 430
His Tyr Thr Gln Lys Ser Leu Ser Leu Ser Leu Gly Lys Gln Val Gln
        435                 440                 445
Leu Val Glu Ser Gly Gly Gly Leu Val Gln Pro Gly Gly Ser Leu Arg
```

```
                450               455               460
Leu Ser Cys Ala Ala Ser Gly Phe Thr Phe Ser Ser Tyr Ser Met Asn
465                 470                 475                 480

Trp Val Arg Gln Ala Pro Gly Lys Gly Leu Glu Trp Val Ser Tyr Ile
                    485                 490                 495

Lys Ser Ser Gly Ser Ser Thr Tyr Tyr Ala Asp Ser Val Lys Gly Arg
                500                 505                 510

Phe Thr Ile Ser Arg Asp Asn Ala Lys Asn Ser Leu Asn Leu Gln Met
            515                 520                 525

Asn Ser Leu Arg Asp Glu Asp Thr Ala Val Tyr Tyr Cys Ala Arg Gly
        530                 535                 540

Thr Tyr Tyr Tyr Gly Ser Gly Asn Phe Phe Leu Phe Asp Tyr Trp Gly
545                 550                 555                 560

Gln Gly Thr Leu Val Thr Val Ser Ala Ser Thr Lys Gly Pro Ser
                    565                 570                 575

Val Phe Pro Leu Ala Pro Cys Ser Arg Ser Thr Ser Glu Ser Thr Ala
                580                 585                 590

Ala Leu Gly Cys Leu Val Lys Asp Tyr Phe Pro Glu Pro Val Thr Val
            595                 600                 605

Ser Trp Asn Ser Gly Ala Leu Thr Ser Gly Val His Thr Phe Pro Ala
        610                 615                 620

Val Leu Gln Ser Ser Gly Leu Tyr Ser Leu Ser Ser Val Val Thr Val
625                 630                 635                 640

Pro Ser Ser Ser Leu Gly Thr Lys Thr Tyr Thr Cys Asn Val Asp His
                    645                 650                 655

Lys Pro Ser Asn Thr Lys Val Asp Lys Arg Val
                660                 665
```

<210> SEQ ID NO 99
<211> LENGTH: 2004
<212> TYPE: DNA
<213> ORGANISM: Artificial Sequence
<220> FEATURE:
<223> OTHER INFORMATION: description of the artificial sequence: the base sequence of Ct-R1090-GpA6014-FL H Chain

<400> SEQUENCE: 99

```
gaggtgcagc tggtgcagtc cggagcagag gtgaaaaagc ccggggagtc tctgaagatc    60
tcctgtaagg gttctggata cagctttatc atctactgga tcggctgggt gcgccagatg   120
cccgggaaag gcctggagtg gatggggatc atctatccta tgacgctga taccagatac    180 agcccgtcct tccaaggcca ggtcaccatc tcagccgaca gtccatcag caccgcctac    240 ctgcagtgga gcagcctgaa ggcctcggac accgccatgt attactgtgt gagactgggt    300
acgagggact ggttcgaccc ctggggccag ggaaccctgg tcaccgtctc ctcagcaagt    360
accaaggggc catccgtctt ccccctggcg ccctgctcca ggagcacctc cgagagcaca    420
gccgccctgg gctgcctggt caaggactac ttccccgaac cggtgacggt gtcgtggaac    480
tcaggcgccc tgaccagcgg cgtgcacacc ttcccggctg tcctacagtc ctcaggactc    540
tactccctca gcagcgtggt gaccgtgccc tccagcagct gggcacgaa gacctacacc    600 tgcaacgtag atcacaagcc cagcaacacc aaggtggaca gagagttga gtccaaatat    660 ggtccccat gcccaccatg cccagcacct gagttcgagg gggaccatc agtcttcctg     720 ttccccccaa aacccaagga cactctcatg atctcccgga cccctgaggt cacgtgcgtg    780
gtggtggacg tgagccagga agaccccgag gtccagttca actggtacgt ggatggcgtg    840
```

-continued

```
gaggtgcata atgccaagac aaagccgcgg gaggagcagt tcaacagcac gtaccgtgtg    900
gtcagcgtcc tcaccgtcct gcaccaggac tggctgaacg gcaaggagta caagtgcaag    960
gtctccaaca aaggcctccc gtcctccatc gagaaaacca tctccaaagc caagggcag     1020 ccccgagagc cacaggtgta caccctgccc ccatcccagg aggagatgac caagaaccag    1080
gtcagcctga cctgcctggt caaaggcttc taccccagcg acatcgccgt ggagtgggag    1140
agcaatgggc agccggagaa caactacaag accacgcctc ccgtgctgga ctccgacggc    1200
tccttcttcc tctacagcaa gctaaccgtg gacaagagca ggtggcagga ggggaatgtc    1260
ttctcatgct ccgtgatgca tgaggctctg cacaaccact acacacagaa gagcctctcc    1320
ctgtccctag gtaaacagat gcagctggtg cagtctgggg gaggcttggt acagcctggg    1380
gggtccctga ctctcctg tgcagcctct ggattctcct tcagtagtta tgccatgaac     1440
tgggtccgcc aggctccagg gaagggactg gaatgggttt catacattac tagtggtggt    1500
agttccagat actacgcaga ctctgtgaag ggccgattca ccatctccag agacaacgcc    1560
aagaactcac tgtatctgca aatgaacagc ctgagagacg aggacacggc tgtgtattac    1620
tgtgcgagag ggacgtatta ctatggttcg gggaattatt tccttttga ccactggggc     1680 cagggaacca tggtcaccgt ctcctcagct agcaccaaag gacttctgt atttcctctt     1740 gcgccatgct ctcgctctac gtcagaatca actgccgctc tggggtgcct ggttaaagac    1800
tacttcccgg agcctgtgac agtgagttgg aactccggcg ccctgacatc aggagtgcat    1860
acatttcccg ccgtgcttca gagcagcgga ctttatagcc tcagcagtgt ggtgaccgtg    1920
ccatcttcca gcctggggac caagacctac acctgtaacg tggaccacaa acccagcaac    1980
accaaggttg ataagagggt ctga                                           2004
```

<210> SEQ ID NO 100
<211> LENGTH: 667
<212> TYPE: PRT
<213> ORGANISM: Artificial Sequence
<220> FEATURE:
<223> OTHER INFORMATION: description of the artificial sequence: the
      amino acid sequence of Ct-R1090-GpA6014-FL H Chain

<400> SEQUENCE: 100

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
            20                  25                  30

Trp Ile Gly Trp Val Arg Gln Met Pro Gly Lys Gly Leu Glu Trp Met
        35                  40                  45

Gly Ile Ile Tyr Pro Asn Asp Ala Asp Thr Arg Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Val Arg Leu Gly Thr Arg Asp Trp Phe Asp Pro Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Cys Ser Arg Ser Thr Ser Glu Ser Thr Ala Ala Leu Gly
    130                 135                 140
```

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
            165                 170                 175

Ser Ser Gly Leu Tyr Ser Leu Ser Ser Val Val Thr Val Pro Ser Ser
            180                 185                 190

Ser Leu Gly Thr Lys Thr Tyr Thr Cys Asn Val Asp His Lys Pro Ser
            195                 200                 205

Asn Thr Lys Val Asp Lys Arg Val Glu Ser Lys Tyr Gly Pro Pro Cys
            210                 215                 220

Pro Pro Cys Pro Ala Pro Glu Phe Glu Gly Gly Pro Ser Val Phe Leu
225                 230                 235                 240

Phe Pro Pro Lys Pro Lys Asp Thr Leu Met Ile Ser Arg Thr Pro Glu
            245                 250                 255

Val Thr Cys Val Val Val Asp Val Ser Gln Glu Asp Pro Glu Val Gln
            260                 265                 270

Phe Asn Trp Tyr Val Asp Gly Val Glu Val His Asn Ala Lys Thr Lys
            275                 280                 285

Pro Arg Glu Glu Gln Phe Asn Ser Thr Tyr Arg Val Val Ser Val Leu
            290                 295                 300

Thr Val Leu His Gln Asp Trp Leu Asn Gly Lys Glu Tyr Lys Cys Lys
305                 310                 315                 320

Val Ser Asn Lys Gly Leu Pro Ser Ser Ile Glu Lys Thr Ile Ser Lys
            325                 330                 335

Ala Lys Gly Gln Pro Arg Glu Pro Gln Val Tyr Thr Leu Pro Pro Ser
            340                 345                 350

Gln Glu Glu Met Thr Lys Asn Gln Val Ser Leu Thr Cys Leu Val Lys
            355                 360                 365

Gly Phe Tyr Pro Ser Asp Ile Ala Val Glu Trp Glu Ser Asn Gly Gln
            370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
            405                 410                 415

Glu Gly Asn Val Phe Ser Cys Ser Val Met His Glu Ala Leu His Asn
            420                 425                 430

His Tyr Thr Gln Lys Ser Leu Ser Leu Ser Leu Gly Lys Gln Met Gln
            435                 440                 445

Leu Val Gln Ser Gly Gly Gly Leu Val Gln Pro Gly Gly Ser Leu Arg
450                 455                 460

Leu Ser Cys Ala Ala Ser Gly Phe Ser Phe Ser Ser Tyr Ala Met Asn
465                 470                 475                 480

Trp Val Arg Gln Ala Pro Gly Lys Gly Leu Glu Trp Val Ser Tyr Ile
            485                 490                 495

Thr Ser Gly Gly Ser Ser Arg Tyr Tyr Ala Asp Ser Val Lys Gly Arg
            500                 505                 510

Phe Thr Ile Ser Arg Asp Asn Ala Lys Asn Ser Leu Tyr Leu Gln Met
            515                 520                 525

Asn Ser Leu Arg Asp Glu Asp Thr Ala Val Tyr Tyr Cys Ala Arg Gly
            530                 535                 540

Thr Tyr Tyr Tyr Gly Ser Gly Asn Tyr Phe Leu Phe Asp His Trp Gly
545                 550                 555                 560

Gln Gly Thr Met Val Thr Val Ser Ser Ala Ser Thr Lys Gly Pro Ser

```
                565              570              575
Val Phe Pro Leu Ala Pro Cys Ser Arg Ser Thr Ser Glu Ser Thr Ala
                580              585              590

Ala Leu Gly Cys Leu Val Lys Asp Tyr Phe Pro Glu Pro Val Thr Val
            595              600              605

Ser Trp Asn Ser Gly Ala Leu Thr Ser Gly Val His Thr Phe Pro Ala
        610              615              620

Val Leu Gln Ser Ser Gly Leu Tyr Ser Leu Ser Ser Val Val Thr Val
625              630              635              640

Pro Ser Ser Ser Leu Gly Thr Lys Thr Tyr Thr Cys Asn Val Asp His
                645              650              655

Lys Pro Ser Asn Thr Lys Val Asp Lys Arg Val
                660              665
```

<210> SEQ ID NO 101
<211> LENGTH: 2004
<212> TYPE: DNA
<213> ORGANISM: Artificial Sequence
<220> FEATURE:
<223> OTHER INFORMATION: description of the artificial sequence: the
      base sequence of Ct-R1090-GpA6062-FL H Chain

<400> SEQUENCE: 101

| | | | | | |
|---|---|---|---|---|---|
| gaggtgcagc | tggtgcagtc | cggagcagag | gtgaaaaagc | cggggagtc | tctgaagatc | 60 |
| tcctgtaagg | gttctggata | cagctttatc | atctactgga | tcggctgggt | gcgccagatg | 120 |
| cccgggaaag | gcctggagtg | gatggggatc | atctatccta | tgacgctga | taccagatac | 180 |
| agcccgtcct | tccaaggcca | ggtcaccatc | tcagccgaca | agtccatcag | caccgcctac | 240 |
| ctgcagtgga | gcagcctgaa | ggcctcggac | accgccatgt | attactgtgt | gagactgggt | 300 |
| acgagggact | ggttcgaccc | ctggggccag | ggaaccctgg | tcaccgtctc | ctcagcaagt | 360 |
| accaaggggc | catccgtctt | ccccctggcg | ccctgctcca | ggagcacctc | cgagagcaca | 420 |
| gccgccctgg | gctgcctggt | caaggactac | ttccccgaac | cggtgacggt | gtcgtggaac | 480 |
| tcaggcgccc | tgaccagcgg | cgtgcacacc | ttcccggctg | tcctacagtc | ctcaggactc | 540 |
| tactccctca | gcagcgtggt | gaccgtgccc | tccagcagct | tgggcacgaa | gacctacacc | 600 |
| tgcaacgtag | atcacaagcc | cagcaacacc | aaggtggaca | agagagttga | gtccaaatat | 660 |
| ggtcccccat | gcccaccatg | cccagcacct | gagttcgagg | ggggaccatc | agtcttcctg | 720 |
| ttccccccaa | aacccaagga | cactctcatg | atctcccgga | ccccctgaggt | cacgtgcgtg | 780 |
| gtggtggacg | tgagccagga | agaccccgag | gtccagttca | actggtacgt | ggatggcgtg | 840 |
| gaggtgcata | atgccaagac | aaagccgcgg | gaggagcagt | tcaacagcac | gtaccgtgtg | 900 |
| gtcagcgtcc | tcaccgtcct | gcaccaggac | tggctgaacg | gcaaggagta | caagtgcaag | 960 |
| gtctccaaca | aaggcctccc | gtcctccatc | gagaaaacca | tctccaaagc | caaagggcag | 1020 |
| ccccgagagc | cacaggtgta | caccctgccc | ccatcccagg | aggagatgac | caagaaccag | 1080 |
| gtcagcctga | cctgcctggt | caaaggcttc | taccccagcg | acatcgccgt | ggagtgggag | 1140 |
| agcaatgggc | agccggagaa | caactacaag | accacgcctc | ccgtgctgga | ctccgacggc | 1200 |
| tccttcttcc | tctacagcaa | gctaaccgtg | gacaagagca | ggtggcagga | ggggaatgtc | 1260 |
| ttctcatgct | ccgtgatgca | tgaggctctg | cacaaccact | acacacagaa | gagcctctcc | 1320 |
| ctgtccctag | gtaaagaggt | gcagctggtg | gagaccgggg | gaggcttggt | acagcctggg | 1380 |
| gggtccctga | gactctcctg | tgcagcctct | ggattctcct | tcagtagcta | tgccatgaac | 1440 |

```
tgggtccgcc aggctccagg gaagggactg gaatgggttt catacattac tagtggtggt    1500
agttccagat actacgcaga ctctgtgaag ggccgattca ccatctccag agacaacgcc    1560
aagaactcac tgtatctgca aatgaacagc ctgagagacg aggacacggc tgtgtattac    1620
tgtgcgagag ggacgtatta ctatggttcg gggaattatt ccttttttga ctactggggc    1680
cagggaacca cggtcaccgt ctcctcagct agcaccaaag gacttctgt atttcctctt     1740 gcgccatgct ctcgctctac gtcagaatca actgccgctc tggggtgcct ggttaaagac    1800
tacttcccgg agcctgtgac agtgagttgg aactccggcg ccctgacatc aggagtgcat    1860
acatttcccg ccgtgcttca gagcagcgga ctttatagcc tcagcagtgt ggtgaccgtg    1920
ccatcttcca gcctggggac caagacctac acctgtaacg tggaccacaa acccagcaac    1980
accaaggttg ataagagggt ctga                                           2004
```

<210> SEQ ID NO 102
<211> LENGTH: 667
<212> TYPE: PRT
<213> ORGANISM: Artificial Sequence
<220> FEATURE:
<223> OTHER INFORMATION: description of the artificial sequence: the amino acid sequence of Ct-R1090-GpA6062-FL H Chain

<400> SEQUENCE: 102

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
            20                  25                  30

Trp Ile Gly Trp Val Arg Gln Met Pro Gly Lys Gly Leu Glu Trp Met
        35                  40                  45

Gly Ile Ile Tyr Pro Asn Asp Ala Asp Thr Arg Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Val Arg Leu Gly Thr Arg Asp Trp Phe Asp Pro Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Cys Ser Arg Ser Thr Ser Glu Ser Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Lys Thr Tyr Thr Cys Asn Val Asp His Lys Pro Ser
        195                 200                 205

Asn Thr Lys Val Asp Lys Arg Val Glu Ser Lys Tyr Gly Pro Pro Cys
    210                 215                 220

Pro Pro Cys Pro Ala Pro Glu Phe Glu Gly Gly Pro Ser Val Phe Leu
225                 230                 235                 240

Phe Pro Pro Lys Pro Lys Asp Thr Leu Met Ile Ser Arg Thr Pro Glu
                245                 250                 255
```

```
Val Thr Cys Val Val Asp Val Ser Gln Glu Asp Pro Glu Val Gln
            260                 265                 270

Phe Asn Trp Tyr Val Asp Gly Val Glu Val His Asn Ala Lys Thr Lys
        275                 280                 285

Pro Arg Glu Glu Gln Phe Asn Ser Thr Tyr Arg Val Val Ser Val Leu
    290                 295                 300

Thr Val Leu His Gln Asp Trp Leu Asn Gly Lys Glu Tyr Lys Cys Lys
305                 310                 315                 320

Val Ser Asn Lys Gly Leu Pro Ser Ser Ile Glu Lys Thr Ile Ser Lys
                325                 330                 335

Ala Lys Gly Gln Pro Arg Glu Pro Gln Val Tyr Thr Leu Pro Pro Ser
            340                 345                 350

Gln Glu Glu Met Thr Lys Asn Gln Val Ser Leu Thr Cys Leu Val Lys
        355                 360                 365

Gly Phe Tyr Pro Ser Asp Ile Ala Val Glu Trp Glu Ser Asn Gly Gln
    370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
                405                 410                 415

Glu Gly Asn Val Phe Ser Cys Ser Val Met His Glu Ala Leu His Asn
            420                 425                 430

His Tyr Thr Gln Lys Ser Leu Ser Leu Ser Leu Gly Lys Glu Val Gln
        435                 440                 445

Leu Val Glu Thr Gly Gly Gly Leu Val Gln Pro Gly Gly Ser Leu Arg
    450                 455                 460

Leu Ser Cys Ala Ala Ser Gly Phe Ser Phe Ser Ser Tyr Ala Met Asn
465                 470                 475                 480

Trp Val Arg Gln Ala Pro Gly Lys Gly Leu Glu Trp Val Ser Tyr Ile
                485                 490                 495

Thr Ser Gly Gly Ser Ser Arg Tyr Tyr Ala Asp Ser Val Lys Gly Arg
            500                 505                 510

Phe Thr Ile Ser Arg Asp Asn Ala Lys Asn Ser Leu Tyr Leu Gln Met
        515                 520                 525

Asn Ser Leu Arg Asp Glu Asp Thr Ala Val Tyr Tyr Cys Ala Arg Gly
    530                 535                 540

Thr Tyr Tyr Tyr Gly Ser Gly Asn Tyr Phe Leu Phe Asp Tyr Trp Gly
545                 550                 555                 560

Gln Gly Thr Thr Val Thr Val Ser Ser Ala Ser Thr Lys Gly Pro Ser
                565                 570                 575

Val Phe Pro Leu Ala Pro Cys Ser Arg Ser Thr Ser Glu Ser Thr Ala
            580                 585                 590

Ala Leu Gly Cys Leu Val Lys Asp Tyr Phe Pro Glu Pro Val Thr Val
        595                 600                 605

Ser Trp Asn Ser Gly Ala Leu Thr Ser Gly Val His Thr Phe Pro Ala
    610                 615                 620

Val Leu Gln Ser Ser Gly Leu Tyr Ser Leu Ser Ser Val Val Thr Val
625                 630                 635                 640

Pro Ser Ser Ser Leu Gly Thr Lys Thr Tyr Thr Cys Asn Val Asp His
                645                 650                 655

Lys Pro Ser Asn Thr Lys Val Asp Lys Arg Val
            660                 665
```

<210> SEQ ID NO 103
<211> LENGTH: 1989
<212> TYPE: DNA
<213> ORGANISM: Artificial Sequence
<220> FEATURE:
<223> OTHER INFORMATION: description of the artificial sequence: the base sequence of Ct-R1090-GpS3003 H Chain

<400> SEQUENCE: 103

```
gaggtgcagc tggtgcagtc cggagcagag gtgaaaaagc ccggggagtc tctgaagatc    60
tcctgtaagg gttctggata cagctttatc atctactgga tcggctgggt gcgccagatg   120
cccgggaaag cctggagtg gatggggatc atctatccta atgacgctga taccagatac   180
agcccgtcct tccaaggcca ggtcaccatc tcagccgaca gtccatcag caccgcctac   240
ctgcagtgga gcagcctgaa ggcctcggac accgccatgt attactgtgt gagactgggt   300
acgagggact ggttcgaccc ctggggccag ggaaccctgg tcaccgtctc ctcagcaagt   360
accaaggggc catccgtctt ccccctggcg ccctgctcca ggagcacctc cgagagcaca   420
gccgccctgg gctgcctggt caaggactac ttccccgaac cggtgacggt gtcgtggaac   480
tcaggcgccc tgaccagcgg cgtgcacacc ttcccggctg tcctacagtc ctcaggactc   540
tactccctca gcagcgtggt gaccgtgccc tccagcagct gggcacgaa gacctacacc   600
tgcaacgtag atcacaagcc cagcaacacc aaggtggaca gagagttga gtccaaatat   660
ggtccccat gcccaccatg cccagcacct gagttcgagg gggaccatc agtcttcctg   720
ttcccccaa acccaagga cactctcatg atctccgga ccctgaggt cacgtgcgtg   780
gtggtggacg tgagccagga agaccccgag gtccagttca actggtacgt ggatggcgtg   840
gaggtgcata atgccaagac aaagccgcgg gaggagcagt tcaacagcac gtaccgtgtg   900
gtcagcgtcc tcaccgtcct gcaccaggac tggctgaacg gcaaggagta caagtgcaag   960
gtctccaaca aaggcctccc gtcctccatc gagaaaacca tctccaaagc caaagggcag  1020
ccccgagagc cacaggtgta caccctgccc ccatcccagg aggagatgac caagaaccag  1080
gtcagcctga cctgcctggt caaaggcttc taccccagcg acatcgccgt ggagtgggag  1140
agcaatgggc agccggagaa caactacaag accacgcctc ccgtgctgga ctccgacggc  1200
tccttcttcc tctacagcaa gctaaccgtg gacaagagca ggtggcagga ggggaatgtc  1260
ttctcatgct ccgtgatgca tgaggctctg cacaaccact acacacagaa gagcctctcc  1320
ctgtccctag gtaaacaggt gcagctggtg cagtctgggg gaggcttggt acagcctggg  1380
gggtccctga gactctcctg tgcagcctct ggattcacct tcagtcacta taccatgaac  1440
tgggtccgcc aggctccagg gaagggcctg gagtgggttt catacattaa tagtggtcgt  1500
agtaccataa agtacgcaga ctctgtgaag ggccgattca ccatctccag agacaatgcc  1560
aagaagtcat tgtatctgca aatgaatagt ctgagagacg aggacacggc tgtgtatttc  1620
tgtgcgagat gggagtggga gcaggaagct tttgatatct ggggccaagg acaatggtc  1680
accgtctctt cagctagcac caaaggacct tctgtatttc ctcttgcgcc atgctctcgc  1740
tctacgtcag aatcaactgc cgctctgggg tgcctggtta aagactactt cccggagcct  1800
gtgacagtga gttggaactc cggcgccctg acatcaggag tgcatacatt tcccgccgtg  1860
cttcagagca gcggacttta tagcctcagc agtgtggtga ccgtgccatc ttccagcctg  1920
ggaccaaga cctacacctg taacgtggac cacaaaccca gcaacaccaa ggttgataag  1980
agggtctga                                                         1989
```

<210> SEQ ID NO 104
<211> LENGTH: 662
<212> TYPE: PRT
<213> ORGANISM: Artificial Sequence
<220> FEATURE:
<223> OTHER INFORMATION: description of the artificial sequence: the amino acid sequence of Ct-R1090-GpS3003 H Chain

<400> SEQUENCE: 104

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
            20                  25                  30

Trp Ile Gly Trp Val Arg Gln Met Pro Gly Lys Gly Leu Glu Trp Met
        35                  40                  45

Gly Ile Ile Tyr Pro Asn Asp Ala Asp Thr Arg Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Val Arg Leu Gly Thr Arg Asp Trp Phe Asp Pro Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Cys Ser Arg Ser Thr Ser Glu Ser Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Lys Thr Tyr Thr Cys Asn Val Asp His Lys Pro Ser
        195                 200                 205

Asn Thr Lys Val Asp Lys Arg Val Glu Ser Lys Tyr Gly Pro Pro Cys
    210                 215                 220

Pro Pro Cys Pro Ala Pro Glu Phe Glu Gly Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser Gln Glu Asp Pro Glu Val Gln
            260                 265                 270

Phe Asn Trp Tyr Val Asp Gly Val Glu Val His Asn Ala Lys Thr Lys
        275                 280                 285

Pro Arg Glu Glu Gln Phe Asn Ser Thr Tyr Arg Val Val Ser Val Leu
    290                 295                 300

Thr Val Leu His Gln Asp Trp Leu Asn Gly Lys Glu Tyr Lys Cys Lys
305                 310                 315                 320

Val Ser Asn Lys Gly Leu Pro Ser Ser Ile Glu Lys Thr Ile Ser Lys
                325                 330                 335

Ala Lys Gly Gln Pro Arg Glu Pro Gln Val Tyr Thr Leu Pro Pro Ser
            340                 345                 350

Gln Glu Glu Met Thr Lys Asn Gln Val Ser Leu Thr Cys Leu Val Lys
        355                 360                 365
```

-continued

Gly Phe Tyr Pro Ser Asp Ile Ala Val Glu Trp Glu Ser Asn Gly Gln
        370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
                405                 410                 415

Glu Gly Asn Val Phe Ser Cys Ser Val Met His Glu Ala Leu His Asn
            420                 425                 430

His Tyr Thr Gln Lys Ser Leu Ser Leu Gly Lys Gln Val Gln
        435                 440                 445

Leu Val Gln Ser Gly Gly Leu Val Gln Pro Gly Gly Ser Leu Arg
450                 455                 460

Leu Ser Cys Ala Ala Ser Gly Phe Thr Phe Ser His Tyr Thr Met Asn
465                 470                 475                 480

Trp Val Arg Gln Ala Pro Gly Lys Gly Leu Glu Trp Val Ser Tyr Ile
                485                 490                 495

Asn Ser Gly Arg Ser Thr Ile Lys Tyr Ala Asp Ser Val Lys Gly Arg
            500                 505                 510

Phe Thr Ile Ser Arg Asp Asn Ala Lys Lys Ser Leu Tyr Leu Gln Met
        515                 520                 525

Asn Ser Leu Arg Asp Glu Asp Thr Ala Val Tyr Phe Cys Ala Arg Trp
530                 535                 540

Glu Trp Glu Gln Glu Ala Phe Asp Ile Trp Gly Gln Gly Thr Met Val
545                 550                 555                 560

Thr Val Ser Ser Ala Ser Thr Lys Gly Pro Ser Val Phe Pro Leu Ala
                565                 570                 575

Pro Cys Ser Arg Ser Thr Ser Glu Ser Thr Ala Ala Leu Gly Cys Leu
            580                 585                 590

Val Lys Asp Tyr Phe Pro Glu Pro Val Thr Val Ser Trp Asn Ser Gly
        595                 600                 605

Ala Leu Thr Ser Gly Val His Thr Phe Pro Ala Val Leu Gln Ser Ser
            610                 615                 620

Gly Leu Tyr Ser Leu Ser Ser Val Val Thr Val Pro Ser Ser Ser Leu
625                 630                 635                 640

Gly Thr Lys Thr Tyr Thr Cys Asn Val Asp His Lys Pro Ser Asn Thr
                645                 650                 655

Lys Val Asp Lys Arg Val
            660

<210> SEQ ID NO 105
<211> LENGTH: 1989
<212> TYPE: DNA
<213> ORGANISM: Artificial Sequence
<220> FEATURE:
<223> OTHER INFORMATION: description of the artificial sequence: the
      base sequence of Ct-R1090-GPngs18 H Chain

<400> SEQUENCE: 105
gaggtgcagc tggtgcagtc cggagcagag gtgaaaaagc ccggggagtc tctgaagatc    60
tcctgtaagg gttctggata cagctttatc atctactgga tcggctgggt gcgccagatg   120
cccgggaaag gcctggagtg gatggggatc atctatccta tgacgctga taccagatac   180 agcccgtcct tccaaggcca ggtcaccatc tcagccgaca agtccatcag caccgcctac   240
ctgcagtgga gcagcctgaa ggcctcggac accgccatgt attactgtgt gagactgggt   300
acgagggact ggttcgaccc ctggggccag ggaaccctgg tcaccgtctc ctcagcaagt   360

```
accaagggc catccgtctt ccccctggcg ccctgctcca ggagcacctc cgagagcaca    420
gccgccctgg gctgcctggt caaggactac ttccccgaac cggtgacggt gtcgtggaac    480
tcaggcgccc tgaccagcgg cgtgcacacc ttcccggctg tcctacagtc ctcaggactc    540
tactccctca gcagcgtggt gaccgtgccc tccagcagct tgggcacgaa gacctacacc    600
tgcaacgtag atcacaagcc cagcaacacc aaggtggaca gagagttga gtccaaatat    660
ggtccccat gccaccatg cccagccct gagttcgagg ggggaccatc agtcttcctg    720
ttccccccaa aacccaagga cactctcatg atctcccgga cccctgaggt cacgtgcgtg    780
gtggtggacg tgagccagga agacccgag gtccagttca actggtacgt ggatggcgtg    840
gaggtgcata atgccaagac aaagccgcgg gaggagcagt tcaacagcac gtaccgtgtg    900
gtcagcgtcc tcaccgtcct gcaccaggac tggctgaacg gcaaggagta caagtgcaag    960
gtctccaaca aaggcctccc gtcctccatc gagaaaacca tctccaaagc caaagggcag    1020
ccccgagagc cacaggtgta caccctgccc ccatcccagg aggagatgac caagaaccag    1080
gtcagcctga cctgcctggt caaaggcttc taccccagcg acatcgccgt ggagtgggag    1140
agcaatgggc agccggagaa caactacaag accacgcctc ccgtgctgga ctccgacggc    1200
tccttcttcc tctacagcaa gctaaccgtg gacaagagca ggtggcagga ggggaatgtc    1260
ttctcatgct ccgtgatgca tgaggctctg cacaaccact acacacagaa gagcctctcc    1320
ctgtccctag gtaaagaggt gcagctggtg gagtctgggg gaggcttggt acagcctggg    1380
gggtccctga gactcctg tgcagcctct ggattcacct tcagtagcta tagcatgaac    1440
tgggtccgcc aggctccagg gaaggggctg gagtgggttt catacattag aagtgatagt    1500
cgtaccataa agtacgcaga ctctgtgaag ggccgattca ccatctccag agacaatgcc    1560
aagaactcac tgtttctgca aatgaacagc ctgagagacg aggacacggc tgtgtattac    1620
tgtgcgagat gggagtggga gctggatgct tttgatatct ggggccaagg acaatggtc    1680
accgtctctt cagctagcac caaaggacct tctgtatttc ctcttgcgcc atgctctcgc    1740
tctacgtcag aatcaactgc cgctctgggg tgcctggtta agactactt cccggagcct    1800
gtgacagtga gttggaactc cggcgccctg acatcaggag tgcatacatt tcccgccgtg    1860
cttcagagca gcggactta tagcctcagc agtgtggtga ccgtgccatc ttccagcctg    1920
gggaccaaga cctacacctg taacgtggac cacaaaccca gcaacaccaa ggttgataag    1980
agggtctga                                                            1989
```

<210> SEQ ID NO 106
<211> LENGTH: 662
<212> TYPE: PRT
<213> ORGANISM: Artificial Sequence
<220> FEATURE:
<223> OTHER INFORMATION: description of the artificial sequence: the amino acid sequence of Ct-R1090-GPngs18 H Chain

<400> SEQUENCE: 106

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
            20                  25                  30

Trp Ile Gly Trp Val Arg Gln Met Pro Gly Lys Gly Leu Glu Trp Met
        35                  40                  45

Gly Ile Ile Tyr Pro Asn Asp Ala Asp Thr Arg Tyr Ser Pro Ser Phe
    50                  55                  60
```

```
Gln Gly Gln Val Thr Ile Ser Ala Asp Lys Ser Ile Ser Thr Ala Tyr
 65                  70                  75                  80

Leu Gln Trp Ser Ser Leu Lys Ala Ser Asp Thr Ala Met Tyr Tyr Cys
                 85                  90                  95

Val Arg Leu Gly Thr Arg Asp Trp Phe Asp Pro Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Cys Ser Arg Ser Thr Ser Glu Ser Thr Ala Ala Leu Gly
130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Lys Thr Tyr Thr Cys Asn Val Asp His Lys Pro Ser
        195                 200                 205

Asn Thr Lys Val Asp Lys Arg Val Glu Ser Lys Tyr Gly Pro Pro Cys
210                 215                 220

Pro Pro Cys Pro Ala Pro Glu Phe Glu Gly Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser Gln Glu Asp Pro Glu Val Gln
            260                 265                 270

Phe Asn Trp Tyr Val Asp Gly Val Glu Val His Asn Ala Lys Thr Lys
        275                 280                 285

Pro Arg Glu Glu Gln Phe Asn Ser Thr Tyr Arg Val Val Ser Val Leu
290                 295                 300

Thr Val Leu His Gln Asp Trp Leu Asn Gly Lys Glu Tyr Lys Cys Lys
305                 310                 315                 320

Val Ser Asn Lys Gly Leu Pro Ser Ser Ile Glu Lys Thr Ile Ser Lys
                325                 330                 335

Ala Lys Gly Gln Pro Arg Glu Pro Gln Val Tyr Thr Leu Pro Pro Ser
            340                 345                 350

Gln Glu Glu Met Thr Lys Asn Gln Val Ser Leu Thr Cys Leu Val Lys
        355                 360                 365

Gly Phe Tyr Pro Ser Asp Ile Ala Val Glu Trp Glu Ser Asn Gly Gln
370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
                405                 410                 415

Glu Gly Asn Val Phe Ser Cys Ser Val Met His Glu Ala Leu His Asn
            420                 425                 430

His Tyr Thr Gln Lys Ser Leu Ser Leu Ser Leu Gly Lys Glu Val Gln
        435                 440                 445

Leu Val Glu Ser Gly Gly Gly Leu Val Gln Pro Gly Gly Ser Leu Arg
450                 455                 460

Leu Ser Cys Ala Ala Ser Gly Phe Thr Phe Ser Ser Tyr Ser Met Asn
465                 470                 475                 480
```

Trp Val Arg Gln Ala Pro Gly Lys Gly Leu Glu Trp Val Ser Tyr Ile
            485                 490                 495

Arg Ser Asp Ser Arg Thr Ile Lys Tyr Ala Asp Ser Val Lys Gly Arg
        500                 505                 510

Phe Thr Ile Ser Arg Asp Asn Ala Lys Asn Ser Leu Phe Leu Gln Met
        515                 520                 525

Asn Ser Leu Arg Asp Glu Asp Thr Ala Val Tyr Tyr Cys Ala Arg Trp
    530                 535                 540

Glu Trp Glu Leu Asp Ala Phe Asp Ile Trp Gly Gln Gly Thr Met Val
545                 550                 555                 560

Thr Val Ser Ser Ala Ser Thr Lys Gly Pro Ser Val Phe Pro Leu Ala
            565                 570                 575

Pro Cys Ser Arg Ser Thr Ser Glu Ser Thr Ala Ala Leu Gly Cys Leu
            580                 585                 590

Val Lys Asp Tyr Phe Pro Glu Pro Val Thr Val Ser Trp Asn Ser Gly
        595                 600                 605

Ala Leu Thr Ser Gly Val His Thr Phe Pro Ala Val Leu Gln Ser Ser
    610                 615                 620

Gly Leu Tyr Ser Leu Ser Ser Val Val Thr Val Pro Ser Ser Ser Leu
625                 630                 635                 640

Gly Thr Lys Thr Tyr Thr Cys Asn Val Asp His Lys Pro Ser Asn Thr
            645                 650                 655

Lys Val Asp Lys Arg Val
            660

<210> SEQ ID NO 107
<211> LENGTH: 2004
<212> TYPE: DNA
<213> ORGANISM: Artificial Sequence
<220> FEATURE:
<223> OTHER INFORMATION: description of the artificial sequence: the
      base sequence of Ct-R1090-GPngs62 H Chain

<400> SEQUENCE: 107
gaggtgcagc tggtgcagtc cggagcagag gtgaaaaagc ccggggagtc tctgaagatc      60
tcctgtaagg gttctggata cagctttatc atctactgga tcggctgggt gcgccagatg    120
cccgggaaag gcctggagtg gatggggatc atctatccta tgacgctga taccagatac     180 agcccgtcct ccaaggcca ggtcaccatc tcagccgaca gtccatcag caccgcctac      240 ctgcagtgga gcagcctgaa ggcctcggac accgccatgt attactgtgt gagactgggt    300
acgagggact ggttcgaccc ctggggccag ggaaccctgg tcaccgtctc ctcagcaagt    360
accaaggggc catccgtctt ccccctggcg ccctgctcca ggagcacctc cgagagcaca    420
gccgccctgg gctgcctggt caaggactac ttccccgaac cggtgacggt gtcgtggaac    480
tcaggcgccc tgaccagcgg cgtgcacacc ttcccggctg tcctacagtc ctcaggactc    540
tactccctca gcagcgtggt gaccgtgccc tccagcagct gggcacgaa gacctacacc     600 tgcaacgtag atcacaagcc cagcaacacc aaggtggaca gagagttga gtccaaatat    660 ggtcccccat gcccaccatg cccagcacct gagttcgagg ggggaccatc agtcttcctg    720 ttcccccaa acccaaggga cactctcatg atctcccgga cccctgaggt cacgtgcgtg    780
gtggtggacg tgagccagga agaccccgag gtccagttca actggtacgt ggatggcgtg    840
gaggtgcata atgccaagac aaagccgcgg gaggagcagt tcaacagcac gtaccgtgtg    900
gtcagcgtcc tcaccgtcct gcaccaggac tggctgaacg gcaaggagta caagtgcaag    960

```
gtctccaaca aaggcctccc gtcctccatc gagaaaacca tctccaaagc caagggcag    1020 ccccgagagc cacaggtgta caccctgccc ccatcccagg aggagatgac caagaaccag    1080
gtcagcctga cctgcctggt caaaggcttc tacccagcg acatcgccgt ggagtgggag    1140
agcaatgggc agccggagaa caactacaag accacgcctc ccgtgctgga ctccgacggc    1200
tccttcttcc tctacagcaa gctaaccgtg gacaagagca ggtggcagga ggggaatgtc    1260
ttctcatgct ccgtgatgca tgaggctctg cacaaccact acacacagaa gagcctctcc    1320
ctgtccctag gtaaagaggt gcagctggtg gagtccgggg gaggcttggt acagcctggg    1380
gggtccctga gactctcctg tgcagcctct ggattcacct ttagcagcta tgccaggagc    1440
tgggtccgcc aggctccagg aaggggctg gagtgggtct cagctattag tggtggtggt    1500
ggtcgcacat actacgcaga ctccgtgaag gccggttca ccatctccag agacaattcc    1560
cagaacacgc tgtatctgca aatgaacagc ctgagagccg aggacacggc cgtatattac    1620
tgtgcgaaaa attactatgg ttcggggagc gccagttact ggtacttcga tctctggggc    1680
cgtggcaccc tggtcaccgt ctcctcagct agcaccaaag gaccttctgt atttcctctt    1740
gcgccatgct ctcgctctac gtcagaatca actgccgctc tggggtgcct ggttaaagac    1800
tacttcccgg agcctgtgac agtgagttgg aactccggcg ccctgacatc aggagtgcat    1860
acatttcccg ccgtgcttca gagcagcgga ctttatagcc tcagcagtgt ggtgaccgtg    1920
ccatcttcca gcctggggac caagacctac acctgtaacg tggaccacaa acccagcaac    1980
accaaggttg ataagagggt ctga                                           2004
```

<210> SEQ ID NO 108
<211> LENGTH: 667
<212> TYPE: PRT
<213> ORGANISM: Artificial Sequence
<220> FEATURE:
<223> OTHER INFORMATION: description of the artificial sequence: the
      amino acid sequence of Ct-R1090-GPngs62 H Chain

<400> SEQUENCE: 108

```
Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ile Ile Tyr
            20                  25                  30

Trp Ile Gly Trp Val Arg Gln Met Pro Gly Lys Gly Leu Glu Trp Met
        35                  40                  45

Gly Ile Ile Tyr Pro Asn Asp Ala Asp Thr Arg Tyr Ser Pro Ser Phe
    50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Val Arg Leu Gly Thr Arg Asp Trp Phe Asp Pro Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Cys Ser Arg Ser Thr Ser Glu Ser Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175
```

```
Ser Ser Gly Leu Tyr Ser Leu Ser Ser Val Val Thr Val Pro Ser Ser
            180                 185                 190

Ser Leu Gly Thr Lys Thr Tyr Thr Cys Asn Val Asp His Lys Pro Ser
            195                 200                 205

Asn Thr Lys Val Asp Lys Arg Val Glu Ser Lys Tyr Gly Pro Pro Cys
210                 215                 220

Pro Pro Cys Pro Ala Pro Glu Phe Glu Gly Gly Pro Ser Val Phe Leu
225                 230                 235                 240

Phe Pro Pro Lys Pro Lys Asp Thr Leu Met Ile Ser Arg Thr Pro Glu
            245                 250                 255

Val Thr Cys Val Val Val Asp Val Ser Gln Glu Asp Pro Glu Val Gln
            260                 265                 270

Phe Asn Trp Tyr Val Asp Gly Val Glu Val His Asn Ala Lys Thr Lys
            275                 280                 285

Pro Arg Glu Glu Gln Phe Asn Ser Thr Tyr Arg Val Val Ser Val Leu
            290                 295                 300

Thr Val Leu His Gln Asp Trp Leu Asn Gly Lys Glu Tyr Lys Cys Lys
305                 310                 315                 320

Val Ser Asn Lys Gly Leu Pro Ser Ser Ile Glu Lys Thr Ile Ser Lys
            325                 330                 335

Ala Lys Gly Gln Pro Arg Glu Pro Gln Val Tyr Thr Leu Pro Pro Ser
            340                 345                 350

Gln Glu Glu Met Thr Lys Asn Gln Val Ser Leu Thr Cys Leu Val Lys
            355                 360                 365

Gly Phe Tyr Pro Ser Asp Ile Ala Val Glu Trp Glu Ser Asn Gly Gln
            370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
            405                 410                 415

Glu Gly Asn Val Phe Ser Cys Ser Val Met His Glu Ala Leu His Asn
            420                 425                 430

His Tyr Thr Gln Lys Ser Leu Ser Leu Ser Leu Gly Lys Glu Val Gln
            435                 440                 445

Leu Val Glu Ser Gly Gly Gly Leu Val Gln Pro Gly Gly Ser Leu Arg
450                 455                 460

Leu Ser Cys Ala Ala Ser Gly Phe Thr Phe Ser Ser Tyr Ala Arg Ser
465                 470                 475                 480

Trp Val Arg Gln Ala Pro Gly Lys Gly Leu Glu Trp Val Ser Ala Ile
            485                 490                 495

Ser Gly Gly Gly Gly Arg Thr Tyr Tyr Ala Asp Ser Val Lys Gly Arg
            500                 505                 510

Phe Thr Ile Ser Arg Asp Asn Ser Gln Asn Thr Leu Tyr Leu Gln Met
            515                 520                 525

Asn Ser Leu Arg Ala Glu Asp Thr Ala Val Tyr Tyr Cys Ala Lys Asn
            530                 535                 540

Tyr Tyr Gly Ser Gly Ser Ala Ser Tyr Trp Tyr Phe Asp Leu Trp Gly
545                 550                 555                 560

Arg Gly Thr Leu Val Thr Val Ser Ser Ala Ser Thr Lys Gly Pro Ser
            565                 570                 575

Val Phe Pro Leu Ala Pro Cys Ser Arg Ser Thr Ser Glu Ser Thr Ala
            580                 585                 590
```

```
Ala Leu Gly Cys Leu Val Lys Asp Tyr Phe Pro Glu Pro Val Thr Val
            595                 600                 605
Ser Trp Asn Ser Gly Ala Leu Thr Ser Gly Val His Thr Phe Pro Ala
    610                 615                 620
Val Leu Gln Ser Ser Gly Leu Tyr Ser Leu Ser Ser Val Val Thr Val
625                 630                 635                 640
Pro Ser Ser Ser Leu Gly Thr Lys Thr Tyr Thr Cys Asn Val Asp His
                645                 650                 655
Lys Pro Ser Asn Thr Lys Val Asp Lys Arg Val
                660                 665
```

<210> SEQ ID NO 109
<211> LENGTH: 2001
<212> TYPE: DNA
<213> ORGANISM: Artificial Sequence
<220> FEATURE:
<223> OTHER INFORMATION: description of the artificial sequence: the
      base sequence of Ct-GpS1019-R1090 H Chain

<400> SEQUENCE: 109

```
gaggtgcagc tggtgcagtc tggaggaggc ttggtacagc cggggggggtc cctgagactc      60 tcctgtgcag cctctggatt cgccttcagt acctatagca ttaactgggt ccgccaggct     120
ccagggaagg ggctggagtg gatttcatac attagtagta gtagtaatac catatactac     180
gcagactctg tgaagggccg attcaccatc tccagagaca atgccaagaa ctcactgtat     240
ctgcaaatga gcagcctgaa agacgaggac acggctgtgt attactgtgc gagaggatat     300
ggttcgggga gttattttag gaactggttc gaccccctggg gccagggaac cctggtcacc     360
gtctcctcag caagtaccaa ggggccatcc gtcttccccc tggcgccctg ctctagaagc     420
acctccgaga gcacagccgc cctgggctgc ctggtcaagg actacttccc cgaaccggtg     480
acggtgtcgt ggaactcagg cgccctgacc agcggcgtgc acaccttccc ggctgtccta     540
cagtcctcag gactctactc cctcagcagc gtggtgaccg tgccctccag cagcttgggc     600
acgaagacct acacctgcaa cgtagatcac aagcccagca acaccaaggt ggacaagaga     660
gttgagtcca aatatggtcc cccatgccca ccatgcccag cacctgagtt cgaggggga      720 ccatcagtct tcctgttccc cccaaaaccc aaggacactc tcatgatctc ccggacccct     780
gaggtcacgt gcgtggtggt ggacgtgagc caggaagacc ccgaggtcca gttcaactgg     840
tacgtggatg gcgtggaggt gcataatgcc aagacaaagc cgcgggagga gcagttcaac     900
agcacgtacc gtgtggtcag cgtcctcacc gtcctgcacc aggactggct gaacggcaag     960
gagtacaagt gcaaggtctc caacaaaggc ctcccgtcct ccatcgagaa aaccatctcc    1020
aaagccaaag gcagccccg agagccacag gtgtacaccc tgcccccatc ccaggaggag    1080
atgaccaaga accaggtcag cctgacctgc ctggtcaaag gcttctaccc cagcgacatc    1140
gccgtggagt gggagagcaa tgggcagccg gagaacaact acaagaccac gcctcccgtg    1200
ctggactccg acggctcctt cttcctctac agcaagctaa ccgtggacaa gagcaggtgg    1260
caggagggga atgtcttctc atgctccgtg atgcatgagg ctctgcacaa ccactacaca    1320
cagaagagcc tctccctgtc cctaggtaaa gaggtgcagc tggtgcagtc cggagcagag    1380
gtgaaaaagc ccggggagtc tctgaagatc tcctgtaagg gttctggata cagctttatc    1440
atctactgga tcggctgggt gcgccagatg cccgggaaag gcctggagtg gatgggggatc    1500 atctatccta tgacgctga taccagatac agcccgtcct tccaaggcca ggtcaccatc    1560
tcagccgaca gtccatcag caccgcctac ctgcagtgga gcagcctgaa ggcctcggac    1620
```

```
accgccatgt attactgtgt gagactgggt acgagggact ggttcgaccc ctggggccag    1680
ggaaccctgg tcaccgtctc ctcagctagc accaaaggac cttctgtatt tcctcttgcg    1740
ccatgctctc gctctacgtc agaatcaact gccgctctgg ggtgcctggt aaagactac    1800 ttcccggagc ctgtgacagt gagttggaac tccggcgccc tgacatcagg agtgcataca    1860
tttcccgccg tgcttcagag cagcggactt tatagcctca gcagtgtggt gaccgtgcca    1920
tcttccagcc tggggaccaa gacctacacc tgtaacgtgg accacaaacc cagcaacacc    1980
aaggttgata gagggtctg a                                                2001
```

<210> SEQ ID NO 110
<211> LENGTH: 666
<212> TYPE: PRT
<213> ORGANISM: Artificial Sequence
<220> FEATURE:
<223> OTHER INFORMATION: description of the artificial sequence: the amino acid sequence of Ct-GpS1019-R1090 H Chain

<400> SEQUENCE: 110

```
Glu Val Gln Leu Val Gln Ser Gly Gly Gly Leu Val Gln Pro Gly Gly
1               5                   10                  15

Ser Leu Arg Leu Ser Cys Ala Ala Ser Gly Phe Ala Phe Ser Thr Tyr
            20                  25                  30

Ser Ile Asn Trp Val Arg Gln Ala Pro Gly Lys Gly Leu Glu Trp Ile
        35                  40                  45

Ser Tyr Ile Ser Ser Ser Ser Asn Thr Ile Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Ser Ser Leu Lys Asp Glu Asp Thr Ala Val Tyr Tyr Cys
                85                  90                  95

Ala Arg Gly Tyr Gly Ser Gly Ser Tyr Phe Arg Asn Trp Phe Asp Pro
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Cys Ser Arg Ser Thr Ser Glu Ser
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Lys Thr Tyr Thr Cys Asn Val
        195                 200                 205

Asp His Lys Pro Ser Asn Thr Lys Val Asp Lys Arg Val Glu Ser Lys
    210                 215                 220

Tyr Gly Pro Pro Cys Pro Pro Cys Pro Ala Pro Glu Phe Glu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser Gln Glu
            260                 265                 270

Asp Pro Glu Val Gln Phe Asn Trp Tyr Val Asp Gly Val Glu Val His
        275                 280                 285
```

Asn Ala Lys Thr Lys Pro Arg Glu Glu Gln Phe Asn Ser Thr Tyr Arg
            290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Gly Leu Pro Ser Ser Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Gln Glu Glu Met Thr Lys Asn Gln Val Ser Leu
        355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Glu Gly Asn Val Phe Ser Cys Ser Val Met His
            420                 425                 430

Glu Ala Leu His Asn His Tyr Thr Gln Lys Ser Leu Ser Leu Ser Leu
        435                 440                 445

Gly Lys Glu Val Gln Leu Val Gln Ser Gly Ala Glu Val Lys Lys Pro
450                 455                 460

Gly Glu Ser Leu Lys Ile Ser Cys Lys Gly Ser Gly Tyr Ser Phe Ile
465                 470                 475                 480

Ile Tyr Trp Ile Gly Trp Val Arg Gln Met Pro Gly Lys Gly Leu Glu
                485                 490                 495

Trp Met Gly Ile Ile Tyr Pro Asn Asp Ala Asp Thr Arg Tyr Ser Pro
            500                 505                 510

Ser Phe Gln Gly Gln Val Thr Ile Ser Ala Asp Lys Ser Ile Ser Thr
        515                 520                 525

Ala Tyr Leu Gln Trp Ser Ser Leu Lys Ala Ser Asp Thr Ala Met Tyr
530                 535                 540

Tyr Cys Val Arg Leu Gly Thr Arg Asp Trp Phe Asp Pro Trp Gly Gln
545                 550                 555                 560

Gly Thr Leu Val Thr Val Ser Ser Ala Ser Thr Lys Gly Pro Ser Val
                565                 570                 575

Phe Pro Leu Ala Pro Cys Ser Arg Ser Thr Ser Glu Ser Thr Ala Ala
            580                 585                 590

Leu Gly Cys Leu Val Lys Asp Tyr Phe Pro Glu Pro Val Thr Val Ser
        595                 600                 605

Trp Asn Ser Gly Ala Leu Thr Ser Gly Val His Thr Phe Pro Ala Val
610                 615                 620

Leu Gln Ser Ser Gly Leu Tyr Ser Leu Ser Ser Val Val Thr Val Pro
625                 630                 635                 640

Ser Ser Ser Leu Gly Thr Lys Thr Tyr Thr Cys Asn Val Asp His Lys
                645                 650                 655

Pro Ser Asn Thr Lys Val Asp Lys Arg Val
            660                 665

<210> SEQ ID NO 111
<211> LENGTH: 2004
<212> TYPE: DNA
<213> ORGANISM: Artificial Sequence
<220> FEATURE:

<223> OTHER INFORMATION: description of the artificial sequence: the
      base sequence of Ct-GpA6005-R1090 H Chain

<400> SEQUENCE: 111

```
caggtgcagc tggtggagtc tgggggaggc ttggtacagc ctgggggtc cctgagactc      60
tcctgtgcag cctctggatt caccttcagt agctatagca tgaactgggt ccgccaggct    120
ccagggaagg gctggagtg gtgtcctac attaagagta gcggtagttc cacatactac     180
gcagactctg tgaagggccg cttcaccatc tccagagaca tgccaagaa ctcactgaat    240
ctgcaaatga acagcctgag agacgaggac acggctgtgt attactgtgc gagagggacg    300
tattactatg gttcgggaaa ttttttcctt tttgactact ggggccaggg aaccctggtc    360
accgtctcct cagcaagtac aaggggcca tccgtcttcc ccctggcgcc ctgctctaga    420
agcacctccg agagcacagc cgccctgggc tgcctggtca aggactactt ccccgaaccg    480
gtgacggtgt cgtggaactc aggcgccctg accagcggcg tgcacacctt cccggctgtc    540
ctacagtcct caggactcta ctccctcagc agcgtggtga ccgtgccctc agcagcttg    600
ggcacgaaga cctacacctg caacgtagat cacaagccca gcaacaccaa ggtggacaag    660
agagttgagt ccaaatatgg tcccccatgc ccaccatgcc cagcacctga gttcgagggg    720
ggaccatcag tcttcctgtt ccccccaaaa cccaaggaca ctctcatgat ctcccggacc    780
cctgaggtca cgtgcgtggt ggtggacgtg agccaggaag accccgaggt ccagttcaac    840
tggtacgtgg atggcgtgga ggtgcataat gccaagacaa agccgcggga ggagcagttc    900
aacagcacgt accgtgtggt cagcgtcctc accgtcctgc accaggactg gctgaacggc    960
aaggagtaca agtgcaaggt ctccaacaaa ggcctcccgt cctccatcga gaaaaccatc   1020
tccaaagcca agggcagcc ccgagagcca caggtgtaca ccctgccccc atcccaggag   1080
gagatgacca agaaccaggt cagcctgacc tgcctggtca aaggcttcta ccccagcgac   1140
atcgccgtgg agtgggagag caatgggcag ccggagaaca actacaagac cacgcctccc   1200
gtgctggact ccgacggctc cttcttcctc tacagcaagc taaccgtgga caagagcagg   1260
tggcaggagg ggaatgtctt ctcatgctcc gtgatgcatg aggctctgca caaccactac   1320
acacagaaga gcctctccct gtccctaggt aaagaggtgc agctggtgca gtccggagca   1380
gaggtgaaaa agcccgggga gtctctgaag atctcctgta agggttctgg atacagcttt   1440
atcatctact ggatcggctg ggtgcgccag atgcccggga aaggcctgga gtggatgggg   1500
atcatctatc ctaatgacgc tgataccaga tacagcccgt ccttccaagg ccaggtcacc   1560
atctcagccg acaagtccat cagcaccgcc tacctgcagt ggagcagcct gaaggcctcg   1620
gacaccgcca tgtattactg tgtgagactg gtacgaggg actggttcga cccctggggc   1680
cagggaaccc tggtcaccgt ctcctcagct agcaccaaag accttctgt atttcctctt   1740
gcgccatgct ctcgctctac gtcagaatca actgccgctc tggggtgcct ggttaaagac   1800
tacttcccgg agcctgtgac agtgagttgg aactccggcg ccctgacatc aggagtgcat   1860
acatttcccg ccgtgcttca gagcagcgga ctttatagcc tcagcagtgt ggtgaccgtg   1920
ccatcttcca gcctggggac caagacctac acctgtaacg tggaccacaa acccagcaac   1980
accaaggttg ataagagggt ctga                                          2004
```

<210> SEQ ID NO 112
<211> LENGTH: 667
<212> TYPE: PRT
<213> ORGANISM: Artificial Sequence
<220> FEATURE:

<223> OTHER INFORMATION: description of the artificial sequence: the amino acid sequence of Ct-GpA6005-R1090 H Chain

<400> SEQUENCE: 112

```
Gln Val Gln Leu Val Glu Ser Gly Gly Gly Leu Val Gln Pro Gly Gly
  1               5                  10                  15

Ser Leu Arg Leu Ser Cys Ala Ala Ser Gly Phe Thr Phe Ser Ser Tyr
             20                  25                  30

Ser Met Asn Trp Val Arg Gln Ala Pro Gly Lys Gly Leu Glu Trp Val
         35                  40                  45

Ser Tyr Ile Lys Ser Ser Gly Ser Ser Thr Tyr Tyr Ala Asp Ser Val
     50                  55                  60

Lys Gly Arg Phe Thr Ile Ser Arg Asp Asn Ala Lys Asn Ser Leu Asn
 65                  70                  75                  80

Leu Gln Met Asn Ser Leu Arg Asp Glu Asp Thr Ala Val Tyr Tyr Cys
                 85                  90                  95

Ala Arg Gly Thr Tyr Tyr Tyr Gly Ser Gly Asn Phe Phe Leu Phe Asp
            100                 105                 110

Tyr Trp Gly Gln Gly Thr Leu Val Thr Val Ser Ser Ala Ser Thr Lys
        115                 120                 125

Gly Pro Ser Val Phe Pro Leu Ala Pro Cys Ser Arg Ser Thr Ser Glu
130                 135                 140

Ser Thr Ala Ala Leu Gly Cys Leu Val Lys Asp Tyr Phe Pro Glu Pro
145                 150                 155                 160

Val Thr Val Ser Trp Asn Ser Gly Ala Leu Thr Ser Gly Val His Thr
                165                 170                 175

Phe Pro Ala Val Leu Gln Ser Ser Gly Leu Tyr Ser Leu Ser Ser Val
            180                 185                 190

Val Thr Val Pro Ser Ser Leu Gly Thr Lys Thr Tyr Thr Cys Asn
        195                 200                 205

Val Asp His Lys Pro Ser Asn Thr Lys Val Asp Lys Arg Val Glu Ser
210                 215                 220

Lys Tyr Gly Pro Pro Cys Pro Pro Cys Pro Ala Pro Glu Phe Glu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser Gln
            260                 265                 270

Glu Asp Pro Glu Val Gln Phe Asn Trp Tyr Val Asp Gly Val Glu Val
        275                 280                 285

His Asn Ala Lys Thr Lys Pro Arg Glu Glu Gln Phe Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Gly Leu Pro Ser Ser Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Gln Glu Glu Met Thr Lys Asn Gln Val Ser
        355                 360                 365

Leu Thr Cys Leu Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400
```

Val Leu Asp Ser Asp Gly Ser Phe Phe Leu Tyr Ser Lys Leu Thr Val
            405                 410                 415

Asp Lys Ser Arg Trp Gln Glu Gly Asn Val Phe Ser Cys Ser Val Met
        420                 425                 430

His Glu Ala Leu His Asn His Tyr Thr Gln Lys Ser Leu Ser Leu Ser
            435                 440                 445

Leu Gly Lys Glu Val Gln Leu Val Gln Ser Gly Ala Glu Val Lys Lys
        450                 455                 460

Pro Gly Glu Ser Leu Lys Ile Ser Cys Lys Gly Ser Gly Tyr Ser Phe
465                 470                 475                 480

Ile Ile Tyr Trp Ile Gly Trp Val Arg Gln Met Pro Gly Lys Gly Leu
            485                 490                 495

Glu Trp Met Gly Ile Ile Tyr Pro Asn Asp Ala Asp Thr Arg Tyr Ser
        500                 505                 510

Pro Ser Phe Gln Gly Gln Val Thr Ile Ser Ala Asp Lys Ser Ile Ser
        515                 520                 525

Thr Ala Tyr Leu Gln Trp Ser Ser Leu Lys Ala Ser Asp Thr Ala Met
        530                 535                 540

Tyr Tyr Cys Val Arg Leu Gly Thr Arg Asp Trp Phe Asp Pro Trp Gly
545                 550                 555                 560

Gln Gly Thr Leu Val Thr Val Ser Ser Ala Ser Thr Lys Gly Pro Ser
            565                 570                 575

Val Phe Pro Leu Ala Pro Cys Ser Arg Ser Thr Ser Glu Ser Thr Ala
        580                 585                 590

Ala Leu Gly Cys Leu Val Lys Asp Tyr Phe Pro Glu Pro Val Thr Val
        595                 600                 605

Ser Trp Asn Ser Gly Ala Leu Thr Ser Gly Val His Thr Phe Pro Ala
        610                 615                 620

Val Leu Gln Ser Ser Gly Leu Tyr Ser Leu Ser Ser Val Val Thr Val
625                 630                 635                 640

Pro Ser Ser Ser Leu Gly Thr Lys Thr Tyr Thr Cys Asn Val Asp His
            645                 650                 655

Lys Pro Ser Asn Thr Lys Val Asp Lys Arg Val
        660                 665

<210> SEQ ID NO 113
<211> LENGTH: 2004
<212> TYPE: DNA
<213> ORGANISM: Artificial Sequence
<220> FEATURE:
<223> OTHER INFORMATION: description of the artificial sequence: the
      base sequence of Ct-GpA6014-R1090 H Chain

<400> SEQUENCE: 113
cagatgcagc tggtgcagtc tggggaggc ttggtacagc ctgggggtc cctgagactc      60 tcctgtgcag cctctggatt ctccttcagt agtyatgcca tgaactgggt ccgccaggct    120
ccagggaagg gactggaatg ggtttcatac attactagtg gtggtagttc cagatactac    180
gcagactctg tgaagggccg attcaccatc tccagagaca acgccaagaa ctcactgtat    240
ctgcaaatga acagcctgag agacgaggac acggctgtgt attactgtgc gagagggacg    300
tattactatg gttcggggaa ttatttcctt tttgaccact ggggccaggg aaccatggtc    360
accgtctcct cagcaagtac caaggggcca tccgtcttcc ccctggcgcc ctgctctaga    420
agcacctccg agagcacagc cgccctgggc tgcctggtca aggactactt ccccgaaccg    480

-continued

```
gtgacggtgt cgtggaactc aggcgccctg accagcggcg tgcacacctt cccggctgtc    540
ctacagtcct caggactcta ctccctcagc agcgtggtga ccgtgccctc cagcagcttg    600
ggcacgaaga cctacacctg caacgtagat cacaagccca gcaacaccaa ggtggacaag    660
agagttgagt ccaaatatgg tcccccatgc ccaccatgcc cagcacctga gttcgagggg    720
ggaccatcag tcttcctgtt ccccccaaaa cccaaggaca ctctcatgat ctcccggacc    780
cctgaggtca cgtgcgtggt ggtggacgtg agccaggaag accccgaggt ccagttcaac    840
tggtacgtgg atggcgtgga ggtgcataat gccaagacaa agccgcggga ggagcagttc    900
aacagcacgt accgtgtggt cagcgtcctc accgtcctgc accaggactg gctgaacggc    960
aaggagtaca agtgcaaggt ctccaacaaa ggcctcccgt cctccatcga gaaaaccatc   1020
tccaaagcca agggcagccc cgagagccaa caggtgtaca ccctgccccc atcccaggag   1080
gagatgacca agaaccaggt cagcctgacc tgcctggtca aaggcttcta ccccagcgac   1140
atcgccgtgg agtgggagag caatgggcag ccggagaaca actacaagac cacgcctccc   1200
gtgctggact ccgacggctc cttcttcctc tacagcaagc taaccgtgga caagagcagg   1260
tggcaggagg ggaatgtctt ctcatgctcc gtgatgcatg aggctctgca caaccactac   1320
acacagaaga gcctctccct gtccctaggt aaagaggtgc agctggtgca gtccggagca   1380
gaggtgaaaa agcccgggga gtctctgaag atctcctgta agggttctgg atacagcttt   1440
atcatctact ggatcggctg ggtgcgccag atgcccggga aaggcctgga gtggatgggg   1500
atcatctatc ctaatgacgc tgataccaga tacagcccgt ccttccaagg ccaggtcacc   1560
atctcagccg acaagtccat cagcaccgcc tacctgcagt ggagcagcct gaaggcctcg   1620
gacaccgcca tgtattactg tgtgagactg ggtacgaggg actggttcga ccctgggggc   1680
cagggaaccc tggtcaccgt ctcctcagct agcaccaaag gcccttctgt atttcctctt   1740
gcgccatgct ctcgctctac gtcagaatca actgccgctc tggggtgcct ggttaaagac   1800
tacttcccgg agcctgtgac agtgagttgg aactccggcg ccctgacatc aggagtgcat   1860
acatttcccg ccgtgcttca gagcagcgga ctttatagcc tcagcagtgt ggtgaccgtg   1920
ccatcttcca gcctggggac caagacctac acctgtaacg tggaccacaa acccagcaac   1980
accaaggttg ataagagggt ctga                                          2004
```

<210> SEQ ID NO 114
<211> LENGTH: 667
<212> TYPE: PRT
<213> ORGANISM: Artificial Sequence
<220> FEATURE:
<223> OTHER INFORMATION: description of the artificial sequence: the amino acid sequence of Ct-GpA6014-R1090 H Chain

<400> SEQUENCE: 114

```
Gln Met Gln Leu Val Gln Ser Gly Gly Gly Leu Val Gln Pro Gly Gly
1               5                   10                  15

Ser Leu Arg Leu Ser Cys Ala Ala Ser Gly Phe Ser Phe Ser Ser Tyr
            20                  25                  30

Ala Met Asn Trp Val Arg Gln Ala Pro Gly Lys Gly Leu Glu Trp Val
        35                  40                  45

Ser Tyr Ile Thr Ser Gly Gly Ser Arg Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
```

```
            85                  90                  95
Ala Arg Gly Thr Tyr Tyr Tyr Gly Ser Gly Asn Tyr Phe Leu Phe Asp
            100                 105                 110

His Trp Gly Gln Gly Thr Met Val Thr Val Ser Ser Ala Ser Thr Lys
            115                 120                 125

Gly Pro Ser Val Phe Pro Leu Ala Pro Cys Ser Arg Ser Thr Ser Glu
            130                 135                 140

Ser Thr Ala Ala Leu Gly Cys Leu Val Lys Asp Tyr Phe Pro Glu Pro
145                 150                 155                 160

Val Thr Val Ser Trp Asn Ser Gly Ala Leu Thr Ser Gly Val His Thr
            165                 170                 175

Phe Pro Ala Val Leu Gln Ser Ser Gly Leu Tyr Ser Leu Ser Ser Val
            180                 185                 190

Val Thr Val Pro Ser Ser Ser Leu Gly Thr Lys Thr Tyr Thr Cys Asn
            195                 200                 205

Val Asp His Lys Pro Ser Asn Thr Lys Val Asp Lys Arg Val Glu Ser
            210                 215                 220

Lys Tyr Gly Pro Pro Cys Pro Pro Cys Pro Ala Pro Glu Phe Glu Gly
225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser Gln
            260                 265                 270

Glu Asp Pro Glu Val Gln Phe Asn Trp Tyr Val Asp Gly Val Glu Val
            275                 280                 285

His Asn Ala Lys Thr Lys Pro Arg Glu Glu Gln Phe Asn Ser Thr Tyr
            290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Gly Leu Pro Ser Ser Ile
            325                 330                 335

Glu Lys Thr Ile Ser Lys Ala Lys Gly Gln Pro Arg Glu Pro Gln Val
            340                 345                 350

Tyr Thr Leu Pro Pro Ser Gln Glu Glu Met Thr Lys Asn Gln Val Ser
            355                 360                 365

Leu Thr Cys Leu Val Lys Gly Phe Tyr Pro Ser Asp Ile Ala Val Glu
            370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
            405                 410                 415

Asp Lys Ser Arg Trp Gln Glu Gly Asn Val Phe Ser Cys Ser Val Met
            420                 425                 430

His Glu Ala Leu His Asn His Tyr Thr Gln Lys Ser Leu Ser Leu Ser
            435                 440                 445

Leu Gly Lys Glu Val Gln Leu Val Gln Ser Gly Ala Glu Val Lys Lys
450                 455                 460

Pro Gly Glu Ser Leu Lys Ile Ser Cys Lys Gly Ser Gly Tyr Ser Phe
465                 470                 475                 480

Ile Ile Tyr Trp Ile Gly Trp Val Arg Gln Met Pro Gly Lys Gly Leu
            485                 490                 495

Glu Trp Met Gly Ile Ile Tyr Pro Asn Asp Ala Asp Thr Arg Tyr Ser
            500                 505                 510
```

```
Pro Ser Phe Gln Gly Gln Val Thr Ile Ser Ala Asp Lys Ser Ile Ser
        515                 520                 525

Thr Ala Tyr Leu Gln Trp Ser Ser Leu Lys Ala Ser Asp Thr Ala Met
        530                 535                 540

Tyr Tyr Cys Val Arg Leu Gly Thr Arg Asp Trp Phe Asp Pro Trp Gly
545                 550                 555                 560

Gln Gly Thr Leu Val Thr Val Ser Ser Ala Ser Thr Lys Gly Pro Ser
                565                 570                 575

Val Phe Pro Leu Ala Pro Cys Ser Arg Ser Thr Ser Glu Ser Thr Ala
                580                 585                 590

Ala Leu Gly Cys Leu Val Lys Asp Tyr Phe Pro Glu Pro Val Thr Val
                595                 600                 605

Ser Trp Asn Ser Gly Ala Leu Thr Ser Gly Val His Thr Phe Pro Ala
            610                 615                 620

Val Leu Gln Ser Ser Gly Leu Tyr Ser Leu Ser Ser Val Val Thr Val
625                 630                 635                 640

Pro Ser Ser Ser Leu Gly Thr Lys Thr Tyr Thr Cys Asn Val Asp His
                645                 650                 655

Lys Pro Ser Asn Thr Lys Val Asp Lys Arg Val
                660                 665
```

```
<210> SEQ ID NO 115
<211> LENGTH: 2004
<212> TYPE: DNA
<213> ORGANISM: Artificial Sequence
<220> FEATURE:
<223> OTHER INFORMATION: description of the artificial sequence: the
      base sequence of Ct-GpA6062-R1090 H Chain

<400> SEQUENCE: 115
```

| | | | | | |
|---|---|---|---|---|---|
| gaggtgcagc | tggtggagac | cggggggaggc | ttggtacagc | ctggggggtc | cctgagactc | 60 |
| tcctgtgcag | cctctggatt | ctccttcagt | agctatgcca | tgaactgggt | ccgccaggct | 120 |
| ccagggaagg | gactggaatg | ggtttcatac | attactagtg | gtggtagttc | cagatactac | 180 |
| gcagactctg | tgaagggccg | attcaccatc | tccagagaca | acgccaagaa | ctcactgtat | 240 |
| ctgcaaatga | acagcctgag | agacgaggac | acggctgtgt | attactgtgc | gagagggacg | 300 |
| tattactatg | gttcggggaa | ttatttcctt | tttgactact | ggggccaggg | aaccacggtc | 360 |
| accgtctcct | cagcaagtac | caaggggcca | tccgtcttcc | ccctggcgcc | ctgctctaga | 420 |
| agcacctccg | agagcacagc | cgccctgggc | tgcctggtca | aggactactt | ccccgaaccg | 480 |
| gtgacggtgt | cgtggaactc | aggcgccctg | accagcggcg | tgcacacctt | cccggctgtc | 540 |
| ctacagtcct | caggactcta | ctccctcagc | agcgtggtga | ccgtgccctc | agcagcttg | 600 |
| ggcacgaaga | cctacacctg | caacgtagat | cacaagccca | gcaacaccaa | ggtggacaag | 660 |
| agagttgagt | ccaaatatgg | tcccccatgc | ccaccatgcc | cagcacctga | gttcgagggg | 720 |
| ggaccatcag | tcttcctgtt | ccccccaaaa | cccaaggaca | ctctcatgat | ctcccggacc | 780 |
| cctgaggtca | cgtgcgtggt | ggtggacgtg | agccaggaag | accccgaggt | ccagttcaac | 840 |
| tggtacgtgg | atggcgtgga | ggtgcataat | gccaagacaa | agccgcggga | ggagcagttc | 900 |
| aacagcacgt | accgtgtggt | cagcgtcctc | accgtcctgc | accaggactg | gctgaacggc | 960 |
| aaggagtaca | agtgcaaggt | ctccaacaaa | ggcctcccgt | cctccatcga | gaaaaccatc | 1020 |
| tccaaagcca | aagggcagcc | ccgagagcca | caggtgtaca | ccctgccccc | atcccaggag | 1080 |
| gagatgacca | agaaccaggt | cagcctgacc | tgcctggtca | aaggcttcta | ccccagcgac | 1140 |

```
atcgccgtgg agtgggagag caatgggcag ccggagaaca actacaagac cacgcctccc    1200
gtgctggact ccgacggctc cttcttcctc tacagcaagc taaccgtgga caagagcagg    1260
tggcaggagg ggaatgtctt ctcatgctcc gtgatgcatg aggctctgca caaccactac    1320
acacagaaga gcctctccct gtccctaggt aaagaggtgc agctggtgca gtccggagca    1380
gaggtgaaaa agcccgggga gtctctgaag atctcctgta agggttctgg atacagcttt    1440
atcatctact ggatcggctg ggtgcgccag atgcccggga aaggcctgga gtggatgggg    1500
atcatctatc ctaatgacgc tgataccaga tacagcccgt ccttccaagg ccaggtcacc    1560
atctcagccg acaagtccat cagcaccgcc tacctgcagt ggagcagcct gaaggcctcg    1620
gacaccgcca tgtattactg tgtgagactg ggtacgaggg actggttcga ccctggggc    1680 cagggaaccc tggtcaccgt ctcctcagct agcaccaaag gcttctgt atttcctctt    1740 gcgccatgct ctcgctctac gtcagaatca actgccgctc tggggtgcct ggttaaagac    1800
tacttcccgg agcctgtgac agtgagttgg aactccggcg ccctgacatc aggagtgcat    1860
acatttcccg ccgtgcttca gagcagcgga ctttatagcc tcagcagtgt ggtgaccgtg    1920
ccatcttcca gcctggggac caagacctac acctgtaacg tggaccacaa acccagcaac    1980
accaaggttg ataagagggt ctga                                            2004
```

<210> SEQ ID NO 116
<211> LENGTH: 667
<212> TYPE: PRT
<213> ORGANISM: Artificial Sequence
<220> FEATURE:
<223> OTHER INFORMATION: description of the artificial sequence: the
      amino acid sequence of Ct-GpA6062-R1090 H Chain

<400> SEQUENCE: 116

```
Glu Val Gln Leu Val Glu Thr Gly Gly Gly Leu Val Gln Pro Gly Gly
1               5                   10                  15

Ser Leu Arg Leu Ser Cys Ala Ala Ser Gly Phe Ser Phe Ser Ser Tyr
            20                  25                  30

Ala Met Asn Trp Val Arg Gln Ala Pro Gly Lys Gly Leu Glu Trp Val
        35                  40                  45

Ser Tyr Ile Thr Ser Gly Gly Ser Arg Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Ala Arg Gly Thr Tyr Tyr Gly Ser Gly Asn Tyr Phe Leu Phe Asp
            100                 105                 110

Tyr Trp Gly Gln Gly Thr Thr Val Thr Val Ser Ser Ala Ser Thr Lys
        115                 120                 125

Gly Pro Ser Val Phe Pro Leu Ala Pro Cys Ser Arg Ser Thr Ser Glu
    130                 135                 140

Ser Thr Ala Ala Leu Gly Cys Leu Val Lys Asp Tyr Phe Pro Glu Pro
145                 150                 155                 160

Val Thr Val Ser Trp Asn Ser Gly Ala Leu Thr Ser Gly Val His Thr
                165                 170                 175

Phe Pro Ala Val Leu Gln Ser Ser Gly Leu Tyr Ser Leu Ser Ser Val
            180                 185                 190

Val Thr Val Pro Ser Ser Ser Leu Gly Thr Lys Thr Tyr Thr Cys Asn
```

```
              195                 200                 205
Val Asp His Lys Pro Ser Asn Thr Lys Val Asp Lys Arg Val Glu Ser
210                 215                 220

Lys Tyr Gly Pro Pro Cys Pro Pro Cys Pro Ala Pro Glu Phe Glu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser Gln
                260                 265                 270

Glu Asp Pro Glu Val Gln Phe Asn Trp Tyr Val Asp Gly Val Glu Val
                275                 280                 285

His Asn Ala Lys Thr Lys Pro Arg Glu Glu Gln Phe Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Gly Leu Pro Ser Ser Ile
                325                 330                 335

Glu Lys Thr Ile Ser Lys Ala Lys Gly Gln Pro Arg Glu Pro Gln Val
                340                 345                 350

Tyr Thr Leu Pro Pro Ser Gln Glu Glu Met Thr Lys Asn Gln Val Ser
                355                 360                 365

Leu Thr Cys Leu Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415

Asp Lys Ser Arg Trp Gln Glu Gly Asn Val Phe Ser Cys Ser Val Met
                420                 425                 430

His Glu Ala Leu His Asn His Tyr Thr Gln Lys Ser Leu Ser Leu Ser
                435                 440                 445

Leu Gly Lys Glu Val Gln Leu Val Gln Ser Gly Ala Glu Val Lys Lys
450                 455                 460

Pro Gly Glu Ser Leu Lys Ile Ser Cys Lys Gly Ser Gly Tyr Ser Phe
465                 470                 475                 480

Ile Ile Tyr Trp Ile Gly Trp Val Arg Gln Met Pro Gly Lys Gly Leu
                485                 490                 495

Glu Trp Met Gly Ile Ile Tyr Pro Asn Asp Ala Asp Thr Arg Tyr Ser
                500                 505                 510

Pro Ser Phe Gln Gly Gln Val Thr Ile Ser Ala Asp Lys Ser Ile Ser
                515                 520                 525

Thr Ala Tyr Leu Gln Trp Ser Leu Lys Ala Ser Asp Thr Ala Met
530                 535                 540

Tyr Tyr Cys Val Arg Leu Gly Thr Arg Asp Trp Phe Asp Pro Trp Gly
545                 550                 555                 560

Gln Gly Thr Leu Val Thr Val Ser Ser Ala Ser Thr Lys Gly Pro Ser
                565                 570                 575

Val Phe Pro Leu Ala Pro Cys Ser Arg Ser Thr Ser Glu Ser Thr Ala
                580                 585                 590

Ala Leu Gly Cys Leu Val Lys Asp Tyr Phe Pro Glu Pro Val Thr Val
                595                 600                 605

Ser Trp Asn Ser Gly Ala Leu Thr Ser Gly Val His Thr Phe Pro Ala
610                 615                 620
```

Val Leu Gln Ser Ser Gly Leu Tyr Ser Leu Ser Val Val Thr Val
625                 630                 635                 640

Pro Ser Ser Ser Leu Gly Thr Lys Thr Tyr Thr Cys Asn Val Asp His
                645                 650                 655

Lys Pro Ser Asn Thr Lys Val Asp Lys Arg Val
            660                 665

<210> SEQ ID NO 117
<211> LENGTH: 1989
<212> TYPE: DNA
<213> ORGANISM: Artificial Sequence
<220> FEATURE:
<223> OTHER INFORMATION: description of the artificial sequence: the
      base sequence of Ct-GpS3003-R1090 H Chain

<400> SEQUENCE: 117

```
caggtgcagc tggtgcagtc tgggggaggc ttggtacagc ctgggggggtc cctgagactc      60
tcctgtgcag cctctggatt cacccttcagt cactatacca tgaactgggt ccgccaggct    120
ccagggaagg ggctggagtg ggtttcatac attaatagtg gtcgtagtac cataaagtac     180
gcagactctg tgaagggccg attcaccatc tccagagaca atgccaagaa gtcattgtat     240
ctgcaaatga atagtctgag agacgaggac acggctgtgt atttctgtgc gagatgggag     300
tgggagcagg aagcttttga tatctggggc caagggacaa tggtcaccgt ctcttcagca     360
agtaccaagg gcccatccgt cttccccctg gcgccctgct ctagaagcac ctccgagagc     420
acagccgccc tgggctgcct ggtcaaggac tacttccccg aaccggtgac ggtgtcgtgg     480
aactcaggcg ccctgaccag cggcgtgcac accttcccgg ctgtcctaca gtcctcagga     540
ctctactccc tcagcagcgt ggtgaccgtg ccctccagca gcttgggcac gaagacctac     600
acctgcaacg tagatcacaa gcccagcaac accaaggtgg acaagagagt tgagtccaaa     660
tatggtcccc catgcccacc atgcccagca cctgagttcg aggggggacc atcagtcttc     720
ctgttccccc caaaacccaa ggacactctc atgatctccc ggacccctga ggtcacgtgc     780
gtggtggtgg acgtgagcca ggaagacccc gaggtccagt tcaactggta cgtggatggc     840
gtggaggtgc ataatgccaa gacaaagccg cgggaggagc agttcaacag cacgtaccgt     900
gtggtcagcg tcctcaccgt cctgcaccag gactggctga acggcaagga gtacaagtgc     960
aaggtctcca acaaaggcct cccgtcctcc atcgagaaaa ccatctccaa agccaaaggg    1020
cagccccgag agccacaggt gtacaccctg cccccatccc aggaggagat gaccaagaac    1080
caggtcagcc tgacctgcct ggtcaaaggc ttctacccca gcgacatcgc cgtggagtgg    1140
gagagcaatg ggcagccgga gaacaactac aagaccacgc ctcccgtgct ggactccgac    1200
ggctccttct tcctctacag caagctaacc gtggacaaga gcaggtggca ggaggggaat    1260
gtcttctcat gctccgtgat gcatgaggct ctgcacaacc actacacaca gaagagcctc    1320
tccctgtccc taggtaaaga ggtgcagctg gtgcagtccg gagcagaggt gaaaaagccc    1380
ggggagtctc tgaagatctc ctgtaagggt tctggataca gctttatcat ctactggatc    1440
ggctgggtgc gccagatgcc cgggaaaggc ctggagtgga tgggatcat ctatcctaat    1500
gacgctgata ccagatacag cccgtccttc caaggccagg tcaccatctc agccgacaag    1560
tccatcagca ccgcctacct gcagtggagc agcctgaagg cctcggacac cgccatgtat    1620
tactgtgtga ctgggtac gagggactgg ttcgaccccct ggggccaggg aaccctggtc    1680
accgtctcct cagctagcac caaaggacct tctgtatttc ctcttgcgcc atgctctcgc    1740
```

```
tctacgtcag aatcaactgc cgctctgggg tgcctggtta aagactactt cccggagcct    1800
gtgacagtga gttggaactc cggcgccctg acatcaggag tgcatacatt tcccgccgtg    1860
cttcagagca gcggacttta tagcctcagc agtgtggtga ccgtgccatc ttccagcctg    1920
gggaccaaga cctacacctg taacgtggac cacaaaccca gcaacaccaa ggttgataag    1980
agggtctga                                                            1989
```

<210> SEQ ID NO 118
<211> LENGTH: 662
<212> TYPE: PRT
<213> ORGANISM: Artificial Sequence
<220> FEATURE:
<223> OTHER INFORMATION: description of the artificial sequence: the
      amino acid sequence of Ct-GpS3003-R1090 H Chain

<400> SEQUENCE: 118

```
Gln Val Gln Leu Val Gln Ser Gly Gly Gly Leu Val Gln Pro Gly Gly
1               5                   10                  15

Ser Leu Arg Leu Ser Cys Ala Ala Ser Gly Phe Thr Phe Ser His Tyr
            20                  25                  30

Thr Met Asn Trp Val Arg Gln Ala Pro Gly Lys Gly Leu Glu Trp Val
        35                  40                  45

Ser Tyr Ile Asn Ser Gly Arg Ser Thr Ile Lys Tyr Ala Asp Ser Val
    50                  55                  60

Lys Gly Arg Phe Thr Ile Ser Arg Asp Asn Ala Lys Lys Ser Leu Tyr
65                  70                  75                  80

Leu Gln Met Asn Ser Leu Arg Asp Glu Asp Thr Ala Val Tyr Phe Cys
                85                  90                  95

Ala Arg Trp Glu Trp Glu Gln Glu Ala Phe Asp Ile Trp Gly Gln Gly
            100                 105                 110

Thr Met Val Thr Val Ser Ser Ala Ser Thr Lys Gly Pro Ser Val Phe
        115                 120                 125

Pro Leu Ala Pro Cys Ser Arg Ser Thr Ser Glu Ser Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Lys Thr Tyr Thr Cys Asn Val Asp His Lys Pro
        195                 200                 205

Ser Asn Thr Lys Val Asp Lys Arg Val Glu Ser Lys Tyr Gly Pro Pro
    210                 215                 220

Cys Pro Pro Cys Pro Ala Pro Glu Phe Glu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser Gln Glu Asp Pro Glu Val
            260                 265                 270

Gln Phe Asn Trp Tyr Val Asp Gly Val Glu Val His Asn Ala Lys Thr
        275                 280                 285

Lys Pro Arg Glu Glu Gln Phe Asn Ser Thr Tyr Arg Val Val Ser Val
    290                 295                 300

Leu Thr Val Leu His Gln Asp Trp Leu Asn Gly Lys Glu Tyr Lys Cys
```

```
                            305                 310                 315                 320
Lys Val Ser Asn Lys Gly Leu Pro Ser Ile Glu Lys Thr Ile Ser
                325                 330                 335
Lys Ala Lys Gly Gln Pro Arg Glu Pro Gln Val Tyr Thr Leu Pro Pro
                340                 345                 350
Ser Gln Glu Glu Met Thr Lys Asn Gln Val Ser Leu Thr Cys Leu Val
                355                 360                 365
Lys Gly Phe Tyr Pro Ser Asp Ile Ala Val Glu Trp Glu Ser Asn Gly
            370                 375                 380
Gln Pro Glu Asn Asn Tyr Lys Thr Thr Pro Val Leu Asp Ser Asp
385                 390                 395                 400
Gly Ser Phe Phe Leu Tyr Ser Lys Leu Thr Val Asp Lys Ser Arg Trp
                405                 410                 415
Gln Glu Gly Asn Val Phe Ser Cys Ser Val Met His Glu Ala Leu His
                420                 425                 430
Asn His Tyr Thr Gln Lys Ser Leu Ser Leu Ser Leu Gly Lys Glu Val
            435                 440                 445
Gln Leu Val Gln Ser Gly Ala Glu Val Lys Lys Pro Gly Glu Ser Leu
450                 455                 460
Lys Ile Ser Cys Lys Gly Ser Gly Tyr Ser Phe Ile Ile Tyr Trp Ile
465                 470                 475                 480
Gly Trp Val Arg Gln Met Pro Gly Lys Gly Leu Glu Trp Met Gly Ile
                485                 490                 495
Ile Tyr Pro Asn Asp Ala Asp Thr Arg Tyr Ser Pro Ser Phe Gln Gly
                500                 505                 510
Gln Val Thr Ile Ser Ala Asp Lys Ser Ile Ser Thr Ala Tyr Leu Gln
            515                 520                 525
Trp Ser Ser Leu Lys Ala Ser Asp Thr Ala Met Tyr Tyr Cys Val Arg
            530                 535                 540
Leu Gly Thr Arg Asp Trp Phe Asp Pro Trp Gly Gln Gly Thr Leu Val
545                 550                 555                 560
Thr Val Ser Ser Ala Ser Thr Lys Gly Pro Ser Val Phe Pro Leu Ala
                565                 570                 575
Pro Cys Ser Arg Ser Thr Ser Glu Ser Thr Ala Ala Leu Gly Cys Leu
                580                 585                 590
Val Lys Asp Tyr Phe Pro Glu Pro Val Thr Val Ser Trp Asn Ser Gly
                595                 600                 605
Ala Leu Thr Ser Gly Val His Thr Phe Pro Ala Val Leu Gln Ser Ser
                610                 615                 620
Gly Leu Tyr Ser Leu Ser Ser Val Val Thr Val Pro Ser Ser Ser Leu
625                 630                 635                 640
Gly Thr Lys Thr Tyr Thr Cys Asn Val Asp His Lys Pro Ser Asn Thr
                645                 650                 655
Lys Val Asp Lys Arg Val
            660

<210> SEQ ID NO 119
<211> LENGTH: 1989
<212> TYPE: DNA
<213> ORGANISM: Artificial Sequence
<220> FEATURE:
<223> OTHER INFORMATION: description of the artificial sequence: the
      base sequence of Ct-GPngs18-R1090 H Chain

<400> SEQUENCE: 119
```

| gaggtgcagc tggtggagtc tggggggaggc ttggtacagc ctgggggggtc cctgagactc | 60 |
| tcctgtgcag cctctggatt caccttcagt agctatagca tgaactgggt ccgccaggct | 120 |
| ccagggaagg ggctggagtg ggtttcatac attagaagtg atagtcgtac cataaagtac | 180 |
| gcagactctg tgaagggccg attcaccatc tccagagaca atgccaagaa ctcactgttt | 240 |
| ctgcaaatga acagcctgag agacgaggac acggctgtgt attactgtgc gagatgggag | 300 |
| tgggagctgg atgcttttga tatctggggc caagggacaa tggtcaccgt ctcttcagca | 360 |
| agtaccaagg ggccatccgt cttccccctg gcgccctgct ctagaagcac ctccgagagc | 420 |
| acagccgccc tgggctgcct ggtcaaggac tacttccccg aaccggtgac ggtgtcgtgg | 480 |
| aactcaggcg ccctgaccag cggcgtgcac accttcccgg ctgtcctaca gtcctcagga | 540 |
| ctctactccc tcagcagcgt ggtgaccgtg ccctccagca gcttgggcac gaagacctac | 600 |
| acctgcaacg tagatcacaa gcccagcaac accaaggtgg acaagagagt tgagtccaaa | 660 |
| tatggtcccc catgcccacc atgcccagca cctgagttcg aggggggacc atcagtcttc | 720 |
| ctgttccccc caaaacccaa ggacactctc atgatctccc ggacccctga ggtcacgtgc | 780 |
| gtggtggtgg acgtgagcca ggaagacccc gaggtccagt tcaactggta cgtggatggc | 840 |
| gtggaggtgc ataatgccaa gacaaagccg cgggaggagc agttcaacag cacgtaccgt | 900 |
| gtggtcagcg tcctcaccgt cctgcaccag gactggctga acggcaagga gtacaagtgc | 960 |
| aaggtctcca acaaaggcct cccgtcctcc atcgagaaaa ccatctccaa agccaaaggg | 1020 |
| cagccccgag agccacaggt gtacaccctg cccccatccc aggaggagat gaccaagaac | 1080 |
| caggtcagcc tgacctgcct ggtcaaaggc ttctaccca gcgacatcgc cgtggagtgg | 1140 |
| gagagcaatg ggcagccgga gaacaactac aagaccacgc ctcccgtgct ggactccgac | 1200 |
| ggctccttct cctctacag caagctaacc gtggacaaga gcaggtggca ggaggggaat | 1260 |
| gtcttctcat gctccgtgat gcatgaggct ctgcacaacc actacacaca gaagagcctc | 1320 |
| tccctgtccc taggtaaaga ggtgcagctg gtgcagtccg gagcagaggt gaaaaagccc | 1380 |
| ggggagtctc tgaagatctc ctgtaagggt tctggataca gctttatcat ctactggatc | 1440 |
| ggctgggtgc gccagatgcc cgggaaaggc ctggagtgga tggggatcat ctatcctaat | 1500 |
| gacgctgata ccagatacag cccgtccttc caaggccagg tcaccatctc agccgacaag | 1560 |
| tccatcagca ccgcctacct gcagtggagc agcctgaagg cctcggacac cgccatgtat | 1620 |
| tactgtgtga gactgggtac gagggactgg ttcgacccct ggggccaggg aaccctggtc | 1680 |
| accgtctcct cagctagcac caaaggacct tctgtatttc ctcttgcgcc atgctctcgc | 1740 |
| tctacgtcag aatcaactgc cgctctgggg tgcctggtta agactactt cccggagcct | 1800 |
| gtgacagtga gttggaactc cggcgccctg acatcaggag tgcatacatt tcccgccgtg | 1860 |
| cttcagagca gcggacttta tagcctcagc agtgtggtga ccgtgccatc ttccagcctg | 1920 |
| gggaccaaga cctacacctg taacgtggac cacaaaccca gcaacaccaa ggttgataag | 1980 |
| agggtctga | 1989 |

<210> SEQ ID NO 120
<211> LENGTH: 662
<212> TYPE: PRT
<213> ORGANISM: Artificial Sequence
<220> FEATURE:
<223> OTHER INFORMATION: description of the artificial sequence: the amino acid sequence of Ct-GPngs18-R1090 H Chain

<400> SEQUENCE: 120

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ser Met Asn Trp Val Arg Gln Ala Pro Gly Lys Gly Leu Glu Trp Val
        35                  40                  45

Ser Tyr Ile Arg Ser Asp Ser Arg Thr Ile Lys Tyr Ala Asp Ser Val
    50                  55                  60

Lys Gly Arg Phe Thr Ile Ser Arg Asp Asn Ala Lys Asn Ser Leu Phe
65                  70                  75                  80

Leu Gln Met Asn Ser Leu Arg Asp Glu Asp Thr Ala Val Tyr Tyr Cys
                85                  90                  95

Ala Arg Trp Glu Trp Glu Leu Asp Ala Phe Asp Ile Trp Gly Gln Gly
            100                 105                 110

Thr Met Val Thr Val Ser Ser Ala Ser Thr Lys Gly Pro Ser Val Phe
        115                 120                 125

Pro Leu Ala Pro Cys Ser Arg Ser Thr Ser Glu Ser Thr Ala Ala Leu
130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Lys Thr Tyr Thr Cys Asn Val Asp His Lys Pro
        195                 200                 205

Ser Asn Thr Lys Val Asp Lys Arg Val Glu Ser Lys Tyr Gly Pro Pro
210                 215                 220

Cys Pro Pro Cys Pro Ala Pro Glu Phe Glu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser Gln Glu Asp Pro Glu Val
            260                 265                 270

Gln Phe Asn Trp Tyr Val Asp Gly Val Glu Val His Asn Ala Lys Thr
        275                 280                 285

Lys Pro Arg Glu Glu Gln Phe Asn Ser Thr Tyr Arg Val Val Ser Val
290                 295                 300

Leu Thr Val Leu His Gln Asp Trp Leu Asn Gly Lys Glu Tyr Lys Cys
305                 310                 315                 320

Lys Val Ser Asn Lys Gly Leu Pro Ser Ser Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Gln Glu Glu Met Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
370                 375                 380

Gln Pro Glu Asn Asn Tyr Lys Thr Thr Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Glu Gly Asn Val Phe Ser Cys Ser Val Met His Glu Ala Leu His
```

```
                420              425                430
Asn His Tyr Thr Gln Lys Ser Leu Ser Leu Gly Lys Glu Val
            435              440              445

Gln Leu Val Gln Ser Gly Ala Glu Val Lys Lys Pro Gly Glu Ser Leu
        450              455              460

Lys Ile Ser Cys Lys Gly Ser Gly Tyr Ser Phe Ile Ile Tyr Trp Ile
465              470              475              480

Gly Trp Val Arg Gln Met Pro Gly Lys Gly Leu Glu Trp Met Gly Ile
                485              490              495

Ile Tyr Pro Asn Asp Ala Asp Thr Arg Tyr Ser Pro Ser Phe Gln Gly
            500              505              510

Gln Val Thr Ile Ser Ala Asp Lys Ser Ile Ser Thr Ala Tyr Leu Gln
        515              520              525

Trp Ser Ser Leu Lys Ala Ser Asp Thr Ala Met Tyr Tyr Cys Val Arg
    530              535              540

Leu Gly Thr Arg Asp Trp Phe Asp Pro Trp Gly Gln Gly Thr Leu Val
545              550              555              560

Thr Val Ser Ser Ala Ser Thr Lys Gly Pro Ser Val Phe Pro Leu Ala
            565              570              575

Pro Cys Ser Arg Ser Thr Ser Glu Ser Thr Ala Ala Leu Gly Cys Leu
        580              585              590

Val Lys Asp Tyr Phe Pro Glu Pro Val Thr Val Ser Trp Asn Ser Gly
    595              600              605

Ala Leu Thr Ser Gly Val His Thr Phe Pro Ala Val Leu Gln Ser Ser
    610              615              620

Gly Leu Tyr Ser Leu Ser Ser Val Val Thr Val Pro Ser Ser Ser Leu
625              630              635              640

Gly Thr Lys Thr Tyr Thr Cys Asn Val Asp His Lys Pro Ser Asn Thr
            645              650              655

Lys Val Asp Lys Arg Val
            660
```

<210> SEQ ID NO 121
<211> LENGTH: 2004
<212> TYPE: DNA
<213> ORGANISM: Artificial Sequence
<220> FEATURE:
<223> OTHER INFORMATION: description of the artificial sequence: the base sequence of Ct-GPngs62-R1090 H Chain

<400> SEQUENCE: 121

```
gaggtgcagc tggtggagtc cggggggaggc ttggtacagc ctggggggtc cctgagactc    60
tcctgtgcag cctctggatt caccttttagc agctatgcca ggagctgggt ccgccaggct    120
ccagggaagg ggctggagtg ggtctcagct attagtggtg gtggtggtcg cacatactac    180
gcagactccg tgaagggccg gttcaccatc tccagagaca attcccagaa cacgctgtat    240
ctgcaaatga acagcctgag agccgaggac acggccgtat attactgtgc gaaaaattac    300
tatggttcgg ggagcgccag ttactggtac ttcgatctct ggggccgtgg caccctggtc    360
accgtctcct cagcaagtac caaggggcca tccgtcttcc ccctggcgcc ctgctctaga    420
agcacctccg agagcacagc cgccctgggc tgcctggtca aggactactt ccccgaaccg    480
gtgacggtgt cgtggaactc aggcgccctg accagcggcg tgcacacctt cccggctgtc    540
ctacagtcct caggactcta ctccctcagc agcgtggtga ccgtgccctc agcagcttg    600
ggcacgaaga cctacacctg caacgtagat cacaagccca gcaacaccaa ggtggacaag    660
```

```
agagttgagt ccaaatatgg tcccccatgc ccaccatgcc cagcacctga gttcgagggg    720
ggaccatcag tcttcctgtt ccccccaaaa cccaaggaca ctctcatgat ctcccggacc    780
cctgaggtca cgtgcgtggt ggtggacgtg agccaggaag accccgaggt ccagttcaac    840
tggtacgtgg atggcgtgga ggtgcataat gccaagacaa agccgcggga ggagcagttc    900
aacagcacgt accgtgtggt cagcgtcctc accgtcctgc accaggactg gctgaacggc    960
aaggagtaca agtgcaaggt ctccaacaaa ggcctcccgt cctccatcga aaaaccatc    1020 tccaaagcca agggcagcc ccgagagcca caggtgtaca ccctgccccc atcccaggag   1080
gagatgacca gaaccaggt cagcctgacc tgcctggtca aaggcttcta ccccagcgac   1140
atcgccgtgg agtgggagag caatgggcag ccggagaaca actacaagac cacgcctccc   1200
gtgctggact ccgacggctc cttcttcctc tacagcaagc taaccgtgga caagagcagg   1260
tggcaggagg ggaatgtctt ctcatgctcc gtgatgcatg aggctctgca caaccactac   1320
acacagaaga gcctctccct gtccctaggt aaagaggtgc agctggtgca gtccggagca   1380
gaggtgaaaa agcccgggga gtctctgaag atctcctgta agggttctgg atacagcttt   1440
atcatctact ggatcggctg ggtgcgccag atgcccggga aaggcctgga gtggatgggg   1500
atcatctatc ctaatgacgc tgataccaga tacagcccgt ccttccaagg ccaggtcacc   1560
atctcagccg acaagtccat cagcaccgcc tacctgcagt ggagcagcct gaaggcctcg   1620
gacaccgcca tgtattactg tgtgagactg ggtacgaggg actggttcga cccctggggc   1680
cagggaaccc tggtcaccgt ctcctcagct agcaccaaag gaccttctgt atttcctctt   1740
gcgccatgct ctcgctctac gtcagaatca actgccgctc tggggtgcct ggttaaagac   1800
tacttcccgg agcctgtgac agtgagttgg aactccggcg ccctgacatc aggagtgcat   1860
acatttcccg ccgtgcttca gagcagcgga ctttatagcc tcagcagtgt ggtgaccgtg   1920
ccatcttcca gcctggggac caagacctac acctgtaacg tggaccacaa acccagcaac   1980
accaaggttg ataagagggt ctga                                          2004
```

<210> SEQ ID NO 122
<211> LENGTH: 667
<212> TYPE: PRT
<213> ORGANISM: Artificial Sequence
<220> FEATURE:
<223> OTHER INFORMATION: description of the artificial sequence: the
      amino acid sequence of Ct-GPngs62-R1090 H Chain

<400> SEQUENCE: 122

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Arg Ser Trp Val Arg Gln Ala Pro Gly Lys Gly Leu Glu Trp Val
        35                  40                  45

Ser Ala Ile Ser Gly Gly Gly Gly Arg Thr Tyr Tyr Ala Asp Ser Val
    50                  55                  60

Lys Gly Arg Phe Thr Ile Ser Arg Asp Asn Ser Gln Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Asn Tyr Tyr Gly Ser Gly Ser Ala Ser Tyr Trp Tyr Phe Asp
            100                 105                 110
```

```
Leu Trp Gly Arg Gly Thr Leu Val Thr Val Ser Ser Ala Ser Thr Lys
            115                 120                 125

Gly Pro Ser Val Phe Pro Leu Ala Pro Cys Ser Arg Ser Thr Ser Glu
130                 135                 140

Ser Thr Ala Ala Leu Gly Cys Leu Val Lys Asp Tyr Phe Pro Glu Pro
145                 150                 155                 160

Val Thr Val Ser Trp Asn Ser Gly Ala Leu Thr Ser Gly Val His Thr
                165                 170                 175

Phe Pro Ala Val Leu Gln Ser Ser Gly Leu Tyr Ser Leu Ser Ser Val
            180                 185                 190

Val Thr Val Pro Ser Ser Leu Gly Thr Lys Thr Tyr Thr Cys Asn
        195                 200                 205

Val Asp His Lys Pro Ser Asn Thr Lys Val Asp Lys Arg Val Glu Ser
210                 215                 220

Lys Tyr Gly Pro Pro Cys Pro Pro Cys Pro Ala Pro Glu Phe Glu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser Gln
        260                 265                 270

Glu Asp Pro Glu Val Gln Phe Asn Trp Tyr Val Asp Gly Val Glu Val
    275                 280                 285

His Asn Ala Lys Thr Lys Pro Arg Glu Glu Gln Phe Asn Ser Thr Tyr
    290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Gly Leu Pro Ser Ser Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Gln Glu Glu Met Thr Lys Asn Gln Val Ser
        355                 360                 365

Leu Thr Cys Leu Val Lys Gly Phe Tyr Pro Ser Asp Ile Ala Val Glu
    370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415

Asp Lys Ser Arg Trp Gln Glu Gly Asn Val Phe Ser Cys Ser Val Met
            420                 425                 430

His Glu Ala Leu His Asn His Tyr Thr Gln Lys Ser Leu Ser Leu Ser
        435                 440                 445

Leu Gly Lys Glu Val Gln Leu Val Gln Ser Gly Ala Glu Val Lys Lys
    450                 455                 460

Pro Gly Glu Ser Leu Lys Ile Ser Cys Lys Gly Ser Gly Tyr Ser Phe
465                 470                 475                 480

Ile Ile Tyr Trp Ile Gly Trp Val Arg Gln Met Pro Gly Lys Gly Leu
                485                 490                 495

Glu Trp Met Gly Ile Ile Tyr Pro Asn Asp Ala Asp Thr Arg Tyr Ser
            500                 505                 510

Pro Ser Phe Gln Gly Gln Val Thr Ile Ser Ala Asp Lys Ser Ile Ser
        515                 520                 525

Thr Ala Tyr Leu Gln Trp Ser Ser Leu Lys Ala Ser Asp Thr Ala Met
```

```
                530             535             540
Tyr Tyr Cys Val Arg Leu Gly Thr Arg Asp Trp Phe Asp Pro Trp Gly
545                 550                 555                 560

Gln Gly Thr Leu Val Thr Val Ser Ser Ala Ser Thr Lys Gly Pro Ser
                565                 570                 575

Val Phe Pro Leu Ala Pro Cys Ser Arg Ser Thr Ser Glu Ser Thr Ala
                580                 585                 590

Ala Leu Gly Cys Leu Val Lys Asp Tyr Phe Pro Glu Pro Val Thr Val
                595                 600                 605

Ser Trp Asn Ser Gly Ala Leu Thr Ser Gly Val His Thr Phe Pro Ala
                610                 615                 620

Val Leu Gln Ser Ser Gly Leu Tyr Ser Leu Ser Ser Val Val Thr Val
625                 630                 635                 640

Pro Ser Ser Ser Leu Gly Thr Lys Thr Tyr Thr Cys Asn Val Asp His
                645                 650                 655

Lys Pro Ser Asn Thr Lys Val Asp Lys Arg Val
                660                 665

<210> SEQ ID NO 123
<211> LENGTH: 115
<212> TYPE: PRT
<213> ORGANISM: Artificial Sequence
<220> FEATURE:
<223> OTHER INFORMATION: description of the artificial sequence: the
      amino acid sequence of GC33 VH

<400> SEQUENCE: 123

Gln Val Gln Leu Gln Gln Ser Gly Ala Glu Leu Val Arg Pro Gly Ala
1               5                   10                  15

Ser Val Lys Leu Ser Cys Lys Ala Ser Gly Tyr Thr Phe Thr Asp Tyr
                20                  25                  30

Glu Met His Trp Val Lys Gln Thr Pro Val His Gly Leu Lys Trp Ile
            35                  40                  45

Gly Ala Leu Asp Pro Lys Thr Gly Asp Thr Ala Tyr Ser Gln Lys Phe
        50                  55                  60

Lys Gly Lys Ala Thr Leu Thr Ala Asp Lys Ser Ser Ser Thr Ala Tyr
65                  70                  75                  80

Met Glu Leu Arg Ser Leu Thr Ser Glu Asp Ser Ala Val Tyr Tyr Cys
                85                  90                  95

Thr Arg Phe Tyr Ser Tyr Thr Tyr Trp Gly Gln Gly Thr Leu Val Thr
                100                 105                 110

Val Ser Ala
        115

<210> SEQ ID NO 124
<211> LENGTH: 113
<212> TYPE: PRT
<213> ORGANISM: Artificial Sequence
<220> FEATURE:
<223> OTHER INFORMATION: description of the artificial sequence: the
      amino acid sequence of GC33 VL

<400> SEQUENCE: 124

Gly Asp Val Val Met Thr Gln Thr Pro Leu Ser Leu Pro Val Ser Leu
1               5                   10                  15

Gly Asp Gln Ala Ser Ile Ser Cys Arg Ser Ser Gln Ser Leu Val His
                20                  25                  30

Ser Asn Gly Asn Thr Tyr Leu His Trp Tyr Leu Gln Lys Pro Gly Gln
```

```
                35                  40                  45
Ser Pro Lys Leu Leu Ile Tyr Lys Val Ser Asn Arg Phe Ser Gly Val
 50                  55                  60

Pro Asp Arg Phe Ser Gly Ser Gly Ser Gly Thr Asp Phe Thr Leu Lys
65                  70                  75                  80

Ile Ser Arg Val Glu Ala Glu Asp Leu Gly Val Tyr Phe Cys Ser Gln
                85                  90                  95

Asn Thr His Val Pro Pro Thr Phe Gly Ser Gly Thr Lys Leu Glu Ile
            100                 105                 110

Lys
```

<210> SEQ ID NO 125
<211> LENGTH: 117
<212> TYPE: PRT
<213> ORGANISM: Artificial Sequence
<220> FEATURE:
<223> OTHER INFORMATION: description of the artificial sequence: the amino acid sequence of YP7 VH

<400> SEQUENCE: 125

```
Glu Val Gln Leu Val Glu Thr Gly Gly Gly Met Val Gln Pro Glu Gly
1               5                  10                  15

Ser Leu Lys Leu Ser Cys Ala Ala Ser Gly Phe Thr Phe Asn Lys Asn
                20                  25                  30

Ala Met Asn Trp Val Arg Gln Ala Pro Gly Lys Gly Leu Glu Trp Val
            35                  40                  45

Ala Arg Ile Arg Asn Lys Thr Asn Asn Tyr Ala Thr Tyr Tyr Ala Asp
 50                  55                  60

Ser Val Lys Ala Arg Phe Thr Ile Ser Arg Asp Asp Ser Gln Ser Met
65                  70                  75                  80

Leu Tyr Leu Gln Met Asn Asn Leu Lys Ile Glu Asp Thr Ala Met Tyr
                85                  90                  95

Tyr Cys Val Ala Gly Asn Ser Phe Ala Tyr Trp Gly Gln Gly Thr Leu
            100                 105                 110

Val Thr Val Ser Ala
        115
```

<210> SEQ ID NO 126
<211> LENGTH: 113
<212> TYPE: PRT
<213> ORGANISM: Artificial Sequence
<220> FEATURE:
<223> OTHER INFORMATION: description of the artificial sequence: the amino acid sequence of YP7 VL

<400> SEQUENCE: 126

```
Asp Ile Val Met Ser Gln Ser Pro Ser Ser Leu Val Val Ser Ile Gly
1               5                  10                  15

Glu Lys Val Thr Met Thr Cys Lys Ser Ser Gln Ser Leu Leu Tyr Ser
                20                  25                  30

Ser Asn Gln Lys Asn Tyr Leu Ala Trp Tyr Gln Gln Lys Pro Gly Gln
            35                  40                  45

Ser Pro Lys Leu Leu Ile Tyr Trp Ala Ser Ser Arg Glu Ser Gly Val
 50                  55                  60

Pro Asp Arg Phe Thr Gly Ser Gly Ser Gly Thr Asp Phe Thr Leu Thr
65                  70                  75                  80

Ile Ser Ser Val Lys Ala Glu Asp Leu Ala Val Tyr Tyr Cys Gln Gln
                85                  90                  95
```

Tyr Tyr Asn Tyr Pro Leu Thr Phe Gly Ala Gly Thr Lys Leu Glu Leu
                100                 105                 110

Lys

<210> SEQ ID NO 127
<211> LENGTH: 117
<212> TYPE: PRT
<213> ORGANISM: Artificial Sequence
<220> FEATURE:
<223> OTHER INFORMATION: description of the artificial sequence: the
      amino acid sequence of HN3 VH

<400> SEQUENCE: 127

Gln Val Gln Leu Val Gln Ser Gly Gly Gly Leu Val Gln Pro Gly Gly
1               5                   10                  15

Ser Leu Arg Leu Ser Cys Ala Ala Ser Tyr Phe Asp Phe Asp Ser Tyr
            20                  25                  30

Glu Met Ser Trp Val Arg Gln Ala Pro Gly Lys Gly Leu Glu Trp Ile
        35                  40                  45

Gly Ser Ile Tyr His Ser Gly Ser Thr Tyr Tyr Asn Pro Ser Leu Lys
    50                  55                  60

Ser Arg Val Thr Ile Ser Arg Asp Asn Ser Lys Asn Thr Leu Tyr Leu
65                  70                  75                  80

Gln Met Asn Thr Leu Arg Ala Glu Asp Thr Ala Thr Tyr Tyr Cys Ala
                85                  90                  95

Arg Val Asn Met Asp Arg Phe Asp Tyr Trp Gly Gln Gly Thr Leu Val
            100                 105                 110

Thr Val Ser Ser Ser
        115

<210> SEQ ID NO 128
<211> LENGTH: 15
<212> TYPE: PRT
<213> ORGANISM: Artificial Sequence
<220> FEATURE:
<223> OTHER INFORMATION: description of the artificial sequence: the
      amino acid sequence of GS linker

<400> SEQUENCE: 128

Gly Gly Gly Gly Ser Gly Gly Gly Gly Ser Gly Gly Gly Gly Ser
1               5                   10                  15

<210> SEQ ID NO 129
<211> LENGTH: 580
<212> TYPE: PRT
<213> ORGANISM: Homo sapiens

<400> SEQUENCE: 129

Met Ala Gly Thr Val Arg Thr Ala Cys Leu Val Val Ala Met Leu Leu
1               5                   10                  15

Ser Leu Asp Phe Pro Gly Gln Ala Gln Pro Pro Pro Pro Pro Pro Asp
            20                  25                  30

Ala Thr Cys His Gln Val Arg Ser Phe Phe Gln Arg Leu Gln Pro Gly
        35                  40                  45

Leu Lys Trp Val Pro Glu Thr Pro Val Pro Gly Ser Asp Leu Gln Val
        50                  55                  60

Cys Leu Pro Lys Gly Pro Thr Cys Cys Ser Arg Lys Met Glu Glu Lys
65                  70                  75                  80

Tyr Gln Leu Thr Ala Arg Leu Asn Met Glu Gln Leu Leu Gln Ser Ala

```
                       85                  90                  95
Ser Met Glu Leu Lys Phe Leu Ile Ile Gln Asn Ala Ala Val Phe Gln
                    100                 105                 110

Glu Ala Phe Glu Ile Val Val Arg His Ala Lys Asn Tyr Thr Asn Ala
                    115                 120                 125

Met Phe Lys Asn Asn Tyr Pro Ser Leu Thr Pro Gln Ala Phe Glu Phe
            130                 135                 140

Val Gly Glu Phe Phe Thr Asp Val Ser Leu Tyr Ile Leu Gly Ser Asp
145                 150                 155                 160

Ile Asn Val Asp Asp Met Val Asn Glu Leu Phe Asp Ser Leu Phe Pro
                165                 170                 175

Val Ile Tyr Thr Gln Leu Met Asn Pro Gly Leu Pro Asp Ser Ala Leu
            180                 185                 190

Asp Ile Asn Glu Cys Leu Arg Gly Ala Arg Arg Asp Leu Lys Val Phe
        195                 200                 205

Gly Asn Phe Pro Lys Leu Ile Met Thr Gln Val Ser Lys Ser Leu Gln
    210                 215                 220

Val Thr Arg Ile Phe Leu Gln Ala Leu Asn Leu Gly Ile Glu Val Ile
225                 230                 235                 240

Asn Thr Thr Asp His Leu Lys Phe Ser Lys Asp Cys Gly Arg Met Leu
                245                 250                 255

Thr Arg Met Trp Tyr Cys Ser Tyr Cys Gln Gly Leu Met Met Val Lys
            260                 265                 270

Pro Cys Gly Gly Tyr Cys Asn Val Val Met Gln Gly Cys Met Ala Gly
        275                 280                 285

Val Val Glu Ile Asp Lys Tyr Trp Arg Glu Tyr Ile Leu Ser Leu Glu
    290                 295                 300

Glu Leu Val Asn Gly Met Tyr Arg Ile Tyr Asp Met Glu Asn Val Leu
305                 310                 315                 320

Leu Gly Leu Phe Ser Thr Ile His Asp Ser Ile Gln Tyr Val Gln Lys
                325                 330                 335

Asn Ala Gly Lys Leu Thr Thr Thr Ile Gly Lys Leu Cys Ala His Ser
            340                 345                 350

Gln Gln Arg Gln Tyr Arg Ser Ala Tyr Tyr Pro Glu Asp Leu Phe Ile
        355                 360                 365

Asp Lys Lys Val Leu Lys Val Ala His Val Glu His Glu Glu Thr Leu
    370                 375                 380

Ser Ser Arg Arg Arg Glu Leu Ile Gln Lys Leu Lys Ser Phe Ile Ser
385                 390                 395                 400

Phe Tyr Ser Ala Leu Pro Gly Tyr Ile Cys Ser His Ser Pro Val Ala
                405                 410                 415

Glu Asn Asp Thr Leu Cys Trp Asn Gly Gln Glu Leu Val Glu Arg Tyr
            420                 425                 430

Ser Gln Lys Ala Ala Arg Asn Gly Met Lys Asn Gln Phe Asn Leu His
        435                 440                 445

Glu Leu Lys Met Lys Gly Pro Glu Pro Val Val Ser Gln Ile Ile Asp
    450                 455                 460

Lys Leu Lys His Ile Asn Gln Leu Leu Arg Thr Met Ser Met Pro Lys
465                 470                 475                 480

Gly Arg Val Leu Asp Lys Asn Leu Asp Glu Glu Gly Phe Glu Ser Gly
                485                 490                 495

Asp Cys Gly Asp Asp Glu Asp Glu Cys Ile Gly Gly Ser Gly Asp Gly
            500                 505                 510
```

```
Met Ile Lys Val Lys Asn Gln Leu Arg Phe Leu Ala Glu Leu Ala Tyr
        515             520                 525

Asp Leu Asp Val Asp Asp Ala Pro Gly Asn Ser Gln Gln Ala Thr Pro
        530             535                 540

Lys Asp Asn Glu Ile Ser Thr Phe His Asn Leu Gly Asn Val His Ser
545                 550                 555                 560

Pro Leu Lys Leu Leu Thr Ser Met Ala Ile Ser Val Val Cys Phe Phe
                565                 570                 575

Phe Leu Val His
            580
```

BISPECIFIC ANTIBODY BINDING TO CD40 AND GPC3

TECHNICAL FIELD

The present invention relates to a bispecific antibody comprising an antigen binding domain that binds to CD40 and an antigen binding domain that binds to glypican 3 (GPC3), a bispecific antibody fragment thereof, a DNA encoding the bispecific antibody or the bispecific antibody fragment thereof, a vector containing the DNA, a hybridoma and a transformant strain that produce the bispecific antibody or the bispecific antibody fragment thereof, a method for producing the bispecific antibody or the bispecific antibody fragment thereof, therapeutic and diagnostic agents comprising the bispecific antibody or the bispecific antibody fragment thereof, therapeutic and diagnostic methods using the bispecific antibody or the bispecific antibody fragment thereof, and a reagent for detection or measurement comprising the bispecific antibody or the bispecific antibody fragment thereof.

BACKGROUND ART

CD40 is a type I membrane-associated glycoprotein identified as an antigen expressed on the surface of a human B cell, and is known to be expressed on various cell types such as B lymphocytes, dendritic cells, monocyte epithelial cells, and fibroblasts, or also a certain type of tumor cells such as neoplastic human B cells. In a CD40-deficient mouse, it has been confirmed that thymus-dependent immunoglobulin class switching or germinal center formation is impaired, and an important role of CD40 in cellular and humoral immune responses has been demonstrated.

CD40 signaling is involved in immunoglobulin class switching or induction of CTL, and therefore, activation of tumor immunity or application to a pharmaceutical product as an adjuvant for a cancer vaccine is also expected (NPL 1).

Glypican 3 (GPC3, SGB, DGSX, MXR7, SDYS, SGBS, OCT-5, SGBS1, or GTR2-2) is a GPI anchored membrane protein composed of 580 amino acids. GPC3 is expressed in systemic tissues during the stage of development, but its expression is limited in adult normal tissues (NPL 2), and GPC3 is known as a highly expressed cancer antigen in hepatocellular carcinoma. Further, it has been reported that GPC3 is also expressed in malignant melanoma, clear cell ovarian cancer, yolk sac tumor, choriocarcinoma, neuroblastoma, hepatoblastoma, Wilms tumor, testicular germ cell tumor, and liposarcoma, and GPC3 is expected as a target molecule for a cancer molecular targeted drug, a diagnostic marker, or a cancer vaccine target (NPL 3).

As a conventional antibody targeting CD40, Chi-Lob 7/4, HCD-122, APX005M, SEA-CD40, CP870,893 (21.4.1), and the like can be exemplified (NPL 4). Among them, CP870, 893 has a strong CD40 signaling inducing ability, and a clinical trial was conducted for solid tumors using systemic immune activation as a drug efficacy mechanism. However, effectiveness has not yet been demonstrated, and expression of toxicity derived from systemic immune activation such as cytokine syndrome, elevation of a thrombus marker, or elevation of a liver parameter has been reported (NPL 5).

As a bispecific protein that recognizes CD40, a multivalent antibody that recognizes CD28 and CD40 is known (PTL 1). An IgG-type anti-human GPC3/anti-mouse CD40 bispecific antibody having a heterodimerized heavy chain is known (PTL 2). In addition, a bispecific protein that binds to a cancer antigen such as nectin-4, PSMA, EGFR, HER2, or MSLN and to CD40 and activates CD40 is known (PTLs 3 and 4). The bispecific antibodies of PTLs 1, 3, and 4 have a CD40 binding domain derived from an anti-CD40 agonistic antibody.

Further, a method for activating a CD40-expressing cell in the vicinity of a cancer cell by a bispecific molecule such as a diabody having specificity for CD40 and a cancer cell surface antigen is known (PTL 5).

CITATION LIST

Patent Literature

PTL 1: WO 2009/131239
PTL 2: WO 2015/156268
PTL 3: WO 2017/205738
PTL 4: WO 2018/140831
PTL 5: WO 99/61057

Non-Patent Literature

NPL 1: Diehl L et al., Nat Med. 1999 July; 5(7): 774-9
NPL 2: Nakatsura Tetsuya et al., Biochemical and Biophysical Research Communications 306 (2003) 16-25
NPL 3: Mitchell Ho and Heungnam Kim, Eur J of Cancer. 2011 November; 47(3): 333-338
NPL 4: Beatty G L et al., Expert Rev Anticancer Ther, 2017 February; 17(2): 175-186
NPL 5: Vonderheide R H et al., Oncoimmunology. 2013 Jan. 1; 2(1): e23033

SUMMARY OF INVENTION

Technical Problem

The present invention provides a bispecific antibody that specifically binds to CD40 and GPC3. An object is to provide a bispecific antibody comprising an antigen binding domain that binds to CD40 and an antigen binding domain that binds to GPC3, a bispecific antibody fragment thereof, a DNA encoding the bispecific antibody or the bispecific antibody fragment thereof, a vector containing the DNA, a hybridoma and a transformant strain that produce the bispecific antibody or the bispecific antibody fragment thereof, a method for producing the bispecific antibody or the bispecific antibody fragment thereof, therapeutic and diagnostic agents comprising the bispecific antibody or the bispecific antibody fragment thereof, therapeutic and diagnostic methods using the bispecific antibody or the bispecific antibody fragment thereof, and a reagent for detection or measurement comprising the bispecific antibody or the bispecific antibody fragment thereof.

Solution to Problem

As a means for solving the above problems, the present invention provides a bispecific antibody comprising an antigen binding domain that binds to CD40 and an antigen binding domain that binds to GPC3, or a bispecific antibody fragment thereof, and the like.

That is, the present invention relates to the following.

1. A bispecific antibody, which comprises an IgG portion comprising a first antigen binding domain, and also comprises a second antigen binding domain, in which the C terminus of a heavy chain of the IgG portion binds to the second antigen binding domain either directly or via a linker, and which is selected from the group consisting of the following (i) and (ii):
  (i) a bispecific antibody in which the first antigen binding domain is an antigen binding domain that binds to human CD40, and the second antigen binding domain is an antigen binding domain that binds to human glypican 3 (GPC3); and
  (ii) a bispecific antibody in which the first antigen binding domain is an antigen binding domain that binds to human GPC3, and the second antigen binding domain is an antigen binding domain that binds to human CD40.

2. The bispecific antibody according to the above 1, which divalently binds to each of human CD40 and human GPC3.

3. The bispecific antibody according to the above 1 or 2, wherein the C terminus of the heavy chain of the IgG portion directly binds to the second antigen binding domain.

4. The bispecific antibody according to any one of the above 1 to 3, wherein the second antigen binding domain is Fab.

5. The bispecific antibody according to any one of the above 1 to 4, which has a CD40 agonistic activity.

6. The bispecific antibody according to any one of the above 1 to 5, which does not exhibit a CD40 agonistic activity in the absence of a GPC3-expressing cell, and exhibits a CD40 agonistic activity only in the presence of a GPC3-expressing cell.

7. The bispecific antibody according to any one of the above 1 to 6, wherein the antigen binding domain that binds to human CD40 comprises complementarity determining regions (CDRs) 1 to 3 of a heavy chain variable region (VH) and CDRs 1 to 3 of a light chain variable region (VL) derived from a non-agonistic anti-CD40 antibody.

8. The bispecific antibody according to any one of the above 1 to 7, wherein the antigen binding domain that binds to human CD40 comprises VH comprising CDRs 1 to 3 comprising the amino acid sequences of SEQ ID NOS: 16 to 18, respectively, and VL comprising CDRs 1 to 3 comprising the amino acid sequences of SEQ ID NOS: 11 to 13, respectively.

9. The bispecific antibody according to any one of the above 1 to 8, wherein the antigen binding domain that binds to human CD40 comprises VH comprising the amino acid sequence of SEQ ID NO: 15, and VL comprising the amino acid sequence of SEQ ID NO: 10.

10. The bispecific antibody according to any one of the above 1 to 9, wherein the antigen binding domain that binds to human GPC3 comprises VL comprising CDRs 1 to 3 comprising the amino acid sequences of SEQ ID NOS: 11 to 13, respectively, and any one VH selected from the group consisting of the following (1a) to (1g):
  (1a) VH comprising CDRs 1 to 3 comprising the amino acid sequences of SEQ ID NOS: 42 to 44, respectively;
  (1b) VH comprising CDRs 1 to 3 comprising the amino acid sequences of SEQ ID NOS: 47 to 49, respectively;
  (1c) VH comprising CDRs 1 to 3 comprising the amino acid sequences of SEQ ID NOS: 52 to 54, respectively;
  (1d) VH comprising CDRs 1 to 3 comprising the amino acid sequences of SEQ ID NOS: 57 to 59, respectively;
  (1e) VH comprising CDRs 1 to 3 comprising the amino acid sequences of SEQ ID NOS: 62 to 64, respectively;
  (1f) VH comprising CDRs 1 to 3 comprising the amino acid sequences of SEQ ID NOS: 67 to 69, respectively; and
  (1g) VH comprising CDRs 1 to 3 comprising the amino acid sequences of SEQ ID NOS: 72 to 74, respectively.

11. The bispecific antibody according to any one of the above 1 to 10, wherein the antigen binding domain that binds to human GPC3 comprises VL comprising the amino acid sequence of SEQ ID NO: 10, and any one VH selected from the group consisting of the following (2a) to (2g):
  (2a) VH comprising the amino acid sequence of SEQ ID NO: 41;
  (2b) VH comprising the amino acid sequence of SEQ ID NO: 46;
  (2c) VH comprising the amino acid sequence of SEQ ID NO: 51;
  (2d) VH comprising the amino acid sequence of SEQ ID NO: 56;
  (2e) VH comprising the amino acid sequence of SEQ ID NO: 61;
  (2f) VH comprising the amino acid sequence of SEQ ID NO: 66; and
  (2g) VH comprising the amino acid sequence of SEQ ID NO: 71.

12. The bispecific antibody according to any one of the above 1 to 11, wherein the heavy chain constant region of the IgG portion comprises the amino acid sequence of SEQ ID NO: 77.

13. The bispecific antibody according to any one of the above 1 to 12, which consists of two heavy chains comprising the amino acid sequence of any one selected from SEQ ID NOS: 96, 98, 100, 102 104, 106, and 108, and four light chains comprising VL comprising the amino acid sequence of SEQ ID NO: 10.

14. A bispecific antibody fragment of the bispecific antibody according to any one of the above 1 to 13.

15. A DNA encoding the bispecific antibody according to any one of the above 1 to 13 or the bispecific antibody fragment according to the above 14.

16. A recombinant vector, containing the DNA according to the above 15.

17. A transformant strain obtained by introducing the recombinant vector according to the above 16 into a host cell.

18. A method for producing the bispecific antibody according to any one of the above 1 to 13 or the bispecific antibody fragment according to the above 14, characterized by culturing the transformant strain according to the above 17 in a culture medium to produce and accumulate the bispecific antibody according to any one of the above 1 to 13 or the bispecific antibody fragment according to the above 14 in a culture, and collecting the bispecific antibody or the bispecific antibody fragment from the culture.

19. A therapeutic agent and/or a diagnostic agent for a disease associated with at least one of human CD40 and human GPC3, containing the bispecific antibody according to any one of the above 1 to 13 or the bispecific antibody fragment according to the above 14 as an active ingredient.

20. The agent according to the above 19, wherein the disease associated with at least one of human CD40 and human GPC3 is a cancer.

21. A therapeutic method and/or a diagnostic method for a disease associated with at least one of human CD40 and human GPC3, using the bispecific antibody according to any one of the above 1 to 13 or the bispecific antibody fragment according to the above 14.

22. The method according to the above 21, wherein the disease associated with at least one of human CD40 and human GPC3 is a cancer.

23. The bispecific antibody according to any one of the above 1 to 13 or the bispecific antibody fragment according to the above 14 for use in therapy and/or diagnosis for a disease associated with at least one of human CD40 and human GPC3.

24. The bispecific antibody or the bispecific antibody fragment according to the above 23, wherein the disease associated with at least one of human CD40 and human GPC3 is a cancer.

25. Use of the bispecific antibody according to any one of the above 1 to 13 or the bispecific antibody fragment according to the above 14 for producing a therapeutic agent and/or a diagnostic agent for a disease associated with at least one of human CD40 and human GPC3.

26. The use according to the above 25, wherein the disease associated with at least one of human CD40 and human GPC3 is a cancer.

27. A reagent for detecting or measuring at least one of GPC3 and CD40, containing the bispecific antibody according to any one of the above 1 to 13 or the bispecific antibody fragment according to the above 14.

28. A derivative of a bispecific antibody, in which a radioisotope, a low-molecular weight drug, a high-molecular weight drug, a protein, or an antibody drug is bound chemically or through genetic engineering to the bispecific antibody according to any one of the above 1 to 13 or the bispecific antibody fragment according to the above 14.

Advantageous Effects of Invention

According to the present invention, a bispecific antibody comprising an antigen binding domain that binds to CD40 and an antigen binding domain that binds to GPC3, bispecific antibody fragment thereof, a DNA encoding the bispecific antibody or the bispecific antibody fragment thereof, a vector containing the DNA, a hybridoma and a transformant strain that produce the bispecific antibody or the bispecific antibody fragment thereof, a method for producing the bispecific antibody or the bispecific antibody fragment thereof, a therapeutic agent and a diagnostic agent comprising the bispecific antibody or the bispecific antibody fragment thereof, a therapeutic method and a diagnostic method using the bispecific antibody or the bispecific antibody fragment thereof, and a reagent for detection or measurement comprising the bispecific antibody or the bispecific antibody fragment thereof can be provided.

DESCRIPTION OF EMBODIMENTS

Figure 1:
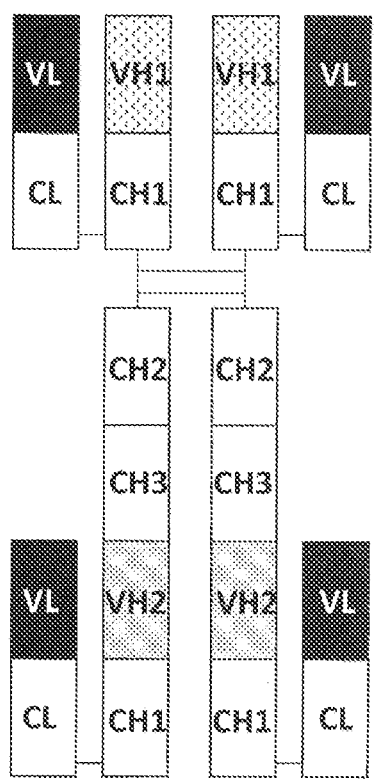
FIG. 1 shows an example of a structure of a bispecific antibody of the present invention.

The present invention relates to a bispecific antibody comprising an antigen binding domain that binds to CD40 and an antigen binding domain that binds to GPC3 or a bispecific antibody fragment thereof (hereinafter referred to as the bispecific antibody or the bispecific antibody fragment thereof of the present invention).

The CD40 in the present invention is used synonymously with TNF receptor superfamily member 5 (TNFRSF5), Bp50, CDW40, MGC9013, and p50. As the CD40, for example, human CD40 containing the amino acid sequence represented by GenBank Accession No. NP_001241 in NCBI (http://www.ncbi.nlm.nih.gov/) or SEQ ID NO: 6, monkey CD40 containing the amino acid sequence represented by GenBank Accession No. XP_005569274 or SEQ ID NO: 8, and the like are exemplified. Further, for example, a polypeptide that is composed of an amino acid sequence in which one or more amino acids are deleted, substituted, or added in the amino acid sequence represented by SEQ ID NO: 6, GenBank Accession No. NP_001241, or GenBank Accession No. XP_005569274 and that has the function of CD40 is exemplified.

A polypeptide comprising an amino acid sequence having generally 70% or more, preferably 80% or more, and more preferably 90% or more homology with the amino acid sequence represented by SEQ ID NO: 6, GenBank Accession No. NP_001241, or GenBank Accession No. XP_005569274, and most preferably, a polypeptide that is composed of an amino acid sequence having 95%, 96%, 97%, 98%, and 99% or more homology and that has the function of CD40 are also included in the CD40 of the present invention.

The polypeptide comprising an amino acid sequence in which one or more amino acid residues are deleted, substituted, or added in the amino acid sequence represented by SEQ ID NO: 6, GenBank Accession No. NP_001241, or GenBank Accession No. XP_005569274 can be obtained by, for example, introducing a site-specific mutation into a DNA encoding the amino acid sequence represented by SEQ ID NO: 6, GenBank Accession No. NP_001241, or GenBank Accession No. XP_005569274 using a site-specific mutagenesis method [Molecular Cloning, A Laboratory Manual, Second Edition, Cold Spring Harbor Laboratory Press (1989), Current Protocols in Molecular Biology, John Wiley & Sons (1987-1997), Nucleic Acids Research, 10, 6487 (1982), Proc. Natl. Acad. Sci. USA, 79, 6409 (1982), Gene, 34, 315 (1985), Nucleic Acids Research, 13. 4431 (1985), Proceeding of the National Academy of Sciences in USA, 82, 488 (1985)], or the like. The number of amino acids to be deleted, substituted, or added is not particularly limited, but is preferably one to several tens, for example, 1 to 20, and more preferably one to several, for example, 1 to 5 amino acids.

As a gene encoding CD40, for example, the nucleotide sequence of human CD40 represented by SEQ ID NO: 5 or GenBank Accession No. NM_001250, the nucleotide sequence of monkey CD40 represented by SEQ ID NO: 7 or GenBank Accession No. XM_011766922, and the like are exemplified. Further, for example, a gene that is composed of a nucleotide sequence in which one or more nucleotides are deleted, substituted, or added in the nucleotide sequence represented by SEQ ID NO: 5 or GenBank Accession No.

NM_001250 and that contains a DNA encoding a polypeptide having the function of CD40, gene that is composed of preferably a nucleotide sequence having 60% or more homology, more preferably a nucleotide sequence having 80% or more homology, and further more preferably a nucleotide sequence having 95% or more homology with the nucleotide sequence represented by SEQ ID NO: 5 or GenBank Accession No. NM_001250 and that contains a DNA encoding a polypeptide having the function of CD40, a gene that is composed of a DNA which hybridizes with a DNA composed of the nucleotide sequence represented by SEQ ID NO: 5 or GenBank Accession No. NM_001250 under stringent conditions, and that contains a DNA encoding a polypeptide having the function of CD40, and the like are also included in the gene encoding the CD40 of the present invention.

The DNA which hybridizes under stringent conditions means, for example, a hybridizable DNA obtained by a colony hybridization method, a plaque hybridization method, a southern blot hybridization method, a DNA microarray method, or the like using a DNA having the nucleotide sequence represented by SEQ ID NO: 5 or GenBank Accession No. NM_001250 as a probe. Specifically, a DNA that can be identified by performing hybridization at 65° C. in the presence of 0.7 to 1.0 mol/L sodium chloride [Molecular Cloning, A Laboratory Manual, Second Edition, Cold Spring Harbor Laboratory Press (1989), Current Protocols in Molecular Biology, John Wiley & Sons (1987-1997), DNA Cloning 1: Core Techniques, A Practical Approach, Second Edition, Oxford University (1995)] using a filter or a microscope slide on which a DNA derived from a hybridized colony or plaque, or a PCR product or an oligo DNA having the sequence is immobilized, and then washing the filter or the microscope slide under the condition of 65° C. using an SSC solution having a concentration of 0.1 to 2 times (a composition of the SSC solution having a concentration of 1 time is composed of 150 mmol/L sodium chloride and 15 mmol/L sodium citrate) can be exemplified. As the hybridizable DNA, for example, a DNA preferably having 60% or more homology, more preferably a DNA having 80% or more homology, and further more preferably a DNA having 95% or more homology with the nucleotide sequence represented by SEQ ID NO: 5 or GenBank Accession No. NM_001250 can be exemplified.

A gene polymorphism is often observed in a nucleotide sequence of a gene encoding a protein of a eukaryote. A gene in which a small-scale mutation has occurred in a nucleotide sequence due to such a polymorphism among genes used in the present invention is also included in the gene encoding the CD40 of the present invention.

The value of homology in the present invention may be a value calculated using a homology search program known to those skilled in the art unless otherwise particularly specified, however, with respect to a nucleotide sequence, a value calculated using a default parameter in BLAST [J. Mol. Biol., 215, 403 (1990)], and the like are exemplified, and with respect to an amino acid sequence, a value calculated using a default parameter in BLAST 2 [Nucleic Acids Research, 25, 3389 (1997), Genome Research, 7, 649 (1997), http://www.ncbi.nlm.nih.gov/Education/BLASTinfo/information3.html], and the like are exemplified.

As for the default parameters, G (Cost to open gap) is 5 in the case of a nucleotide sequence and 11 in the case of an amino acid sequence, -E (Cost to extend gap) is 2 in the case of a nucleotide sequence and 1 in the case of an amino acid sequence, -q (Penalty for nucleotide mismatch) is -3, -r (reward for nucleotide match) is 1, -e (expect value) is 10, -W (wordsize) is 11 residues in the case of a nucleotide sequence and 3 residues in the case of an amino acid sequence, -y [Dropoff (X) for blast extensions in bits] is 20 in the case of blastn and 7 in the case of programs other than blastn, -X (X dropoff value for gapped alignment in hits) is 15, and -Z (final X dropoff value for gapped alignment in bits) is 50 in the case of blastn and 25 in the case of programs other than blastn (http://www.ncbi.nlm/nih.gov/blast/html/blastcgihelp.html).

A polypeptide composed of a partial sequence of the amino acid sequence of CD40 can be produced by a method known to those skilled in the art, and can be produced by, for example, deleting part of the DNA encoding the amino acid sequence represented by SEQ ID NO: 6, GenBank Accession No. NP_001241, or GenBank Accession No. XP_005569274 and culturing a transformant transfected with an expression vector containing the resulting DNA. In addition, for example, a polypeptide having an amino acid sequence in which one or more amino acids are deleted, substituted, or added in the partial sequence of the amino acid sequence represented by SEQ ID NO: 6, GenBank Accession No. NP_001241, or GenBank Accession No. XP_005569274 can be obtained by the same method as described above based on the polypeptide or the DNA produced by the above method. Further, a polypeptide composed of the partial sequence of the amino acid sequence of CD40, or a polypeptide having an amino acid sequence in which one or more amino acids are deleted, substituted, or added in the partial sequence of the amino acid sequence of CD40 can also be produced using a chemical synthesis method such as a fluorenylmethyloxycarbonyl (Fmoc) method or a t-butyloxycarbonyl (tBoc) method.

As an extracellular domain of the CD40 in the present invention, for example, a region in which the amino acid sequence of human CD40 represented by GenBank Accession No. NP_001241 is predicted using a known transmembrane region prediction program SOSUI (http://sosui.proteome.bio.tuat.ac.jp/sosuiframe0.html), TMHMM ver. 2 (http://www.cbs.dtu.dk/services/TMHMM-2.0/), ExPASy Proteomics Server (http://Ca.expasy.org/), or the like is exemplified. Specifically, the amino acid sequence of positions 21 to 194 of SEQ ID NO: 6 or GenBank Accession No. NP_001241 is exemplified.

Examples of the function of CD40 include induction of CD40 signaling when a CD40 ligand or agonist binds it to cause various effects. For example, when CD40 signaling is induced in a cancer cell, cell death or growth inhibition of the cancer cell, or the like is caused. When CD40 signaling is induced in a B lymphocyte, for example, activation of the B lymphocyte, promotion of expression of CD95, class switch recombination, somatic hypermutation, or the like is caused to induce production of an antibody with high antigen affinity or the like. When CD40 signaling is induced in a dendritic cell, for example, an increase in the expression of CD80, CD83, and/or CD86, each of which is a costimulatory molecule of the dendritic cell, an increase in the expression of HLA-ABC, maturation, or production of IL-12 is caused. When CD40 signaling is induced in a macrophage, for example, reduction in a surface marker of an M2 macrophage, induction of expression of a surface marker of an M1 macrophage, or pro-inflammatory cytokine production is caused.

The GPC3 in the present invention is used synonymously with SGB, DGSX, MXR7, SDYS, Simpson-Golabi-Hehmel Syndrome, Type 1 (SGBS), OCI-5, SGBS1, and GTR2-2.

As the GPC3, for example, human GPC3 comprising the amino acid sequence represented by GenBank Accession No. NP_004475, monkey GPC3 comprising the amino acid sequence represented by GenBank Accession No. XP_005594665, mouse GPC3 comprising the amino acid sequence represented by GenBank Accession No. NP_057906, and the like are exemplified. Further, for example, a polypeptide that is composed of an amino acid sequence in which one or more amino acids are deleted, substituted, or added in the amino acid sequence represented by GenBank Accession No, NP_004475, GenBank Accession No. XP_005594665, or NP_057906, and that has the function of GPC3 is exemplified.

A polypeptide comprising an amino acid sequence having preferably 70% or more, more preferably 80% or more, and further more preferably 90% or more homology with amino acid sequence represented by GenBank Accession No. NP_004475, GenBank Accession No, XP_005594665, or GenBank Accession No. NP_057906, and most preferably, a polypeptide that is composed of an amino acid sequence having 95%, 96%, 97%, 98%, and 99% or more homology and that has the function of GPC3 are also included in the GPC3 of the present invention.

The polypeptide having an amino acid sequence in which one or more amino acid residues are deleted, substituted, or added in the amino acid sequence represented by GenBank Accession No. NP_004475, GenBank Accession No. XP_005594665, or GenBank Accession No. NP_057906 can be obtained by, for example, introducing a site-specific mutation into a DNA encoding the amino acid sequence of SEQ ID NO: GenBank Accession No. NP_004475, GenBank Accession No. XP_005594665, or GenBank Accession No. NP_057906 using the above-mentioned site-specific mutagenesis method, or the like. The number of amino acids to be deleted, substituted, or added is not particularly limited, but is preferably one to several tens, for example, 1 to 20, and more preferably one to several, for example, 1 to 5 amino acids.

As a gene encoding the GPC3 in the present invention, for example, a gene of human GPC3 containing the nucleotide sequence represented by GenBank Accession No. NM_004484, a gene of monkey GPC3 containing the nucleotide sequence represented by GenBank Accession No. XM_005594608, or a gene of mouse GPC3 containing the nucleotide sequence represented by GenBank Accession No. NM_016697 is exemplified.

Further, for example, a gene that is composed of a nucleotide sequence in which one or more nucleotides are deleted, substituted, or added in the nucleotide sequence of GenBank Accession No. NM_004484, GenBank Accession No. XM_005594608, or GenBank Accession No. NM_016697, and that contains a DNA encoding a polypeptide having the function of GPC3, a gene that is composed of a nucleotide sequence having 60% or more homology, preferably a nucleotide sequence having 80% or more homology, and more preferably a nucleotide sequence having 95% or more homology with the nucleotide sequence of GenBank Accession No. NM_004484, GenBank Accession No. XM_005594608, or GenBank Accession No. NM_016697, and that contains a DNA encoding a polypeptide having the function of GPC3, a gene that is composed of a DNA which hybridizes with a DNA containing the nucleotide sequence represented by SEQ ID NO: GenBank Accession No. NM_004484, GenBank Accession No. XM_005594608, or GenBank Accession No. NM_016697 under stringent conditions, and that contains a DNA encoding a polypeptide having the function of GPC3, and the like are also included in the gene encoding the GPC3 of the present invention.

As an extracellular domain of the GPC3 in the present invention, for example, a region in which the amino acid sequence of human GPC3 represented by GenBank Accession No. NP_004475 is predicted using a known transmembrane region prediction program SOSUI (http://sosui.proteome.bio.tuat.ac.jp/sosuiframe0.html), TMHMM ver. 2 (http://www.cbs.dtu.dk/services/TMHMM-2.0/), ExPASy Proteomics Server (http://Ca.expasy.org/), or the like is exemplified. Specifically, the amino acid sequence of positions 25 to 563 of SEQ ID NO: 31 or GenBank Accession No. NP_004475 is exemplified.

As the function of GPC3, for example, promotion of binding between Wnt and Frizzled by forming a complex with Wnt so as to activate the Wnt pathway, thereby promoting cell proliferation or cell migration in a hepatocellular carcinoma cell line, and the like are exemplified.

An antibody is a protein derived from a gene (referred to as "antibody gene") encoding all or part of a heavy chain variable region, a heavy chain constant region, a light chain variable region, and a light chain constant region constituting an immunoglobulin. The antibody of the present invention also includes an antibody or an antibody fragment having any immunoglobulin class and subclass.

The heavy chain (H chain) refers to a polypeptide having a higher molecular weight of the two types of polypeptides constituting an immunoglobulin molecule. The heavy chain determines the antibody class and subclass. IgA, IgD, IgE, IgG, and IgM include an α chain, a δ chain, an ε chain, a γ chain, and a μ chain as the heavy chain, respectively, and the heavy chain constant region is characterized by a different amino acid sequence. The light chain (L chain) refers to a polypeptide having a lower molecular weight of the two types of polypeptides constituting an immunoglobulin molecule. In the case of a human antibody, there exist two types, a κ chain and a λ chain, in the light chain.

The variable region (V region) generally refers to a region that is present in an amino acid sequence at the N-terminal side of an immunoglobulin and is rich in diversity. Because a part other than the variable region has a structure with less diversity, it is called a constant region (C region). The respective variable regions of the heavy chain and the light chain are associated to form an antigen binding domain and determine the binding property of the antibody to the antigen.

In the heavy chain of a human antibody, the variable region corresponds to the amino acid sequence at positions 1 to 117 in the EU index of Kabat et al. (Kabat et al., Sequences of proteins of immunological interest, 1991 Fifth edition), and the constant region corresponds to the amino acid sequence downstream of position 118. In the light chain of a human antibody, the amino acid sequence at positions 1 to 107 numbered according to Kabat et al. (Kabat numbering) corresponds to the variable region, and the amino acid sequence downstream of position 108 corresponds to the constant region. Hereinafter, the heavy chain variable region or the light chain variable region is abbreviated as VH or VL.

The antigen binding domain is a domain that recognizes and binds to an antigen in an antibody, and refers to a domain that forms a complementary conformation with an antigenic determinant (epitope). In the antigen binding domain, a strong intermolecular interaction occurs with the antigenic determinant. The antigen binding domain is constituted by VH and VL including at least three complementarity determining regions (CDRs). In the case of a human antibody, VH and VL each include three CDRs. These CDRs are referred to as CDR1, CDR2, and CDR3, respectively, in order from the N-terminal side.

In the constant region, the heavy chain constant region and the light chain constant region are denoted as CH and CL, respectively. The CH is classified into an α chain, a δ chain, an ε chain, a γ chain, and a μ chain which are subclasses of the heavy chain. The CH is constituted by a CH1 domain, a hinge domain, a CH2 domain, and a CH3 domain arranged in order from the N-terminal side, and the CH2 domain and the CH3 domain together are called an Fc region. On the other hand, the CL is classified into two subclasses called a Cλ chain and a Cκ chain.

In the present invention, the anti-CD40 antibody refers to a monoclonal antibody that specifically recognizes and binds to the extracellular domain of CD40. In addition, in the present invention, the anti-GPC3 antibody refers to a monoclonal antibody that specifically recognizes and binds to the extracellular domain of GPC3. Further, in the present invention, the antibody also includes a polyclonal antibody and an oligoclonal antibody.

In the present invention, the binding of an antibody or an antibody fragment thereof to CD40 or GPC3 can be confirmed by a method in which the binding affinity of the antibody to a cell having expressed CD40 or GPC3 is confirmed using, for example, a known immunological detection method, preferably a fluorescent cell staining method, or the like. Further, it is also possible to use known immunological detection methods [Monoclonal Antibodies—Principles and Practice, Third Edition, Academic Press (1996), Antibodies—A Laboratory Manual, Cold Spring Harbor Laboratory (1988), Monoclonal Antibody Experimental Manual, Kodansha Scientific Ltd. (1987)], and the like in combination.

A monoclonal antibody is an antibody secreted by an antibody-producing cell maintaining monoclonality, and recognizes a single epitope (also referred to as an antigenic determinant). The monoclonal antibody molecules have the same amino acid sequence (primary structure) and have a single structure. A polyclonal antibody refers to a population of antibody molecules secreted by antibody-producing cells of different clones. An oligoclonal antibody refers to a population of antibody molecules in which multiple different monoclonal antibodies are mixed.

The epitope refers to a structural part of an antigen that an antibody recognizes and binds to. Examples of the epitope include a single amino acid sequence, a conformation composed of an amino acid sequence, an amino acid sequence to which a sugar chain is bound, and a conformation composed of an amino acid sequence to which a sugar chain is bound, and the like, each of which a monoclonal antibody recognizes and binds to.

Examples of the monoclonal antibody in the present invention can include an antibody produced by a hybridoma, and a genetically recombinant antibody produced by a transformant transformed with an expression vector comprising an antibody gene.

The hybridoma can be prepared by, for example, preparing an antigen, obtaining an antibody-producing cell having antigen specificity from an animal immunized with the antigen, and then fusing the antibody-producing cell with a myeloma cell. A desired monoclonal antibody can be obtained by culturing the hybridoma or by administering the hybridoma to an animal to convert the hybridoma into an ascites tumor, separating the culture solution or the ascites, followed by purification. As the animal to be immunized with the antigen, any animal can be used as long as it can produce a hybridoma, however, a mouse, a rat, a hamster, a rabbit, or the like is preferably used. In addition, the hybridoma can also be produced by obtaining a cell having an antibody-producing ability from such an immunized animal, subjecting the cell to in vitro immunization, and then fusing the cell with a myeloma cell.

Examples of the genetically recombinant antibody in the present invention include antibodies produced using a gene recombinant technique such as a recombinant mouse antibody, a recombinant rat antibody, a recombinant hamster antibody, a recombinant rabbit antibody, a human chimeric antibody (also referred to as a chimeric antibody), a humanized antibody (also referred to as a CDR-grafted antibody), and a human antibody. In the genetically recombinant antibody, it is possible to determine which animal species the heavy chain and the light chain variable regions and constant regions derived from are applied according to the animal species to be used as a target and the purpose. For example, when the animal species to be used as a target is a human, as the variable region, one derived from a human or a non-human animal such as a mouse can be adopted, and as the constant region and the linker, those derived from a human can be adopted.

The chimeric antibody refers to an antibody composed of VH and VL of an antibody of an animal other than a human (non-human animal) and CH and CL of a human antibody. As the non-human animal, any animal such as a mouse, a rat, a hamster, or a rabbit can be used as long as it can produce a hybridoma. The chimeric antibody can be produced by obtaining cDNAs encoding VH and VL from a hybridoma derived from a non-human animal that produces a monoclonal antibody, inserting each of the cDNAs into an expression vector for an animal cell having DNAs encoding CH and CL of a human antibody, thereby constructing an expression vector for a chimeric antibody, and then introducing the vector into an animal cell to cause expression.

The humanized antibody refers to an antibody in which CDRs of VH and VL of a non-human animal antibody are grafted in the corresponding CDRs of VH and VL of a human antibody. A region other than the CDRs of VH and VL is referred to as a framework region (hereinafter referred to as FR). The humanized antibody can be produced by constructing a cDNA encoding the amino acid sequence of VH composed of the amino acid sequence of CDR of VH of a non-human animal antibody and the amino acid sequence of FR of VH of an arbitrary human antibody, and a cDNA encoding the amino acid sequence of VL composed of the amino acid sequence of CDR of VL of a non-human animal antibody and the amino acid sequence of FR of VL of an arbitrary human antibody, inserting each of the cDNAs into an expression vector for an animal cell having DNAs encoding CH and CL of a human antibody, thereby constructing an expression vector for a humanized antibody, and then introducing the vector into an animal cell to cause expression.

The human antibody originally refers to an antibody that is naturally present in a human body, but also includes an antibody that is obtained from a human antibody phage library and a human antibody-producing transgenic animal, each of which is produced by recent advancement of genetic engineering, cellular engineering, or developmental engineering technology, and the like.

The antibody that is naturally present in a human body can be obtained by, for example, infecting human peripheral blood lymphocytes with an EB virus or the like so as to immortalize the lymphocytes, followed by cloning to culture a lymphocyte that produces the antibody, and then purifying the antibody from the culture supernatant.

The human antibody phage library is a library in which an antibody fragment such as Fab or scFv is expressed on a phage surface by inserting an antibody gene prepared from a human B cell into a phage gene. It is possible to collect a phage having expressed an antibody fragment having a desired antigen binding activity on the surface from the library using a binding activity to a substrate on which an antigen is immobilized as an index. The antibody fragment can be further converted into a human antibody molecule consisting of two complete H chains and two complete L chains using a genetic engineering technique.

The human antibody-producing transgenic animal means an animal in which a human antibody gene is incorporated into a cell. Specifically, for example, a human antibody-producing transgenic mouse can be produced by introducing a human antibody gene into a mouse ES cell, implanting the ES cell in a mouse early embryo, and then allowing the embryo to develop into an individual. A human antibody derived from the human antibody-producing transgenic animal can be prepared by obtaining a hybridoma using a conventional hybridoma production method that is performed for a non-human animal, and culturing the hybridoma to produce and accumulate the antibody in the culture supernatant.

The CH of the genetically recombinant antibody may be any as long as it belongs to a human immunoglobulin, but is preferably CH of human immunoglobulin G (hIgG) class. Further, it is possible to use CH of any subclass such as hIgG1, hIgG2, hIgG3, and hIgG4 which belong to the hIgG class. In addition, the CL of the genetically recombinant antibody may be any as long as it belongs to a human immunoglobulin, and CL of the κ class or the λ class can be used.

In the present invention, the bispecific antibody refers to a polypeptide or a protein that has two types of antigen binding domains with different specificities. Each of the antigen binding domains of the bispecific antibody may bind to different epitopes of a single antigen or may bind to different antigens.

The bispecific antibody of the present invention comprises an IgG portion comprising a first antigen binding domain, and also comprises a second antigen binding domain, and the C terminus of a heavy chain of the IgG portion binds to the second antigen binding domain either directly or via a linker.

The antigen binding domain in the present invention is a partial structure having a function of specifically recognizing and binding to an antigen. As the antigen binding domain of the present invention, for example, a recombinant protein or a polypeptide utilizing a protein having a binding ability to an antigen such as an antibody or an antibody fragment thereof, a recombinant protein comprising CDR of an antibody, an antibody variable region comprising CDR, a ligand or a receptor is exemplified. Among these, in the present invention, the antigen binding domain is preferably Fab of an antibody.

In the present invention, the first antigen binding domain refers to a first antigen binding domain included in the bispecific antibody, and the second antigen binding domain refers to an antigen binding domain, which is included in the bispecific antibody, and binds to an epitope different from that for the first antigen binding domain binds.

In the present invention, the antigen binding domain that binds to CD40 or GPC3 may be any as long as it specifically recognizes and binds to CD40 or GPC3. For example, the domain may be in any form of a polypeptide, a protein molecule, and a fragment thereof that can be produced by a gene recombination technique such as an antibody, a ligand, a receptor, or a naturally occurring interacting molecule, and a conjugate body with a low-molecular weight molecule or a natural product of the protein molecule, or the like.

The bispecific antibody or the bispecific antibody fragment thereof of the present invention may bind to CD40 and GPC3 expressed on the same cell, or may bind to CD40 and GPC3 expressed on different cells, but preferably binds to CD40 and GPC3 expressed on different cells.

Examples of the cell that expresses CD40 include antigen-presenting cells such as B dendritic cells (DC), macrophages, and monocytes, cancer cells such as Ramos cells, and the like.

Examples of the cell that expresses GPC3 include cancer cells included in hepatocellular carcinoma, malignant melanoma, clear cell ovarian cancer, yolk sac tumor, choriocarcinoma, neuroblastoma, hepatoblastoma, Wilms tumor, testicular germ cell tumor, liposarcoma, or the like.

As the bispecific antibody or the bispecific antibody fragment thereof of the present invention, for example, a bispecific antibody or a bispecific antibody fragment thereof having a CD40 agonistic activity is exemplified. As the bispecific antibody or the bispecific antibody fragment thereof of the present invention, a bispecific antibody or a bispecific antibody fragment thereof that does not exhibit a CD40 agonistic activity in the absence of a GPC3 molecule or a cell that expresses GPC3 (a GPC3-expressing cell), but exhibits a CD40 agonistic activity only in the presence of a GPC3 molecule or a cell that expresses GPC3 is preferred. Such a bispecific antibody or a bispecific antibody fragment thereof activates CD40 only in a lesion site such as a cancer in which a cell that expresses GPC3 is present, and therefore is preferred from the viewpoint that an adverse effect caused by systemic CD40 activation does not occur.

In the bispecific antibody of the present invention, the antigen binding domain to CD40 may be any as long as it is derived from a non-agonistic anti-CD40 antibody and specifically recognizes and binds to CD40. The non-agonistic anti-CD40 antibody refers to an antibody that specifically recognizes and binds to CD40, but does not have an agonistic activity. For example, a polypeptide comprising CDR of an anti-CD40 antibody that has a binding ability to CD40, but does not affect the agonistic activity or antagonistic activity, a polypeptide comprising CDR of a non-agonistic anti-CD40 antibody, an antibody fragment of a non-agonistic anti-CD40 antibody, a polypeptide comprising a variable region of a non-agonistic anti-CD40 antibody, and the like are exemplified. As the antigen binding domain to CD40, a polypeptide comprising a variable region of a non-agonistic anti-CD40 antibody is preferred, and Fab of a non-agonistic anti-CD40 antibody is more preferred. The Fab of an anti-CD40 antibody is sometimes referred to as anti-CD40 Fab.

The CD40 agonistic activity of the bispecific antibody or the bispecific antibody fragment thereof of the present invention refers to an activity to induce activation of an antigen-presenting cell, an activity to induce cell death of a tumor cell, or the like by binding of the bispecific antibody or the bispecific antibody fragment thereof to CD40 on a cell to cause signaling through the CD40.

In the present invention, if the expression level of CD95, CD80, CD83, CD86, and/or HLA-ABC, or the like is increased as compared with the negative control when an antibody or a bispecific antibody binds to a cell that expresses CD40, it is determined that the antibody or the bispecific antibody has an agonistic activity. On the other hand, if the expression level of CD95, CD80, CD83, CD86, and/or HLA-ABC, or the like is not increased as compared with the negative control when an antibody or a bispecific antibody binds to a cell that expresses CD40, it is determined that the antibody or the bispecific antibody does not have an agonistic activity.

The CD40 agonistic activity can be confirmed by, for example, evaluating an increase in the expression level of CD95 on a cell that expresses CD40 such as a human Burkitt's lymphoma cell line Ramos cell (JCRB, No: JCRB9119), An antibody or a bispecific antibody capable of enhancing the expression level of CD95 when it binds to a cell that expresses CD40 (CD40-expressing cell) has an agonistic activity. Further, the CD40 agonistic activity can be confirmed by, for example, evaluating the expression level of CD80, CD83, or CD86, each of which is a costimulatory molecule. or HLA-ABC using an immature dendritic cell. When the expression level of CD80, CD83, or CD86, or HLA-ABC in a dendritic cell that expresses CD40 by binding of an anti-CD40 antibody or a CD40 bispecific antibody, it is found that the antibody or the bispecific antibody has an agonistic activity.

That is, as the bispecific antibody or the bispecific antibody fragment thereof of the present invention, specifically, a bispecific antibody or a bispecific antibody fragment thereof that induces activation of an antigen-presenting cell and/or cell death of a tumor cell, each of which expresses CD40, when it binds to GPC3 and CD40 in the presence of a cell that expresses GPC3, or the like is exemplified.

In the present invention, the CD40 antagonistic activity refers to an activity to inhibit activation of CD40 by a CD40 ligand or a CD40 agonist, or the like. For example, it refers to an activity to inhibit induction of CD40 signaling by binding of a CD40 ligand or a CD40 agonist to CD40, or the like.

The CD40 antagonistic activity of an antibody can be confirmed by, for example, inhibition of induction of the expression of CD95 by a CD40 ligand against a cell that expresses CD40 such as a Ramos cell by adding the antibody.

The number of binding domains to a certain antigen included in a single molecule of a bispecific antibody refers to a binding valence. For example, in the present invention, when a single molecule of a bispecific antibody has two antigen binding domains that bind to CD40 and two antigen binding domains that bind to GPC3, the bispecific antibody divalently binds to each of CD40 and GPC3.

In the present invention, the bispecific antibody per molecule may bind to CD40 or GPC3 in whatever valence, but is preferably binds at least divalently to each of CD40 and GPC3.

As the bispecific antibody of the present invention, a bispecific antibody having a structure in which to the C terminus of a heavy chain of the IgG portion comprising the first antigen binding domain, the second antigen binding domain binds either directly or via a linker is exemplified, but it is not limited thereto. The first and second antigen binding domains can be replaced with each other as appropriate, and a bispecific antibody having a desired activity can be produced. For example, in the bispecific antibody of the present invention, the positions of an antigen binding domain that binds to CD40 (also referred to as an antigen binding domain to CD40) and an antigen binding domain that binds to GPC3 (also referred to as an antigen binding domain to GPC3) can be selected as appropriate. As the bispecific antibody of the present invention, one in which the first antigen binding domain is an antigen binding domain to CD40 and the second antigen binding domain is an antigen binding domain to GPC3 is preferred.

The IgG portion in the present invention is IgG included in the bispecific antibody of the present invention or IgG with a modified Fc region, and has a heterotetrametric structure obtained by assembling two heterodimers consisting of one light chain and one heavy chain, and comprises the first antigen binding domain.

The heavy chain constant region of the IgG portion may be in any subclass such as IgG1, IgG2, IgG3, or IgG4. Further, part of the amino acid sequence thereof may be deleted, added, substituted, and/or inserted. In addition, all or part of the fragments of the amino acid sequence composed of CH1, a hinge, CH2, and CH3 of the heavy chain of IgG can be appropriately combined and used. Further, the amino acid sequences thereof can also be used by partially deleting or changing the order. In addition, the subclass of IgG used for the constant region of the IgG portion is not particularly limited, but is preferably IgG4, or an IgG4 mutant obtained by substituting a Ser residue at position 228 in the heavy chain constant region of IgG4 with Pro, and a Leu residue at position 235 therein with Asn (hereinafter referred to as IgG4PE), or an IgG4 mutant obtained by substituting a Ser residue at position 228 in the heavy chain constant region of IgG4 with Pro, a Lou residue at position 235 therein with Asn, and an Arg residue at position 409 therein with Lys (hereinafter referred to as IgG4PE R409K).

For example, an IgG portion in which the heavy chain constant region (CH1-hinge-CH2-CH3 in this order from the N-terminal side) includes IgG4PE R409K containing the amino acid sequence of SEQ ID NO: 77 is preferred.

Two variable regions included in the IgG portion contained in the bispecific antibody of the present invention preferably recognize the same antigen. Further, they preferably have the same structure and the same amino acid sequence.

The first antigen binding domain in the present invention comprises the antigen binding domain of the IgG portion and specifically binds to CD40 or GPC3.

The second antigen binding domain in the present invention is a portion constituting the bispecific antibody of the present invention, and binds to the C terminus of a heavy chain of the IgG portion described above either directly or via a linker. The second antigen binding domain comprises an antigen binding site to CD40 or GPC3. The second antigen binding domain need only be a polypeptide that specifically binds to CD40 or GPC3, but is preferably one comprising a variable region of an antibody, and is particularly preferably Fab. Further, a ligand molecule or a receptor molecule for a cell surface antigen can also be used similarly.

The bispecific antibody of the present invention can be produced by a known production technique ([Nature Protocols, 9, 2450-2463 (2014)], WO 1998/050431, WO 2001/7734, WO 2002/002773, and WO 2009/131239) or the like.

In the present invention, it is possible to appropriately select the position of V of an anti-CD40 antibody (which means VH derived from an anti-CD40 antibody) and the position of VH of an anti-GPC3 antibody (which means VH derived from an anti-GPC3 antibody) included in the bispecific antibody. For example, in the bispecific antibody having the structure illustrated in FIG. 1, the VH of the anti-CD40 antibody may be located closer to the N-terminal side or closer to the C-terminal side than the VH of the anti-GPC3 antibody, but is preferably located closer to the N-terminal side than the VH of the anti-GPC3 antibody.

In the present invention, the VLs included in the bispecific antibody may be the same VL or different VLs. The VH of the bispecific antibody that is a bispecific antibody comprising the same VL and that can bind to two different antigens or different two epitopes on the same antigen need only be VH optimized or modified so that each variable region can bind to a corresponding specific antigen or epitope, and for example, it is possible to select appropriate VH using a method such as screening with amino acid modification, or phage display.

The VL included in the bispecific antibody of the present invention may be any as long as it is the VL of an anti-CD40 antibody or an anti-GPC3 antibody, however, VL comprising CDRs 1, 2, and 3 comprising the amino acid sequences of SEQ ID NOS: 11, 12, and 13, respectively, and VL comprising the amino acid sequence of SEQ ID NO: 10 are preferred.

The VH included in the bispecific antibody of the present invention may be any as long as it is the VH of an anti-CD40 antibody or an anti-GPC3 antibody, however, as the VH of an anti-CD40 antibody, VH comprising CDRs 1, 2, and 3 comprising the amino acid sequences of SEQ ID NOS: 16, 17, and 18, respectively, and VH comprising the amino acid sequence of SEQ ID NO: 15 are preferred. As the VH of an anti-GPC3 antibody included in the bispecific antibody of the present invention, VH comprising CDRs 1 to 3 comprising the amino acid sequences of SEQ ID NOS: 42 to 44, respectively, VH comprising CDRs 1 to 3 comprising the amino acid sequences of SEQ ID NOS: 52 to 54, respectively, VH comprising the amino acid sequence of SEQ ID NO: 41, or VH comprising the amino acid sequence of SEQ ID NO: 51 is preferred.

In the present invention, the linker refers to a chemical structure for binding multiple antigen binding domains, and is preferably a polypeptide. As the linker used in the bispecific antibody of the present invention, for example, a linker comprising all or part of the amino acid sequence of an immunoglobulin domain, a linker comprising a known GS linker such as GGGGS or a repetitive sequence thereof, and other known peptide linkers, and the like are exemplified.

In the present invention, the immunoglobulin domain includes a peptide that has an amino acid sequence similar to that of an immunoglobulin and is composed of about 100 amino acid residues in which at least two cysteine residues are present as a smallest unit. In the present invention, the immunoglobulin domain also includes a polypeptide including multiple immunoglobulin domains, each of which is the smallest unit described above. Examples of the immunoglobulin domain include VH, CH1, CH2, and CH3 of an immunoglobulin heavy chain, and VL and CL of an immunoglobulin light chain, and the like.

The animal species of the immunoglobulin is not particularly limited, hut is preferably a human. In addition, the subclass of the constant region of the immunoglobulin heavy chain may be any of IgD, IgM, IgG1, IgG2, IgG3, IgG4, IgA1, IgA2, and IgE, and preferably, IgG-derived and IgM-derived subclasses are exemplified. In addition, the subclass of the constant region of the immunoglobulin light chain may be either of κ and λ.

Further, the immunoglobulin domain is also present in proteins other than the immunoglobulin, and for example, immunoglobulin domains included in proteins belonging to the immunoglobulin superfamily such as a major histocompatibility antigen (MHC), CD1, B7, and a T cell receptor (TCR) are exemplified. As the immunoglobulin domain used for the bispecific antibody of the present invention, any immunoglobulin domain can also be applied.

In the case of a human antibody, CH1 refers to a region having the amino acid sequence at positions 118 to 215 indicated in the EU index. Similarly, CH2 refers to a region having the amino acid sequence at positions 231 to 340 indicated in the EU index of Kabat et al., and CH3 refers to a region having the amino acid sequence at positions 341 to 446 indicated in the EU index of Kabat et al. Between CH1 and CH2, an amino acid region rich in flexibility called a hinge region (hereinafter sometimes referred to as a hinge) is present. The hinge region refers to a region having the amino acid sequence at positions 216 to 230 indicated in the EU index of Kabat et al.

The CL refers to a region having the amino acid sequence at positions 108 to 214 indicated by Kabat numbering in the case of the K chain of a human antibody, and refers to a region having the amino acid sequence at positions 108 to 215 in the case of the λ chain, The bispecific antibody of the present invention may have the second antigen binding domains, one at the C terminus of each of the two heavy chains of the IgG portion, or may have one second antigen binding domain only at the C terminus of one heavy chain, but preferably have the second antigen binding domains, one at the C terminus of each of the two heavy chains. When the bispecific antibody has the second antigen binding domains, one at the C terminus of each of the two heavy chains, these may be the same or different, but are preferably the same.

When the second antigen binding domain of the present invention is Fab, what binds to the heavy chain C terminus of the IgG portion may be either VH-CH1 or VL-CL of the Fab, but is preferably VH-CH1. Further, when the second antigen binding domain is Fab and two second antigen binding domains are included in the bispecific antibody of the present invention, one of those binding to the heavy chain C terminus of the IgG portion may be VH-CH1 of the Fab and the other may be VL-CL of the Fab, or both may be VH CH1 of the Fab or both may be VL-CL of the Fab, but it is preferred that both are VH-CH1 of the Fab.

When the second antigen binding domain includes Fab, a light chain included in the Fab and a light chain of the IgG portion may be the same or different, but are preferably the same. Further, the light chain may be either a λ chain or a κ chain, but is preferably a κ chain.

A bispecific antibody or a bispecific antibody fragment thereof, in which one or more of amino acid residues are deleted, added, substituted, or inserted in the amino acid sequence constituting the bispecific antibody or the bispecific antibody fragment thereof of the present invention, and which has the same activity as that of the bispecific antibody or the bispecific antibody fragment thereof described above, is also included in the bispecific antibody or the bispecific antibody fragment thereof of the present invention.

The number of amino acids to be deleted, substituted, inserted, and/or added is one or more, and is not particularly limited, and is a number such that deletion, substitution, insertion, or addition can be carried out using a well-known technique such as a site-specific mutagenesis method described in Molecular Cloning, The Second Edition, Cold Spring Harbor Laboratory Press (1989), Current Protocols in Molecular Biology, John Willy & Sons (1987-1997), Nucleic Acids Research, 10, 6487 (1982), Proc. Natl. Acad. Sci., USA, 79, 6409 (1982), Gene, 34, 315 (1985), Nucleic Acids Research, 13, 4431 (1985), Proc. Natl. Acad. Sci USA, 82, 488 (1985), or the like. For example, it is generally one to several tens, preferably 1 to 20, more preferably 1 to 10, and further more preferably 1 to 5.

The above description that one or more of amino acid residues in the amino acid sequence of the bispecific antibody of the present invention are deleted, substituted, inserted, or added indicates as follows. The description means that there is a deletion, substitution, insertion, or addition of one or multiple amino acid residues in arbitrary one or multiple amino acid sequences in the same sequence. Further, such a deletion, substitution, insertion, or addition may sometimes occur simultaneously, and the amino acid residues to be substituted, inserted, or added may be either a natural type or an unnatural type.

Examples of the natural amino acid residue include L-alanine, L-asparagine, L-aspartic acid, L-glutamine, L-glutamic acid, glycine, L-histidine, L-isoleucine, L-leucine, L-lysine, L-arginine, L-methionine, L-phenylalanine, L-proline, L-serine, L-threonine, L-tryptophan, L-tyrosine, L-valine, L-cysteine, and the like.

Hereinafter, preferred examples of mutually substitutable amino acid residues are shown. Amino acid residues included in the same group can be mutually substituted.
- group A: leucine, isoleucine, norleucine, valine, norvaline, alanine, 2-aminobutanoic acid, methionine, O-methylserine, t-butyl glycine, t-butyl alanine, and cyclohexylalanine
- group B: aspartic acid, glutamic acid, isoaspartic acid, isoglutamic acid, 2-aminoadipic acid, and 2-aminosuberic acid
- group C: asparagine and glutamine
- group D: lysine, arginine, ornithine, 2,4-diaminobutanoic acid, and 2,3-diaminopropionic acid
- group E: proline, 3-hydroxyproline, and 4-hydroxyproline
- group F: serine, threonine, and homoserine
- group G: phenylalanine and tyrosine The bispecific antibody or the bispecific antibody fragment thereof of the present invention also includes an antibody containing any amino acid residue subjected to a post-translational modification.

As the bispecific antibody of the present invention, specifically, any one bispecific antibody selected from the group consisting of the following (1) to (3), and the like is exemplified:
(1) a bispecific antibody in which to the heavy chain C terminus of the IgG portion comprising the first antigen binding domain, the second antigen binding domain being Fab binds directly, and of the first antigen binding domain and the second antigen binding domain, the first antigen binding domain is an antigen binding domain that binds to CD40 and the second antigen binding domain is an antigen binding domain that binds to GPC3;
(2) a bispecific antibody in which the antigen binding domain that binds to CD40 comprises CDRs 1 to 3 of VH and CDRs 1 to 3 of VL derived from an anti-CD40 antibody, and the antigen binding domain that binds to GPC3 comprises CDRs 1 to 3 of VH and CDRs 1 to 3 of VL derived from an anti-GPC3 antibody; and
(3) a bispecific antibody in which the antigen binding domain that binds to CD40 comprises VH and VL derived from an anti-CD40 antibody, and the antigen binding domain that binds to GPC3 comprises VH and VL derived from an anti-GPC3 antibody.

In the bispecific antibody described in the above (2), the CDRs 1 to 3 of VL derived from an anti-CD40 antibody and the CDRs 1 to 3 of VL derived from an anti-GPC3 antibody may be mutually the same or different, respectively, but are preferably the same, respectively.

Further, in the bispecific antibody described in the above (3), the VL derived from an anti-CD40 antibody and the VL derived from an anti-GPC3 antibody may be mutually the same or different, but are preferably the same.

The anti-CD40 antibody described in the above (2) and (3) may or may not have a CD40 agonistic activity, but is preferably an anti-CD40 antibody that does not have a CD40 agonistic activity (a non-agonistic anti-CD40 antibody). As the bispecific antibody of the present invention, for example, a bispecific antibody in which the antigen binding domain that binds to CD40 comprises CDRs 1 to 3 of VH and CDRs 1 to 3 of VL derived from a non-agonistic anti-CD40 antibody, a bispecific antibody comprising VH and VL derived from a non-agonistic anti-CD40 antibody, and the like are exemplified.

Further, each of the anti-CD40 antibodies in the above (2) and (3) may or may not have a CD40 antagonistic activity, but is preferably an anti-CD40 antibody that does not have a CD40 antagonistic activity (a non-antagonistic anti-CD40 antibody).

As an example of the antigen binding domain that binds to CD40 in the bispecific antibody of the present invention, an antigen binding domain comprising VH comprising CDRs 1 to 3 comprising the amino acid sequences of SEQ ID NOS: 16 to 18, respectively, and VL comprising CDRs 1 to 3 comprising the amino acid sequences of SEQ ID NOS: 11 to 13, respectively, is exemplified.

The antigen binding domain that binds to CD40 in the bispecific antibody of the present invention also comprises an antigen binding domain comprising the amino acid sequences of CDRs 1 to 3 of VH and VL having at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98%, or at least 99% homology with the corresponding amino acid sequences of CDRs 1 to 3 of VH of SEQ ID NOS: 16 to 18, respectively, and amino acid sequences of CDRs 1 to 3 of VL of SEQ ID NOS: 11 to 13, respectively.

The antigen binding domain that binds to CD40 in the bispecific antibody of the present invention also comprises an antigen binding domain described in the following (i) or (ii):
(i) an antigen binding domain that binds to CD40 competitively with an anti-CD40 antibody comprising VL comprising CDRs 1 to 3 comprising the amino acid sequences of SEQ ID NOS: 11 to 13, respectively, and VH comprising CDRs 1 to 3 comprising the amino acid sequences of SEQ ID NOS: 16 to 18, respectively; or
(ii) an antibody binding domain that binds to the same epitope as that for an anti-CD40 antibody comprising VL comprising CDRs 1 to 3 comprising the amino acid sequences of SEQ ID NOS: 11 to 13, respectively, and VH comprising CDRs 1 to 3 comprising the amino acid sequences of SEQ ID NOS: 16 to 18, respectively.

As another example of the antigen binding domain that binds to CD40 in the bispecific antibody of the present invention, an antigen binding domain comprising VL comprising the amino acid sequence of SEQ ID NO: 10 and VH comprising the amino acid sequence of SEQ ID NO: 15 is exemplified.

As an example of the antigen binding domain that binds to GPC3 in the bispecific antibody of the present invention, an antigen binding domain comprising VL comprising CDRs 1 to 3 comprising the amino acid sequences of SEQ ID NOS: 11 to 13, respectively, and any one VH selected from the following (1a) to (1g) is exemplified:

(1a) VH comprising CDRs 1 to 3 comprising the amino acid sequences of SEQ ID NOS: 42 to 44, respectively;
(1b) VH comprising CDRs 1 to 3 comprising the amino acid sequences of SEQ ID NOS: 47 to 49, respectively;
(1c) VR comprising CDRs 1 to 3 comprising the amino acid sequences of SEQ ID NOS: 52 to 54, respectively;
(1d) VU comprising CDRs 1 to 3 comprising the amino acid sequences of SEQ ID NOS: 57 to 59, respectively;
(1e) VH comprising CDRs 1 to 3 comprising the amino acid sequences of SEQ ID NOS: 62 to 64, respectively;
(1f) VH comprising CDRs 1 to 3 comprising the amino acid sequences of SEQ ID NOS: 67 to 69, respectively; and
(1g) VH comprising CDRs 1 to 3 comprising the amino acid sequences of SEQ ID NOS: 72 to 74, respectively.

The antigen binding domain that binds to GPC3 in the bispecific antibody of the present invention also comprises an antigen binding domain comprising the amino acid sequences of CDRs 1 to 3 of VH and VL having at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98%, or at least 99% homology with the corresponding amino acid sequences of CDRs 1 to 3 of VH of any one of the above (1a) to (1g), and amino acid sequences of CDRs 1 to 3 of VL of SEQ ID NOS: 11 to 13, respectively.

The antigen binding domain that binds to GPC3 in the bispecific antibody of the present invention also includes an antigen binding domain described in the following (i) or (ii):
(i) an antigen binding domain that binds to GPC3 competitively with an anti-GPC3 antibody comprising VL comprising CDRs 1 to 3 comprising the amino acid sequences of SEQ ID NOS: 11 to 13, respectively, and VR of any one of the above (1a) to (1g); or
(ii) an antibody binding domain that binds to the same epitope as that for an anti-GPC3 antibody comprising VL comprising CDRs 1 to 3 comprising the amino acid sequences of SEQ NOS: 11 to 13, respectively, and VH of any one of the above (1a) to (1g).

As the antigen binding domain that binds to GPC3 in the bispecific antibody of the present invention, an antigen binding domain that binds to an epitope contained in the amino acid sequence at positions 192 to 358 in the full-length amino acid sequence of human GPC3 (SEQ ID NO: 129) is exemplified.

As another example of the antigen binding domain that binds to GPC3 in the bispecific antibody of the present invention, an antigen binding domain comprising VL comprising the amino acid sequence of SEQ ID NO: 10 and VH comprising the amino acid sequence of SEQ ID NO: 41, 46, 51, 56, 61, 66, or 71 is exemplified.

As one embodiment of the present invention, a bispecific antibody, which comprises an IgG portion comprising a first antigen binding domain, and also comprises a second antigen binding domain, and in which the second antigen binding domain is Fab, and to the heavy chain C terminus of the IgG portion, VH-CH1 of the Fab binds either directly or via a linker, is exemplified.

Further, as one embodiment of the present invention, a bispecific antibody, which comprises an IgG portion comprising a first antigen binding domain, and also comprises a second antigen binding domain, and in which the second antigen binding domain is Fab, and to the heavy chain C terminus of the IgG portion, VL-CL of the Fab binds either directly or via a linker, is also exemplified.

As one embodiment of the present invention, a bispecific antibody, which comprises an IgG portion comprising a first antigen binding domain to CD40, and also comprises a second antigen binding domain to GPC3, is exemplified.

As one embodiment of the present invention, a bispecific antibody, which comprises IgG portion comprising a first antigen binding domain to GPC3, and also comprises a second antigen binding domain to CD40, is also exemplified.

As a more specific example of the bispecific antibody of the present invention, the following (A) or (B) is exemplified.

(A) a bispecific antibody, which comprises the following (i) and (ii), and in which the Fab described in (ii) binds either directly or via a linker to the heavy chain C terminus of the IgG portion described in (i):
(i) an IgG portion comprising an antigen binding domain that comprises VL comprising CDRs 1 to 3 comprising the amino acid sequences of SEQ ID NOS: 11 to 13, respectively, and VH comprising CDRs 1 to 3 comprising the amino acid sequences of SEQ ID NOS: 16 to 18, respectively, and that binds to CD40; and
(ii) Fab comprising an antigen binding domain that comprises VL comprising CDRs 1 to 3 comprising the amino acid sequences of SEQ ID NOS: 11 to 13, respectively, and any one VH selected from the following (2a) to (2g), and that binds to GPC3:
(2a) VH comprising CDRs 1 to 3 comprising the amino acid sequences of SEQ ID NOS: 42 to 44, respectively
(2b) VH comprising CDRs 1 to 3 comprising the amino acid sequences of SEQ ID NOS: 47 to 49, respectively;
(2c) VH comprising CDRs 1 to 3 comprising the amino acid sequences of SEQ ID NOS: 52 to 54, respectively;
(2d) VH comprising CDRs 1 to 3 comprising the amino acid sequences of SEQ ID NOS: 57 to 59, respectively;
(2e) VH comprising CDRs 1 to 3 comprising the amino acid sequences of SEQ ID NOS: 62 to 64, respectively;
(2f) VH comprising CDRs 1 to 3 comprising the amino acid sequences of SEQ ID NOS: 67 to 69, respectively; and
(2g) VH comprising CDRs 1 to 3 comprising the amino acid sequences of SEQ ID NOS: 72 to 74, respectively.

(B) a bispecific antibody, which comprises the following (i) and (ii) and in which the Fab described in (ii) binds either directly or via a linker to the heavy chain C terminus of the IgG portion described in (i):
(i) an IgG portion comprising an antigen binding domain that comprises VL comprising the amino acid sequence of SEQ ID NO: 10, and VH comprising the amino acid sequence of SEQ ID NO: 15, and that binds to CD40; and
(ii) Fab comprising an antigen binding domain that comprises VL comprising the amino acid sequence of SEQ ID NO: 10, and VH comprising the amino acid sequence of SEQ ID NO: 41, 46, 51, 56, 61, 66, or 71, and that binds to GPC3.

As the bispecific antibody (A) or (B) described above, what binds to the heavy chain C terminus of the IgG portion either directly or via a linker may be either VL-CL or VH-CH1 of the Fab, but is preferably VH-CH1. Further, as the bispecific antibody (A) or (B) described above, the Fab may bind to the heavy chain C terminus of the IgG portion either directly or via a linker, but preferably directly.

As one embodiment of the present invention, a bispecific antibody, which comprises an IgG portion comprising a first antigen binding domain, and also comprises a second antigen binding domain, and in which the second antigen binding domain binds to the heavy chain C terminus of the IgG portion either directly or via a linker, and the heavy chain constant region of the IgG portion is human IgG4 or a modified human IgG4, is exemplified. As a more preferred embodiment of the present invention, a bispecific antibody, in which the heavy chain constant region is IgG4PE or IgG4PE R409K, is exemplified. As a specific example of the amino acid sequence of the heavy chain constant region of the IgG4PE R409K, the amino acid sequence of SEQ ID NO: 77 is exemplified.

Specific examples of the bispecific antibody of the present invention include CA-R1090-GpS1019-FL, Ct-R1090-GpA6005-FL, Ct-R1090-GpA6014-FL, Ct-R1090-GpA6062-FL, Ct-R1090-GpS3003, Ct-R1090-GPngs18, Ct-R1090-GPngs62, and the like. Additional specific examples of the bispecific antibody of the present invention similarly include Ct-GpS1019-R1090, Ct-GpA6005-R1090, Ct-GpA6014-R1090, Ct-GpA6062-R1090, Ct-GpS3003-R1090, Ct-GPngs18-R1090, Ct-GPngs62-R1090, and the like.

The bispecific antibody or the bispecific antibody fragment thereof of the present invention also includes an antibody or a bispecific antibody fragment thereof having an effector activity.

The effector activity refers to an antibody-dependent cellular cytotoxicity activity that is caused via the Fc region of the antibody, and examples thereof include an antibody-dependent cellular cytotoxicity activity (ADCC activity), a complement-dependent cytotoxicity activity (CDC activity), an antibody-dependent cellular phagocytosis activity (ADCP activity) that is caused by phagocytes such as macrophages or dendritic cells, an opsonin effect, and the like.

In the present invention, the ADCC activity and the CDC activity can be measured using a known measurement method [Cancer Immunol. Immunother., 36, 373 (1993)].

The ADCC activity refers to an activity in which an antibody having bound to an antigen on a target cell activates an immune cell (a natural killer cell or the like) when the antibody binds to an Fc receptor of the immune cell via the Fc region of the antibody so as to damage the target cell.

The Fc receptor (FcR) is a receptor that binds to the Fc region of the antibody, and induces various effector activities by binding of the antibody. Each FcR corresponds to the subclass of an antibody, and IgG, IgE, IgA, and IgM bind specifically to FcγR, FcεR, FcαR, and FcμR, respectively. Further, in the FcγR, there are subtypes of FcγRI (CD64), FcγRII (CD32), and FcγRIII (CD16), and the subtypes have isoforms of FcγRIA, FcγRIB, FcγRIC, FcγRIIA, FcγRIIB, FcγRIIC, FcγRIIIA, and FcγRIIIB, respectively. The different types of FcγRs are present on different cells [Annu. Rev. Immunol. 9: 457-492 (1991)]. In humans, FcγRIIIB is expressed specifically in neutrophils, and FcγRIIIA is expressed in monocytes, natural killer cells (NK cells), macrophages, and some T cells. An NK cell-dependent ADCC activity is induced through the binding of the antibody to FcγRIIIA.

The CDC activity refers to an activity in which an antibody having bound to an antigen on a target cell activates a series of cascades (complement activation pathways) composed of complement-related proteins in the blood so as to damage the target cell. In addition, a protein fragment generated by the activation of the complement induces the migration and activation of an immune cell. The cascade of CDC activity starts when C1q first binds to the Fc region, and subsequently binds to C1r and C1s that are two serine proteases so as to form a C1 complex.

The CDC activity or the ADCC activity of the bispecific antibody or the bispecific antibody fragment thereof of the present invention against an antigen-expressing cell can be evaluated by a known measurement method [Cancer Immunol. Immunother., 36, 373 (1993)].

As a method for controlling the effector activity of the bispecific antibody of the present invention, a method for controlling the amount of fucose (also referred to as core fucose) that is α-1,6-linked to N-acetylglucosamine (GlcNAc) present at the reducing end of an N-linked complex sugar chain that binds to asparagine (Asn) at position 297 of the Fc region (a constant region composed of CH2 and CH3 domains) of the antibody (WO 2005/035586, WO 2002/31140, and WO 00/61739), a method for controlling by modifying an amino acid residue of the Fc region of the antibody (WO 00/42072), and the like are known.

The ADCC activity of the antibody can be increased or decreased by controlling the amount of core fucose to be added to the bispecific antibody. For example, as a method for decreasing the content of fucose that binds to the N-linked complex sugar chain bound to Fc of the antibody, by expressing the bispecific antibody using an α1,6-fucosyltransferase gene-deficient host cell, the bispecific antibody having a high ADCC activity can be obtained. On the other hand, as a method for increasing the content of fucose that binds to the N-linked complex sugar chain bound to Fc of the bispecific antibody, by expressing the antibody using a host cell transfected with an α1,6-fucosyltransferase gene, the bispecific antibody having a low ADCC activity can be obtained.

In addition, the ADCC activity or the CDC activity can be increased or decreased by modifying an amino acid residue in the Fc region of the bispecific antibody. For example, by using the amino acid sequence of the Fc region described in US Patent Application Publication No. 2007/0148165, the CDC activity of the bispecific antibody can be increased. Further, by performing an amino acid modification described in U.S. Pat. Nos. 6,737,056, 7,297,775, 7,317,091, or the like, the ADCC activity or the CDC activity can be increased or decreased.

Further, a bispecific antibody in which the effector activity is controlled may be obtained by combining the above-mentioned methods.

The stability of the bispecific antibody of the present invention can be evaluated by measuring the amount of an aggregate (oligomer) formed in a sample stored during a purification process or under certain conditions. That is, when the amount of the aggregate decreases under the same conditions, it is evaluated that the stability of the antibody has been improved. The amount of the aggregate can be measured by separating an aggregated antibody and a non-aggregated antibody using appropriate chromatography including gel filtration chromatography.

The productivity of the bispecific antibody of the present invention can be evaluated, by measuring the amount of an antibody produced from the antibody-producing cell in a culture solution. More specifically, the productivity can be evaluated by measuring the amount of the antibody contained in a culture supernatant obtained by removing the producing cell from the culture solution using an appropriate method such as an HPLC method or an ELISA method.

In the present invention, the antibody fragment is a protein that includes an antigen binding domain and has a binding activity to the antigen, In the present invention, examples of the antibody fragment include Fab, Fab', F(ab')$_2$, scFv, a diabody, dsFv, VHH, a peptide including CDR, and the like.

The Fab is an antibody fragment, which has a molecular weight of about 50,000 and has an antigen binding activity, and in which about a half of an H chain at the N-terminal side and the entire L chain are bound via a disulfide bond (S—S bond) among the fragments obtained by treating an IgG antibody with a protease papain (cleaved at an amino acid residue at position 224 in the H chain). The H chain of Fab including VH and CH1 is referred to as VH-CH1, and the L chain of Fab including VL and CL is referred to as VL-CL.

The F(ab')$_2$ is an antibody fragment, which has a molecular weight of about 100,000 and has an antigen binding activity, and is slightly larger than a molecule obtained by binding Fabs via an S—S bond in the hinge region among the fragments obtained by treating IgG with a protease pepsin (cleaved at an amino acid residue at position 234 in the H chain).

The Fab' is an antibody fragment, which has a molecular weight of about 50,000 and has an antigen binding activity, and in which an S—S bond in the hinge region of the above F(ab')$_2$ is cleaved.

The scFv is a VH-P-VL or VL-P-VH polypeptide in which one VH and one VL are linked using an appropriate peptide linker (P) of 12 or more residues, and is an antibody fragment having an antigen binding activity.

The diabody is an antibody fragment in which says having the same or different antigen binding specificity form a dimer, and is an antibody fragment having a divalent antigen binding activity to the same antigen or antigen binding activities each specific for different antigens.

The dsFv refers to a molecule obtained by binding polypeptides in which one amino acid residue in each of VH and VL is substituted with a cysteine residue via an S—S bond between the cysteine residues.

The is also called a nanobody and refers to a heavy chain variable region in a VHH antibody, and can bind to an antigen without the presence of another polypeptide.

The VHH antibody is an antibody present in an animal of the family Camelidae such as an alpaca and an elasmobranch such as a shark, and does not include a light chain or CH1, and is composed only of a heavy chain.

The peptide comprising CDR is configured to comprise at least one region of CDRs of VH or VL. A peptide comprising multiple CDRs can be produced by binding CDRs either directly or via an appropriate peptide linker. The peptide comprising CDR can be produced by constructing DNAs encoding CDRs of VH and VL of the bispecific antibody of the present invention, inserting the DNAs into an expression vector for a prokaryote or an expression vector for a eukaryote, and then introducing the expression vector into a prokaryote or a eukaryote to cause expression. In addition, the peptide comprising CDR can also be produced by a chemical synthesis method such as an Fmoc method or a tBoc method.

The bispecific antibody fragment of the present invention is essentially composed of a portion of the structures of a bispecific antibody, and is a protein that includes two types of antigen binding domains having different antigen binding site specificities of the bispecific antibody, and has a binding activity to both of the two types of antigens.

An Fc region that includes an amino acid residue modification aiming at enhancing or eliminating the effector activity of the antibody, stabilizing the antibody, and controlling the blood half-life can also be used for the bispecific antibody of the present invention.

The bispecific antibody or the bispecific antibody fragment of the present invention includes a derivative of the bispecific antibody in which a radioisotope, a low-molecular weight drug, a high-molecular weight drug, a protein, an antibody drug, or the like is bound chemically or in a genetic engineering manner to the bispecific antibody or the bispecific antibody fragment thereof of the present invention.

The derivative of the bispecific antibody in the present invention can be produced by binding a radioisotope, a low-molecular weight drug, a high-molecular weight drug, an immunostimulant, a protein, an antibody drug, or the like to the N-terminal side or the C-terminal side of an H chain or an L chain of the bispecific antibody or the bispecific antibody fragment thereof of the present invention, an appropriate substituent or a side chain in the bispecific, antibody or the bispecific antibody fragment thereof, further, a sugar chain in the bispecific antibody or the bispecific antibody fragment thereof, or the like using a chemical method [Introduction to Antibody Engineering, Chijin Shokan Co., Ltd. (1994)].

Further, the derivative of the bispecific antibody in the present invention can be produced by a genetic engineering technique in which a DNA encoding the bispecific antibody or the bispecific antibody fragment thereof of the present invention is ligated to a DNA encoding a desired protein or antibody drug, the resultant is inserted into an expression vector, and the expression vector is introduced into an appropriate host cell to cause expression.

Examples of the radioisotope include $^{111}$In, $^{131}$I, $^{125}$I, $^{90}$Y, $^{64}$Cu, $^{99}$Tc, $^{77}$Lu, $^{211}$At, and the like. The radioisotope can be directly bound to the antibody by a chloramine T method or the like. In addition, a substance that chelates the radioisotope may be hound to the antibody. Examples of the chelating agent include 1-isothiocyanatobenzyl-3-methyldiethylenetriaminepentaacetic acid (MX-DTPA) and the like.

Examples of the low-molecular weight drug include anticancer agents such as an alkylating agent, a nitrosourea agent, an antimetabolite, an antibiotic, a plant alkaloid, a topoisomerase inhibitor, a hormonal therapy agent, a hormone antagonist, an aromatase inhibitor, a P-glycoprotein inhibitor, a platinum complex derivative, an M-phase inhibitor, or a kinase inhibitor [Clinical oncology, Japanese Journal of Cancer and Chemotherapy (1996)], anti-inflammatory agents such as a steroidal agent such as hydrocortisone or prednisone, a nonsteroidal agent such as aspirin or indomethacin, an immunomodulatory agent such as gold thiomalate or penicillamine, an immunosuppressive agent such as cyclophosphamide or azathioprine, an antihistamine agent such as chlorpheniramine maleate or clemastine [Inflammation and anti-inflammatory therapy, Ishiyaku Publishers, Inc. (1982)], and the like.

Examples of the anticancer agent include amifostine (Ethyol), cisplatin, dacarbazine (DTIC), dactinomycin, mechlorethamine (nitrogen mustard), streptozocin, cyclophosphamide, ifosfamide, carmustine (BCNU), lomustine (CCNU), doxorubicin (Adriamycin), epirubicin, gemcitabine, (Gemzar), daunorubicin, procarbazine, mitomycin, cytarabine, etoposide, 5-fluorouracil, fluorouracil, vinblastine, vincristine, bleomycin, daunomycin, peplomycin, estramustine, paclitaxel (Taxol), docetaxel (Taxotere), aldesleukin, asparaginase, busulfan, carboplatin, oxaliplatin, nedaplatin, cladribine, camptothecin, 10-hydroxy-7-ethyl-camptothecin (SN38), floxuridine, fludarabine, hydroxyurea, idarubicin, mesna, irinotecan (CPT-11), nogitecan, mitoxantrone, topotecan, leuprolide, megestrol, melphalan, mercaptopurine, hydroxycarbamide, plicamycin, mitotane, pegaspargase, pentostatin, pipobroman, tamoxifen, goserelin, leuprorelin, flutamide, teniposide, testolactone, thioguanine, thiotepa, uracil mustard, vinorelbine, chlorambucil, hydrocortisone, prednisolone, methylprednisolone, vindesines, nimustine, semustine, capecitabine, Tomudex, azacitidine, UFT, oxaloplatin, gefitinib (Iressa), imatinib (STI571), erlotinib, an FMS-like tyrosine kinase 3 (Flt3) inhibitor, a vascular endothelial growth factor receptor (VEGFR) inhibitor, a fibroblast growth factor receptor (FGFR) inhibitor, an epidermal growth factor receptor (EGFR) inhibitor such as Tarceva, radicicol, 17-allylamino-17-demethoxygeldanamycin, rapamycin, amsacrine, all-trans retinoic acid, thalidomide, lenalidomide, anastrozole, fadrozole, letrozole, exemestane, bucillamine, mizoribine, cyclosporine, hydrocortisone, bexarotene (Targretin), dexamethasone, a progestin, an estrogen, anastrozole (Arimidex), Leuplin, aspirin, indomethacin, celecoxib, azathioprine, penicillamine, gold thiomalate, chlorpheniramine maleate, chlorpheniramine, clemastine, tretinoin, bexarotene, arsenic, bortezomib, allopurinol, calicheamicin, ibritumomab tiuxetan, targretin, ozogamine, clarithromycin, leucovorin, ketoconazole, aminoglutethimide, suramin, methotrexate, or maytansinoid, or a derivative thereof, and the like.

Examples of a method for binding a low-molecular weight drug to the bispecific antibody of the present invention include a method for binding between amino groups of the drug and the antibody via glutaraldehyde, a method for binding an amino group of the drug to a carboxyl group of the antibody via a water-soluble carbodiimide, and the like.

Examples of the high-molecular weight drug include polyethylene glycol (PEG), albumin, dextran, polyoxyethylene, a styrene-maleic acid copolymer, polyvinylpyrrolidone, a pyran copolymer, hydroxypropyl methacrylamide, and the like. By binding such a high-molecular weight compound to the bispecific antibody or the bispecific antibody fragment of the present invention, an effect such as (1) improvement of the stability against various chemical, physical, or biological factors, (2) significant extension of the blood half-life, or (3) elimination of immunogenicity or suppression of antibody production is expected [Bioconjugate pharmaceutical, Hirokawa-Shoten Ltd. (1993)].

Examples of a method for binding PEG to the bispecific antibody of the present invention include a method for reacting with a PEGylation reagent, and the like [Bioconjugate pharmaceutical, Hirokawa-Shoten Ltd. (1993)]. Examples of the PEGylation reagent include a modifying agent to an ε-amino group of lysine (JP-A-S61-178926), a modifying agent to a carboxyl group of aspartic acid and glutamic acid (JP-A-S56-23587), a modifying agent to a guanidine group of arginine (JP-A-H2-117920), and the like.

The immunostimulant may be a natural product known as an immunoadjuvant, and specific examples thereof include a drug that enhances immunity such as a β(1→3) glucan (for example, lentinan or schizophyllan) or α-galactosylceramide (KRN7000), and the like.

Examples of the protein include a cytokine or a growth factor that activates immunocompetent cells such as NK cells, macrophages, or neutrophils, or a toxic protein, and the like.

Examples of the cytokine or the growth factor include interferon (hereinafter referred to as IFN)-α, IFN-β, and IFN-γ, interleukin (hereinafter referred to as IL)-2. IL-12, IL-15, IL-18, IL-21, and IL-23, a granulocyte colony stimulating factor (G-CSF), a granulocyte-macrophage colony stimulating factor (GM-CSF), a macrophage colony stimulating factor (M-CSF), and the like.

Examples of the toxic protein include ricin, diphtheria toxin, ONTAK, and the like, and also include a protein toxin in which a mutation is introduced into a protein for regulating toxicity.

A fusion antibody with a protein or an antibody drug can be produced by ligating a cDNA encoding the protein to a cDNA encoding the bispecific antibody or the bispecific antibody fragment of the present invention to construct a DNA encoding the fusion antibody, inserting the DNA into an expression vector for a prokaryote or a eukaryote, and then introducing the expression vector into a prokaryote or a eukaryote to cause expression.

When the derivative of the antibody is used for a detection method or a quantitative determination method, or as a reagent for detection, a reagent for quantitative determination, or a diagnostic agent, examples of the drug to be bound to the bispecific antibody or the bispecific antibody fragment thereof of the present invention include a labeling substance to be used for a general immunological detection or measurement method. Examples of the labeling substance include an enzyme such as alkaline phosphatase, peroxidase, or luciferase, a luminescent substance such as acridinium ester or lophine, or a fluorescent substance such as fluorescein isothiocyanate (FITC) or tetramethylrhodamine isothiocyanate (RITC), Alexa (registered trademark) Fluor 488, or R-phycoerythrin (R-PE), and the like.

In the present invention, the bispecific antibody and the bispecific antibody fragment thereof having a cytotoxicity activity such as a CDC activity or an ADCC activity are included. The CDC activity or the ADCC activity of the bispecific antibody or the bispecific antibody fragment thereof of the present invention against an antigen-expressing cell can be evaluated by a known measurement method [Cancer Immunol. Immunother., 36, 373 (1993)].

Further, the present invention relates to a composition containing a bispecific antibody or a bispecific antibody fragment thereof that specifically recognizes and binds to CD40 and GPC3 or a therapeutic agent for a disease associated with CD40 and/or GPC3, preferably a disease involved in a CD40 and GPC3-expressing cell, containing the bispecific antibody or the bispecific antibody fragment thereof as an active ingredient.

The disease associated with CD40 and/or GPC3 can be, for example, any as long as it is a disease associated with CD40 and/or GPC3, and for example, a malignant tumor, a cancer, and the like are exemplified.

In the present invention, examples of the malignant tumor and the cancer include, large intestine cancer, colorectal cancer, lung cancer, breast cancer, glioma, malignant melanoma (melanoma), thyroid cancer, renal cell carcinoma, leukemia, lymphoma, T cell lymphoma, stomach cancer, pancreatic cancer, cervical cancer, endometrial cancer, ovarian cancer, bile duct cancer, esophageal cancer, liver cancer, head and neck cancer, skin cancer, urinary tract cancer, bladder cancer, prostate cancer, choriocarcinoma, pharyngeal cancer, laryngeal cancer, mesothelioma, pleural tumor, arrhenoblastoma, endometrial hyperplasia, endometriosis, embryoma, fibrosarcoma, Kaposi sarcoma, angioma, cavernous hemangioma, angioblastoma, retinoblastoma, astrocytoma, neurofibroma, oligodendroglioma, medulloblastoma, neuroblastoma, glioma, rhabdomyosarcoma, glioblastoma, osteogenic sarcoma, leiomyosarcoma, Wilms tumor, and the like.

The therapeutic agent containing the bispecific antibody or the bispecific antibody fragment thereof of the present invention, or a derivative thereof may contain only the antibody or the bispecific antibody fragment thereof or a derivative thereof as an active ingredient, however, in general, it is preferably provided as a pharmaceutical preparation produced using an arbitrary method known in the technical field of pharmaceutics by mixing it together with one or more pharmacologically acceptable carriers.

As the route of administration, it is preferred to use the most effective route for the treatment, and for example, oral administration or parenteral administration such as intraoral, intra-airway, intrarectal, subcutaneous, intramuscular, or intravenous administration is exemplified. Above all, intravenous administration is preferred.

Examples of a dosage form include a spray, a capsule, a tablet, a powder, a granule, a syrup, an emulsion, a suppository, an injection, an ointment, a tape, and the like.

A dose or administration frequency varies depending on a target therapeutic effect, an administration method, a treatment duration, an age, a body weight, etc., but is generally 10 µg/kg to 10 mg/kg per day for an adult.

Further, the present invention relates to a reagent for detecting or measuring CD40 and/or GPC3, or a diagnostic agent for a disease associated with CD40 and/or GPC3, preferably a disease involved in a CD40 and GPC3-expressing cell, each of which contains the bispecific antibody or the bispecific antibody fragment thereof of the present invention. In addition, the present invention relates to a method for detecting or measuring CD40 and/or GPC3, a therapeutic method for a disease associated with CD40 and/or GPC3, preferably a disease involved in a CD40 and GPC3-expressing cell, or a diagnostic method for a disease associated with CD40 and/or GPC3, preferably a disease involved in a CD40 and GPC3-expressing cell, each of which uses the bispecific antibody or the bispecific antibody fragment thereof of the present invention.

Examples of a method for detecting or measuring the amount of CD40 and/or GPC3 in the present invention include known arbitrary methods. For example, an immunological detection or measurement method and the like are exemplified.

The immunological detection or measurement method is a method for detecting or measuring the amount of an antibody or the amount of an antigen using a labeled antigen or antibody. Examples of the immunological detection or measurement method include a radioimmunoassay method (RIA), an enzyme immunoassay method (EIA or ELISA), a fluorescence immunoassay method (FIA), a luminescent immunoassay method, a Western blotting method, a physicochemical method, and the like.

By detecting or measuring a cell expressing CD40 and/or GPC3 using the bispecific antibody or the bispecific antibody fragment thereof of the present invention, it is possible to diagnose a disease associated with CD40 and/or GPC3, preferably a disease involved in a CD40 and GPC3-expressing cell.

It is possible to use a known immunological detection method for detecting a cell expressing CD40 or GPC3, but for example, an immunoprecipitation method, an immunocytological staining method, an immunohistological staining method, or a fluorescent antibody staining method, and the like are exemplified. In addition, for example, a fluorescent antibody staining method such as an FMAT 8100 HTS system (manufactured by Applied Biosystems, Inc.), and the like are also exemplified.

A biological sample to be subjected to detection or measurement of CD40 and/or GPC3 in the present invention includes, for example, a tissue cell, blood, plasma, serum, pancreatic juice, urine, feces, a tissue fluid, a culture solution, and the like, and is not particularly limited as long as the sample may contain a cell expressing CD40 or GPC3.

The diagnostic agent containing the bispecific antibody or the bispecific antibody fragment thereof of the present invention, or a derivative thereof may contain a reagent for performing an antigen-antibody reaction or a reagent for detecting the reaction in accordance with a target diagnostic method. Examples of the reagent for performing an antigen-antibody reaction include a buffer, a salt, and the like.

Examples of the reagent for detection include a reagent, which is used for a general immunological detection or measurement method, such as a labeled secondary antibody that binds to the bispecific antibody or the bispecific antibody fragment thereof, or a derivative thereof, or a substrate corresponding to a label.

Hereinafter, a method for producing the bispecific antibody of the present invention, a method for evaluating the activity of the bispecific antibody or the bispecific antibody fragment thereof, and a therapeutic method and a diagnostic method for a disease using the bispecific antibody or the bispecific antibody fragment thereof will be specifically described.

1. Method for Producing Monoclonal Antibody

A method for producing a monoclonal antibody in the present invention includes the following operation steps. That is, (1) at least one of the purification of an antigen to be used as an immunogen and the production of a cell in which the antigen is overexpressed on the cell surface, (2) a step of preparing an antibody-producing cell by immunizing an animal with the antigen, followed by collecting the blood and examining an antibody titer thereof to determine when to resect the spleen or the like, (3) preparing a myeloma cell (myeloma), (4) fusing the antibody-producing cell with the myeloma, (5) screening a hybridoma group that produces a target antibody, (6) separating (cloning) a monoclonal cell from the hybridoma group, (7) in some cases, culturing the hybridoma for producing a monoclonal antibody in a large amount, or breeding an animal implanted with the hybridoma, (8) investigating the bioactivity of the monoclonal antibody produced in this manner, and the antigen binding specificity thereof, or examining the characteristics as a labeling reagent, and the like.

Hereinafter, a method for producing a monoclonal antibody that binds to CD40 and a monoclonal antibody that binds to GPC3, which are used for producing the bispecific antibody that binds to CD40 and GPC3 in the present invention, will be described in detail in accordance with the above-mentioned steps. The method for producing the antibodies is not limited thereto, and for example, an antibody-producing cell other than a spleen cell, and a myeloma can also be used.

(1) Purification of Antigen

A cell that expresses CD40 or GPC3 can be obtained by introducing an expression vector containing a cDNA encoding the full length of CD40 or GPC3 or a partial length thereof into *E. coli*, yeast, an insect cell, an animal cell, or the like. In addition, CD40 or GPC3 is purified from various human cultured tumor cells or human tissues or the like in which CD40 or GPC3 is expressed in a large amount and can be used as an antigen. In addition, the cultured tumor cell or the tissue or the like can also be used as an antigen as it is. Further, a synthetic peptide having a partial sequence of CD40 or GPC3 is prepared by a chemical synthesis method such as an Fmoc method or a tBoc method and can also be used as an antigen.

CD40 or GPC3 used in the present invention can be produced using a method described in Molecular Cloning, A Laboratory Manual, Second Edition, Cold Spring Harbor Laboratory Press (1989), or Current Protocols In Molecular Biology, John Wiley & Sons (1987-1997), or the like, for example, by expressing a DNA encoding the CD40 or the GPC3 in a host cell using the following method.

A recombinant vector is produced by inserting a full-length cDNA containing a region encoding CD40 or GPC3 downstream of a promoter in an appropriate expression vector. A DNA fragment that has been prepared based on the full-length cDNA and has an appropriate length and contains a region encoding a polypeptide may be used in place of the full-length cDNA. Subsequently, by introducing the obtained recombinant vector into a host cell suitable for the expression vector, a transformant that produces CD40 or GPC3 can be obtained.

As the expression vector, any vector can be used as long as it can autonomously replicate or can be integrated into a chromosome in a host cell to be used, and contains an appropriate promoter at a position capable of transcribing a DNA encoding CD40 or GPC3.

As the host cell, any cell, for example, a microorganism belonging to the genus *Escherichia* such as *E. coli* or the like, yeast, an insect cell, an animal cell, or the like, can be used as long as it can express a target gene.

When a prokaryote such as *E. coli* is used as the host cell, the recombinant vector is preferably a vector that can autonomously replicate in the prokaryote, and also contains a promoter, a ribosomal binding sequence, a DNA containing a region encoding CD40 or GPC3, and a transcription termination sequence. In addition, the transcription termination sequence is not necessarily needed for the recombinant vector, however, it is preferred that the transcription termination sequence is placed immediately downstream of a structural gene. Further, the recombinant vector may contain a gene that controls the promoter.

As the recombinant vector, it is preferred to use a plasmid in which the distance between a Shine-Dalgarno sequence, which is a ribosomal binding sequence, and a start codon is adjusted to an appropriate distance (for example, 6 to 18 nucleotides).

In addition, in the nucleotide sequence of the DNA encoding CD40 or GPC3, it is possible to substitute a nucleotide so that a codon becomes most suitable for expression in a host, and as a result, the production rate of the target CD40 or GPC3 can be improved.

As the expression vector, any vector can be used as long as it can exhibit its function in a host cell to be used, and examples thereof include pBTrp2, pBTac1, pBTac2 (each of which is manufactured by Roche Diagnostics K.K.), pKK233-2 (manufactured by Pharmacia Corporation), pSE280 (manufactured by Invitrogen, pGEMEX-1 (manufactured by Promega Corporation), pQE-8 (manufactured by QIAGEN, pKYP10 (JP-A-S58-110600), pKYP200 [Agricultural Biological Chemistry, 48, 669 (1984)], pLSA1 [Agric. Biol. Chem., 53, 277 (1989)], pGEL1 [Proc. Natl. Acad. Sci. USA, 82, 4306 (1985)], pBluescript II SK(−) (manufactured by Stratagene Corporation), pTrs30 [prepared from *E. coli* JM109/pTrS30 (FERM BP-5407)], pTrs32 [prepared from *E. coli* JM109/pTrS32 (FERM BP-5408)], pGHA2 [prepared from *E. coli* IGHA2 (FERM BP-400), JP-A-S60-221091], pGKA2 [prepared from *E. coli* IGKA2 (FERM BP-6798), JP-A-S60-221091], pTerm2 (U.S. Pat. No. 4,686,191, 4,939,094, or 5,160,735), pSupex, pUB110, pTP5, pC194, pEG400 [J. Bacteriol., 172, 2392 (1990)], pGEX (manufactured by Pharmacia Corporation), pET System (manufactured by Novagen, Inc.), pME18SFL3 (manufactured by Toyobo Co., Ltd.), and the like.

The promoter may be any as long as it functions in a host cell to be used. Examples thereof include promoters derived from *E. coli*, a phage, or the like such as a trp promoter (Ptrp), a lac promoter, a PL promoter, a PR promoter, or a T7 promoter. In addition, examples thereof also include artificially designed and modified promoters such as a tandem promoter in which two Ptrp promoters are linked in tandem, a tac promoter, a lacT7 promoter, or a let I promoter, and the like.

Examples of the host cell include *E. coli* XL1-Blue, *E. coli* XL2-Blue, *E. coli* DH1, *E. coli* MC1000, *E. coli* KY3276, *E. coli* W1485, *E. coli* JM109, *E. coli* HB101, *E. coli* No. 49, *E. coli* W3110, *E. coli* NY49, *E. coli* DH5α, and the like.

As a method for introducing a recombinant vector into a host cell, any method can be used as long as it is a method for introducing a DNA into a host cell to be used, and examples thereof include a method using calcium ions [Proc. Natl. Acad. Sci. USA, 69, 2110 (1972), Gene, 17, 107 (1982), Molecular & General Genetics, 168, 111 (1979)].

When an animal cell is used as a host, as the expression vector, any vector can be used as long as it functions in an animal cell, and examples thereof include pcDNAI (manufactured by Invitrogen, Inc.), pcDM8 (manufactured by Funakoshi Co., Ltd.), pAGE107 [JP-A-H3-22979; Cytotechnology, 3, 133 (1990)], pAS3-3 (JP-A-H2-227075), pCDM8 [Nature, 329, 840 (1987)], pcDNAI/Amp (manufactured by Invitrogen, Inc.), pcDNA3.1 (manufactured by Invitrogen, Inc.), pREP4 (manufactured by Invitrogen, Inc.), pAGE103 [J. Biochemistry, 101, 1307 (1987)], pAGE210, pME18SFL3, pKANTEX93 (WO 97/10354), and the like.

As the promoter, any promoter can be used as long as it can exhibit its functions in an animal cell, and examples thereof include a cytomegalovirus (CMV) immediate early (IE) gene promoter, an SV40 early promoter, a retrovirus promoter, a metallothionein promoter, a heat-shock promoter, an SRα promoter, or a Moloney murine leukemia virus promoter or enhancer. In addition, a human CMV IE gene enhancer may be used together with the promoter.

Examples of the host cell include a human Burkitt's lymphoma cell Namalwa, an African Green Monkey kidney-derived cell COS, a Chinese hamster ovary-derived cell CHO, a human leukemia cell HBT5637 (JP-A-S63-000299), and the like.

As a method for introducing a recombinant vector into a host cell, any method can be used as long as it is a method for introducing a DNA into an animal cell, and examples thereof include an electroporation method [Cytotechnology, 3, 133 (1990)], a calcium phosphate method (JP-A-H2-227075), a lipofection method [Proc. Natl. Acad. Sci. USA, 84, 7413 (1987)], and the like.

CD40 or GPC3 can be produced by culturing a transformant derived from a microorganism or an animal cell or the like having a recombinant vector incorporating a DNA encoding CD40 or GPC3 obtained as described above in a culture medium, allowing the transformant to produce and accumulate the CD40 or GPC3 in the culture, and then collecting it from the culture. A method for culturing the transformant in a culture medium can be carried out according to a usual method used for culturing a host.

In the case of being expressed in a cell derived from a eukaryote, it is possible to obtain CD40 or GPC3 to which a sugar or a sugar chain is added.

When culturing a microorganism transformed with a recombinant vector using an inducible promoter, an inducer may be added to a culture medium as needed. For example, when a microorganism transformed with a recombinant vector using a lac promoter is cultured, isopropyl-β-D-thiogalactopyranoside or the like may be added to a culture medium, and when a microorganism transformed with a recombinant vector using a trp promoter is cultured, indoleacrylic acid or the like may be added to a culture medium.

Examples of the culture medium in which the transformant obtained using an animal cell as a host is cultured include RPMI 1640 medium [The Journal of the American Medical Association, 199, 519 (1967)], Eagle's MEM medium [Science, 122, 501 (1952)], Dulbecco's modified MEM medium [Virology, 8, 396 (1959)], Medium 199 [Proc. Soc. Exp. Biol. Med., 73, 1 (1950)], Iscove's modified Dulbecco's medium (IMDM), which are generally used, or a culture medium in which fetal bovine serum (FBS) or the like is added to any of these culture media, and the like. The culture is usually carried out under the conditions of pH 6 to 8 and 30 to 40° C. in the presence of 5% $CO_2$ for 1 to 7 days. In addition, during the culture, an antibiotic such as kanamycin or penicillin may be added to the culture medium as needed.

As a method for expressing a gene encoding CD40 or GPC3, a method of secretory production, fused protein expression, or the like [Molecular Cloning, A Laboratory Manual, Second Edition, Cold Spring Harbor Laboratory Press (1989)] can be used in addition to direct expression. Examples of a method for producing CD40 or GPC3 include a method for producing it in a host cell, a method for secreting it out of a host cell, and a method for producing it on an outer membrane of a host cell, and an appropriate method can be selected by changing a host cell to be used or the structure of CD40 or GPC3 to be produced.

For example, an antigen fusion protein can be produced by preparing a DNA in which a DNA encoding an Fc region of an antibody, a DNA encoding glutathione S-transferase (GST), a DNA encoding a FLAG tag or a DNA encoding a Histidine tag, or the like is ligated to a DNA encoding an amino acid sequence of an extracellular domain, followed by expression and purification. Specific examples thereof include an Fc-fusion protein in which an extracellular domain of CD40 or GPC3 is bound to an Fc region of human IgG, and a fusion protein of an extracellular domain of CD40 or GPC3 with glutathione S-transferase (GST).

When CD40 or GPC3 is produced in a host cell or on an outer membrane of a host cell, CD40 or GPC3 can be actively secreted out of the host cell using the method of Paulson et al. [J. Biol. Chem., 264, 17619 (1989)], the method of Lowe et al. [Proc. Natl. Acad. Sci., USA, 86, 8227 (1989), Genes Develop., 4, 1288 (1990)], or a method described in JP-A-H05-336963, WO 94/23021, or the like. In addition, the production amount of CD40 or GPC3 can also be increased by utilizing a gene amplification system using a dihydrofolate reductase gene or the like (JP-A-H2-227075).

The produced CD40 or GPC3 can be isolated and purified, for example, as follows.

When CD40 or GPC3 is expressed in cells in a dissolved state, the cells are collected by centrifugation after completion of the culture, suspended in an aqueous buffer solution, followed by homogenization of the cells using an ultrasonic homogenizer, a French press, a Manton Gaulin homogenizer, a Dyno mill, or the like, whereby a cell-free extract solution is obtained. It is possible to obtain a purified protein from a supernatant obtained by centrifugation of the cell-free extract solution using methods such as general protein isolation and purification methods, that is, a solvent extraction method, a salting-out method using ammonium sulfate or the like, a desalting method, a precipitation method using an organic solvent, anion exchange chromatography using a resin such as diethylaminoethyl (DEAE)-Sepharose or DIAION HPA-75 (manufactured by Mitsubishi Chemical Corporation), cation exchange chromatography using a resin such as S-Sepharose FF (manufactured by Pharmacia Corporation), hydrophobic chromatography using a resin such as Butyl Sepharose or Phenyl Sepharose, a gel filtration method using a molecular sieve, affinity chromatography, a chromatofocusing method, electrophoresis such as isoelectric focusing electrophoresis, and the like alone or in combination.

When CD40 or GPC3 is expressed in cells by forming an insoluble body, the cells are collected and then homogenized in the same manner as described above, followed by centrifugation, whereby the insoluble body of the CD40 or GPC3 is collected as a precipitated fraction. The collected insoluble body of the CD40 or GPC3 is solubilized with a protein denaturing agent. The CD40 or GPC3 is returned to a normal conformation by diluting or dialyzing the solubilized solution, and thereafter, a purified protein of a polypeptide can be obtained by the same isolation and purification methods as described above.

When CD40 or GPC3, or a derivative thereof such as a sugar-modified body thereof is extracellularly secreted, the CD40 or GPC3, or the derivative thereof such as a sugar-modified body thereof can be collected in a culture supernatant. The culture supernatant is subjected to a treatment using a method such as centrifugation in the same manner as described above, thereby obtaining a soluble fraction, and then by using the same isolation and purification methods as described above, a purified protein can be obtained from the soluble fraction.

In addition, CD40 or GPC3 used in the present invention can also be produced using a chemical synthesis method such as an Fmoc method or a tBoc method. Specifically, for example, chemical synthesis can be carried out using a peptide synthesizer manufactured by Advanced Chemtech, Inc., PerkinElmer, Inc., Pharmacia Corporation, Protein Technology Instrument, Inc., Synthecell-Vega Biomolecules Corporation, Perceptive, Inc., Shimadzu Corporation, or the like.

(2) Step of Preparing Antibody-Producing Cell

An animal such as a mouse, a rat, or a hamster at the age of 3 to 20 weeks is immunized with the antigen obtained in (1), and an antibody-producing cell in the spleen, the lymph node, or the peripheral blood of the animal is collected. In addition, as the animal, for example, a transgenic mouse that produces a human-derived antibody described in the document of Tomizuka, et al. [Tomizuka, et al., Proc Natl. Acad Sci USA., 97, 722 (2000)], a conditional knockout mouse of CD40 or GPC3 for enhancing immunogenicity, or the like is exemplified as an immunized animal.

The immunization is carried out by administering an antigen together with an appropriate adjuvant such as a Freund's complete adjuvant, an aluminum hydroxide gel, *Bordetella pertussis* vaccine, or the like. As a method for administration of an immunogen when immunizing a mouse, any method of subcutaneous injection, intraperitoneal injection, intravenous injection, intradermal injection, intramuscular injection, footpad injection, and the like may be used, hut intraperitoneal injection, footpad injection, or intravenous injection is preferred. When the antigen is a partial peptide, a conjugate of the antigen with a carrier protein such as BSA (bovine serum albumin) or KLH (Keyhole Limpet hemocyanin) is produced and used as an immunogen.

The administration of the antigen is performed 5 to 10 times every 1 to 2 weeks after the first administration. On day 3 to 7 after each administration, the blood is collected from a venous plexus of the fundus, and the antibody titer of the serum thereof is measured using an enzyme immunoassay method [Antibodies—A Laboratory Manual, Cold Spring Harbor Laboratory (1988)] or the like. If an animal whose serum shows a sufficient antibody titer against the antigen used for the immunization is used as a supply source for the antibody-producing cell for fusion, the effect of the subsequent operation can be enhanced.

On day 3 to 7 after the final administration of the antigen, a tissue including the antibody-producing cell such as the spleen is resected from the immunized animal, and the antibody-producing cell is collected. The antibody-producing cell is a lymphocyte that is a plasma cell and a progenitor cell thereof. The cell may be obtained from any site of an individual and can be generally obtained from the spleen, the lymph node, the bone marrow, the tonsil, the peripheral blood, or an appropriate combination thereof, or the like, but spleen cells are most generally used. When spleen cells are used, the spleen is shredded and loosened, followed by centrifugation, and then red blood cells are removed, whereby the antibody-producing cells for fusion are obtained.

(3) Step of Preparing Myeloma

As a myeloma, a cell that is derived from a mammal such as a mouse, a rat, a guinea pig, a hamster, a rabbit, or a human, and that has no ability of autoantibody production can be used, however, generally, an established cell line obtained from a mouse, for example, a 8-azaguanine resistant mouse (BALB/c derived) myeloma cell line P3-X63Ag8-U1 (P3-U1) [Current Topics in Microbiology and Immunology, 18, 1 (1978)], P3-NS1/1-Ag41 (NS-1) [European J. Immunology, 6, 511 (1976)], SP2/0-Ag14 (SP-2) [Nature, 276, 269 (1978)], P3-X63-Ag8653 (653) [J. Immunology, 123, 1548 (1979)], P3-X63-Ag8 (X63) [Nature, 256, 495 (1975)], or the like is used. The cell line is subcultured in a suitable culture medium, for example, a culture medium such as an 8-azaguanine medium [RPM1 1640 medium supplemented with glutamine, 2-mercaptoethanol, gentamicin, FCS, and 8-azaguanine], Iscove's modified Dulbecco's medium (hereinafter referred to as "IMDM"), or Dulbecco's modified Eagle medium (hereinafter referred to as "DMEM"). The above-mentioned cell line is subcultured in a normal culture medium (for example, DMEM medium containing 10% FCS) 3 to 4 days before cell fusion, and $2 \times 10^7$ or more cells are ensured on the day of performing the fusion.

(4) Cell Fusion

The antibody-producing cells for fusion obtained in (2) and the myeloma cells obtained in (3) are well washed with Minimum Essential Medium (MEM) or PBS (1.83 g of disodium phosphate, 0.21 g of monopotassium phosphate, 7.65 g of sodium chloride, 1 L of distilled water, pH 7.2), and mixed to give the antibody-producing cells for fusion: the myeloma cells=5:1 to 10:1, followed by centrifugation, and then the supernatant is removed. After the precipitated cell clusters are well loosened, a mixed solution of polyethylene glycol 1000 (PEG-1000), MEM medium, and dimethyl sulfoxide is added thereto while stirring at 37° C. Further, 1 to 2 mL of MEM medium is added thereto every 1 to 2 minutes several times, and then MEM medium is added thereto so that the total amount becomes 50 mL. After centrifugation, the supernatant is removed, the precipitated cell clusters are gently loosened, and then the cells are gently suspended in HAT medium [a normal culture medium supplemented with hypoxanthine, thymidine, and aminopterin]. The resulting suspension is cultured in a 5% $CO_2$ incubator at 37° C. for 7 to 14 days.

In addition, the cell fusion can also be carried out by the following method. The spleen cells and the myeloma cells are well washed with a serum-free culture medium (for example, DMEM), or phosphate buffered saline (hereinafter referred to as "phosphate buffer solution"), and mixed so that the cell count ratio of the spleen cells to the myeloma cells becomes about 5:1 to 10:1, followed by centrifugation. The supernatant is removed, and after the precipitated cell clusters are well loosened, 1 mL of a serum-free culture medium containing 50% (w/v) polyethylene glycol (molecular weight: 1000 to 4000) is added dropwise thereto while stirring. Thereafter, 10 mL of the serum-free culture medium is slowly added thereto, followed by centrifugation. The supernatant is removed again, the precipitated cells are suspended in a normal culture medium containing an appropriate amount of a hypoxanthine-aminopterin-thymidine (HAT) solution and human interleukin 2 (IL-2) (hereinafter referred to as HAT medium), and the suspension is dispensed in each well of a culture plate (hereinafter referred to as a plate), and then, the cells are cultured in the presence of 5% carbon dioxide gas at 37° C. for about 2 weeks. During the course of the culture, the HAT medium is supplemented as appropriate.

(5) Selection of Hybridoma Group

When the myeloma cell used for the fusion is an 8-azaguanine resistant strain, that is, a hypoxanthine-guanine-phosphoribosyltransferase (HGPRT)-deficient strain, the unfused myeloma cell and a fused cell of the myeloma cells cannot survive in the HAT medium. On the other hand, a fused cell of the antibody-producing cells, and a hybridoma of the antibody-producing cell and the myeloma cell can survive in the HAT medium, however, the life span of the fused cell of the antibody-producing cells is reached shortly. Therefore, by continuing the culture in the HAT medium, only the hybridoma of the antibody-producing cell and the myeloma cell survives, and as a result, the hybridoma can be obtained.

For a hybridoma grown in a colony form, medium replacement with a culture medium obtained by removing aminopterin from the HAT medium (hereinafter referred to as HT medium) is performed. Thereafter, a portion of the culture supernatant is collected, and a hybridoma that produces an antibody can be selected using the below-mentioned antibody titer measurement method. Examples of the antibody titer measurement method include various known techniques such as a radioisotopic immunoassay method (RIA method), a solid-phase enzyme immunoassay method (ELISA method), a fluorescent antibody method, and a passive hemagglutination reaction method, but an RIA method or an ELISA method is preferred from the viewpoint of detection sensitivity, rapidity, accuracy, a possibility of automation of an operation, and the like.

The hybridoma determined to produce a desired antibody by measuring the antibody titer is transferred to another plate, and cloning is performed. Examples of the cloning method include a limiting dilution method in which culture is performed by dilution so that one cell is contained in one well of a plate, a soft agar method in which culture is performed in a soft agar medium to collect colonies, a method in which one cell is isolated using a micromanipulator, a method in which one cell is isolated using a cell sorter, and the like.

For a well in which the antibody titer is observed, for example, cloning by a limiting dilution method is repeated 2 to 4 times, and the cell in which the antibody titer is stably observed is selected as a hybridoma strain that produces a monoclonal antibody against human CD40 or GPC3.

(6) Preparation of Monoclonal Antibody

The monoclonal antibody-producing hybridoma obtained in (5) is intraperitoneally injected into a mouse or a nude mouse at the age of 8 to 10 weeks having been subjected to a pristane treatment [0.5 mL of 2,6,10,14-tetramethylpentadecane (Pristane) is intraperitoneally administered, followed by breeding for 2 weeks]. In 10 to 21 days, the hybridoma is converted into an ascites tumor. The ascites is collected from this mouse, followed by centrifugation, removing solids, and then salting out with 40% to 50% ammonium sulfate. Thereafter, purification is performed by a caprylic acid precipitation method, a DEAE-Sepharose column, a protein A column, or a gel filtration column, and then an IgG or IgM fraction is collected and a purified monoclonal antibody is prepared. In addition, by growing the hybridoma in the peritoneal cavity of a mouse of the same strain (for example, BALB/c) or a Nu/Nu mouse, a rat, a guinea pig, a hamster, a rabbit, or the like, ascites containing a large amount of a monoclonal antibody that binds to CD40 or GPC3 can be obtained.

After culturing the monoclonal antibody-producing hybridoma obtained in (5) in RPMI 1640 medium supplemented with 10% FBS, or the like, the supernatant is removed by centrifugation, and the residue is suspended in GIT medium or Hybridoma-SFM medium supplemented with 5% Daigo's GF21, or the like, and then cultured for 3 to 7 days by flask culture, spinner culture, bag culture, or the like. The obtained cell suspension is centrifuged, and purification from the obtained supernatant is performed by a protein A column or a protein G column, and then an IgG fraction is collected, whereby a purified monoclonal antibody can also be obtained. As a simple method for the purification, it is also possible to use a commercially available monoclonal antibody purification kit (for example, MabTrap GII kit manufactured by Amersham Pharmacia Biotech, Inc.), or the like.

The determination of the subclass of the antibody is carried out by an enzyme immunoassay method using a subclass typing kit. The quantitative determination of a protein content can be carried out by a Lowry method or a method of calculation from the absorbance at 280 nm [1.4 (OD$_{280}$)=1 mg/mL immunoglobulin].

(7) Binding Assay of Monoclonal Antibody to CD40 or GPC3

The binding activity of the monoclonal antibody to CD40 or GPC3 can be measured by a binding assay system such as an Ouchterlony method, an ELISA method, an RIA method, a flow cytometry method (FCM), or a surface plasmon resonance method (SPR).

An Ouchterlony method is simple, but a concentration operation is needed when the concentration of the antibody is low. On the other hand, when an ELISA method or an RIA method is used, by allowing a culture supernatant to directly react with an antigen-adsorbed solid phase and further by using antibodies corresponding to various immunoglobulin isotypes and subclasses as secondary antibodies, it is possible to identify the isotype and subclass of the antibody and also to measure the binding activity of the antibody.

As a specific example of the procedure, the purified or partially purified recombinant CD40 or GPC3 is adsorbed to a solid phase surface of a 96-well plate for ELISA or the like, and then the solid phase surface to which the antigen is not adsorbed is blocked with a protein unrelated to the antigen, for example, bovine serum albumin (BSA). After an ELISA plate is washed with phosphate buffer saline (PBS) and PBS containing 0.05% Tween 20 (Tween-PBS), or the like, a serially diluted first antibody (for example, mouse serum, a culture supernatant, or the like) is allowed to react therewith, and then the antibody is bound to the antigen immobilized on the plate. Subsequently, as a second antibody, an anti-immunoglobulin antibody labeled with biotin, an enzyme (horse radish peroxidase (HRP), alkaline phosphatase (ALP), or the like), a chemiluminescent substance or a radioactive compound, or the like, is dispensed to allow the second antibody to react with the first antibody bound to the plate. After well washing with Tween-PBS, a reaction according to the labeling substance of the second antibody is performed, and a monoclonal antibody that specifically reacts with the target antigen is selected.

In FCM, the binding activity of an antibody to an antigen-expressing cell can be measured [Cancer Immunol. Immunother, 36, 373 (1993)]. Binding of an antibody to a membrane protein antigen expressed on a cell membrane means that the antibody recognizes the conformation of a naturally occurring antigen and binds thereto.

Examples of an SPR method include a kinetics analysis by Biacore. For example, by using Biacore T100, the kinetics in binding of an antigen and a test substance are measured, and the result is analyzed with an analysis software attached to an instrument. As a specific example of the procedure, after fixing an anti-mouse IgG antibody to a sensor chip CM5 by an amine coupling method, a test substance such as a hybridoma culture supernatant or a purified monoclonal antibody is allowed to flow to bind in an appropriate amount, further the antigen at multiple known concentrations is allowed to flow, and then binding and dissociation are measured. Subsequently, a kinetics analysis by a 1:1 binding model is carried out with respect to the obtained data using the software attached to the instrument to obtain various parameters. Alternatively, after fixing CD40 or GPC3 onto the sensor chip by, for example, an amine coupling method, a purified monoclonal antibody at multiple known concentrations is allowed to flow, and then binding and dissociation are measured. A kinetics analysis by a bivalent binding model is carried out with respect to the obtained data using the software attached to the instrument to obtain various parameters.

In addition, in the present invention, it is possible to select an antibody that binds to CD40 or GPC3 competitively with the antibody against CD40 or GPC3 by allowing a test antibody to coexist in the above-mentioned binding assay system to cause a reaction. That is, by screening an antibody whose binding to an antigen is inhibited when a test antibody is added, it is possible to obtain an antibody that competes with the antibody obtained above for binding to CD40 or GPC3.

(8) Identification of Epitope for Monoclonal Antibody Against CD40 or GPC3

In the present invention, the identification of an epitope which the antibody recognizes and binds to can be carried out as follows.

For example, a partially deficient variant of an antigen, a mutant of an antigen in which an amino acid residue different among species is modified, or a mutant of an antigen in which a specific domain is modified is produced, and if the reactivity of an antibody against the deficient variant or the mutant is lowered, it becomes clear that the deficient site or the amino acid modified site is an epitope for the antibody. Such a partially deficient variant or a mutant of an antigen may be obtained as a secretory protein using a suitable host cell, for example, *E. coli*, yeast, a plant cell, a mammalian cell, or the like, or may be prepared as an antigen-expressing cell by expressing it on a cell membrane of a host cell. In the case of a membrane-associated antigen, in order to express it while maintaining the conformation of the antigen, it is preferred to express it on the membrane of a host cell. In addition, it is also possible to confirm the reactivity of the antibody by producing a synthetic peptide mimicking the primary structure or the conformation of the antigen. As for a synthetic peptide, a method for producing various partial peptides of the molecule thereof using a known peptide synthesis technique, and the like are exemplified.

For example, with respect to the extracellular domain of human and mouse CD40 or GPC3, it is possible to identify an epitope for an antibody by producing a chimeric protein in which domains constituting the respective regions are appropriately combined, and then confirming the reactivity of the antibody with the protein. Thereafter, it is possible to specify the epitope in more detail by variously synthesizing an oligopeptide of the corresponding region or a mutant or the like of the peptide using an oligopeptide synthesis technique well known to those skilled in the art, and then confirming the reactivity of the antibody with the peptide. As a simple method for obtaining many types of oligopeptides, a commercially available kit [for example, SPOTs Kit (manufactured by Genosys Biotechnologies, Inc.), a series of multipin peptide synthesis kits (manufactured by Chiron Corporation) using a multipin synthesis method, or the like] can also be used.

An antibody that binds to the same epitope as that for an epitope to which an antibody that binds to CD40 or GPC3 binds can be obtained by identifying an epitope for an antibody obtained in the above-mentioned binding assay system, producing a partial synthetic peptide of the epitope, a synthetic peptide mimicking the conformation of the epitope, a recombinant of the epitope, or the like, and then performing immunization therewith.

For example, if the epitope is a membrane protein, an antibody specific to the epitope can be more efficiently produced by producing a recombinant fusion protein in which the entire extracellular domain or a part of the extracellular domain is linked to an appropriate tag, for example, a FLAG tag, a Histidine tag, a GST protein or an antibody Fc region, or the like, and performing immunization with the recombinant protein.

2. Production of Genetically Recombinant Antibody

As production examples of genetically recombinant antibodies, methods for producing a chimeric antibody, a humanized antibody, and a human antibody will be described below, although the methods are schematically described in P. J. Delves., ANTIBODY PRODUCTION ESSENTIAL TECHNIQUES., 1997 WILEY, P. Shepherd and C. Dean. Monoclonal Antibodies., 2000 OXFORD UNIVERSITY PRESS, and J. W. Goding., Monoclonal Antibodies: principles and practice., 1993 ACADEMIC PRESS, and the like. In addition, genetically recombinant mouse, rat, hamster, and rabbit antibodies can also be produced using the same method.

(1) Acquisition of cDNA Encoding V Region of Monoclonal Antibody from Hybridoma

Acquisition of cDNAs encoding VH and VL of a monoclonal antibody can be carried out, for example, as follows.

First, mRNA is extracted from a hybridoma that produces a monoclonal antibody, and cDNAs are synthesized. Subsequently, the synthesized cDNAs are each cloned into a vector such as a phage or a plasmid, thereby producing a cDNA library. A recombinant phage or a recombinant plasmid containing a cDNA encoding VH or VL is isolated from the library using a DNA encoding a C region part or a V region part of the antibody as a probe, respectively. The entire nucleotide sequence of VH or VL in the isolated recombinant phage or recombinant plasmid is determined, and then the entire amino acid sequence of VH or VL is deduced from the nucleotide sequence.

As a non-human animal used for producing a hybridoma, a mouse, a rat, a hamster, a rabbit, or the like is used, but any animal can be used as long as a hybridoma can be produced.

In the preparation of the total RNA from a hybridoma, a guanidine thiocyanate-cesium trifluoroacetate method [Methods in Enzymol., 154, 3 (1987)], or a kit such as RNA easy Kit (manufactured by QIAGEN, Inc.), or the like is used.

In the preparation of mRNA from the total RNA, an oligo (dT)-immobilized cellulose column method [Molecular Cloning, A Laboratory Manual, Second Edition, Cold Spring Harbor Laboratory Press (1989)], or a kit such as Oligo-dT30 <Super> mRNA Purification Kit (manufactured by Takara Bio, Inc.), or the like is used. Further, it is also possible to prepare mRNA using a kit such as Fast Track mRNA Isolation Kit (manufactured by Invitrogen, Inc.), or QuickPrep mRNA Purification Kit (manufactured by Pharmacia Corporation).

In the synthesis of cDNAs and the production of a cDNA library, a known method [Molecular Cloning, A Laboratory Manual, Second Edition, Cold Spring Harbor Laboratory Press (1989), Current Protocols in Molecular Biology, Supplement 1, John Wiley & Sons (1987-1997)], or a kit such as SuperScript Plasmid System for cDNA Synthesis and Plasmid Cloning (manufactured by Invitrogen, Inc.) or ZAP-cDNA Synthesis Kit (manufactured by Stratagene Corporation), or the like is used.

When the cDNA library is produced, as the vector into which a cDNA synthesized using mRNA extracted from a hybridoma as a template is incorporated, any vector can be used as long as it can incorporate the cDNA.

For example, ZAP Express [Strategies, 5, 58 (1992)], pBluescript II SK(+) [Nucleic Acids Research, 17, 9494 (1989)], λZAP II (manufactured by Stratagene Corporation), λgt 10, λgt 11 [DNA Cloning: A Practical Approach, I, 49 (1985)], Lambda BlueMid (manufactured by Clontech Laboratories, Inc.), λExCell, pT7T3-18U (manufactured by Pharmacia Corporation), pcD2 [Mol. Cell. Biol., 3, 280 (1983)], pUC18 [Gene, 33, 103 (1985)], or the like is used.

As *E. coli* into which a cDNA library constructed by a phage or a plasmid vector is introduced, any *E. coli* can be used as long as it can introduce, express, and maintain the cDNA library. For example, XL1-Blue MRF' [Strategies, 5, 81 (1992)], C600 [Genetics, 39, 440 (1954)], Y1088, Y1090 [Science, 222, 778 (1983)], NM522 [J. Mol. Biol., 166, 1 (1983)], K802 [J. Mol. Biol., 16, 118 (1966)], JM105 [Gene, 38, 275 (1985)], or the like is used.

In the selection of a cDNA clone encoding VH or VL of a non-human antibody from the cDNA library, a colony hybridization method using an isotope or a fluorescently labeled probe, or a plaque hybridization method [Molecular Cloning, A Laboratory Manual, Second Edition, Cold Spring Harbor Laboratory Press (1989)], or the like is used.

In addition, it is also possible to prepare a cDNA encoding VH or VL by preparing a primer and performing a polymerase chain reaction method [hereinafter referred to as a PCR method, Molecular Cloning, A Laboratory Manual, Second Edition, Cold Spring Harbor Laboratory Press (1989), Current Protocols in Molecular Biology, Supplement 1, John Wiley & Sons (1987-1997)] using a cDNA synthesized from mRNA or a cDNA library as a template.

The selected cDNA is cleaved with an appropriate restriction enzyme or the like, and then cloned into a plasmid such as pBluescript SK(-) (manufactured by Stratagem Corporation), and the nucleotide sequence of the cDNA is determined by a commonly used nucleotide sequence analysis method or the like. For example, after performing a reaction such as a dideoxy method [Proc. Natl. Acad. Sci. USA, 74, 5463 (1977)], an analysis is performed using an automatic nucleotide sequence analyzer such as A.L.F. DNA sequencer (manufactured by Pharmacia Corporation).

By deducing the entire amino acid sequence of each of VH and VL from the determined entire nucleotide sequence and comparing it with the entire amino acid sequence of each of VH and VL of a known antibody [Sequences of Proteins of Immunological Interest, US Dept. Health and Human Services (1991)], it is confirmed whether or not the obtained cDNA encodes the complete amino acid sequence of each of VH and VL of the antibody containing a secretion signal sequence.

With respect to the complete amino acid sequence of each of VH and VL, of the antibody containing a secretion signal sequence, by comparison with the entire amino acid sequence of each of VH and VL of a known antibody [Sequences of Proteins of Immunological Interest, US Dept. Health and Human Services (1991)], the length of the secretion signal sequence and the N-terminal amino acid sequence can be deduced, and further the subgroup to which these belong can be identified.

In addition, the amino acid sequence of each of CDRs of VH and VL can be deduced by comparison with the amino acid sequence of each of VH and VL of a known antibody [Sequences of Proteins of Immunological Interest, US Dept. Health and Human Services (1991)].

Further, with respect to the obtained complete amino acid sequence of each of VH and VL, it is possible to confirm whether or not the complete amino acid sequence of each of VH and VL is new by, for example, performing a homology search by the BLAST method [J. Mol. Biol., 215, 403 (1990)] or the like using an arbitrary database such as SWISS-PROT or PIR-Protein.

(2) Construction of Expression Vector for Genetically Recombinant Antibody

An expression vector for a genetically recombinant antibody can be constructed by cloning a DNA encoding at least one of CH and CL of a human antibody into an expression vector for an animal cell.

As a C region of a human antibody, CH and CL of an arbitrary human antibody can be used, and for example, CH of γ1 subclass and CL of κ class of a human antibody, or the like can be used. As a DNA encoding each of CH and CL of a human antibody, a cDNA is used, but it is also possible to use a chromosomal DNA composed of an exon and an intron.

As the expression vector for an animal cell, any vector can be used as long as it can incorporate a gene encoding a C region of a human antibody and express the gene, and for example, pAGE107 [Cytotechnol., 3, 133 (1990)], pAGE103 [J. Biochem., 101, 1307 (1987)], pHSG274 [Gene, 27, 223 (1984)], pKCR [Proc. Natl. Acad. Sci. USA, 78, 1527 (1981)], pSG1bd2-4 [Cytotechnol., 4, 173 (1990)], pSE1UK1Sed1-3 [Cytotechnol., 13, 79 (1993)], INPEP4 (manufactured by Biogen-IDEC, Inc.), N5KG1val (U.S. Pat. No. 6,001,358), N5KG4PE R409K (described in WO 2006/033386), an N5KG2 vector (described in WO 2003/033538), a transposon vector (WO 2010/143698), or the like can be used.

As a promoter and an enhancer of the expression vector for an animal cell, an SV40 early promoter [J. Biochem., 101, 1307 (1987)], Moloney murine leukemia virus LTR [Biochem. Biophys. Res. Commun., 149, 960 (1987), a CMV promoter (U.S. Pat. No. 5,168,062), or a promoter [Cell, 41, 479 (1985)] and an enhancer [Cell, 33, 717 (1983)] of an immunoglobulin H chain, or the like can be used.

In the expression of a genetically recombinant antibody, a vector carrying both genes of the antibody H chain and L chain (tandem-type vector) [J. Immunol. Methods, 167, 271 (1994)] is used from the viewpoints of ease of construction of the vector, ease of introduction into an animal cell, balance of the expression levels of the antibody H chain and L chain in the cell, and the like, however, multiple vectors separately carrying each of the genes of the antibody H chain and L chain (separation-type vectors) can also be used in combination.

As the tandem-type expression vector for a genetically recombinant antibody, pKANTEX93 (WO 97/10354), pEE18 [Hybridoma, 17, 559 (1998)], N5KG1val (U.S. Pat. No. 6,001,358), N5KG4PE R409K (described in WO 2006/033386), an N5KG2 vector (described in WO 2003/033538), a Tol2 transposon vector (WO 2010/143698), or the like is used.

(3) Construction of Expression Vector for Chimeric Antibody

By cloning the cDNA encoding VH or VL of a non-human antibody obtained in (1) upstream of each gene encoding CH or CL of a human antibody in the expression vector for a genetically recombinant antibody obtained in (2), an expression vector for a chimeric antibody can be constructed.

First, in order to ligate the cDNA encoding VH or VL of a non-human antibody at the 3'-end side to CH or CL of a human antibody at the 5'-end side, cDNAs of VH and VL designed so that the nucleotide sequence of a ligation region encodes an appropriate amino acid and to become an appropriate restriction enzyme recognition sequence are produced. Subsequently, the produced cDNAs of VH and VL are each cloned upstream of each gene encoding CH or CL of a human antibody in the expression vector for a genetically recombinant antibody obtained in (2) so that they are expressed in an appropriate form, whereby an expression vector for a chimeric antibody is constructed.

In addition, each cDNA encoding VH or VL of a non-human antibody is amplified by a PCR method using a synthetic DNA containing an appropriate restriction enzyme recognition sequence at both ends, and is cloned into the expression vector for a genetically recombinant antibody obtained in (2), whereby an expression vector for a chimeric antibody can also be constructed.

(4) Production of cDNA Encoding V Region of Humanized Antibody

A cDNA encoding VH or VL of a humanized antibody can be produced as follows. First, each amino acid sequence of a framework region (hereinafter referred to as FR) of VH or VL of a human antibody to be grafted with the amino acid sequence of CDR of VH or VL of a non-human antibody obtained in (1) is selected.

As the amino acid sequence of FR to be selected, any amino acid sequence can be used as long as it is derived from a human antibody. For example, an amino acid sequence of FR of a human antibody registered in a database such as Protein Data Bank, or a common amino acid sequence in each subgroup of FR of a human antibody [Sequences of Proteins of Immunological Interest, US Dept. Health and Human Services (1991)], or the like is used. In order to suppress a decrease in the binding activity of an antibody, an amino acid sequence of human FR having a homology as high as possible (60% or more) with the amino acid sequence of FR of VH or VL of the original non-human antibody is selected.

Subsequently, each of the amino acid sequences of CDRs of the original non-human antibody is grafted to the selected amino acid sequence of FR of VH or VL of a human antibody, and each amino acid sequence of VH or VL of a humanized antibody is designed. By converting the designed amino acid sequence into a DNA sequence in consideration of the usage frequency of codons found in the nucleotide sequence of the antibody gene [Sequences of Proteins of Immunological Interest, US Dept. Health and Human Services (1991)], each cDNA sequence of VH or VL of a humanized antibody is designed.

Based on the designed cDNA sequence, several synthetic DNAs having a length of around 100 to 150 nucleotides are synthesized and a PCR reaction is performed using them. In this case, from the viewpoint of the reaction efficiency in the PCR reaction and the length of a synthesizable DNA, preferably 4 to 6 synthetic DNAs are designed for each of the H chain and the L chain. In addition, it is also possible to synthesize and use a synthetic DNA having a full-length variable region.

Further, by introducing an appropriate restriction enzyme recognition sequence at the 5' end of the synthetic DNA located at both ends, a cDNA encoding VH or VL of a humanized antibody can be easily cloned into the expression vector for a genetically recombinant antibody obtained in (2), After a PCR reaction, each amplified product is cloned into a plasmid such as pBluescript SK(−) (manufactured by Stratagene Corporation), the nucleotide sequence is determined by the same method as described in (1), and thus a plasmid containing a DNA sequence encoding the amino acid sequence of VH or VL of a desired humanized antibody is obtained.

(5) Modification of Amino Acid Sequence of V Region of Humanized Antibody

The antigen binding activity of a humanized antibody prepared merely by grafting only CDRs of VH and VL of a non-human antibody to FRs of VH and VL of a human antibody is lowered as compared with that of the original non-human antibody [BIO/TECHNOLOGY, 9, 266 (1991)]. For this reason, the lowered antigen binding activity of the humanized antibody can be increased by identifying amino acid residues directly involved in the binding to an antigen, amino acid residues interacting with the amino acid residues of CDRs, and amino acid residues maintaining the conformation of the antibody and indirectly involved in the binding to an antigen in the amino acid sequences of FRs of VH and VL of the human antibody, and substituting the amino acid residues with the amino acid residues of the original non-human antibody.

In order to identify the amino acid residues of FR involved in the antigen binding activity, it is possible to construct and analyze the conformation of the antibody using X-ray crystallography [J. Mol. Biol., 112, 535 (1977)], or computer modeling [Protein Engineering, 7, 1501 (1994)], or the like. Further, it is possible to obtain a modified humanized antibody having a necessary antigen binding activity by producing several types of modified antibodies for each antibody, and repeatedly examining the correlation with each antigen binding activity thereof through trial and error.

The amino acid residues of FRs of VH and VL of a human antibody can be modified by performing the PCR reaction described in (4) using a synthetic DNA for modification. With respect to the amplification product after the PCR reaction, the nucleotide sequence is determined to confirm that the desired modification has been carried out by the method described in (1).

(6) Construction of Expression Vector for Humanized Antibody

An expression vector for a humanized antibody can be constructed by cloning each cDNA encoding VH or VL of the constructed humanized antibody upstream of each gene encoding CH or CL of a human antibody of the expression vector for a genetically recombinant antibody obtained in (2).

For example, the cloning is performed upstream of each gene encoding CH or CL of a human antibody in the expression vector for a genetically recombinant antibody obtained in (2) by introducing an appropriate restriction enzyme recognition sequence at the 5' end of the synthetic DNA located at both ends among the synthetic DNAs used when constructing VH or VL of the humanized antibody obtained in (4) and (5) so that they are expressed in an appropriate form.

(7) Construction of Expression Vector for Human Antibody

When a hybridoma that produces a monoclonal antibody is established using an animal that produces a human antibody as an immunized animal, the amino acid sequences and the cDNA sequences of VH and VL of a human antibody can be obtained in (1). Therefore, by cloning each gene encoding VH or VL of a human antibody obtained in (1) upstream of each gene encoding CH or CL of a human antibody of the expression vector for a genetically recombinant antibody obtained in (2), an expression vector for a human antibody can be constructed.

(8) Transient Expression of Genetically Recombinant Antibody

By transiently expressing a genetically recombinant antibody using the expression vector for a genetically recombinant antibody obtained in (3), (6), or (7), or an expression vector obtained by modification thereof, the antigen binding activities of many types of genetically recombinant antibodies obtained can be efficiently evaluated.

As a host cell into which the expression vector is introduced, any cell can be used as long as it is a host cell capable of expressing a genetically recombinant antibody, and for example, a COS-7 cell [American Type Culture Collection (MCC) number: CRL1651] is used. In the introduction of the expression vector into a COS-7 cell, a DEAE-dextran method [Methods in Nucleic Acids Res., CRC press (1991)], a lipofection method [Proc. Natl. Acad. Sci. USA, 84, 7413 (1987)], or the like is used.

After the introduction of the expression vector, the expression level and the antigen binding activity of the genetically recombinant antibody in a culture supernatant are measured using an enzyme immunoassay method [Monoclonal Antibodies-Principles and practice, Third Edition, Academic Press (1996), Antibodies-A Laboratory Manual, Cold Spring Harbor Laboratory (1988), Monoclonal Antibody Experimental Manual, Kodansha Scientific Ltd. (1987)], or the like.

(9) Acquisition of Stable Expression Cell Line of Genetically Recombinant Antibody and Preparation of Genetically Recombinant Antibody A transformant strain that stably expresses a genetically recombinant antibody can be obtained by introducing the expression vector for a genetically recombinant antibody obtained in (3), (6), or (7) into an appropriate host cell.

As the introduction of the expression vector into a host cell, for example, an electroporation method [JP-A-H2-257891, Cytotechnology, 3, 133 (1990)], a calcium ion method, an electroporation method, a spheroplast method, a lithium acetate method, a calcium phosphate method, a lipofection method, and the like are exemplified. In addition, as a method for introducing a gene into an animal described below, for example, a microinjection method, a method for introducing a gene into an ES cell using an electroporation method or a lipofection method, a nuclear transfer method, and the like are exemplified.

As a host cell into which the expression vector fir a genetically recombinant antibody is introduced, any cell can be used as long as it is a host cell capable of expressing a genetically recombinant antibody. For example, mouse SP2/0-Ag14 cells (ATCC CRL 1581), mouse P3X63-Ag8.653 cells (ATCC CRL 1580), Chinese hamster CHO-K1 cells (ATCC CCL-61), DUKXB11 (ATCC CCL-9096), Pro-5 cells (ATCC CCL-1781), CHO-S cells (Life Technologies, Cat No. 11619), dihydrofolate reductase gene (dhfr)-deficient CHO cells (CHO/DG44 cells) [Proc. Natl. Acad. Sci. USA, 77, 4216 (1980)], Lec13 cells having acquired lectin resistance [Somatic Cell and Molecular Genetics, 12, 55 (1986)], α1,6-fucosyltransferase gene-deficient CHO cells (WO 2005/035586 and WO 02/31140), Rat YB2/3HL.P2.G11.16Ag.20 cells (ATCC No.: CRL 1662), and the like are used.

In addition, it is also possible to use a host cell in which the activity of a protein such as an enzyme involved in the synthesis of intracellular sugar nucleotide GDP-fucose, protein such as an enzyme involved in sugar chain modification such that the 1-position of fucose is α-linked to the 6-position of N-acetylglucosamine at the reducing end of an N-glycoside-linked complex sugar chain, a protein involved in the transport of intracellular sugar nucleotide GDP-fucose to the Golgi body, or the like is decreased or lost, for example, an α1,6-fucosyltransferase gene-deficient CHO cell (WO 2005/035586 and WO 02/31140), or the like.

After introduction of the expression vector, a transformant strain that stably expresses a genetically recombinant antibody is selected by culturing the transformant strain in a culture medium for animal cell culture containing a drug such as G418 sulfate (hereinafter referred to as G418) (JP-A-H2-257891).

As the culture medium for animal cell culture, RPMI 1640 medium (manufactured by Invitrogen, Inc.), GIT medium (manufactured by Nippon Pharmaceutical Co., Ltd.), EX-CELL 301 medium (manufactured by JRH Biosciences, Inc.), EX-CELL 302 medium (manufactured by JRH Bioscience, Inc.), EX-CELL 325 medium (manufactured by JRH Bioscience., Inc.), IMDM medium (manufactured by Invitrogen, Inc.) or Hybridoma-SFM medium (manufactured by Invitrogen, Inc.), or a culture medium in which any of various additives such as FBS is added to any of these culture media, or the like is used. By culturing the obtained transformant strain in the culture medium, a genetically recombinant antibody is expressed and accumulated in the culture supernatant. The expression level and the antigen binding activity of the genetically recombinant antibody in the culture supernatant can be measured by an ELISA method or the like. In addition, the expression level of the genetically recombinant antibody produced by the transformant strain can be increased using a DHFR amplification system (JP-A-H2-257891) or the like.

The genetically recombinant antibody can be purified using a protein A column from the culture supernatant of the transformant strain [Monoclonal Antibodies—Principles and Practice, Third Edition, Academic Press (1996), Antibodies—A Laboratory Manual, Cold Spring Harbor Laboratory (1988)]. In addition, the purification can also be carried out by combining methods used for purifying a protein such as gel filtration, ion exchange chromatography, and ultrafiltration.

The molecular weights of an H chain, an L chain, or the entire antibody molecule of a purified genetically recombinant antibody can be measured using a polyacrylamide gel electrophoresis method [Nature, 227, 680 (1970)], or a Western blotting method [Monoclonal Antibodies—Principles and Practice, Third Edition, Academic Press (1996). Antibodies—A Laboratory Manual, Cold Spring Harbor Laboratory (1988)], or the like.

3. Production of Bispecific Antibody or Bispecific Antibody Fragment Thereof

The bispecific antibody of the present invention can be produced by designing each of the IgG portion, which includes the first antigen binding domain, and the second antigen binding domain, and further designing the bispecific antibody in which these are linked.

3-1. Designing of IgG Portion Including First Antigen Binding Domain

The IgG portion can be obtained by obtaining monoclonal antibodies using the method described in the above 1., determining the cDNA sequences of CDR and a variable region of each antibody using the method described in the above 2., and designing the IgG portion including the CDR or the variable region of the antibody as the first antigen binding domain.

3-2. Designing of Second Antigen Binding Domain

When CDR or a variable region of an antibody is included in the second antigen binding domain, the second antigen binding domain can be produced by determining the DNA sequence of the CDR or the variable region of the antibody using the method described in the above 1. and 2. and designing the second antigen binding domain including them. As such a second antigen binding domain, a single-stranded one obtained by binding VH and VL either directly or via an appropriate linker as scFV or the like, one designed to be expressed in the form of a double strand as Fab, dsFv, or the like, and bound via an S—S bond after expression, or VHH or the like can also be used. The antigen binding activity of the second antigen binding domain is evaluated by the above-mentioned method, and one retaining the antigen binding activity can be selected.

4. Production of Bispecific Antibody 4-1. Production of Bispecific Antibody in Which Second Antigen Binding Domain is Fab (1) A bispecific antibody, which has such a structure that the second antigen binding domain is Fab, and to the heavy chain C terminus of an IgG portion, VH-CH1 of the Fab binds either directly or via a linker, and in which the light chain is common to the first antigen binding domain and the second antigen binding domain can be specifically produced as follows.

A DNA encoding a polypeptide in which the heavy chain of the IgG portion and VH-CH1 of the Fab are linked is synthesized and integrated into the expression vector for a genetically recombinant antibody including CH described in 2. (2) after cutting out the CH. Further, a DNA encoding VL is synthesized and integrated into the expression vector for a genetically recombinant antibody including CL described in 2. (2). By expressing the respective vectors according to the method described in 2. (8), the bispecific antibody can be produced.

(2) A bispecific antibody having a structure in which the second antigen binding domain is Fab, and to the heavy chain C terminus of an IgG portion, VL-CL of the Fab binds either directly or via a linker can be specifically produced as follows.

A DNA encoding a polypeptide in which VL-CL of the Fab and the heavy chain of the IgG portion are linked and a DNA encoding VH-CH1 of the Fab are synthesized and integrated into the expression vector for a genetically recombinant antibody including CH described in 2. (2) after cutting out the CH. Further, a DNA encoding VL of the IgG portion is synthesized and integrated into the expression vector for a genetically recombinant antibody including CL described in 2. (2). By expressing the bispecific antibody according to the method described in 2. (8) using the respective vectors, the bispecific antibody can be produced.

4-2. Bispecific Antibody in Which Second Antigen Binding Domain is Other than Fab (1) A bispecific antibody in which the second antigen binding domain is VHH can be specifically produced as follows.

A DNA encoding a polypeptide in which and VH-CH1 of the IgG portion are linked is synthesized and integrated into the expression vector for a genetically recombinant antibody including CH described in 2. (2) after culling out the CH. Further, a DNA encoding VL, of the IgG portion is synthesized and integrated into the expression vector for a genetically recombinant antibody including CL described in 2. (2). By expressing the bispecific antibody according to the method described in 2. (8) using the respective vectors, the bispecific antibody can be produced.

(2) A bispecific antibody in which the second antigen binding domain is a polypeptide other than the above (1) and (2) including scFv, dsFv, or CDR can be specifically produced as follows.

When the second antigen binding domain is a single strand, a DNA in which a DNA encoding the second antigen binding domain and a DNA encoding the heavy chain of the IgG portion are linked is synthesized. When the second antigen binding domain is an assembly composed of two single-stranded polypeptides, one of the single-stranded polypeptides constituting the second antigen binding domain is linked to a DNA encoding the heavy chain of the IgG portion and synthesized, and also a DNA encoding the other single-stranded polypeptide constituting the second antigen binding domain is synthesized. These DNAs are integrated into the expression vector for a genetically recombinant antibody including CH described in 2. (2) after cutting out the CH. Further, a DNA encoding VL of the IgG portion is also synthesized and integrated into the expression vector for a genetically recombinant antibody including CL described in 2. (2). By expressing the bispecific antibody according to the method described in 2. (8) using the respective vectors, the bispecific antibody can be produced.

(3) Production of Bispecific Antibody in Which Second Antigen Binding Domain is Other than Above When the second antigen binding domain is a polypeptide other than the above, the bispecific antibody of the present invention can be specifically produced as follows.

When the second antigen binding domain is a single strand, a DNA in which a DNA encoding the second antigen binding domain and a DNA encoding the heavy chain of the IgG-portion are linked is synthesized. When the second antigen binding domain is an assembly composed of two or more single-stranded polypeptides, one of the single-stranded polypeptides constituting the second antigen binding domain is linked to a DNA encoding the heavy chain of the IgG portion and synthesized, and also a DNA encoding the other polypeptide to be assembled constituting the second antigen binding domain is synthesized. These DNAs are integrated into the expression vector for a genetically recombinant antibody including CH described in 2. (2) after cutting out the CH. Further, a DNA encoding VL of the IgG portion is also synthesized and integrated into the expression vector for a genetically recombinant antibody including CL described in 2. (2). By expressing the bispecific antibody according to the method described in 2. (8) using the respective vectors, the bispecific antibody can be produced.

Further, when a bispecific antibody in which the second antigen binding domain is bound via a linker in any of the above-mentioned bispecific antibodies is produced, by synthesizing a DNA in which the linker is linked to the C terminus of the IgG portion and expressing a polypeptide, the bispecific antibody can be produced.

The antigen binding domain can be isolated and obtained by a technique such as a phage display method or a yeast display method other than the method using a hybridoma described in the above 1. [Emmanuelle Laffy et. al., Human Antibodies 14, 33-55, (2005)].

Further, when a bispecific antibody or the bispecific antibody fragment thereof composed of multiple VHs and a single VL is produced, a screening using a phage display method or the like is performed and each VH most suitable for the single VL is selected so that each antigen binding domain contained in the bispecific antibody reacts with each specific antigen.

Specifically, first, an animal is immunized with a first antigen using the method described in the above 1., and a hybridoma is produced from its spleen, and then, a DNA sequence encoding the first antigen binding domain is cloned. Subsequently, an animal is immunized with a second antigen, and a cDNA library is prepared from its spleen, and then, a DNA encoding the amino acid sequence of VH is obtained from the library by PCR.

Subsequently, a phage library expressing scFv in which VH obtained by immunization with the second antigen and VL of the first antigen binding domain are linked is produced, and a phage displaying scFv that specifically binds to the second antigen is selected by panning using the phage library. From the selected phage, a DNA sequence encoding the amino acid sequence of VH of the second antigen binding domain is cloned.

Further, when the second antigen binding domain is Fab, a DNA sequence encoding the amino acid sequence of a polypeptide in which VH of the first antigen binding domain and VH of the second antigen binding domain are linked via the above-mentioned linker is designed, and the DNA sequence and a DNA sequence encoding the amino acid sequence of the single VL are inserted into, for example, the expression vector for a genetically recombinant antibody described in the above 2. (2), whereby the expression vector for the bispecific, antibody or the bispecific antibody fragment thereof of the present invention can be constructed.

4. Evaluation of Activity of Bispecific Antibody or Bispecific Antibody Fragment Thereof of the Present Invention The evaluation of the activity of the purified bispecific antibody or bispecific antibody fragment thereof can be carried out as follows.

The binding activity of the bispecific antibody or the bispecific antibody fragment thereof of the present invention to a cell line having expressed CD40 and/or GPC3 can be measured using the binding assay system described in the above 1. (7).

The CDC activity or the ADCC activity against a cell having expressed CD40 and/or GPC3 can be measured by a known measurement method [Cancer Immunol. Immunother., 36, 373 (1993)].

The cell death-inducing activity of the bispecific, antibody or the bispecific antibody fragment thereof of the present invention can be measured by the following method. For example, cells are seeded in a 96-well plate, and after adding an antibody and culturing the cells for a certain period of time, LWT-8 reagent (manufactured by Dojindo Molecular Technologies, Inc.) is allowed to react, and then an absorbance at 450 nm is measured with a plate reader to measure the viability of the cells.

5. Therapeutic Method for Disease Using Bispecific Antibody or Bispecific Antibody Fragment Thereof of the Present Invention The bispecific antibody or the bispecific antibody fragment thereof of the present invention can be used for a treatment of a disease associated with CD40 and/or GPC3, preferably a disease involved in a cell that expresses CD40 and GPC3. As the disease associated with CD40 and/or GPC3, for example, a malignant tumor, a cancer, and the like are exemplified.

Examples of the malignant tumor and the cancer include, large intestine cancer, colorectal cancer, lung cancer, breast cancer, glioma, malignant melanoma (melanoma), thyroid cancer, renal cell carcinoma, leukemia, lymphoma, T cell lymphoma, stomach cancer, pancreatic cancer, cervical cancer, endometrial cancer, ovarian cancer, bile duct cancer, esophageal cancer, liver cancer, head and neck squamous cell cancer, skin cancer, urinary tract cancer, bladder cancer, prostate cancer, choriocarcinoma, pharyngeal cancer, laryngeal cancer, pleural tumor, arrhenoblastoma, endometrial hyperplasia, endometriosis, embryoma, fibrosarcoma, Kaposi sarcoma, angioma, cavernous hemangioma, angioblastoma, retinoblastoma, astrocytoma, neurofibroma, oligodendroglioma, medulloblastoma, neuroblastoma, glioma, rhabdomyosarcoma glioblastoma, osteogenic sarcoma, leiomyosarcoma, Wilms tumor, and the like.

A therapeutic agent containing the bispecific antibody or the bispecific antibody fragment thereof of the present invention or a derivative thereof may contain only the antibody or the bispecific antibody fragment thereof or a derivative thereof as an active ingredient, however, in general, it is provided as a pharmaceutical preparation produced using a method known in the technical field of pharmaceutics by mixing it together with one or more pharmacologically acceptable carriers.

Examples of the route of administration include oral administration or parenteral administration such as intraoral, intra-airway, intrarectal, subcutaneous, intramuscular, and intravenous administration. Examples of the dosage form include a spray, a capsule, a tablet, a powder, a granule, a syrup, an emulsion, a suppository, an injection, an ointment, a tape, and the like. Various pharmaceutical preparations can be produced by a conventional method using an excipient, a filler, a binder, a wetting agent, a disintegrating agent, a surfactant, a lubricant, a dispersant, a buffer, a preservative, a solubilizing agent, an antiseptic, a coloring agent, a flavoring agent, a stabilizer, and the like that are generally used.

Examples of the excipient include lactose, fructose, glucose, corn starch, sorbit, crystalline cellulose, sterile water, ethanol, glycerol, physiological saline, a buffer solution, and the like. Examples of the disintegrating agent include starch, sodium alginate, gelatin, calcium carbonate, calcium citrate, dextrin, magnesium carbonate, synthetic magnesium silicate, and the like.

Examples of the binder include methyl cellulose or a salt thereof, ethyl cellulose, gum arabic, gelatin, hydroxypropyl cellulose, polyvinylpyrrolidone, and the like. Examples of the lubricant include talc, magnesium stearate, polyethylene glycol, hydrogenated vegetable oil, and the like.

Examples of the stabilizer include amino acids such as arginine, histidine, lysine and methionine, human serum albumin, gelatin, dextran 40, methyl cellulose, sodium sulfite, sodium metasulfite, and the like.

Examples of other additives include syrup, vaseline, glycerin, ethanol, propylene glycol, citric acid, sodium chloride, sodium nitrite, sodium phosphate, and the like.

Examples of the pharmaceutical preparation suitable for oral administration include an emulsion, a syrup, a capsule, a tablet, a powder, a granule, and the like.

A liquid preparation such as an emulsion or a syrup is produced using water, a saccharide such as sucrose, sorbitol, or fructose, a glycol such as polyethylene glycol or propylene glycol, an oil such as sesame oil, olive oil, or soybean oil, a preservative such as a p-hydroxybenzoic acid ester, a flavor such as strawberry flavor or peppermint, or the like, as an additive.

A capsule, a tablet, a powder, a granule, or the like can be produced using an excipient such as lactose, glucose, sucrose, or mannitol, a disintegrating agent such as starch or sodium alginate, a lubricant such as magnesium stearate or talc, a binder such as polyvinyl alcohol, hydroxypropyl cellulose, or gelatin, a surfactant such as a fatty acid ester, a plasticizer such as glycerin, or the like as an additive.

Examples of the pharmaceutical preparation suitable for parenteral administration include an injection, a suppository, a spray, and the like. An injection is produced using a carrier composed of a salt solution, a glucose solution, or a mixture of both, or the like.

A suppository is produced using a carrier such as cacao butter, a hydrogenated fat, or carboxylic acid. A spray is produced using a carrier which does not stimulate the buccal or airway mucous membrane of a recipient and disperses the bispecific antibody or the bispecific antibody fragment thereof of the present invention as fine particles so as to facilitate absorption thereof, or the like. Examples of the carrier include lactose, glycerin, and the like. In addition, it can also be produced as an aerosol or a dry powder. Further, a component exemplified as the additive for the pharmaceutical preparation suitable for oral administration can also be added in the above-mentioned parenteral preparation.

An effective amount of the bispecific antibody of the present invention and an effective amount to be administered as a combination with a suitable diluent and a pharmacologically usable carrier is 0.0001 mg to 100 mg per kg of the body weight at one time, and is administered at intervals of 2 days to 8 weeks.

6. Diagnostic Method for Disease Using Bispecific Antibody or Bispecific Antibody Fragment Thereof of the Present Invention By detecting or measuring a cell having expressed CD40 and/or GPC3 using the bispecific antibody or the bispecific antibody fragment thereof of the present invention, it is possible to diagnose a disease associated with CD40 and/or GPC3, preferably a disease involved in a cell that expresses CD40 and GPC3.

The diagnosis of a malignant tumor or a cancer that is a disease associated with CD40 and/or GPC3 can be carried out by, for example, detecting or measuring CD40 and/or GPC3 as follows.

First, with respect to biological samples collected from the bodies of multiple healthy subjects, CD40 and/or GPC3 is detected or measured by the following immunological method using the bispecific antibody or the bispecific antibody fragment thereof of the present invention, or a derivative thereof, and then the abundance of CD40 and/or GPC3 in the biological samples of the healthy subjects is examined.

Subsequently, the abundance of CD40 and/or GPC3 in a biological sample of a test subject is also examined in the same manner, and then, the abundance is compared with the abundance of the healthy subjects. When the abundance of CD40 and/or GPC3 of the test subject increases as compared with that of the healthy subjects, the test subject is diagnosed as having a cancer. With respect also to the diagnosis of the other diseases associated with CD40 and/or GPC3, the diagnosis can be carried out in the same manner.

The immunological method is a method for detecting or measuring the amount of an antibody or the amount of an antigen using a labeled antigen or antibody. Examples thereof include a radioactive material labeled immune antibody method, an enzyme immunoassay method, a fluorescence immunoassay method, a luminescence immunoassay method, a Western blotting method, a physicochemical method, and the like.

Examples of the radioactive material labeled immune antibody method include a method in which the bispecific antibody or the bispecific antibody fragment thereof of the present invention is allowed to react with an antigen or a cell or the like having expressed an antigen, and further an anti-immunoglobulin antibody or a binding fragment subjected to radiolabeling is allowed to react therewith, followed by measurement with a scintillation counter or the like.

Examples of the enzyme immunoassay method include a method in which the bispecific antibody or the bispecific antibody fragment thereof of the present invention is allowed to react with an antigen or a cell or the like having expressed an antigen, and further an anti-immunoglobulin antibody or a binding fragment subjected to labeling is allowed to react therewith, followed by measurement of a coloring dye with an absorptiometer. For example, a sandwich ELISA method and the like are exemplified.

As a labeling substance used in the enzyme immunoassay method, a known enzyme label [Enzyme Immunoassay Method, IGAKU-SHOIN Ltd. (1987)] can be used. For example, an alkaline phosphatase label, a peroxidase label, a luciferase label, a biotin label, or the like is used.

The sandwich ELISA method is a method in which after an antibody is bound to a solid phase, an antigen that is a detection or measurement target is trapped, and then a second antibody is allowed to react with the trapped antigen. In the ELISA method, two types of antibodies that are antibodies or antibody fragments binding to an antigen desired to be detected or measured and have different antigen binding domains are prepared, and among them, a first antibody or antibody fragment is adsorbed onto a plate (for example, a 96-well plate) in advance, and subsequently, a second antibody or antibody fragment is labeled with a fluorescent substance such as FITC, an enzyme such as peroxidase, biotin, or the like beforehand. Cells separated from the inside of the living body or a homogenate liquid thereof, tissues or a homogenate liquid thereof, a cell culture supernatant, serum, pleural effusion, ascites, intraocular fluid, or the like is allowed to react with the plate on which the antibody is adsorbed, and thereafter the labeled antibody or antibody fragment is allowed to react therewith, and then, a detection reaction is carried out according to the labeling substance. From a calibration curve prepared by serially diluting an antigen at a known concentration, the antigen concentration in the test sample is calculated.

As the antibody used in the sandwich ELISA method, either a polyclonal antibody or a monoclonal antibody may be used, and an antibody fragment such as Fab, Fab', or F(ab)$_2$ may be used. The combination of the two types antibodies used in the sandwich ELISA method may be a combination of monoclonal antibodies or antibody fragments thereof that bind to different epitopes, or may be a combination of a polyclonal antibody and a monoclonal antibody or an antibody fragment thereof.

As the fluorescence immunoassay method, measurement is performed by, for example, a method described in the document [Monoclonal Antibodies—Principles and Practice, Third Edition, Academic Press (1996), Monoclonal Antibody Experimental Manual, Kodansha Scientific Ltd. (1987)], or the like. As a labeling substance used in the fluorescence immunoassay method, a known fluorescent label [Fluorescent Antibody Method, Soft Science, Inc. (1983)] can be used. For example, FITC, RITC, or the like is used.

As the luminescence immunoassay method, measurement is performed by, for example, a method described in the document [Bioluminescence and Chemiluminescence Clinical Test 42, Hirokawa-Shoten Ltd. (1998)], or the like. As a labeling substance used in the luminescence immunoassay method, a known luminescent label is exemplified, and for example, an acridinium ester, lophine, or the like is used.

As the Western blotting method, measurement is performed by fractionating an antigen or a cell or the like having expressed an antigen by SDS (sodium dodecyl sulfate)—PAGE [Antibodies—A Laboratory Manual Cold Spring Harbor Laboratory (1988)], thereafter blotting the gel onto a polyvinylidene fluoride (PVDF) membrane or a nitrocellulose membrane, allowing an antibody or an antibody fragment that binds to the antigen to react with the membrane, and then further allowing an anti-IgG antibody or an antibody fragment thereof labeled with a fluorescent substance such as FITC, labeled with an enzyme such as peroxidase, or labeled with biotin, or the like to react therewith, followed by visualizing the label. One example is shown below.

First, cells or tissues having expressed a polypeptide containing a desired amino acid sequence are lysed, and 0.1 to 30 μg in terms of protein amount per lane is electrophoresed by an SDS-PAGE method under reducing conditions. Subsequently, the electrophoresed protein is transferred to a PVDF membrane and is allowed to react with PBS containing 1 to 10% BSA (hereinafter referred to as BSA-PBS) at room temperature for 30 minutes to perform a blocking operation. Then, the bispecific antibody of the present invention is allowed to react therewith, and the membrane is washed with PBS containing 0.05 to 0.1% Tween 20 (Tween-PBS), and then a goat anti-mouse IgG labeled with peroxidase is allowed to react therewith at room temperature for 2 hours. By performing washing with Tween-PBS, and detecting a band to which the antibody is bound using ECL Western Blotting Detection Reagents (manufactured by Amersham, Inc.) or the like, an antigen is detected. As the antibody used for detection by Western blotting, an antibody capable of binding to a polypeptide that does not retain a natural conformation is used.

As the physicochemical method, for example, by binding CD40 and/or GPC3, each of which is an antigen to the bispecific antibody or the bispecific antibody fragment thereof of the present invention, an aggregate is formed, and the aggregate is detected. As another physicochemical method, a capillary tube method, a one-dimensional immunodiffusion method, an immunoturbidimetric method, a latex immunoturbidimetric method [Kauai's Manual of Clinical Laboratory Medicine, KANEHARA & Co., LTD. (1998)], or the like can also be used.

In the latex immunoturbidimetric method, when a carrier such as a polystyrene latex having a particle diameter of about 0.1 to 1 μm sensitized with an antibody or an antigen is used to cause an antigen-antibody reaction with a corresponding antigen or antibody, the scattered light is increased in a reaction solution and the transmitted light is decreased. The antigen concentration or the like in a test sample is measured by detecting this change as an absorbance or an integrating sphere turbidity.

On the other hand, for the detection or measurement of a cell having expressed CD40 and/or GPC3, a known immunological detection method can be used, but it is preferred to use an immunoprecipitation method, an immunocytological staining method, an immunohistological staining method, a fluorescent antibody staining method, or the like.

As the immunoprecipitation method, a cell or the like having expressed CD40 and/or GPC3 is allowed to react with the bispecific antibody or the bispecific antibody fragment thereof of the present invention, and then a carrier having a specific binding ability to an immunoglobulin such as Protein G Sepharose is added thereto, thereby precipitating an antigen-antibody complex.

Alternatively, it can also be carried out by the following method. First, the bispecific antibody or the bispecific antibody fragment thereof of the present invention is immobilized on a 96-well plate for ELISA, followed by blocking with BSA-PBS. Subsequently, BSA-PBS is discarded, and the plate is well washed with PBS, and then, a lysate solution of cells or tissues having expressed CD40 and/or GPC3 is allowed to react therewith. From the plate after being well washed, an immunoprecipitated material is extracted with a sample buffer for SDS-PAGE, and then detected by the above-mentioned Western blotting.

The immunocytological staining method or the immunohistological staining method is a method in which a cell or a tissue having expressed an antigen or the like is treated with a surfactant or methanol or the like for enhancing the permeability of the antibody in some cases, and then allowed to react with the bispecific antibody of the present invention, and further react with an anti-immunoglobulin antibody or a binding fragment thereof fluorescently labeled with FITC or the like, labeled with an enzyme such as peroxidase, or labeled with biotin, or the like, and thereafter the label is visualized, and then observed with a microscope. In addition, detection can be carried out by a fluorescent antibody staining method in which a fluorescently labeled antibody is allowed to react with a cell and analyzed with a flow cytometer [Monoclonal Antibodies—Principles and Practice, Third Edition, Academic Press (1996), Monoclonal Antibody Experimental Manual, Kodansha Scientific Ltd. (1987)]. In particular, the bispecific antibody or the bispecific antibody fragment thereof of the present invention enables detection of CD40 and/or GPC3 expressed on a cell membrane by a fluorescent antibody staining method.

In addition, when the FMAT 8100 HTS system (manufactured by Applied Biosystems, Inc.) or the like is used among the fluorescent antibody staining methods, it is possible to measure the amount of an antigen or the amount of an antibody without separating the formed antibody-antigen complex from a free antibody or antigen not involved in the formation of the antibody-antigen complex.

EXAMPLES

Hereinafter, the present invention will be more specifically described by way of Examples, however, the present invention is not limited to the following Examples.

[Example 1] Acquisition of Soluble Human and Monkey CD40 Antigens

1. Preparation of Soluble Antigens of Human CD40 and Monkey CD40

Each of the extracellular domain proteins of human and monkey CD40 in which FLAG-Fc was added to the C terminus was produced by a method described below. The nucleotide sequence encoding the extracellular domain of human CD40 is shown in SEQ ID NO: 1, the amino acid sequence deduced from the nucleotide sequence is shown in SEQ ID NO: 2, the nucleotide sequence encoding the extracellular domain of monkey CD40 is shown in SEQ ID NO: 3, and the amino acid sequence deduced from the nucleotide sequence is shown in SEQ ID NO: 4.

(1) Production of Human and Monkey CD40-FLAG-Fc Vectors

A gene fragment of the extracellular domain of human CD40 composed of the nucleotide sequence shown in SEQ ID NO: 1 was produced based on the nucleotide sequence of a human CD40 gene (Genbank Accession Number: NM_001250, SEQ ID NO: 5, an amino acid sequence encoded by the gene is shown in SEQ ID NO: 6).

An INPEP4 vector (manufactured by Biogen-IDEC GmbH) containing a FLAG-tag and an Fc region of human IgG was digested with restriction enzymes KpnI and XbaI, and a gene fragment of the extracellular domain to which a human CD40 signal sequence coding region composed of the nucleotide sequence at positions 1 to 60 of the nucleotide sequence shown in SEQ ID NO: 1 was added was inserted into an appropriate site, whereby a human CD40-FLAG-Fc expression vector was produced.

In the same manner, a monkey CD40-FLAG-Fc expression vector containing a gene fragment of the extracellular domain of monkey CD40 composed of the nucleotide sequence shown in SEQ ID NO: 3 was produced based on the nucleotide sequence of a monkey CD40 gene (SEQ ID NO: 7, an amino acid sequence encoded by the gene is shown in SEQ ID NO: 8) cloned from a monkey peripheral blood mononuclear cell (PBMC).

(2) Production of Human and Monkey CD40-FLAG-Fc Proteins

The human CD40-FLAG-Fc expression vector produced in 1. (1) was introduced into HEK 293 cells using FreeStyle (trademark) 293 Expression System (manufactured by Thermo Fisher, Inc.) and the cells were cultured to express a protein in a transient expression system. The culture supernatant was collected 5 days after introduction of the vector, and filtered through a membrane filter (manufactured by Millipore Corporation) having a pore diameter of 0.22 μm.

The culture supernatant was subjected to affinity purification using a Protein A resin (MabSelect, manufactured by GE Healthcare, Inc.). The antibody adsorbed to the Protein A was washed with Dulbecco's phosphate buffered saline [D-PBS(–) without Ca and Mg, liquid; hereinafter referred to as D-PBS(–), manufactured by Nacalai Tesque, Inc.], eluted with a 20 mM sodium citrate and 50 mM NaCl buffer solution (pH 3.4) and collected in a tube containing a 1 M sodium phosphate buffer solution (pH 7.0).

Subsequently, the buffer solution was replaced with D-PBS(–) by ultrafiltration using VIVASPIN (manufactured by Sartrius stealin), followed by filter sterilization with a membrane filter Millex-Gv (manufactured by Millipore Corporation) having a pore diameter of 0.22 μm, whereby a human CD40-FLAG-Fc protein was produced. In the same manner, a monkey CD40-FLAG-Fc protein was produced using the monkey CD40-FLAG-Fc expression vector produced in 1. (1). The concentration of the obtained protein was determined by measuring an absorbance at a wavelength of 280 nm and performing calculation using an extinction coefficient estimated from the amino acid sequence of each protein.

(3) Production of Human and Monkey CD40-GST Vectors

An N5 vector (manufactured by Biogen-IDEC GmbH) containing a GST region was digested with restriction enzymes BglII and KpnI, and a gene fragment of the extracellular domain of human CD40 composed of the nucleotide sequence represented by SEQ ID NO: 1 described in 1. (1) was inserted into an appropriate site, whereby a human CD40-GST expression vector was produced. In the same manner, a monkey CD40-GST expression vector containing a gene fragment of the extracellular domain composed of the nucleotide sequence represented by SEQ NO: 3 was produced.

(4) Production of Human and Monkey CD40-GST Proteins

The human CD40-GST vector produced in 1. (3) was introduced into HEK 293 cells in the same manner as in 1. (2), and the cells were cultured, and then, the culture supernatant was filtered through a membrane filter. The culture supernatant was reacted with Glutathione Sepharose 4B (manufactured by GE Healthcare), and washed with D-PBS(–), and then subjected to affinity purification using 10 mM Glutathione in 50 mM Tris-HCl (pH 8.0) as an elution buffer solution.

The eluted fusion protein solution was subjected to ultrafiltration and filter sterilization with a membrane filter in the same manner as in 1. (2), whereby a human CD40-GST protein was obtained. Further, by using the monkey CD40-GST vector, a monkey CD40-GST protein was obtained in the same manner. The concentration of the obtained protein was determined by measuring an absorbance at a wavelength of 280 nm and performing calculation using an extinction coefficient estimated from the amino acid sequence of each protein.

[Example 2] Acquisition of Anti-CD40 Antibody

1. Production of CD40-Immunized Human Antibody M13 Phage Library

As an immunogen, the human CD40-FLAG-Fc produced in Example 1 was intraperitoneally administered to a human antibody-producing mouse [Ishida & Lonberg, IBC's 11th Antibody Engineering, Abstract 2000; Ishida, I. et al., Cloning & Stem Cells 4, 85-96 (2002) and Isamu Ishida (2002) Experimental medicine 20, 6, 846-851] a total of 4 times. Only at the first immunization, Alum gel (2 mg/mouse) and pertussis vaccine ($1 \times 10^9$ vaccines/mouse) were added as adjuvants.

The second immunization was performed two weeks after the first immunization, the third immunization was performed 1 week thereafter, the final immunization was performed 10 days after the third immunization, and dissection was performed 4 days after the final immunization and the spleen was surgically excised. The excised spleen was placed on a cell strainer (manufactured by Falcon, Inc.) and the cells were transferred to a tube while gently smashing with a silicon rod, and centrifuged to precipitate the cells, then the cells were reacted with a red blood cell depletion reagent (manufactured by Sigma-Aldrich Co. LLC) in ice for 3 minutes, followed by further centrifugation.

RNA was extracted from the obtained spleen cells using RNeasy Mini kit (manufactured by QIAGEN, cDNAs were amplified using a SMARTer RACE cDNA amplification kit (manufactured by Clontech Laboratories, Inc.), and further, a VH gene fragment was amplified by PCR. The VH gene fragment was inserted into a phagemid pCANTAB 5E (manufactured by Amersham Pharmacia, Inc.) together with a VL gene that is a human antibody germ-line sequence and contains the nucleotide sequence represented by SEQ ID NO: 9 encoding the amino acid sequence (VL) of L6, and *E. coli* TG1 (manufactured by Lucigen Corporation) was transformed with the phagemid, whereby plasmids were obtained.

Note that the L6 sequence encodes a light chain variable region (VL) of a human antibody composed of the amino acid sequence represented by SEQ ID NO: 10, and the amino acid sequences of CDRs 1, 2, and 3 of the VL (also denoted by LCDRs 1, 2, and 3, respectively) are represented by SEQ ID NOS: 11, 12, and 13, respectively.

By infecting VCSM13 Interference Resistant Helper Phage (manufactured by Agilent Technologies, Inc.) with the obtained plasmids, a CD40-immunized human antibody M13 phage library that has the VL gene composed of the L6 sequence and includes a library of VH genes was obtained.

2. Acquisition of Anti-CD40 Monoclonal Antibody

By using the CD40-immunized human antibody M13 phage library, an anti-CD40 monoclonal antibody including VL containing the amino acid sequence of L6 was obtained by the following phage display method. MAXISORP STARTUBE (manufactured by NUNC, Inc.) in which the human CD40-GST obtained in Example 1 was immobilized and a portion to which the human CD40-GST is not bound was blocked using SuperBlock Blockig Buffer (manufactured by Thermo Fisher, Inc.), and the human antibody M13 phage library were allowed to react at room temperature for 1 to 2 hours, and washing was performed 3 times each with D-PBS(–) and PBS containing 0.1% Tween 20 (hereinafter referred to as PBS-T, manufactured by Wako Pure Chemical Industries, Ltd.), and thereafter, the phage was eluted with 0.1 M Gly-HCl (pH 2.2).

The eluted phage was used to infect TG1 competent cells to amply the phage, which was reacted again with human CD40-GSI immobilized on MAXISORP STARTUBE, followed by washing 5 times each with D-PBS(–) and PBS-T, and thereafter, the phage was eluted with 0.1 M Gly-HCl (pH 2.2).

This operation was repeated twice or three times to concentrate the phage displaying scFv that specifically binds to human CD40. The concentrated phage was used to infect TG1, which was then inoculated in a SOBAG plate (2.0% tryptone, 0.5% Yeast extract, 0.05% NaCl, 2.0% glucose, 10 mM $MgCl_2$, 100 μg/mL ampicillin, and 1.5% agar) to form a colony.

The colony was inoculated and cultured, and then infected with VCSM13 Interference Resistant Helper Phage, and cultured again, whereby a monoclonal phage was obtained. By using the obtained monoclonal phage, a clone that binds to both human and monkey CD40-GST was selected by ELISA.

In the ELISA, MAXISORP (manufactured by NUNC, Inc.) in which the human or monkey CD40-GST in Example 1 was immobilized on each well and a portion to which the human or monkey CD40-GST is not bound was blocked using SuperBlock Blockig Buffer (manufactured by Thermo Fisher, Inc.) was used. To each well, each phage clone was added and reacted at room temperature for 30 minutes, and thereafter, each well was washed 3 times with PBS-T.

Subsequently, an anti-M13 antibody (manufactured by GE Healthcare, Inc.) labeled with horseradish peroxidase was diluted 5000 times with PBS-T containing 10% Block Ace (manufactured by Dainippon Pharmaceutical Co., Ltd.), and the resultant was added in an amount of 50 μL to each well, and incubated at room temperature for 30 minutes. After the microplate was washed four times with PBS-T, a TMB chromogenic substrate solution (manufactured by DAKO, Inc.) was added in an amount of 50 μL to each well and incubated at room temperature for 10 minutes. The coloring reaction was stopped by adding a 2 N HCl solution to each well (50 μL/well), and an absorbance at a wavelength of 450 nm (reference wavelength: 570 nm) was measured using a plate reader (Emax, Molecular Devices, Inc.).

A sequence analysis was performed for a clone bound to both human and monkey CD40, whereby an anti-CD40 antibody R1090S55A having VL composed of the L6 sequence was obtained. In Table 1, the entire nucleotide sequence encoding VH of the obtained CD40 antibody, the amino acid sequence deduced from the nucleotide sequence, and the amino acid sequences of CDRs 1 to 3 of VH (hereinafter sometimes referred to as HCDRs 1 to 3) are shown.

TABLE 1

Sequence Information of VH of Anti-Human CD40 Antibody

| Clone name | R1090S55A |
|---|---|
| Nucleotide sequence encoding VH | SEQ ID NO: 14 |
| Amino acid sequence of VH | SEQ ID NO: 15 |
| Amino acid sequence of HCDR1 | SEQ ID NO: 16 |
| Ammo acid sequence of HCDR2 | SEQ ID NO: 17 |
| Amino acid sequence of HCDR3 | SEQ ID NO: 18 |

A soluble IgG expression vector into which the gene of the obtained anti-CD40 antibody R1090S55A was integrated was produced. First, the L6 gene encoding VL of R1090S55A was subcloned into the BglII-BsiWI site of N5KG4PF R409K (described in WO 2006/033386).

Thereafter, the VH gene of R1090S55A was subcloned into the SalI-NheI site of the N5KG4PE R409K vector, whereby N5KG4PE R409K_R1090S55A that is an expression vector for the anti-CD40 monoclonal antibody R1090S55A having a constant region of human IgG4PE R409K was obtained.

Further, in order to produce an anti-CD40 monoclonal antibody 21.4.1 (hereinafter also referred to as CP-870,893) described in WO 2003/040170 as the positive control antibody of the anti-CD40 antibody, an expression vector was produced. The nucleotide sequence of VH of 21.4.1 is represented by SEQ ID NO: 19 and the amino acid sequence of the VH deduced from the sequence is represented by SEQ ID NO: 20. Further, the nucleotide sequence of VL of 21.4.1 is represented by SEQ ID NO: 21 and the amino acid sequence of the VL deduced from the sequence is represented by SEQ ID NO: 22.

The genes encoding VH and VL of 21.4.1 were synthesized and subcloned into the SalI-NheI and BglII-BsiWI sites of an N5KG2 vector (described in WO 2003/033538), respectively, whereby an expression vector N5KG2_21.4.1 for the anti-CD40 monoclonal antibody 21.4.1 having a constant region of human IgG2 was obtained.

[Example 3] Preparation of Soluble Human and Mouse GPC3 Antigens

A soluble GPC3 protein in which an Fc region of human, mouse, or rabbit IgG or GST was added to the C terminus of a human or mouse GPC3 protein was produced by a method described below.

(1) Production of Human and Mouse GPC3-Mouse-Fc Vectors

A full-length amino acid sequence of human GPC3 was obtained from the nucleotide sequence of a human GPC3 gene (Genbank Accession Number: NM_004484), and the codon was converted to a codon most suitable for expression in a mammalian cell, whereby a nucleotide sequence encoding full-length human GPC3 was obtained. A DNA fragment of soluble human GPC3 was obtained by a polymerase chain reaction (PCR) using the nucleotide sequence encoding the full-length GPC3 as a template. Further, a DNA fragment of mouse Fc (hereinafter also referred to as mFc) was obtained by performing PCR using a vector encoding mouse IgG as a template. A nucleotide sequence (SEQ ID NO: 23) in which mFc was linked to the C terminus of soluble human GPC3 containing a signal sequence was inserted into a pCI vector (manufactured by Promega Corporation) using Infusion-HD Cloning Kit (manufactured by Clontech Laboratories, Inc.), whereby an expression vector for human GPC3-mFc was obtained. The amino acid sequence that does not contain the signal sequence in the amino acid sequence deduced from the nucleotide sequence of human GPC3-mFc is represented by SEQ ID NO: 24.

In the same manner, a mouse GPC3-mFc vector in which the nucleotide sequence (SEQ ID NO: 25) of mouse GPC3-mFc containing a signal sequence was inserted was produced using the nucleotide sequence of a mouse GPC3 gene (Genbank Accession Number: NM_016697). The amino acid sequence that does not contain the signal sequence in the amino acid sequence deduced from the nucleotide sequence of mouse GPC3-mFc is represented by SEQ ID NO: 26.

(2) Production of Human and Mouse GPC3-Mouse Fc Proteins

The human GPC3-mFc expression vector produced in (1) was introduced into Expi293F cells using Expi293 (trademark) Expression System (manufactured by Thermo Fisher, Inc.), and the cells were cultured to transiently express a protein. The culture supernatant was collected 4 days after introduction of the vector, and filtered through a membrane filter (manufactured by Millipore Corporation) having a pore diameter of 0.22 μm.

The culture supernatant was subjected to affinity purification using a Protein A resin (MabSelect, manufactured by GE Healthcare, Inc.). The antibody adsorbed to the Protein A was washed with D-PBS(−), eluted with a 20 mM sodium citrate and 50 mM NaCl buffer solution (pH 3.4) and collected in a tube containing a 1 M sodium phosphate buffer solution (pH 7.0).

Subsequently, the eluate was replaced with D-PBS(−) by ultrafiltration using VIVASPIN (manufactured by Sartrius stealin), followed by filter sterilization with a membrane filter Millex-Gv (manufactured by Millipore Corporation) having a pore diameter of 0.22 µm, whereby a human GPC3-mFc protein was produced.

In the same manner, a mouse GPC3-mFc protein was produced using the mouse GPC3-mFc expression vector produced in 1. (1). The concentration of the obtained protein was determined by measuring an absorbance at a wavelength of 280 nm and performing calculation using an extinction coefficient estimated from the amino acid sequence of each protein.

(3) Production of Human and Mouse GPC3-Rabbit Fc Vectors

A DNA fragment of soluble human GPC3 was obtained in the same manner as in (1). Further, a DNA fragment of rabbit Fc (hereinafter also referred to as rFc) was obtained by performing PCR using a vector encoding rabbit IgG as a template. A nucleotide sequence (SEQ ID NO: 27) in which rFc was linked to the C terminus of soluble human GPC3 containing a signal sequence was inserted into a pCI vector (manufactured by Promega Corporation) using Infusion-HD Cloning Kit (manufactured by Clontech Laboratories, Inc.), whereby an expression vector for human GPC3-rFc was obtained. The amino acid sequence that does not contain the signal sequence in the amino acid sequence deduced from the nucleotide sequence of human GPC3-rFc is represented by SEQ ID NO: 28.

A mouse GPC3-rFc, vector in which the nucleotide sequence (SEQ ID NO: 29) of mouse GPC3-rFc containing a signal sequence was inserted was produced in the same manner. The amino acid sequence that does not contain the signal sequence in the amino acid sequence deduced from the nucleotide sequence of mouse GPC3-rFc is represented by SEQ ID NO: 30.

(4) Production of Human and Mouse GPC3-Rabbit Fc Proteins

The human GPC3-rFc expression vector produced in (3) was introduced into Expi293F cells using Expi293 (trademark) Expression System (manufactured by Thermo Fisher, Inc), and the cells were cultured to express a protein in a transient expression system. The culture supernatant was collected 4 days after introduction of the vector, and filtered through a membrane filter (manufactured by Millipore Corporation) having a pore diameter of 0.22 µm.

The culture supernatant was subjected to affinity purification using a Protein A resin (MabSelect, manufactured by GE Healthcare, Inc.). The antibody adsorbed to the Protein A was washed with D-PBS(−), eluted with a 20 mM sodium citrate and 50 mM NaCl buffer solution (pH 3.4) and collected in a tube containing a 1 M sodium phosphate buffer solution (pH 7.0).

Subsequently, the eluate was replaced with D-PBS(−) by ultrafiltration using VIVASPIN (manufactured by Sartrius stealin), followed by filter sterilization with a membrane filter Millex-Gv (manufactured by Millipore Corporation) having a pore diameter of 0.22 µm, whereby a human GPC3-rFc protein was produced.

In the same manner, a mouse GPC3-rFc protein was produced using the mouse GPC3-rFc expression vector produced in (3). The concentration of the obtained protein was determined by measuring an absorbance at a wavelength of 280 nm and performing calculation using an extinction coefficient estimated from the amino acid sequence of each protein.

(5) Production of Human GPC3-GST Vector

A GPI anchor addition sequence and a signal sequence were removed from the nucleotide sequence of a human GPC3 gene (Genbank Accession Number: NM_1164618), whereby a soluble human GPC3 amino acid sequence represented by SEQ ID NO: 31 was obtained. To the C terminus of the soluble human GPC3 amino acid sequence represented by SEQ ID NO: 31, a GST amino acid sequence was added, whereby a human GPC3-GST amino acid sequence represented by SEQ ID NO: 33 was produced. The codon was converted to a codon most suitable for expression in a mammalian cell based on the amino acid sequence of human GPC3-GST, whereby a nucleotide sequence of human GPC3-GST represented by SEQ ID NO: 32 was obtained. The full-length nucleotide sequence of human GPC3-GST was synthesized and inserted into an appropriate site of a pCI vector (manufactured by Promega Corporation) containing a signal sequence, whereby a human GPC3-GST expression vector was produced.

(6) Production of Human GPC3-GST Protein

The human GPC3-GST expression vector produced in (5) was introduced into Expi293F cells using Expi293 (trademark) Expression System (manufactured by Thermo Fisher, Inc.), and the cells were cultured to express a protein in a transient expression system. The culture supernatant was collected 4 days after introduction of the vector, and filtered through a membrane filter (manufactured by Millipore Corporation) having a pore diameter of 0.22 µm.

The culture supernatant was subjected to affinity purification using a glutathione resin (Glutathione Sepharose 4B, manufactured by GE Healthcare). The antibody adsorbed to glutathione was washed with D-PBS(−), and then eluted with 50 mM Tris-HCl and 10 mM reduced glutathione (pH 8.0).

Subsequently, the eluate was replaced with D-PBS(−) by ultrafiltration using VIVASPIN (manufactured by Sartrius stealin), followed by filter sterilization with a membrane filter Millex-Gv (manufactured by Millipore Corporation) having a pore diameter of 0.22 µm, whereby a human GPC3-GST protein was produced. The concentration of the obtained protein was determined by measuring an absorbance at a wavelength of 280 nm and performing calculation using an extinction coefficient estimated from the amino acid sequence of each protein.

(7) Production of Heparan Sulfate Addition Site Mutants of Human and Mouse GPC3

An amino acid sequence of soluble human GPC3 (human GPC3-AA) in which heparan sulfate is not added was obtained by substituting serif) at position 495 and serif at position 509, each of which is known as an addition site of heparan sulfate, with alanine based on the soluble human GPC3 amino acid sequence represented by SEQ ID NO: 31. The codon was converted to a codon most suitable for expression in a mammalian cell based on the amino acid sequence of human GPC3-AA, whereby a nucleotide sequence of human GPC3-AA was obtained.

The full-length nucleotide sequence of human GPC3-AA was synthesized and inserted into an appropriate restriction enzyme site of a pCI vector (manufactured by Promega Corporation) containing a signal sequence and a Flag tag and human Fe (hereinafter referred to as hFc), whereby an expression vector for human GPC3-AA-Flag-hFc (the nucleotide sequence containing the signal sequence is represented by SEQ ID NO: 34) was produced. The amino acid sequence that does not contain the signal sequence in the amino acid sequence of human GPC3-AA-Flag-hFc deduced from the nucleotide sequence is represented by SEQ ID NO: 35.

The GPI anchor addition sequence and the signal sequence were removed from the nucleotide sequence of a mouse GPC3 gene (Genbank Accession Number: NM_0016697), whereby a soluble mouse GPC3 amino acid sequence represented by SEQ ID NO: 36 was obtained in the same manner. An amino acid sequence of soluble mouse GPC3 (mouse GPC3-AA) in which heparan sulfate is not added was obtained by substituting serin at position 494 and serin at position 508, each of which is known as an addition site of heparan sulfate, with alanine based on the soluble mouse GPC3 amino acid sequence represented by SEQ ID NO: 36.

The codon was converted to a codon most suitable for expression in a mammalian cell based on the amino acid sequence of mouse GPC3-AA, whereby a nucleotide sequence of mouse GPC3-AA was obtained. The full-length nucleotide sequence of mouse GPC3-AA was synthesized and inserted into an appropriate restriction enzyme site of a pCI vector (manufactured by Promega Corporation) containing a signal sequence and a Flag tag and hFc, whereby an expression vector having mouse GPC3-AA-Flag-hFc (the nucleotide sequence containing the signal sequence is represented by SEQ ID NO: 37) was produced. The amino acid sequence that does not contain the signal sequence in the amino acid sequence deduced from the nucleotide sequence of mouse GPC3-AA-Flag-hFc is represented by SEQ ID NO: 38.

(8) Production of Biotinylated Human GPC3-hFc and Biotinylated Mouse GPC3-hFc

Human GPC3-Fc and mouse GPC3-Fc (manufactured by ACROBiosystems, Inc.) were biotinylated using EZ-Link Sulfo-HNS-LC-Biotin, No-Weight Format (manufactured by Thermo Fisher Scientific, Inc.), whereby biotinylated human GPC3-Fc and biotinylated mouse GPC3-Fc were obtained.

(9) Production of Expression Vector for Full-Length Human GPC3

A nucleotide sequence encoding the full-length human GPC3 obtained in (1) was synthesized, and the obtained nucleotide sequence fragment (SEQ ID NO: 39) was ligated to an appropriate restriction enzyme site of a pEF6 vector (manufactured by Thermo Fisher Scientific, Inc.), whereby a human GPC3 expression vector pEF6-MycHisC-hGPC3 (1-580) was obtained.

[Example 4] Acquisition of Anti-GPC3 Antibody

Production of Human Naive Antibody M13 Phage Library

A VH gene fragment was amplified by PCR from a cDNA derived from human PBMC. The VH gene fragment and a VL gene fragment that is a human antibody germ-line sequence and contains the nucleotide sequence of L6 composed of the nucleotide sequence represented by SEQ ID NO: 9 were inserted into a vector in which a tag sequence of a phagemid pCANTAB 5E (manufactured by Amersham Pharmacia, Inc.) was changed to a FLAG-His tag and a trypsin recognition sequence, and *E. coli* TG1 (manufactured by Lucigen Corporation) was transformed with the vector, whereby plasmids were obtained.

Note that L6 is a light chain variable region (VL) of a human antibody containing the amino acid sequence represented by SEQ ID NO: 10, and the amino acid sequences of CDRs 1, 2, and 3 of the VL (also denoted by LCDRs 1, 2, and 3, respectively) are represented by SEQ ID NOS: 11, 12, and 13, respectively.

By infecting VCSM13 Interference Resistant Helper Phage (manufactured by Agilent Technologies, Inc.) with the obtained plasmids, a human naive antibody M13 phage library that has the VL gene containing the nucleotide sequence encoding the amino acid sequence of L6 and includes a library of VH genes was obtained.

Production of GPC3-Immunized Human Antibody M13 Phage Library

As an immunogen, the human GPC3-GST, the human GPC3-mFc, the mouse GPC3-mFc, the human GPC3-rFc, or the mouse GPC3-rFc produced in Example 3, human GPC3-Fc (manufactured by ACROBiosystems, Inc.), or mouse GPC3-Fc (manufactured by ACROBiosystems, Inc.) was administered to a human antibody-producing mouse [Ishida Lonberg, IBC's 11th Antibody Engineering, Abstract 2000; Ishida, I. et al., Cloning & Stem Cells 4, 85-96 (2002) and Isamu Ishida (2002) Experimental medicine 20, 6, 846-851] a total of 4 times at 20 μg/mouse or 50 μg/mouse. Only at the first immunization, Alum gel (0.25 mg/mouse or 2 mg/mouse) and an inactivated *Bordetella pertussis* suspension (manufactured by Nacalai Tesque, Inc.) ($1 \times 10^9$ cells/mouse) were added as adjuvants.

The second immunization was performed two weeks after the first immunization, the third immunization was performed 1 week thereafter, the final immunization was performed 2 weeks after the third immunization, and dissection was performed 4 days after the final immunization and the lymph node or the spleen was surgically excised. The excised lymph node or spleen was homogenized, and thereafter, the cells were transferred to a tube through a cell strainer (manufactured by Falcon, Inc.), and centrifuged to precipitate the cells. The obtained spleen cells were mixed with a red blood cell depletion reagent (manufactured by Sigma-Aldrich Co. LLC) and reacted with the reagent for 1 minute in a warm water bath at 37° C., followed by dilution with DMEM medium (manufactured by Sigma-Aldrich Co. LLC), and further the resultant was centrifuged.

RNA was extracted from the obtained lymph node cells or spleen cells using RNeasy Mini Plus kit (manufactured by QIAGEN, Inc.), cDNAs were amplified using a SMARTer RACE cDNA amplification kit (manufactured by Clontech Laboratories, Inc.), and further, a VH gene fragment was amplified by PCR. The VH gene fragment and a VL gene fragment that is a human antibody germ-line sequence and contains the L6 sequence composed of the nucleotide sequence represented by SEQ ID NO: 9 were inserted into a vector in which a tag sequence of a phagemid pCANTAB 5E (manufactured by Amersham Pharmacia, Inc.) was changed to a FLAG-His tag and a trypsin recognition sequence, and *E. coli* TG1 (manufactured by Lucigen Corporation) was transformed with the vector, whereby plasmids were obtained.

By infecting VCSM13 Interference Resistant Helper Phage (manufactured by Agilent Technologies, Inc.) with the obtained plasmids, a GPC3-immunized human antibody M13 phage library that has the VL gene composed of the L6 sequence and includes a library of VH genes was obtained.

3. Acquisition of Anti-GPC3 Monoclonal Antibody

By using the human naive antibody M13 phage library and the GPC3-immunized human antibody M13 phage library, an anti-GPC3 monoclonal antibody including VL containing the amino acid sequence of L6 was obtained by the following phage display method. Subsequently, on MAXISORP STARTUBE (manufactured by NUNC, Inc.), streptavidin (manufactured by Thermo Fisher, Inc.) was immobilized and blocking was performed using SuperBlock Blocking Buffer (manufactured by Thermo Fisher, Inc.), and thereafter, the biotinylated human GPC3-Fc or the biotinylated mouse GPC3-Fc produced in Example 3 was bound thereto.

On MAXISORP STARTUBE (manufactured by NUNC, Inc.), the human GPC3-AA-Flag-hFc or the mouse GPC3-AA-Flag-hFc produced in Example 3 was immobilized and blocking was performed using SuperBlock Blocking Buffer. Each MAXISORP STARTUBE and the human naive antibody M13 phage library or the GPC3-immunized human antibody M13 phage library were reacted with each other at room temperature for 1 to 2 hours, and washing was performed with D-PBS(−) and PBS containing 0.1% Tween 20 (hereinafter referred to as PBS-T, manufactured by Wako Pure Chemical Industries, Ltd.), and thereafter, the phage was eluted with 0.25% trypsin (manufactured by Nacalai Tesque, Inc.). The eluted phage was used to infect TG1 competent cells to amply the phage.

Thereafter, the resultant was reacted again with the biotinylated human GPC3-Fc, the biotinylated mouse GPC3-Fc, the human GPC3-AA-FLAG-hFc, or the mouse GPC3-AA-FLAG-hFc immobilized on MAXISORP STARTUBE, and then, washing and elution were performed. This operation was repeated to concentrate the phage displaying an antibody molecule that specifically binds to human GPC3 and mouse GPC3.

The concentrated phage was used to infect TG1, which was then inoculated in a SOBAG plate (2.0% tryptone, 0.5% Yeast extract, 0.05% NaCl, 2.0% glucose, 10 mM $MgCl_2$, 100 μg/mL ampicillin, and 1.5% agar) to form a colony.

The colony was inoculated and cultured for several hours, and then, 1 mM IPTG (manufactured by Nacalai Tesque, Inc.) was added thereto, and the colony was cultured again, whereby a monoclonal *E. coli* culture supernatant was obtained. By using the obtained monoclonal *E. coli* culture supernatant, a clone that binds to human GPC3 and mouse GPC3 was selected by ELISA.

In the ELISA, MAXISORP (manufactured by NUNC, Inc.) in which streptavidin (manufactured by Thermo Fisher, Inc.) was immobilized and blocking was performed using SuperBlock Blockig Buffer (manufactured by Thermo Fisher, Inc.), and thereafter, the biotinylated human GPC3-Fc or the biotinylated mouse GPC3-Fc produced in Example 3 was bound thereto was used. To each well, each culture supernatant and an anti-FLAG antibody (manufactured by Sigma-Aldrich Co. LLC) were added and reacted at room temperature for 60 minutes, and thereafter, each well was washed 3 times with PBS-T.

Subsequently, an anti-mouse antibody (manufactured by Abcam plc.) labeled with horseradish peroxidase was diluted 1000 times with PBS-T containing 10% Block Ace (manufactured by Dainippon Pharmaceutical Co., Ltd.), and the resultant was added in an amount of 50 μL to each well, and incubated at room temperature for 30 minutes. After the microplate was washed three times with PBS-T, a TMB chromogenic substrate solution (manufactured by DAKO, Inc.) was added in an amount of 50 μL to each well and incubated at room temperature for 10 minutes. The coloring reaction was stopped by adding a 2 N HCl solution to each well (50 μL/well), and an absorbance at a wavelength of 450 nm (reference wavelength: 570 nm) was measured using a plate reader (EnSpire, manufactured by PerkinElmer, Inc.).

A sequence analysis was performed for clones bound to human GPC3 and mouse GPC3, whereby anti-GPC3 antibodies having VL containing the amino acid sequence of L6 were obtained.

Further, a sequence analysis was performed by an Ion PGM (trademark) system (manufactured by Thermo Fisher Scientific, Inc.) using a DNA prepared from *E. coli* obtained by infecting TG1 with the above concentrated phage, and a concentrated antibody sequence was selected. A nucleotide sequence encoding the selected antibody and the nucleotide sequence of L6 were artificially synthesized, and an antibody expression cassette was produced by a procedure in accordance with the method described in J Virol Methods. (2009) 158 (1-2): 171-179. By using this cassette, the gene was introduced into Expi293F cells by Expi293 (trademark) Expression System (manufactured by Thermo Fisher, Inc.), and by using the obtained antibody transiently expressing cell culture supernatant, the binding affinity for human GPC3 and mouse GPC3 was evaluated by Enzyme-Linked ImmunoSorbent Assay (ELISA) according to the following procedure.

Human GPC3-His (manufactured by ACROBiosystems, Inc.) was diluted to a concentration of 2 μg/mL with D-PBS (−), and the resultant was dispensed in Ni-NTA HisSorb Plates (manufactured by QIAGEN, Inc.) at 100 μL/well, and the plates were left to stand at room temperature for 1 hour. After each well was washed three times with 200 μL/well of D-PBS(−), the GPC3 antibody diluted to 0.0001, 0.001, 0.01, 0.1, 1, or 10 μg/mL with 1% (w/v) BSA-PBS(−) pH 7.0 (manufactured by Nacalai Tesque, Inc., hereinafter referred to as BSA-PBS) was added to the well al 100 μL/well.

After the plates were left to stand at room temperature for 1 hour, washing was performed three times with 200 μL/well of PBS-T, and as a secondary antibody, a solution obtained by diluting Peroxidase AffiniPure Goat Anti-Human IgG, Fcγ Fragment specific (manufactured by Jackson ImmunoReseach, Inc.) 1000 times with 1% (w/v) BSA-PBS(−) pH 7.0 (manufactured by Nacalai Tesque, Inc., hereinafter referred to as BSA-PBS) was added at 100 μL/well, and the plates were left to stand at room temperature for 1 hour. Each well was washed three times with 200 μL/well of PBS-T, and thereafter washed twice with 200 μL/well of D-PBS(−), and then, a mixed liquid obtained by mixing equal amounts of liquid A and liquid B of Substrate Reagent Pack (manufactured by R&D Systems) was added at 50 μL/well, and the plates were left to stand for 5 minutes. The reaction was stopped by adding Stop solution (manufactured by R&D Systems) at 50 μL/well, and absorbances at 450 nm and 570 nm were measured using an EPOCH 2 microplate reader (manufactured by BioTek Instruments, Inc.), and a value obtained by subtracting the absorbance at 570 nm from the absorbance at 450 nm was calculated.

In Table 2, the entire nucleotide sequence encoding VH of each of the obtained GPC3 antibodies and the amino acid sequence deduced from the nucleotide sequence, and the amino acid sequences of CDRs 1 to 3 of VH (hereinafter sometimes referred to as HCDRs 1 to 3) are shown.

TABLE 2

Sequence Information of VH of Anti-GPC3 Antibody

| Clone name | Nucleotide sequence encoding VH | Amino acid sequence of VH | Amino acid sequence of HCDR1 | Amino acid sequence of HCDR2 | Amino acid sequence of HCDR3 |
|---|---|---|---|---|---|
| GpS1019 | SEQ ID NO: 40 | SEQ ID NO: 41 | SEQ ID NO: 42 | SEQ ID NO: 43 | SEQ ID NO: 44 |
| GpA6005 | SEQ ID NO: 45 | SEQ ID NO: 46 | SEQ ID NO: 47 | SEQ ID NO: 48 | SEQ ID NO: 49 |
| GpA6014 | SEQ ID NO: 50 | SEQ ID NO: 51 | SEQ ID NO: 52 | SEQ ID NO: 53 | SEQ ID NO: 54 |
| GpA6062 | SEQ ID NO: 55 | SEQ ID NO: 56 | SEQ ID NO: 57 | SEQ ID NO: 58 | SEQ ID NO: 59 |
| GpS3003 | SEQ ID NO: 60 | SEQ ID NO: 61 | SEQ ID NO: 62 | SEQ ID NO: 63 | SEQ ID NO: 64 |
| GPngs18 | SEQ ID NO: 65 | SEQ ID NO: 66 | SEQ ID NO: 67 | SEQ ID NO: 68 | SEQ ID NO: 69 |
| GPngs62 | SEQ ID NO: 70 | SEQ ID NO: 71 | SEQ ID NO: 72 | SEQ ID NO: 73 | SEQ ID NO: 74 |

4. Production of Expression Vector for Anti-GPC3 Antibody

IgG expression vectors into which the gene of each of the anti-GPC3 antibodies shown in Table 2 was integrated were produced. A nucleotide sequence (SEQ ID NO: 9) encoding the amino acid sequence (SEQ ID NO: 10) of VL (L6) common to the anti-CD40 antibody R1090S55A obtained in Example 2 and the anti-GPC3 antibody clones shown in Table 2 was artificially synthesized, and ligated to an appropriate restriction enzyme site of a pCI vector (Promega Corporation) containing a signal sequence, whereby a light chain expression vector containing VL of L6 was obtained. The nucleotide sequence encoding the light chain including L6 as VL is represented by SEQ ID NO: 75, and the amino acid sequence of the light chain deduced from the sequence is represented by SEQ ID NO: 76.

Subsequently, the nucleotide sequence of VH of each of the anti-GPC3 antibodies shown in Table 2 was amplified by PCR and inserted into a pCI vector (Promega. Corporation) containing a nucleotide sequence encoding a polypeptide composed of the heavy chain constant region (hereinafter also referred to as CH) of human IgG4PE R409K represented by SEQ ID NO: 77 using an appropriate restriction enzyme site, whereby a heavy chain expression vector of the anti-GPC3 antibody was obtained. The SEQ ID NOS of the nucleotide sequence of the monoclonal antibody including VH of each of the obtained anti-GPC3 antibodies and the amino acid sequence deduced from the nucleotide sequence are shown in Table 3.

TABLE 3

Heavy Chain Sequence of Produced Anti-GPC3 Antibody (constant region is IgG4PE R409K)

| Name of anti-GPC3 antibody | Nucleotide sequence encoding heavy chain | Amino acid sequence of heavy chain |
|---|---|---|
| GpS1019 | SEQ ID NO: 78 | SEQ ID NO: 79 |
| GpA6005 | SEQ ID NO: 80 | SEQ ID NO: 81 |
| GpA6014 | SEQ ID NO: 82 | SEQ ID NO: 83 |
| GpA6062 | SEQ ID NO: 84 | SEQ ID NO: 85 |
| GpS3003 | SEQ ID NO: 86 | SEQ ID NO: 87 |
| GPngs18 | SEQ ID NO: 88 | SEQ ID NO: 89 |
| GPngs62 | SEQ ID NO: 90 | SEQ ID NO: 91 |

5. Preparation of Anti-GPC3 Antibody

The expression vector for the anti-GPC3 antibody produced in 4. was expressed and the expressed material was purified by the following method.

The heavy chain expression vector and the light chain expression vector for anti-GPC3 antibody were co-transfected into Expi293F cells by Expi293 (trademark) Expression System (manufactured by Thermo Fisher, Inc.), and Transfection Enhancer was added thereto after 16 hours, whereby an antibody was expressed in a transient expression system.

The culture supernatant was collected 4 days after introduction of the vector, and filtered through a membrane filter (manufactured by Millipore Corporation) having a pore diameter of 0.22 μm, and thereafter, the antibody was subjected to affinity purification using a Protein A resin (MabSelect, manufactured by GE Healthcare, Inc.). As the washing solution, D-PBS(−) was used. The antibody adsorbed to the Protein A was eluted with a 20 mM sodium citrate and 50 mM NaCl buffer solution (pH 3.0) and collected in a tube containing a 200 mM sodium phosphate buffer solution (pH 7.0).

Subsequently, the buffer solution was replaced with D-PBS(−) by ultrafiltration using VIVASPIN (manufactured by Sartrius stealin), followed by filter sterilization with a membrane filter Millex-Gv (manufactured by Millipore Corporation) having a pore diameter of 0.22 μm, whereby a bispecific antibody was produced. An absorbance at a wavelength of 280 nm of the antibody solution was measured, and the concentration of the purified antibody was calculated using an extinction coefficient estimated from the amino acid sequence of each antibody.

Anti-CD40 monoclonal antibodies R1090S55A and CP-870,893 were also prepared in the same manner.

[Example 5] Construction of Expression Vector for Bispecific Antibody that Binds to CD40 and GPC3

A bispecific antibody that has a structure shown in FIG. 1 and binds to at least one of human and monkey CD40 and at least one of human, monkey, and mouse GPC3 was produced by the following method. As the form of the bispecific antibody, the form described in WO 2009/131239 was adopted.

The bispecific antibody has a structure in which the second antigen binding domain directly binds to the C terminus of each heavy chain of the IgG portion including the first antigen binding domain, and the second antigen binding domain is Fab. VH1 and VH2 in FIG. 1 are either the VH of the anti-CD40 antibody or the VH of the anti-GPC3 antibody, and one is the VH of the anti-CD40 antibody and the other is the VH of the anti-GPC3 antibody.

Further, a bispecific antibody in which in FIG. 1. VH1 is the VH of the anti-CD40 antibody and VH2 is the VH of the anti-GPC3 antibody is also referred to as a CD40-GPC3 bispecific antibody. Similarly, a bispecific antibody in which in FIG. 1, VH1 is the VH of the anti-GPC3 antibody and VH2 is the VH of the anti-CD40 antibody is also referred to as a GPC3-CD40 bispecific antibody.

This bispecific antibody includes a polypeptide (the nucleotide sequence is represented by SEQ ID NO: 92 and the amino acid sequence deduced from the nucleotide sequence is represented by SEQ ID NO: 77) composed of CH of IgG4PE R409K as the heavy chain constant region of the IgG portion. Further, the bispecific antibody includes CH1 (the nucleotide sequence is represented by SEQ ID NO: 93 and the amino acid sequence deduced from the nucleotide sequence is represented by SEQ ID NO: 94) of IgG4 as CH1 of the Fab. In addition, the bispecific antibody produced by the following process includes a light chain including VL containing the amino acid sequence of L6.

The name of the bispecific antibody, the clone (VH1) of the anti-CD40 antibody and the clone (VH2) of the anti-GPC3 antibody used for the production of the antibody are shown in Table 4.

TABLE 4

Name of Produced Bispecific Antibody and Used Clones

| Name of bispecific antibody | Anti-CD40 antibody clone (VH1) | Anti-GPC3 antibody clone (VH2) |
| --- | --- | --- |
| Ct-R1090-GpS1019-FL | R1090S55A | GpS1019 |
| Ct-R1090-GpA6005-FL | R1090S55A | GpA6005 |
| Ct-R1090-GpA6014-FL | R1090S55A | GpA6014 |
| Ct-R1090-GpA6062-FL | R1090S55A | GpA6062 |
| Ct-R1090-GpS3003 | R1090S55A | GpS3003 |
| Ct-R1090-GPngs18 | R1090S55A | GPngs18 |
| Ct-R1090-GPngs62 | R1090S55A | GPngs62 |

1. Production of Expression Vector for Bispecific Antibody

An expression vector for an amino acid sequence in which the heavy chain of the IgG portion and VH-VL of Fab were linked (also referred to as the heavy chain of the bispecific antibody) of each of the bispecific antibodies shown in Table 4 was produced by a method described below.

A nucleotide sequence fragment encoding the VH of the anti-GPC3 antibody shown in Table 2 amplified by PCR was inserted into an appropriate restriction enzyme site of a pCI vector (manufactured by Promega Corporation) containing the nucleotide sequence (SEQ ID NO: 14) encoding the amino acid sequence of the VH of the anti-CD40 antibody R1090S55A represented by SEQ ID NO: 15, the nucleotide sequence (SEQ ID NO: 92) encoding the amino acid sequence of the polypeptide composed of the CH of IgG4PE R409K represented by SEQ ID NO: 77, and the nucleotide sequence (SEQ ID NO: 93) encoding the CH1 of IgG4 represented by SEQ ID NO: 94, whereby a heavy chain expression vector was obtained. In Table 5, the nucleotide sequence encoding the heavy chain of the CD40-GPC3 bispecific antibody including the VH of each of the obtained anti-GPC3 antibodies, and the amino acid sequence deduced from the nucleotide sequence are shown.

TABLE 5

Produced Bispecific Antibody and Sequence Information of Heavy Chain

| Name of bispecific antibody | Nucleotide sequence encoding heavy chain | Amino acid sequence of heavy chain |
| --- | --- | --- |
| Ct-R1090-GpS1019-FL | SEQ ID NO: 95 | SEQ ID NO: 96 |
| Ct-R1090-GpA6005-FL | SEQ ID NO: 97 | SEQ ID NO: 98 |
| Ct-R1090-GpA6014-FL | SEQ ID NO: 99 | SEQ ID NO: 100 |
| Ct-R1090-GpA6062-FL | SEQ ID NO: 101 | SEQ ID NO: 102 |
| Ct-R1090-GpS3003 | SEQ ID NO: 103 | SEQ ID NO: 104 |
| Ct-R1090-GPngs18 | SEQ ID NO: 105 | SEQ ID NO: 106 |
| Ct-R1090-GPngs62 | SEQ ID NO: 107 | SEQ ID NO: 108 |

2. Preparation of Bispecific Antibody

The expression vector for each of the bispecific antibodies produced in 1. was expressed and the expressed material was purified by the following method.

The heavy chain expression vector for the CD40-GPC3 bispecific antibody and the fight chain expression vector containing the nucleotide sequence encoding the amino acid sequence of L6 produced in Example 4.4. were co-transfected into Expi293F cells by Expi293 (trademark) Expression System (manufactured by Thermo Fisher, Inc.), and Transfection Enhancer was added thereto after 16 hours, whereby an antibody was expressed in a transient expression system.

The culture supernatant was collected 4 days after introduction of the vector, and filtered through a membrane filter (manufactured by Millipore Corporation) having a pore diameter of 0.22 µm, and thereafter, the antibody was subjected to affinity purification using a Protein A resin (MabSelect, manufactured by GE Healthcare, Inc.). As the washing solution, D-PBS(−) was used. The antibody adsorbed to the Protein A was eluted with a 20 mM sodium citrate and 50 mM NaCl buffer solution (pH 3.0) and collected in a tube containing a 200 mM sodium phosphate buffer solution (pH 7.0).

Subsequently, the buffer solution was replaced with D-PBS(−) by ultrafiltration using VIVASPIN (manufactured by Sartrius stealin), followed by filter sterilization with a membrane filter Millex-Gv (manufactured by Millipore Corporation) having a pore diameter of 0.22 µm, whereby a CD40-GPC3 bispecific antibody was obtained. An absorbance at a wavelength of 280 nm of the antibody solution was measured, and the concentration of the purified antibody was calculated using an extinction coefficient estimated from the amino acid sequence of each antibody.

[Example 6] Evaluation of Binding Affinity for Human GPC3 of CD40-GPC3 Bispecific Antibody by ELISA The binding affinity for human GPC3 of the CD40-GPC3 bispecific antibodies obtained in Example 5 was evaluated by Enzyme-Linked ImmunoSorbent Assay (ELISA) according to the following procedure.

Human GPC3-His (manufactured by ACROBiosystems, Inc.) was diluted to a concentration of 2 µg/mL with D-PBS (−), and the resultant was dispensed in Ni-NTA HisSorb Plates (manufactured by QIAGEN, Inc.) at 100 µL/well, and the plates were left to stand at room temperature for 1 hour. After each well was washed three times with 200 µL/well of D-PBS(−), the CD40-GPC3 bispecific antibody diluted to 0.0001, 0.001, 0.01, 0.1, 1, or 10 µg/mL with 1% (w/v) BSA-PBS(−) pH 7.0 (manufactured by Nacalai Tesque, Inc., hereinafter referred to as BSA-PBS) was added to the well at 100 µL/well.

After the plates were left to stand at room temperature for 1 hour, washing was performed three times with 200 µL/well of PBS-T, and as a secondary antibody, a solution obtained by diluting Peroxidase AffiniPure Goat Anti-Human IgG, Fcγ Fragment specific (manufactured by Jackson ImmunoReseach, Inc.) 1000 times with 1% (w/v) BSA-PBS(−) pH 7.0 (manufactured by Nacalai Tesque, Inc., hereinafter referred to as BSA-PBS) was added at 100 µL/well, and the plates were left to stand at room temperature for 1 hour.

Each well was washed three times with 200 µL/well of PBS-T, and thereafter washed twice with 200 µL/well of D-PBS(−), and then, a mixed liquid obtained by mixing equal amounts of liquid A and liquid B of Substrate Reagent Pack (manufactured by R&D Systems) was added at 50 µL/well, and the plates were left to stand for 5 minutes. The reaction was stopped by adding Stop solution (manufactured by R&D Systems) at 50 µL/well, and absorbances at 450 nm and 570 nm were measured using an EPOCH 2 microplate reader (manufactured by BioTek Instruments, Inc.), and a value obtained by subtracting the absorbance at 570 nm from the absorbance at 450 nm was calculated. Note that as the negative control, an IgG4 antibody (the constant region: IgG4PE R409K, hereinafter referred to as an anti-DNP antibody) produced according to the method described in Example 4.5, using a vector containing a nucleotide sequence encoding an anti-2,4-dinitrophenol (DNP) antibody described in [Clin Cancer Res 2005, 11(8), 3126-3135] was used.

Figure 2:
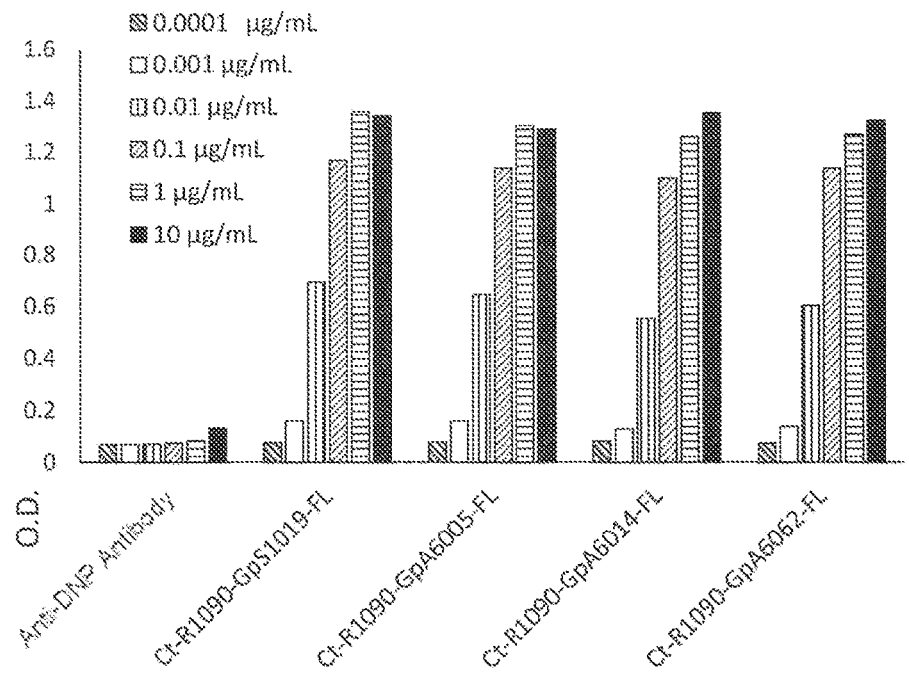
FIG. 2 shows the results of evaluating the binding of each of various GPC3-CD40 bispecific antibodies (panels (A)-(C)) to hGPC3-His by an ELISA method. The vertical axis represents an absorbance, and the horizontal axis represents the respective CD40-GPC3 bispecific antibodies added. Each antibody was added at 10, 1, 0.1, 0.01, 0.001, or 0.0001 ug/mL. For comparison, an anti-DNP antibody was used as the negative control antibody.
Figure 2:
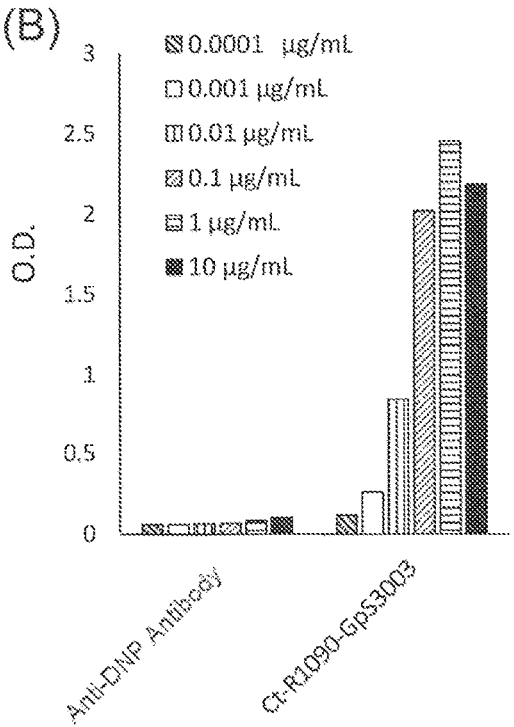
Figure 2:
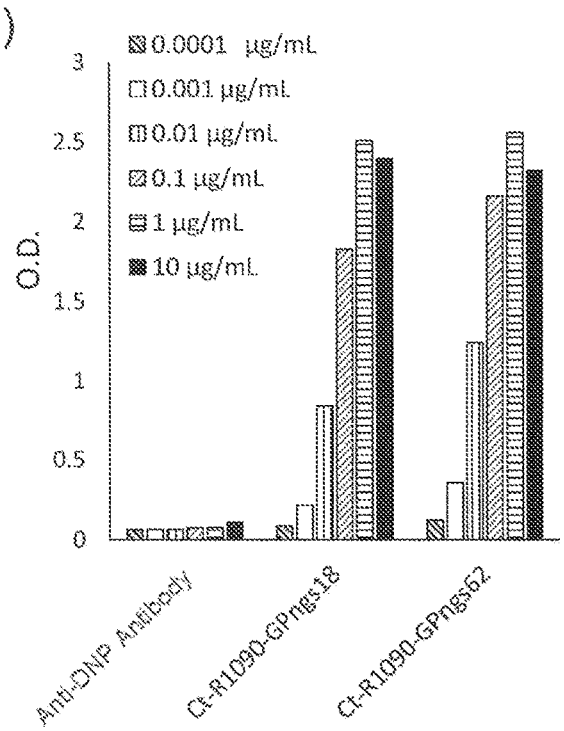
Figure 3:
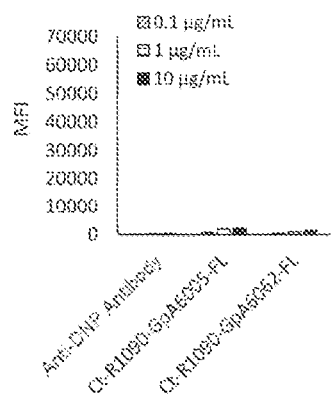
FIG. 3 shows the results of evaluating the binding activity of each of various CD40-GPC3 bispecific antibodies (panels (A)-(D)) to Expi293F cells by FCM. The vertical axis represents a mean fluorescence intensity (MFI), and the horizontal axis represents the respective bispecific antibodies added. Each antibody was added at 10, 1, or 0.1 ug/mL. For comparison, an anti-DNP antibody was used as the negative control antibody. Panels (E)-(H) show the results of evaluating the binding of each of various CD40-GPC3 bispecific antibodies to Expi293F cells having transiently expressed human GPC3 by FCM. The vertical axis represents a mean fluorescence intensity (MFI), and the horizontal axis represents the respective bispecific antibodies added. Each antibody was added at 10, 1, or 0.1 µg/mL. For comparison, an anti-DNP antibody was used as the negative control antibody.
Figure 3:
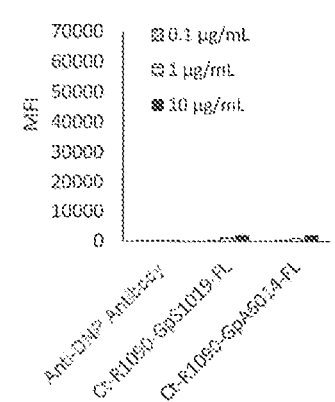
Figure 3:
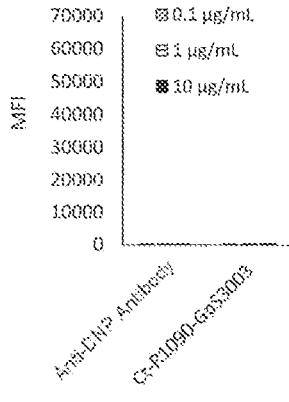
Figure 3:
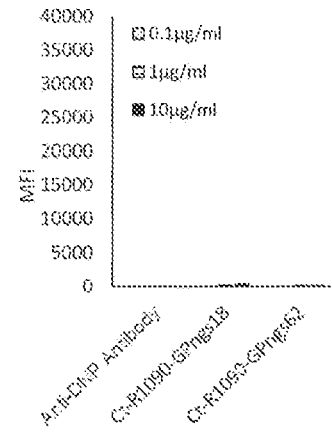
Figure 3:
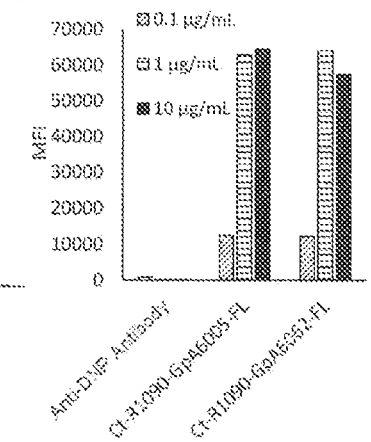
Figure 3:
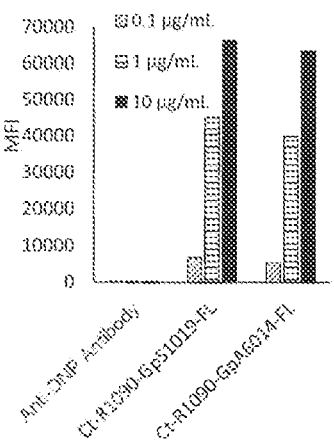
Figure 3:
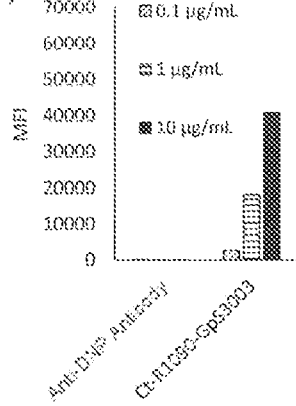
Figure 3:
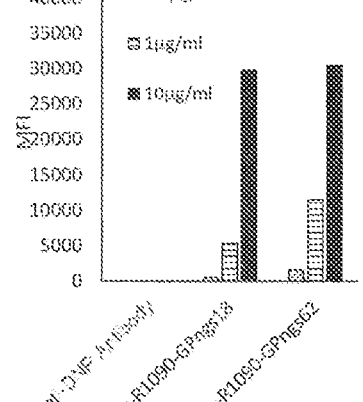

The results of measuring the binding affinity for human GPC3 of the CD40-GPC3 bispecific antibodies are shown in FIGS. 2(A), 2(B), and 2(C). As shown in FIGS. 2(A), 2(B), and 2(C), it could be confirmed that any of the CD40-GPC3 bispecific antibodies binds to the immobilized human GPC3-His.

[Example 7] Evaluation of Binding Affinity of CD40-GPC3 Bispecific Antibody for GPC3 on Cells In order to evaluate the binding affinity for GPC3 on a cell membrane of each of the CD40-GPC3 bispecific antibodies obtained in Example 5, evaluation was performed by FCM using human GPC3 transiently expressing cells of Expi293F cells as follows.

The human GPC3 expression vector produced in Example 3 was introduced into Expi293F cells using Expi293 (trademark) Expression System (manufactured by Thermo Fisher, Inc.), and the cells were cultured to express human GPC3 on a cell membrane in a transient expression system. As the negative control cells that do not express human GPC3, Expi293F cells to which the human GPC3 expression vector was not added when the gene was introduced were used.

The Expi293F cells ($1\times10^6$ cells/mL) 48 hours after introduction of the vector were seeded in a U-bottom 96-well plate (manufactured by Falcon, Inc.) at 50 μL/well. After centrifugation (1500 rpm, 4° C., 3 minutes), the supernatant was removed, and the pellet was washed once with 200 μL/well of D-PBS(−) containing 3% fetal bovine serum, (hereinafter referred to as SB). After centrifugation (1500 rpm, 4° C., 3 minutes), the supernatant was removed, and to the pellet, each of the diluted CD40-GPC3 bispecific antibodies was added at 100 μL/well to give a final concentration of 0.1, 1, or 10 μg/mL, and the plate was left to stand at ice temperature for 30 minutes. As the negative control, the anti-DNP antibody was used.

After centrifugation (1500 rpm, 4° C., 3 minutes), the supernatant was removed, and the resultant was washed twice with SB, and then, SB containing APC-conjugated AffiniPure F(ab')$_2$ Goat Anti-Human IgG, Fcγ (manufactured by Jackson ImmunoResearch Laboratories, Inc.) diluted 100 times was added thereto at 100 μL/well, and the plate was left to stand at ice temperature for 30 minutes.

After further centrifugation (1500 rpm, 4° C., 3 minutes), the supernatant was removed, and the resultant was washed twice with SB, and then suspended in 100 μL/well of SB, and the fluorescence intensity of APC on the Expi293F cells was measured using a flow cytometer FACSCANTO II (manufactured by Becton, Dickinson and Company).

The evaluation results of each of the CD40-GPC3 bispecific antibodies for the Expi293F cells that do not express human GPC3 are shown in FIGS. 3(A), 3(B), 3(C), and 3(D). Any of the bispecific antibodies did not exhibit binding affinity for the Expi293F cells that do not express human GPC3.

The evaluation results of each of the CD40-GPC3 bispecific antibodies for the Expi293F cells that express human GPC3 are shown in FIGS. 3(E), 3(F), 3(G), and 3(H). Any of the CD40-GPC3 bispecific antibodies exhibited binding affinity for the Expi293F cells that express human GPC3.

From these results, it was demonstrated that the CD40-GPC3 bispecific antibodies obtained in Example 5 selectively bind to human GPC3 on a cell membrane.

[Example 8] Evaluation of Expression of CD40 and GPC3 in Cell Line by FCM

The expression of CD40 and GPC3 in Ramos cells (JCRB9119) and HepG2 cells (ATCC HB-8065) was evaluated by FCM according to the following procedure. In the evaluation, the anti-CD40 antibody R1090S55A obtained in Example 2, the anti-GPC3 antibodies prepared in Example 4, and the CD40-GPC3 bispecific antibodies obtained in Example 5 were used.

Ramos cells were suspended in SB at a cell density of $1\times10^6$ cells/mL, and the suspension was dispensed in a 96-well round bottom plate (manufactured by Falcon, Inc.) at 100 μL/well. After centrifugation (2000 rpm, 4° C., 2 minutes), the supernatant was removed, and to the resulting pellet, SB containing each of the anti-CD40 antibody R1090S55A obtained in Example 2, the anti-GPC3 antibodies obtained in Example 4, and the CD40-GPC3 bispecific antibodies obtained in Example 5 at a concentration of 0.01, 0.1, 1, or 10 μg/mL was added at 100 μL/well to suspend the pellet, and the plate was left to stand at ice temperature for 30 minutes.

After further centrifugation (2000 rpm, 4° C., 2 minutes), the supernatant was removed, and the pellet was washed 3 times with 200 μL/well of SB, and then, APC-conjugated AffiniPure F(ab')$_2$ Goat Anti-Human IgG, Fcγ (manufactured by Jackson ImmunoResearch Laboratories, Inc.) diluted 100 times was added thereto at 100 μL/well, and the plate was incubated at ice temperature for 30 minutes. After washing twice with SB, the cells were suspended in 100 μL/well of SB, and the fluorescence intensity of each cell was measured using a flow cytometer FACSCANTO II (manufactured by Becton, Dickinson and Company).

Evaluation for HepG2 cells was performed in the same manner.

Figure 4:
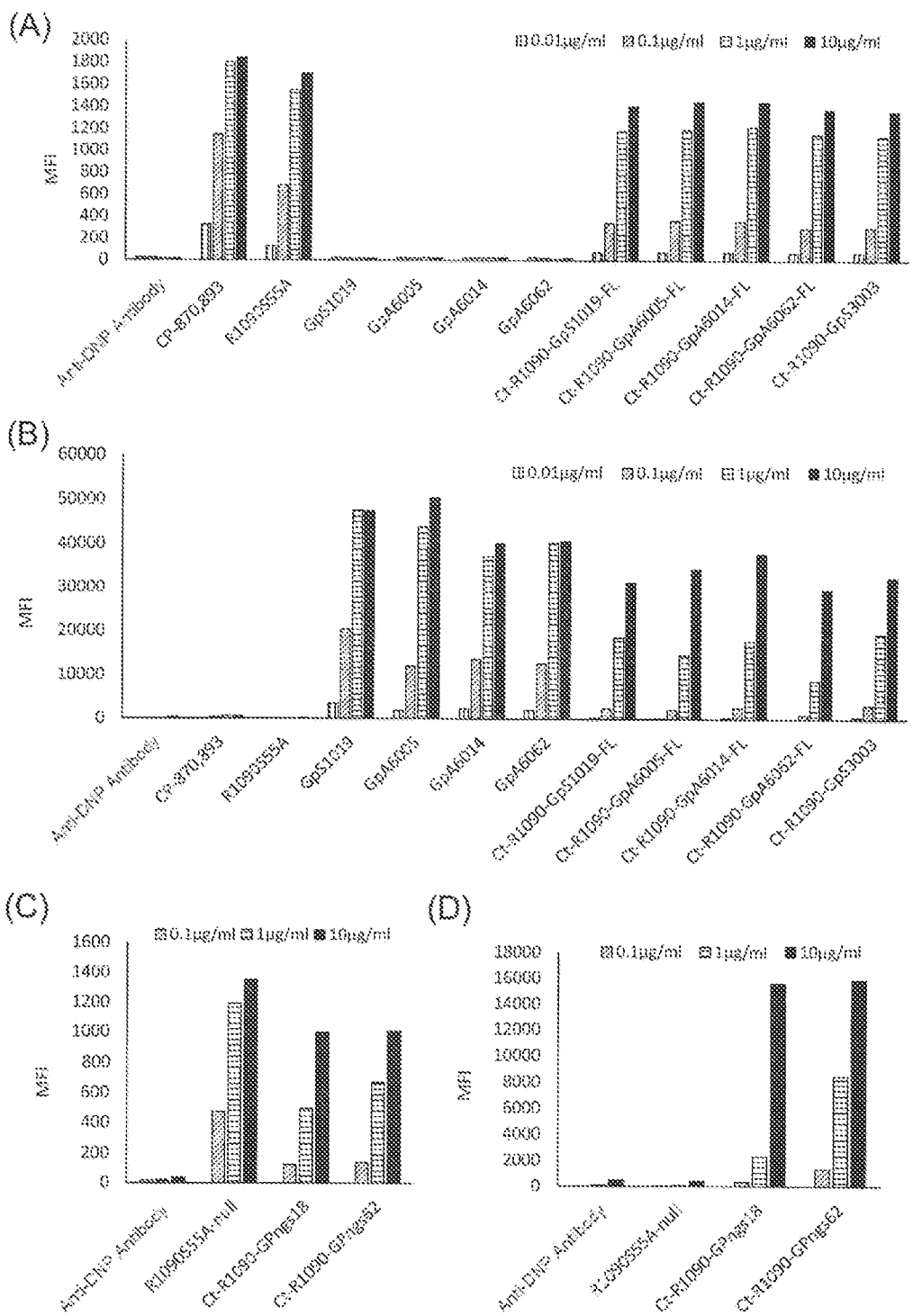
FIG. 4 shows the results of evaluating the binding activity of each antibody or bispecific antibody (panels (A) and (C)) to Ramos cells by FCM. The vertical axis represents a mean fluorescence intensity (MFI), and the horizontal axis represents the respective antibodies or bispecific antibodies added. Each antibody was added at 10, 1, 0.1, or 0.01 µg/mL. Panels (B) and (D) show the results of evaluating the binding activity of each antibody or bispecific antibody to HepG2 cells by FCM. The vertical axis represents a mean fluorescence intensity (MFI), and the horizontal axis represents the respective antibodies or bispecific antibodies added. Each antibody was added at 10, 1, 0.1, or 0.01 µg/mL. For comparison, an anti-DNP antibody was used as the negative control antibody.

The evaluation results of the binding affinity of each of various antibodies or the bispecific antibodies for the Ramos cells are shown in FIGS. 4(A) and 4(C), and for the HepG2 cells are shown in FIGS. 4(B) and 4(D).

As shown in FIGS. 4(A) and 4(C), the anti-GPC3 antibodies produced in Example 4 did not exhibit a binding activity to the Ramos cells, and CP-870,893 and R1090S55A, each of which is an anti-CD40 antibody exhibited a binding activity thereto. Further, also the CD40-GPC3 bispecific antibodies produced in Example 5 exhibited a binding activity to the Ramos cells. From these results, it was suggested that the Ramos cells express CD40 on a cell surface, and do not express GPC3. In addition, it was demonstrated that the bispecific antibody of the present invention binds to CD40.

As shown in FIGS. 4(B) and 4(D), the anti-GPC3 antibody exhibited a significantly stronger binding activity to the HepG2 cells than the anti-CD40 antibody. The CD40-GPC3 bispecific antibody also exhibited a strong binding activity comparable to that of the anti-GPC3 antibody to the HepG2 cells. Therefore, it was demonstrated that the CD40-GPC3 bispecific antibody of the present invention has a binding ability to GPC3. From these results, it was demonstrated that the bispecific antibody of the present invention has a binding activity to both GPC3 and CD40.

[Example 9] Evaluation of CD40 Signaling Inducing Activity of CD40-GPC3 Bispecific Antibody by Analysis of Expression Level of CD95 Using FCM The CD40 signaling inducing activity of each of the CD40-GPC3 bispecific antibodies obtained in Example 5 was evaluated by FCM as follows using an increase in the expression level of CD95 on Ramos cells as an index.

1. Evaluation of CD40 Agonistic Activity in Absence of GPC3-Expressing Cells

Ramos cells ($1.25 \times 10^6$ cells/mL) were seeded in a U-bottom 96-well plate (manufactured by Falcon, Inc.) at 40 µL/well, and a test antibody diluted to a final concentration of 0.001, 0.01, 0,1, 1, or 10 µg/mL with RPMI 1640 medium (manufactured by Sigma-Aldrich Co. LLC) containing 10% FBS was added thereto at 60 µL/well, and the cells were cultured at 37° C. under 5.0% carbon dioxide gas for 16 hours.

After centrifugation (1500 rpm, 4° C., 3 minutes), the supernatant was removed, and the pellet was washed once with 200 µL/well of SB. After centrifugation (1500 rpm, 4° C., 3 minutes), the supernatant was removed, and to the pellet, a PE mouse anti-human CD95 antibody (manufactured by Becton, Dickinson and Company) diluted 100 times was added to suspend the pellet, and then, the plate was left to stand at ice temperature for 30 minutes.

After further centrifugation (1500 rpm. 4° C., 3 minutes), the supernatant was removed, and the resultant was washed twice with D-PBS(–) containing SB, and then suspended in 100 µL/well of D-PBS(–) containing SB, and the fluorescence intensity of CD95 on the Ramos cells was measured using a flow cytometer FACSCANTO II (manufactured by Becton, Dickinson and Company). As the negative control, the anti-DNP antibody was used.

Figure 5:
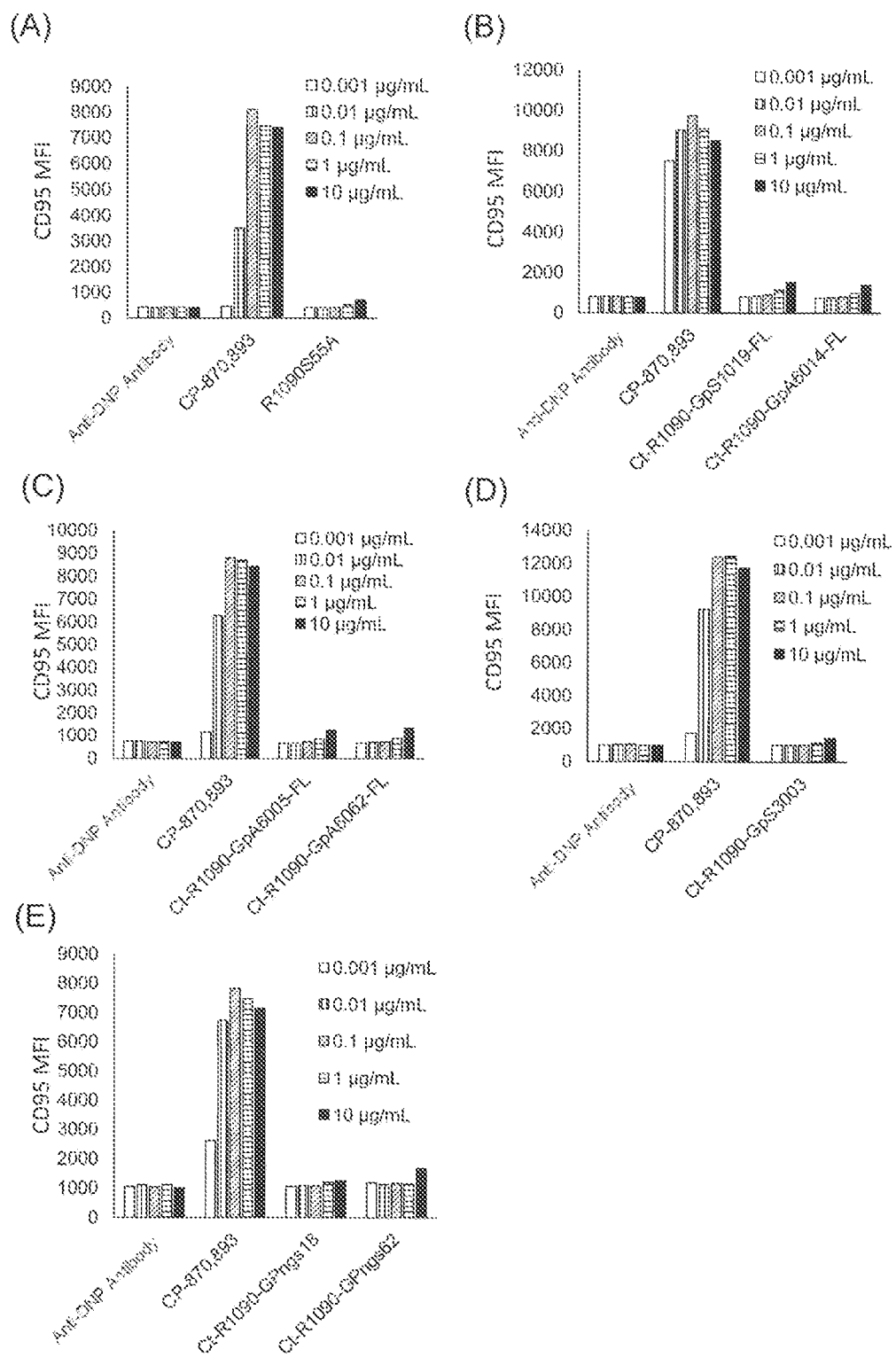
FIG. 5 shows a CD40 signaling inducing activity by each of R1090S55A and various CD40-GPC3 bispecific antibodies (panels (A)-(E)) against Ramos cells. The vertical axis represents the expression level of CD95 expressed as a mean fluorescence intensity (MFI), and the horizontal axis represents the bispecific antibodies added. Each antibody was added at 10, 1, 0.1, 0.01, or 0.001 g/mL. For comparison, an anti-DNP antibody was used as the negative control antibody, and CP-870,893 which is an anti-CD40 agonistic antibody was used as the positive control antibody.

The evaluation results of the anti-DNP antibody, CP-870, 893, and R1090S55A are shown in FIG. 5(A). CP-870,893 that is a CD40 agonistic antibody strongly induced the expression of CD95 on the Ramos cells. On the other hand, R1090S55A exhibited almost no activity to induce CD95 on the Ramos cells, and was found to have no CD40 agonistic activity. The evaluation results of the anti-DNP antibody, CP-870,893, and various CD40-GPC3 bispecific antibodies are shown in FIGS. 5(B), 5(C), 5(D), and 5(E).

Any of the CD40-GPC3 bispecific antibodies of the present invention (Ct-R1090-GpS1019-FL, Ct-R1090-GpA6014-FL, Ct-R1090-GpA6005-FL, Ct-R1090-GpA6062-FL, Ct-R1090-GpS3003, Ct-R1090-GPngs18, and Ct-R1090-GPngs62) exhibited almost no activity to induce the expression of CD95.

From these evaluation results, it was demonstrated that the bispecific antibody of the present invention does not induce CD40 signaling against CD40-positive cells under the condition that only CD40-positive cells are present.

2. Evaluation of CD40 Agonistic Activity Under Coculture Condition with GPC3-Expressing Cells Ramos cells ($1.25 \times 10^6$ cells/mL) were seeded in a U-bottom 96-well plate (manufactured by Falcon, Inc.) at 40 µL/well, and a test antibody diluted to 0.005, 0.05, 0.5, 5, or 50 µg/mL (a final concentration of 0.001, 0.01, 0.1, 1, or 10 µg/mL) with RPMI 1640 medium (manufactured by Sigma-Aldrich Co. LLC) containing 10% FBS was added thereto at 20 µg/mL, and HepG2 cells ($1.25 \times 10^6$ cells/mL) were further added thereto at 40 µL/well, and the cells were cultured at 37° C. under 5.0% carbon dioxide gas for 16 hours.

After centrifugation (1500 rpm, 4° C., 3 minutes), the supernatant was removed, and the pellet was washed once with 200 µL/well of D-PBS(–) containing SB. After centrifugation (1500 rpm, 4° C., 3 minutes), the supernatant was removed, and to the pellet, a PE mouse anti-human CD95 antibody (manufactured by Becton, Dickinson and Company) diluted 100 times was added to suspend the pellet, and then, the plate was left to stand at ice temperature for 30 minutes.

After further centrifugation (1500 rpm, 4° C., 3 minutes), the supernatant was removed, and the resultant was washed twice with SB, and then suspended in 100 µL/well of SB, and the fluorescence intensity of CD95 on the Ramos cells was measured using a flow cytometer FACSCANTO II (manufactured by Becton, Dickinson and Company). As the negative control, the anti-DNP antibody was used.

The evaluation results of the anti-DNP antibody, CP-870, 893, and various CD40-GPC3 bispecific antibodies are shown in FIGS. 6(A), 6(B), 6(C), and 6(D).

Figure 6:
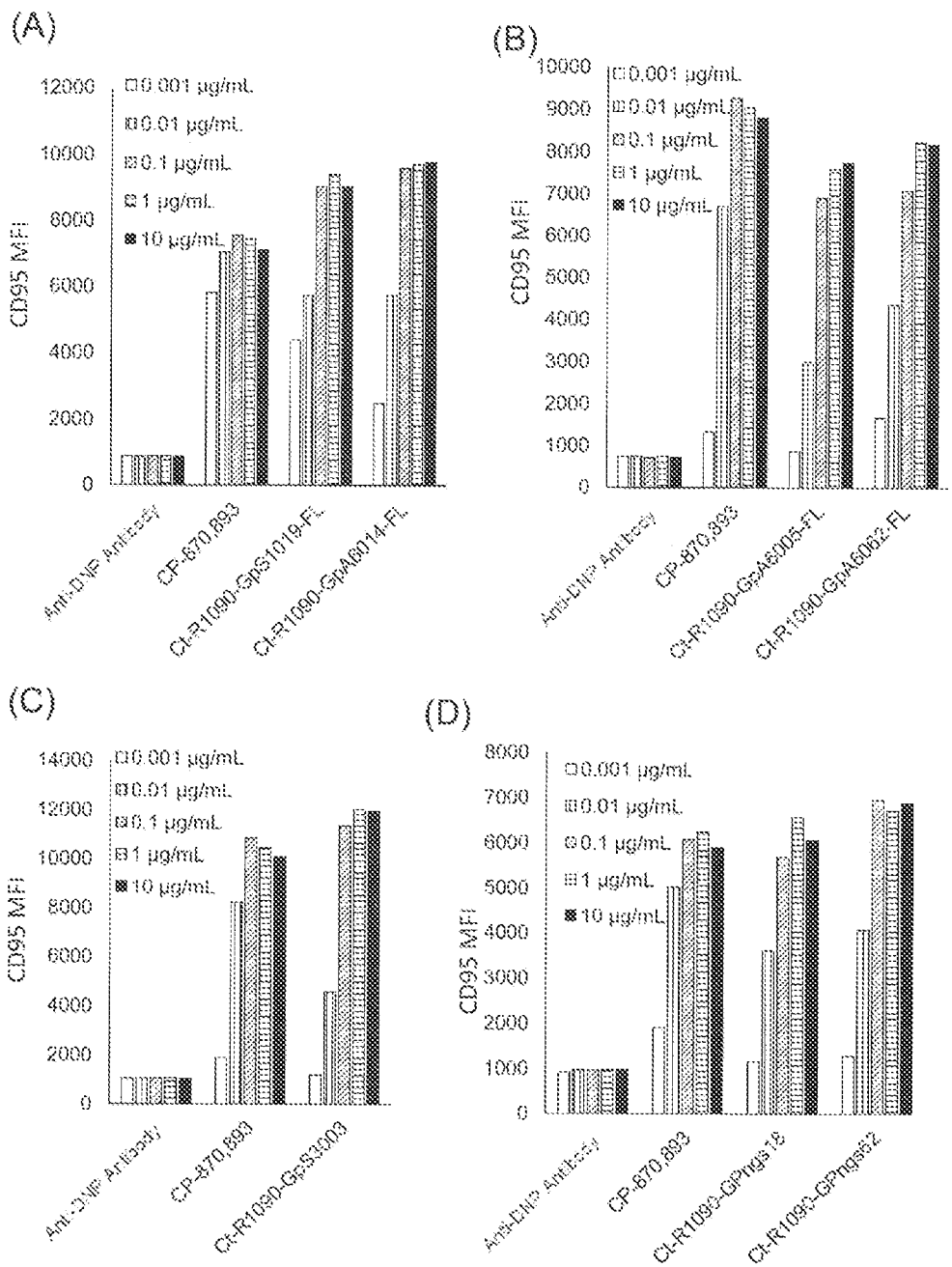
FIG. 6 shows a CD40 signaling inducing activity by each of various CD40-GPC3 bispecific antibodies (panels (A)-(D)) against Ramos cells cocultured with HepG2 cells. Panels (A)-(C) show the binding activity of an anti-CD95 antibody against Ramos cells when each bispecific antibody was added at 10, 1, 0.1, 0.01, or 0.001 µg/mL. The vertical axis represents the expression level of CD95 expressed as a mean fluorescence intensity (MFI), and the horizontal axis represents the bispecific antibodies added. For comparison, an anti-DNP antibody was used as the negative control antibody, and CP-870,893 which is an anti-CD40 agonistic antibody was used as the positive control antibody.

As shown in FIG. 6, it was demonstrated that when performing coculture with HepG2 that is positive for GPC3, the anti-DNP antibody does not induce the expression of CD95 in the Ramos cells, but any of the CD40-GPC3 bispecific antibodies produced in Example 5 (Ct-R1090-GpS1019-FL, Ct-R1090-GpA6014-FL, Ct-R1090-GpA6005-FL, Ct-R1090-GpA6062-FL, Ct-R1090-GpS3003, Ct-R1090-GPngs18, and Ct-R1090-GPngs62) induced the expression of CD95 in the Ramos cells in a concentration dependent manner comparable to CP-870,893 that is a CD40 agonistic antibody.

As shown in FIGS. 5(B), 5(C), 5(D), and 5(E), the CD40-GPC3 bispecific antibody of the present invention did not induce CD40 signaling when the antibody binds to CD40 on the Ramos cells alone. On the other hand, as shown in FIGS. 6(A), 6(B), 6(C), and 6(D), the antibody induced CD40 signaling in the Ramos cells only when GPC3-positive cells coexist.

It has been confirmed that R1090S55A that is an anti-CD40 antibody (also referred to as a parent antibody) used for the antigen binding domain to CD40 of such a CD40-GPC3 bispecific antibody does not induce CD40 signaling in Ramos cells (a non-agonistic activity) as shown in FIG. 5(A). Therefore, it was found that the CD40-GPC3 bispecific antibody of the present invention comes to exhibit a CD40 signaling inducing activity (agonistic activity) that the parent antibodies do not originally have by being converted into a bispecific antibody.

This suggested that by administering the CD40-GPC3 bispecific antibody of the present invention, signaling is induced in a CD40-positive cell such as an immune cell or a tumor cell specifically to a lesion site where a GPC3-positive cell such as a tumor is present without inducing CD40 signaling at a site where a GPC3-positive cell is not present.

[Example 10] Production of GPC3-CD40 Bispecific Antibody and Evaluation of Agonistic Activity A bispecific antibody having a heavy chain shown in Table 6 and a light chain including VL encoded by L6 was produced in accordance with the method described in Example 5. The name of the bispecific antibody, the anti-GPC3 antibody clone (VH1) and the anti-CD40 antibody clone (VH2) used for the production of the antibody are shown in Table 6.

TABLE 6

Name of Produced GPC3-CD40 Bispecific
Antibody and Used Clones

| Name of bispecific antibody | Anti-GPC3 antibody clone (VH1) | Anti-CD40 antibody clone (VH2) |
|---|---|---|
| Ct-GpS1019-R1090 | GpS1019 | R1090S55A |
| Ct-GpA6005-R1090 | GpA6005 | R1090S55A |
| Ct-GpA6014-R1090 | GpA6014 | R1090S55A |
| Ct-GpA6062-R1090 | GpA6062 | R1090S55A |
| Ct-GpS3003-R1090 | GpS3003 | R1090S55A |
| Ct-GPngs18-R1090 | GPngs18 | R1090S55A |
| Ct-GPngs62-R1090 | GPngs62 | R1090S55A |

1. Production of Expression Vector for GPC3-CD40 Bispecific Antibody

A heavy chain expression vector for each of the bispecific antibodies shown in Table 6 was produced in accordance with the method described in Example 5.1. In Table 7, the nucleotide sequence encoding the heavy chain of the bispecific antibody including the VH of each of the obtained anti-GPC3 antibodies, and the amino acid sequence deduced from the nucleotide sequence are shown.

TABLE 1

Produced GPC3-CD40 Bispecific Antibody
and Sequence Information of Heavy Chain

| Name of bispecific antibody | Nucleotide sequence encoding heavy chain | Amino acid sequence of heavy chain |
|---|---|---|
| Ct-GpS1019-R1090 | SEQ ID NO: 109 | SEQ ID NO: 110 |
| Ct-GpA6005-R1090 | SEQ ID NO: 111 | SEQ ID NO: 112 |
| Ct-GpA6014-R1090 | SEQ ID NO: 113 | SEQ ID NO: 114 |
| Ct-GpA6062-R1090 | SEQ ID NO: 115 | SEQ ID NO: 116 |
| Ct-GpS3003-R1090 | SEQ ID NO: 117 | SEQ ID NO: 118 |
| Ct-GPngs18-R1090 | SEQ ID NO: 119 | SEQ ID NO: 120 |
| Ct-GPngs62-R1090 | SEQ ID NO: 121 | SEQ ID NO: 122 |

2. Preparation of Bispecific Antibody

A GPC3-CD40 bispecific antibody was prepared using the heavy chain expression vector produced in Example 10.1. in accordance with the method described in Example 5.2.

3. Evaluation of CD40 Signaling Inducing Activity of Bispecific Antibody

The signaling inducing activity of each of the produced GPC3-CD40 bispecific antibodies was evaluated in the same manner as in Example 9. As a result, the bispecific antibodies did not exhibit an agonistic activity.

When a CD40-GPC3 bispecific antibody and a GPC3-CD40 bispecific antibody were produced in the same manner using another clone R1066 in the CD40 binding domain and using GpS1019 in the GPC3 binding domain, and an agonistic activity was evaluated, either of the bispecific antibodies exhibited an agonistic activity.

From the above results, it was found that whether or not an agonistic activity is exhibited by replacing the first antigen binding domain and the second antigen binding domain with each other in the bispecific antibody of the present invention differs depending on the clone of the antibody.

[Example 11] Evaluation of CD40 Agonistic Activity against Human Induced Dendritic Cells The CD40 signaling inducing activity of each of the CD40-GPC3 bispecific antibodies obtained in Example 5 against dendritic cells in the coexistence with GPC3-positive cells was evaluated by FCM using an activation marker on the dendritic cells as an index. As the negative control, the anti-DNP antibody was used, and as the positive control, CP-870,893 was used.

Specifically, differentiation of CD14-positive monocytes into immature dendritic cells was induced. When CD40 signaling is activated in immature dendritic cells, the expression of CD80 and CD86, each of which is a costimulatory molecule, is increased, and therefore, the CD40 agonistic activity of each of various antibodies or bispecific antibodies was evaluated by adding an anti-CD40 antibody or each of various CD40 bispecific antibodies to prepared human induced dendritic cells and analyzing the expression level of a costimulatory molecule by FCM.

1. Preparation of Cells

After Untouched Frozen NPB-CD14+ Monocytes (manufactured by AllCells, Inc.) were thawed, the cells were suspended in X-VIVO 15 Serum-Free Hematopoietic Cell Medium (manufactured by Lonza, Inc.) containing 100 ng/mL recombinant human GM-CSF (manufactured by R&D Systems) and 100 ng/mL recombinant human IL4 (manufactured by R&D Systems) at a cell density of $1 \times 10^6$ cells/mL, and the suspension was added to 6-well Flat Bottom Ultra-Low Attachment Surface (manufactured by Corning Incorporated) at 3 mL/well.

The culture medium was replaced with a fresh culture medium 2 days and 4 days after culturing. The cells were collected 7 days after the start of culturing and centrifuged at 1500 rpm for 5 minutes at room temperature. The precipitated cells were prepared in X-VIVO 15 Serum-Free Hematopoietic Cell Medium containing 100 ng/mL IL-4 and 100 ng/mL GM-CSF at $2 \times 10^5$ cells/mL, and added to 24-well Flat Bottom Ultra-Low Attachment Surface (manufactured by Corning Incorporated) at 250 µL/well. Further, HepG2 cells were prepared at $4 \times 10^5$ cells/mL, and added thereto at 125 µL/well. The evaluation target antibody prepared to a final concentration of 1 or 10 µg/mL was added thereto at 125 µL/well and mixed therewith, and the cells were cultured at 37° C. in the presence of 5% $CO_2$ for 2 days.

2. Measurement of Expression of Activation Marker on Dendritic Cells by FCM

The cells cultured for 2 days were centrifuged (2000 rpm, 4° C., 5 minutes). The supernatant was removed, and 1% (w/v) BSA-PBS(−) pH 7.0 without KCl (manufactured by Nacalai Tesque, Inc.) (also referred to as FACS Buffer) was added thereto in an amount of 150 µL each. BD Fc Block Reagent for Human (manufactured by BD Pharmingen, Inc.) was added thereto to suspend the cells, and the suspension was left to stand on ice for 5 minutes.

Thereafter, the cell suspension was added to a 96-well U-bottom plate (manufactured by Falcon, Inc.) in an amount of 50 µL each. A labeled antibody Brilliant Violet 421 anti-human CD80 antibody (manufactured by Biolegend Co., Ltd.), PE Mouse Anti-Human CD86 (manufactured by BD Pharmingen, Inc.), or PE-Cy7 anti-human CD45 (manufactured by Biolegend Co., Ltd.) suspended in FACS Buffer was added thereto at 50 µL/well, followed by incubation at 4° C. for 30 minutes.

After centrifugation (1200 rpm, 4° C., 2 minutes), the supernatant was removed. The precipitated cells were washed twice with 200 µL of FACS Buffer. Thereafter, the cells were resuspended in 100 µL of FACS Buffer, and the fluorescence intensity was measured using FACS Canto II (manufactured by BD Biosciences Company). In the analysis, data analysis software FlowJo 9.6.4 was used and CD45-positive cells were used as the dendritic cells, and with respect to CD80 and CD86 in the CD45-positive cells, the expression level was evaluated based on the mean fluorescence intensity (MFI) of the antibody bound thereto.

Figure 7:
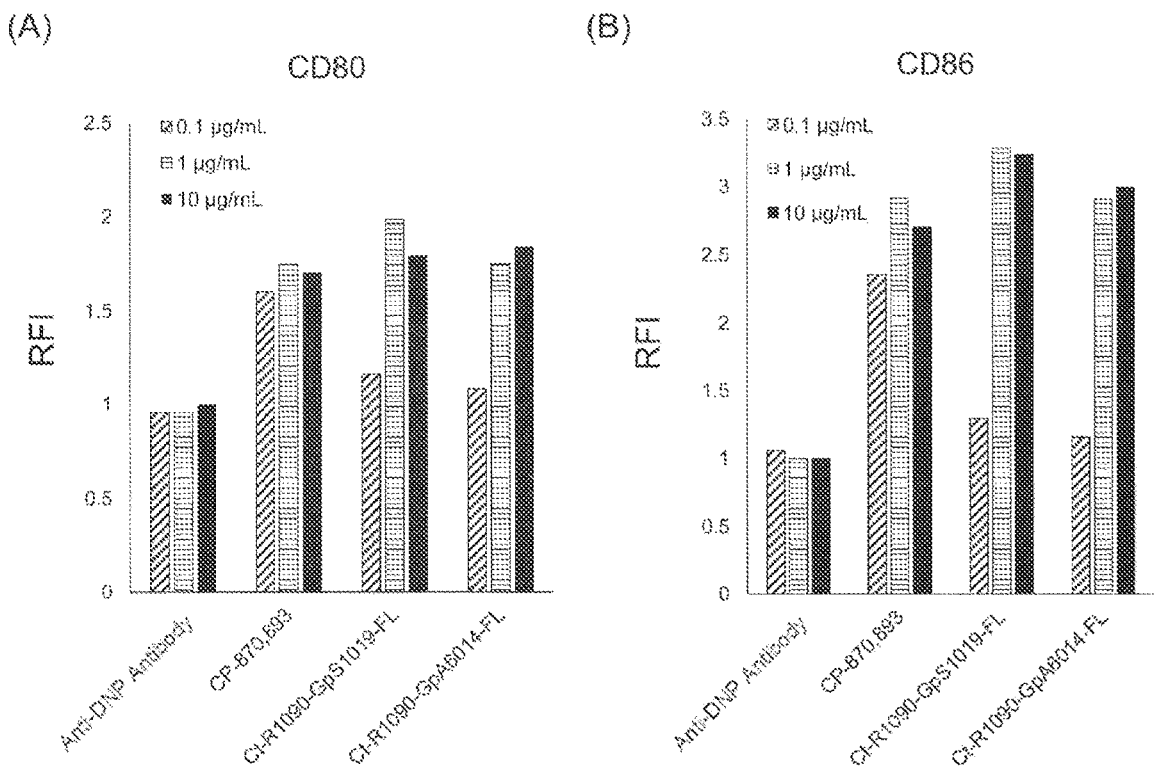
FIG. 7 shows a CD40 signaling inducing activity by each of various CD40-GPC3 bispecific antibodies against human dendritic cells cocultured with HepG2 cells. Panel (A) shows the results of evaluating the expression of CD80 of the dendritic cells and panel (B) shows the results of evaluating the expression of CD86 of the dendritic cells by FCM. The vertical axis represents a relative fluorescence intensity (RFI) to that when an anti-DNP antibody was added. Each bispecific antibody was added at 10, 1, or 0.1 µg/mL. For comparison, CP-870,893 which is an anti-CD40 agonistic antibody was used as the positive control antibody.

The results of analyzing the expression levels of CD80 and CD86 on the dendritic cells when adding each of the anti-DNP antibody, CP-870,893, and various CD40-GPC3 bispecific antibodies by FCM are shown in FIGS. 7(A) and 7(B).

As shown in FIGS. 7(A) and 7(B), it was demonstrated that when performing coculture with HepG2 that is positive for GPC3, the CD40-GPC3 bispecific antibodies produced in Example 5 (Ct-R1090-GpS1019-FL and Ct-R1090-GpA6014-FL) induce an increase in the expression of CD80 and CD86 in the dendritic cells as compared with the anti-DNP antibody in the same manner as CP-870,893 that is a CD40 agonistic antibody.

From the above results, it was demonstrated that the CD40-GPC3 bispecific antibody of the present invention has a CD40 agonistic activity against dendritic cells in the presence of GPC3-positive cells.

[Example 12] Comparison of Expression Level of GPC3 in Human GPC3-Positive Cell Line and Hepatocellular Carcinoma Clinical Specimen 1. Production of MC-38/hGPC3

MC-38/hGPC3 in which a mouse cell line MC-38 (Kerafast, Inc.) not expressing GPC3 was made to express human GPC3 was produced by the following method.

A human GPC3 gene represented by SEQ ID NO: 39 was subjected to artificial gene synthesis, and cloned into a multicloning site of a pEF6/myc-HisC vector using KpnI/BamH, whereby a human GPC3 expression vector pEF6-hGPC3 was obtained.

The obtained expression vector pEF6-hGPC3 was introduced into MC-38 cells using Nucleofector (manufactured by Lonza, Inc.) and cultured, and selection was performed using 5 μg/mL Blasticidin S (manufactured by InvivoGen, Inc.) from the following day. Single cell cloning was performed using a cell sorter, whereby MC-38 cells that express human GPC3 (MC-38/hGPC3) were obtained.

2. Analysis of Expression Level of GPC3 in Various GPC3-Positive Cell Lines by FCM The expression levels of GPC3 in HepG2 cells (ATCC HB-8065) used in the evaluation of an agonistic activity as the GPC3-positive cells in Example 9, HuH-7 cells (JCRB0403), and MC-38/hGPC3 produced in Example 11 were compared by FCM.

By using HepG2 cells, HuH-7 cells, and MG-38/hGPC3 cells, the expression level of GPC3 was measured by FCM in the same manner as in Example 7. By using the anti-GPC3 antibody GpS1019 obtained in Example 4 and the anti-DNP antibody, staining was performed at a concentration of 1 μg/mL in each case. A value obtained by dividing MFI when staining was performed with GpS1019 by MFI when staining was performed with the anti-DNP antibody was calculated as a relative fluorescence intensity (RFI).

Figure 8:
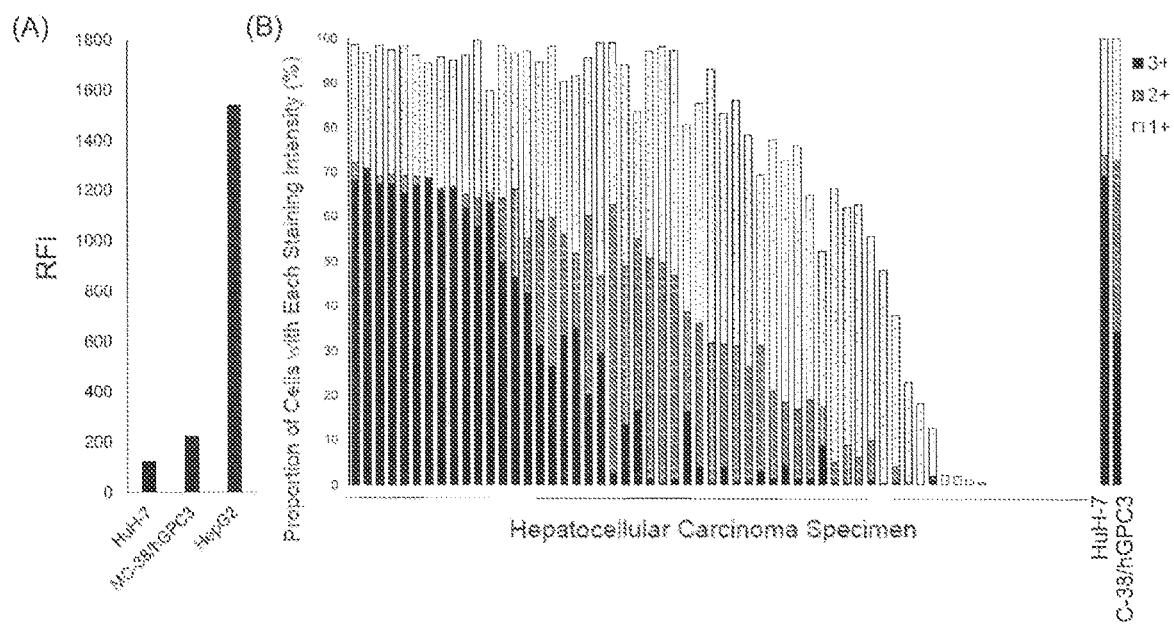
FIG. 8 shows the results of evaluating the expression level of GPC3 of each of HuH-7 cells, MC-38/hGPC3 cells, and HepG2 cells by FCM (panel (A)). The vertical axis represents a relative fluorescence intensity (RFI) when GpS1019 was added at 1 µg/mL as an anti-GPC3 antibody to that when an anti-DNP antibody was used. Panel (B) shows the results of performing immunohistological staining of hepatocellular carcinoma patient specimens, and HuH-7 cells and MC-38/hGPC3 cells under the same conditions. The vertical axis represents the proportion of cells with each staining intensity quantified by an image analysis of immunohistological staining.

The evaluation results of the HuH-7 cells, the HepG2 cells, and the MC-38/hGPC3 cells are shown in FIG. 8(A).

As shown in FIG. 8(A), any of the HuH-7 cells, the HepG2 cells, and the MC-38/hGPC3 cells expressed GPC3, but the HepG2 cells exhibited a significantly high RFI as compared with the HuH-7 cells and the MC-38/hGPC3 cells, and it was demonstrated that the expression level of GPC3 is high.

3. Comparison of Expression Level of GPC3 in Human GPC3-Positive Cell Line and Hepatocellular Carcinoma Clinical Specimen In order to compare the expression level of GPC3 in human clinical hepatocellular carcinoma with the expression level of GPC3 in HuH-7 cells and MC-38/hGPC3 cells, the expression of GPC3 in a human liver cancer tissue array, HuH-7 cells, and MC-38/hGPC3 cells was analyzed by immunohistological staining (IHC).

An mIgG1 type of a conventional anti-GPC3 antibody GC33 (GC33-mIgG1) was produced by the following method. As the amino acid sequence of a variable region of GC33, the sequence described in WO 2006/006693 was used. The amino acid sequence of VH of GC33 is represented by SEQ ID NO: 124, and the amino acid sequence of VL of GC33 is represented by SEQ ID NO: 125. GC33-mIgG1 was produced in accordance with the method described in Example 4 using mouse IgG1 as the amino acid sequence of a heavy chain constant region and a mouse κ chain as a light chain.

Immunohistological staining (IHC) against a formalin-fixed and paraffin-embedded human liver cancer tissue array (hepatocellular carcinoma, 61 cases), HuH-7 cells, and MC-38/hGPC3 cells was performed using GC33-mIgG1 and a negative control antibody.

A deparaffinized specimen was subjected to antigen activation using Target retrieval solution pH 9 (manufactured by Agilent Technologies, Inc.) for 10 minutes in a Decloaking Chamber at 110° C. followed by cooling at room temperature for 30 minutes, and washing was performed with tap water for 5 minutes. Subsequently, inactivation of endogenous peroxidase by Peroxidase Blocking Reagent (manufactured by Agilent Technologies, Inc.) was performed for 10 minutes.

Further, blocking was performed using Protein Block (manufactured by Agilent Technologies, Inc.). Subsequently, the anti-GPC3 antibody and the negative control antibody obtained by diluting the stock solution 10 times were reacted at room temperature for 1 hour, and then washing was performed with PBS. Envision System-HRP Labeled polymer Anti-mouse (manufactured by Agilent Technologies, Inc.) was added thereto and reacted at room temperature for 30 minutes. DAB (manufactured by Agilent Technologies, Inc.) was added thereto and reacted for 1 minute for color development. Hematoxylin (manufactured by Agilent Technologies, Inc.) was reacted for 5 minutes, and washing was performed with running water, and then, nuclear staining was performed.

The stained sample was subjected to a dehydration and clearing treatment with ethanol and xylene, and finally sealed with DPX (Merck).

FIG. 8(B) shows the IHC results of the human liver cancer tissue array, the HuH-7 cells, and the MC-38/hGPC3 cells. The staining intensity on the cell membrane of each cell was quantitatively determined, and classified into 0, 1+, 2+, and 3+ in ascending order of the staining intensity, and the frequency of cells with each staining intensity was plotted for each specimen.

As shown in FIG. 8(B), the expression of GPC3 was confirmed in a human hepatocellular carcinoma tissue. In addition, the proportion of cells of each staining intensity in the HuH-7 cells and the MC-38/hGPC3 cells is substantially the same as the proportion of each staining intensity in cases in which the staining intensity of GPC3 is relatively high in the human hepatocellular carcinoma tissue. From the above results, it was demonstrated that the expression level of GPC3 in HuH-7 and MC-38/hGPC3 reflected the expression level of GPC3 in the human hepatocellular carcinoma tissue.

[Example 13] Evaluation of CD40 Agonistic Activity Using HuH-7 Cells or MC-38/hGPC3 Cells as GPC3-Positive Cells By using the HuH-7 cells and the MC-38/hGPC3 cells in which the expression level of GPC3 was found to be substantially the same as that of the clinical hepatocellular carcinoma specimen in Example 12 as the GPC3-positive cells, the CD40 signaling inducing ability of each of the CD40-GPC3 bispecific antibodies obtained in Example 5 was evaluated by FCM in the same manner as in Example 9 using an increase in the expression level of CD95 on Ramos cells as an index.

Figure 9:
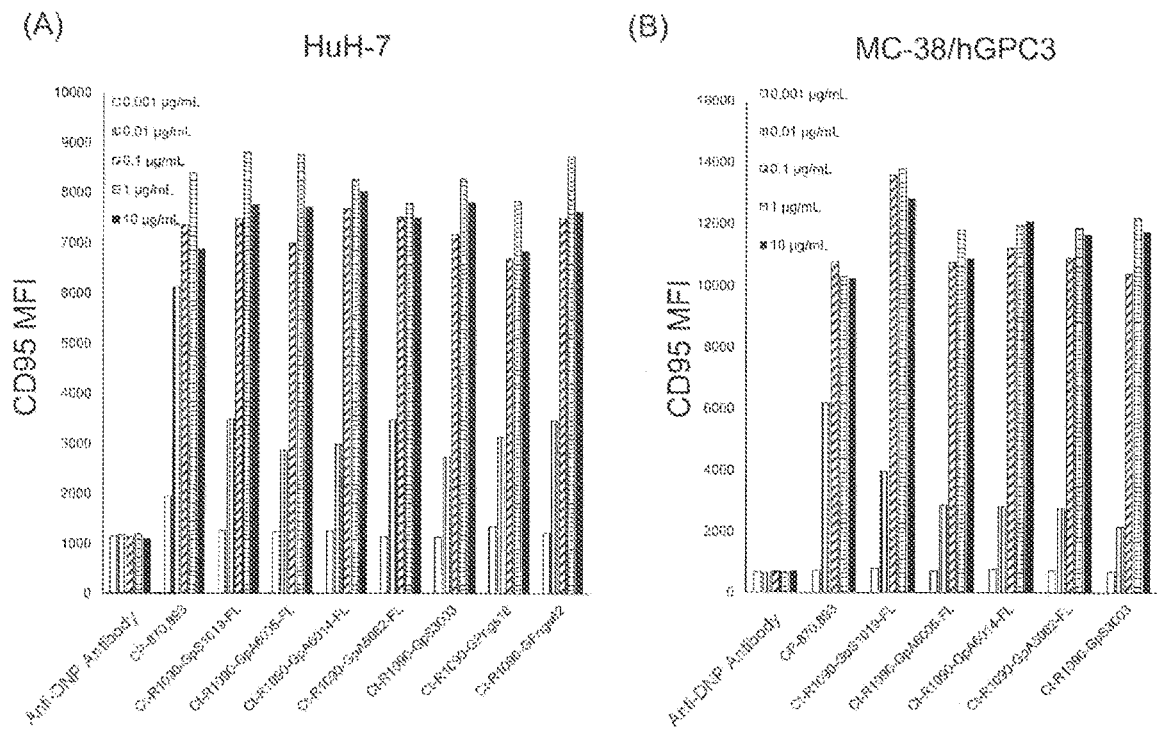
FIG. 9 shows a CD40 signaling inducing activity of each of various CD40-GPC3 bispecific antibodies (panels (A) and (B)) against Ramos cells cocultured with HuH-7 cells or MC-38/hGPC3 cells. They show the binding activity of an anti-CD95 antibody against Ramos cells when each bispecific antibody was added at 10, 1, 0.1, 0.01, or 0.001 µg/mL. The vertical axis represents a mean fluorescence intensity (MFI) of CD95. For comparison, an anti-DNP antibody was used as the negative control antibody, and CP-870,893 which is an anti-CD40 agonistic antibody was used as the positive control antibody.

The evaluation results of the anti-DNP antibody, CP-870, 893, and various CD40-GPC3 bispecific antibodies are shown in FIGS. 9(A) and 9(B).

As shown in FIG. 9(A), it was demonstrated that when performing coculture with the HuH-7 cells, any of the CD40-GPC3 bispecific antibodies produced in Example 5 (Ct-R1090-GpS1019-FL, Ct-R1090-GpA6014-FL, Ct-R1090-GpA6005-FL, Ct-R1090-GpA6062-FL, Ct-R1090-GpS3003, Ct-R1090-G-Pngs18, and Ct-R1090-GPngs62) induces the expression of CD95 in Ramos cells in a concentration dependent manner comparable to CP-870, 893 that is a CD40 agonistic antibody. As shown in FIG. 9(B), similar results were obtained also in the case of coculturing the MC-38/hGPC3 cells with Ramos cells.

From the above results, it was demonstrated that the CD40-GPC3 bispecific antibody of the present invention exhibited an agonistic activity comparable to that of CP-870, 893 that is a CD40 agonistic antibody at the expression level of GPC3 comparable to that of the clinical hepatocellular carcinoma.

[Example 14] Measurement of Binding Activity of Anti-GPC3 Antibody

The binding activity of each of the anti-GPC3 antibodies obtained in Example 4 and conventional anti-GPC3 antibodies GC33, YP7, and HN3 to human GPC3 was evaluated. Specifically, by using human CD40-His, a binding affinity test by a surface plasmon resonance method (SPR method) was performed. As a measurement device, Biacore T100 (manufactured by GE Healthcare, Inc.) was used.

1. Production of GC33, YP7, and HN3 that are Conventional Anti-GPC3 Antibodies

As the variable region amino acid sequences of the conventional anti-GPC3 antibodies GC33, YP7, and HN3, the amino acid sequences described in WO 2006/006693, WO 2013/181543, and WO 2012/145469 were used, respectively. The amino acid sequence of VH of YP7 is represented by SEQ ID NO: 126, the amino acid sequence of VL of YP7 is represented by SEQ ID NO: 127, and the amino acid sequence of VH of HN3 is represented by SEQ ID NO: 128.

Various anti-GPC3 antibodies were obtained by the method described in Example 4 using IgG4PE R409K represented by SEQ ID NO: 77 as the amino acid sequence of a heavy chain constant region, and the sequence of a κ chain as the light chain.

2. Measurement of Binding Activity by SPR Method

An anti-human IgG antibody was immobilized on a CM5 sensor chip (manufactured by GE Healthcare, Inc.) using Human Antibody Capture Kit (manufactured by GE Healthcare, Inc.) according to the package insert. A test antibody prepared at 2 µg/mL was added to a flow cell for 10 seconds at a flow rate of 10 µL/min.

Subsequently, as the analyte, each of human CD40-His protein solutions (diluted with HBS-EP+) obtained by 5-step 5-fold serial dilution from 125 nM or 25 nM was added at a flow rate of 30 µL/min, and a binding reaction of each antibody and the analyte was measured for 2 minutes and a dissociation reaction was measured for 10 minutes. The measurement was performed by a single cycle kinetics method.

The obtained sensorgram was analyzed using Bia Evaluation Software (manufactured by GE Healthcare, Inc.), and the kinetic constant of each antibody was calculated. The dissociation constant [kd/ka=$K_D$] of each anti-GPC3 antibody against human GPC3 is shown in Table 8.

TABLE 8

|  | GC33 | YP7 | HN3 |
|---|---|---|---|
| ka (1/Ms) | $1.45 \times 10^5$ | $2.17 \times 10^5$ | $1.13 \times 10^{10}$ |
| kd (1/s) | $3.78 \times 10^{-4}$ | $1.86 \times 10^{-4}$ | $1.50 \times 10^2$ |
| $K_D$ (nM) | 2.6 | 0.861 | 13.2 |

As shown in Table 8, the anti-GPC3 antibodies GC33, YP7, and HN3 produced in Example 14 have a binding activity to human GPC3, and the $K_D$ value against human GPC3 was around 1 nM in the case of GC33 and YP7, and around 10 nM in the case of HN3.

The results of performing an analysis also for GC33, HN3, and the anti-GPC3 antibodies obtained in Example 4 in the same manner are shown in Table 9.

TABLE 9

|  | GC33 | HN3 | GpS1019 | GpA6005 | GpA6014 | GpA6062 | GpS3003 | GPngs18 | GPngs62 |
|---|---|---|---|---|---|---|---|---|---|
| ka (1/Ms) | $2.05 \times 10^5$ | $1.54 \times 10^9$ | $2.14 \times 10^6$ | $4.56 \times 10^5$ | $2.97 \times 10^5$ | $2.76 \times 10^5$ | $8.50 \times 10^5$ | $1.96 \times 10^6$ | $5.74 \times 10^6$ |
| kd (1/s) | $2.99 \times 10^{-4}$ | 37.4 | $1.21 \times 10^{-3}$ | $3.47 \times 10^{-4}$ | $1.89 \times 10^{-3}$ | $1.75 \times 10^{-3}$ | $2.99 \times 10^{-3}$ | $7.64 \times 10^{-4}$ | $3.10 \times 10^{-2}$ |
| $K_D$ (nM) | 1.46 | 24.4 | 0.564 | 0.762 | 6.35 | 6.33 | 3.52 | 0.390 | 5.36 |

As shown in Table 9, the $K_D$ value against human GPC3 of each of GpS1019, GpA6005, GpA6014, GpA6062, GpS3003, GPngs18, and GPngs62 is from 6.35 to $0.39 \times 10^{-9}$ M, and it was demonstrated that these antibodies each have a strong binding activity equal to or higher than the conventional anti-GPC3 antibodies.

[Example 15] Epitope Analysis for Anti-GPC3 Antibody

The presence or absence of competition of various anti-GPC3 antibodies was analyzed by FCM, and the epitopes were classified, in addition, GPC3 partial fragment-expressing cells were produced, and an epitope analysis was performed by measuring the binding activity of each of various anti-GPC3 antibodies.

1. Classification based on Presence or Absence of Competition (1) Production of Labeled Antibody The anti-GPC3 antibodies GpS1019, GpA6005, GpA6014, GpA6062, GPngs18, and GPngs62 obtained in Example 4 and the anti-GPC3 antibodies GC33, HN3, and YP7 obtained in Example 14 were labeled using Alexa Fluor 647 Antibody Labeling Kit (manufactured by Thermo Fisher Scientific, Inc.).

(2) Competitive Assay by FCM

HepG2 cells were suspended in SB at a cell density of 1×10$^6$ cells/mL, and the suspension was dispensed in a 96-well round bottom plate (manufactured by Falcon, Inc.) at 100 μL/well. After centrifugation (2000 rpm, 4° C., 2 minutes), the supernatant was removed, and to the resulting pellet, SB containing an unlabeled antibody (hereinafter also referred to as a competitive antibody) of each of the anti-GPC3 antibodies GpS1019, GpA6005, GpA6014, GpA6062, GPngs18, and GPngs62 obtained in Example 4 and the anti-GPC3 antibodies GC33, HN3, and YP7 obtained in Example 14 at a concentration of 100 μg/mL was added at 25 μL/well to suspend the pellet, and the plate was left to stand at ice temperature for 30 minutes.

Subsequently, each of various labeled antibodies produced in Example 15.1.(1) at 20 μg/mL was added thereto as a detection target antibody at 25 μL/well and suspended therein, and then, the plate was left to stand at ice temperature for 30 minutes.

After further centrifugation (2000 rpm, 4° C., 2 minutes), the supernatant was removed, and the pellet was washed 3 times with 200 μL/well of SB, and thereafter suspended in 100 μL/well of SB, and the fluorescence intensity of each cell was measured with a flow cytometer FACSCANTO II (manufactured by Becton, Dickinson and Company). A value obtained by dividing MFI when the competitive antibody was added by MFI when the competitive antibody was not added was calculated for a combination of each competitive antibody and the detection target antibody, and a case where the value was 0.5 or less was defined as competitive.

Figure 10:
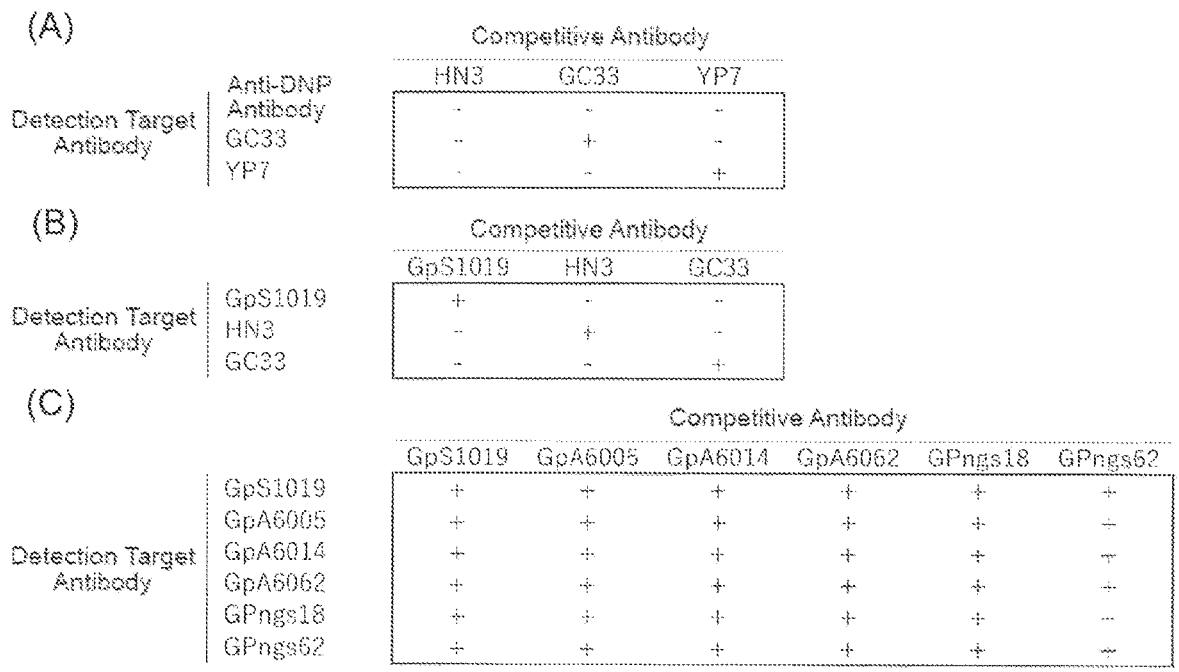
FIG. 10 shows the results of competitive FCM of each of various anti-GPC3 antibodies (panels (A)-(C)). FCM was performed using a fluorescently labeled form of each of the anti-GPC3 antibodies as a detection target antibody in the presence of an unlabeled form of each of the anti-GPC3 antibodies as a competitive antibody. A case where the MFI in the presence of the competitive antibody with respect to the MFI in the absence of the competitive antibody was 0.5 or less was regarded as competitive and is denoted by "+", and a case where it exceeds 0.5 was regarded as not competitive and is denoted by "−".

The presence or absence of competition for combinations of the competitive antibody and the detection target antibody is shown in FIGS. 10(A), 10(B), and 10(C). FIG. 10(A) shows the presence or absence of competition in the case where the unlabeled antibody of HN3, GC33, or YP7 was added as the competitive antibody, and the labeled antibody of the anti-DNP antibody, GC33, or YP7 was used as the detection target antibody for the corresponding case.

Further, FIG. 10(B) shows the presence or absence of competition in the case where the unlabeled antibody of GpS1019, HN3, or GC33 was used as the competitive antibody, and the labeled antibody of GpS1019, HN3, or GC33 was used as the detection target antibody.

Further, FIG. 10(C) shows the presence or absence of competition in the case where the unlabeled antibody of GpS1019, GpA6005, GpA6014, GpA6062, GPngs18, or GPngs62 was added as the competitive antibody, and the labeled antibody of GpS1019, GpA6005, GpA6014, GpA6062, GPngs18, or GPngs62 was used as the detection target antibody for the corresponding case.

As shown in FIG. 10(A), in the case of HN3, GC33, and YP7, competition with an antibody other than its own was not observed. From the results, it was found that HN3, GC33, and YP7 bind to different epitopes, respectively.

As shown in FIG. 10(B), in the case of GpS1019, HN3, and GC33, competition with an antibody other than its own was not observed. From the results, it was found that GpS1019, HN3, and GC33 bind to different epitopes, respectively.

As shown in FIG. 10(C), in the case of GpS1019, GpA6005, GpA6014, GpA6062, GPngs18, and GPngs62, binding was decreased when the competitive antibody was added in all combinations, and the antibodies competed with each other. From the results, it was found that GpS1019, GpA6005, GpA6014, GpA6062, GPngs18, and GPngs62 recognize epitopes adjacent to each other or some or all recognize overlapping epitopes.

From the above results, it was found that GpS1019, GpA6005, GpA6014, GpA6062, GPngs18, and GPngs62 bind a different epitope from that for GC33 or HN3, each of which is a conventional anti-GPC3 antibody.

2. Identification of Binding Site Using GPC3 Partial Fragment-Expressing Cells

An epitope analysis for each of the anti-GPC3 antibodies obtained in Example 4 was performed by verifying the binding affinity of each of the anti-GPC3 antibodies by allowing ExpiCHO-S cells (manufactured by Thermo Fisher Scientific, Inc.) to express a partial fragment of human GPC3 using the following method.

The full-length nucleotide sequence of human GPC3 represented by SEQ ID NO: 39 was subjected to codon conversion to obtain the full-length amino acid sequence of human GPC3, and a polypeptide sequence represented by the amino acid sequence at positions 25 to 358 in the full-length amino acid sequence of human GPC3 was produced.

A sequence in which a His sequence was linked to the N-terminal side of the polypeptide sequence represented by the amino acid sequence at positions 25 to 358 in the full-length amino acid sequence of human GPC3, and the polypeptide represented by the amino acid sequence at positions 563 to 580 in the full-length amino acid sequence of human GPC3 as the GPI addition sequence was linked to the C-terminal side (referred to as hGPC3 (25-358)) was produced. The amino acid sequence was subjected to codon conversion to obtain the nucleotide sequence, and a fragment was synthesized by artificial gene synthesis, and then, inserted into an appropriate site of a pCI vector, whereby an expression vector for hGPC3 (25-358) was obtained. Similarly, expression vectors for hGPC3 (192-580), hGPC3 (359-580), and hGPC3 (25-580) were obtained.

Each of the obtained expression vectors for the human GPC3 partial fragments was transfected into ExpiCHO-S cells using Expifectamine CHO-S transfection kit (manufactured by Thermo Fisher Scientific. Inc.), and the human GPC3 partial fragments were transiently expressed.

The obtained ExpiCHO-S cells that transiently express the human GPC3 partial fragments (hereinafter also referred to as GPC3 partial fragment-expressing cells) were subjected to FCM in the same manner as in Example 7, and the fluorescence intensity of each cell was measured. The results are shown in Table 10. A case where the GPC3 partial fragment-expressing cells in which the anti-GPC3 antibody GpS1019 was bound exhibited a fluorescence intensity 10 times or more that of the anti-DNP antibody that is the negative control was defined as having reactivity. In Table 10, a partial fragment to which the anti-GPC3 antibody GpS1019 had reactivity was denoted by "+", and a partial fragment to which the anti-GPC3 antibody GpS1019 did not have reactivity was denoted by "−".

TABLE 10

Reactivity of GpS1019 with GPC3 partial fragment-expressing cells

| | hGPC3 (25-580) | hGPC3 (25-358) | hGPC3 (192-580) | hGPC3 (359-580) |
|---|---|---|---|---|
| GpS1019 | + | + | + | − |

As shown in Table 10, the anti-GPC3 antibody GpS1019 bound to the cells that express hGPC3 (25-580), hGPC3 (25-358), and hGPC3 (192-580), but did not bind to the cells that express hGPC3 (359-580). Therefore, it is presumed that the epitope for the anti-GPC3 antibody GpS1019 is contained between the amino acid at position 192 and the amino acid at position 358 of human GPC3.

The anti-GPC3 antibody YP7 is an antibody obtained by immunization with the peptide at positions 511 to 560 that is a C-terminal region of a GPC3 molecule (WO 2013/181543), and therefore is considered to recognize the vicinity of the C terminus of the GPC3 molecule. Accordingly, it is considered that the epitope recognized by the obtained anti-GPC3 antibody GpS1019, GpA6005, GpA6014, GpA6062, GPngs18, or GPngs62 is different from the epitope for YP7.

[Example 16] Production of CD40-GPC3 Bispecific Antibody Using Conventional Anti-GPC3 Antibody An expression vector for a CD40-GPC3 bispecific antibody using the variable region of each of the anti-GPC3 antibodies GC33 and YP7 as the GPC3 binding domain was produced by the following method.

An amino acid sequence in which the amino acid sequence of the VH of the anti-CD40 antibody R1090S55A represented by SEQ ID NO: 15, the amino acid sequence of the polypeptide composed of the CH of IgG4PE R409K represented by SEQ ID NO: 77, a linker sequence composed of glycine and serine represented by SEQ ID NO: 128, and an amino acid sequence obtained by substituting the VL of L6 in the light chain amino acid sequence represented by SEQ ID NO: 76 with the VL of GC33 represented by SEQ ID NO: 124 or the VL of YP7 represented by SEQ ID NO: 126 were linked was designed.

The thus obtained amino acid sequence was subjected to codon conversion and then inserted into an appropriate restriction enzyme site of a pCI vector (manufactured by Promega Corporation) by gene synthesis, whereby an anti-CD40 antibody VH and anti-GPC3 antibody VL expression vector was obtained. Subsequently, an amino acid sequence in which the amino acid sequence of the CH1 of IgG4 represented by SEQ ID NO: 94 was linked to the amino acid sequence of the VH of GC33 represented by SEQ ID NO: 123 or the amino acid sequence of the VH of YP7 represented by SEQ ID NO: 125 was prepared, and an anti-GPC3 antibody VH expression vector was obtained in the same manner.

The three types of expression vectors: the anti-CD40 antibody VH and anti-GPC3 antibody VL expression vector, the anti-GPC3 antibody VH expression vector, and the anti-CD40 antibody VL expression vector produced in Example 4-4 were introduced into Expi293F cells by the method described in Example 4, an antibody was purified from the obtained culture supernatant, and a monomer fraction was fractionated by size eclusion chromatography, whereby various CD40-GPC3 bispecific antibodies (Ct-R1090-HN3, Cross-R1090-GC33, and Cross-R1090-YP7) were produced.

An expression vector for a CD40-GPC3 bispecific antibody using the variable region of HN3 as a GPC3 binding domain was produced by the method described below.

An amino acid sequence in which the amino acid sequence of the VH of the anti-CD40 antibody R1090S55A represented by SEQ ID NO: 15, the amino acid sequence of the polypeptide composed of the CH of IgG4PE R409K represented by SEQ ID NO: 77, and the amino acid sequence of the VH of HN3 represented by SEQ ID NO: 127 were linked was prepared, and codon conversion was performed, and then the resultant was inserted into an appropriate restriction enzyme site of a pCI vector (manufactured by Promega Corporation) by gene synthesis, whereby a heavy chain expression vector for Ct-R10904IN3 was obtained.

The heavy chain expression vector for Ct-R1090-HN3 and the anti-CD40 antibody VL expression vector produced in Example 4-4 were introduced into Expi293F cells by the method described in Example 4, an antibody was purified from the obtained culture supernatant, and a monomer fraction was fractionated by size eclusion chromatography, whereby Ct-R1090-HN3 was produced.

[Example 17] Evaluation of Reactivity of Bispecific Antibody Produced in Example 16 with GPC3 and CD40

The reactivity of each of various bispecific antibodies produced in Example 16 with HepG2 cells and Ramos cells was evaluated by FCM in the same manner as in Example 7. The results are shown in FIGS. 11(A) and 11(B) and FIGS. 12(A) and 12(B).

Figure 11:
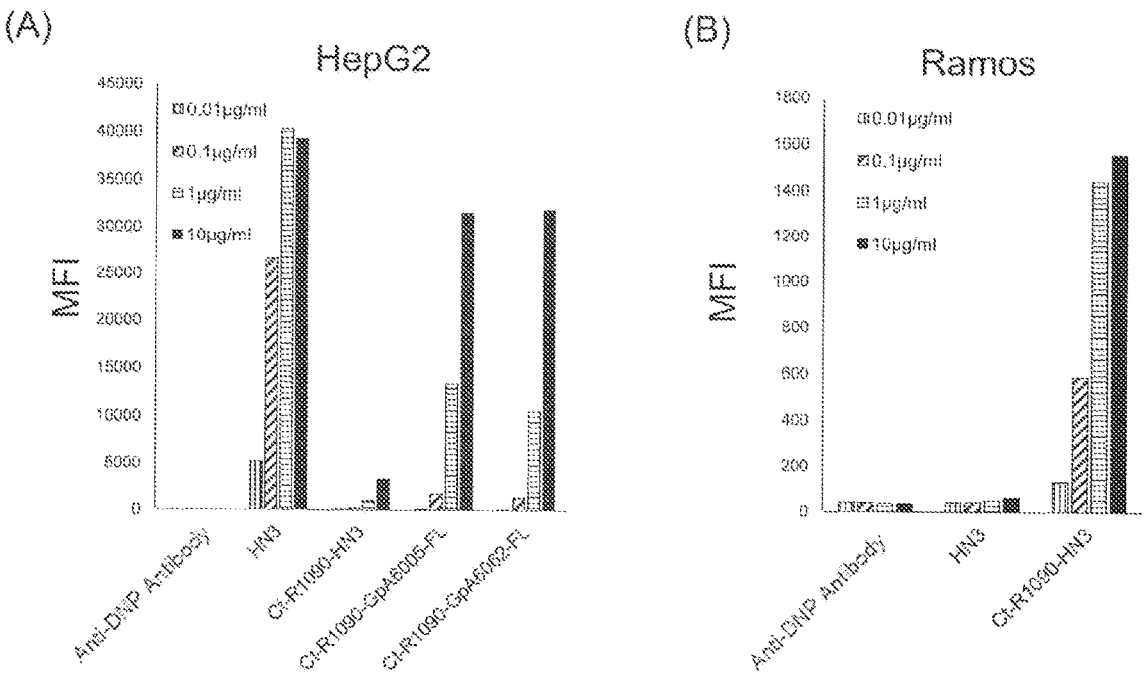
FIG. 11 shows the results of evaluating the binding affinity of each of an anti-GPC3 antibody HN3 and Ct-R1090-HN3 for HepG2 cells and Ramos cells by FCM. Panel (A) shows the binding affinity for HepG2 cells and panel (B) shows the binding affinity for Ramos cells. The vertical axis represents MFI.
Figure 12:
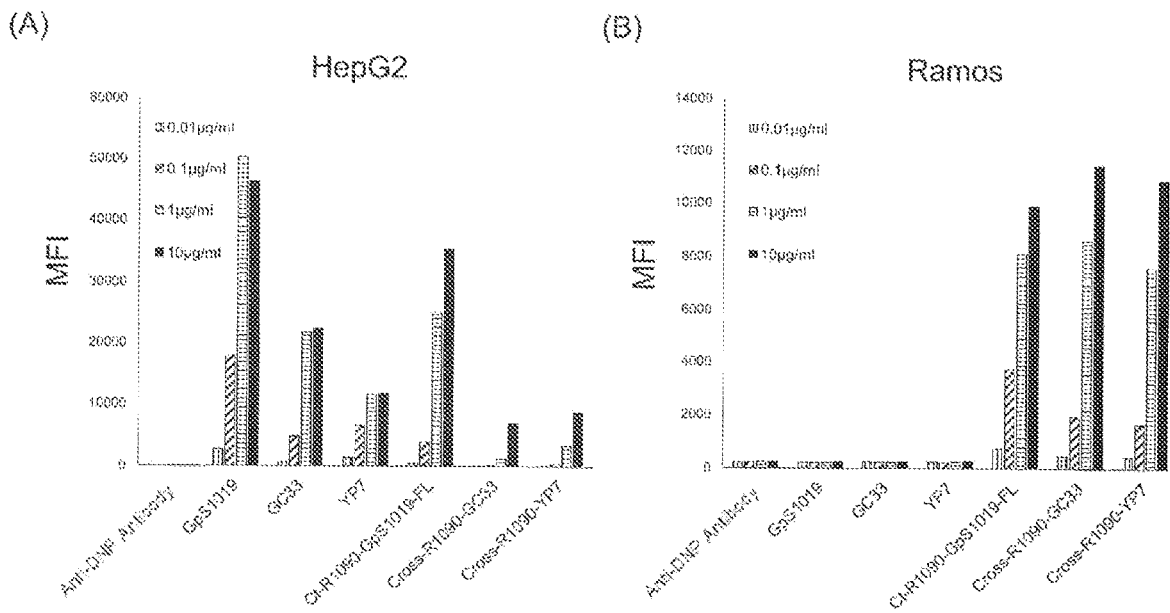
FIG. 12 shows the results of evaluating the binding affinity of each of anti-GPC3 antibodies GC33 and YP7 and CD40-GPC3 bispecific antibodies Ct-R1090-GpS1019-FL, Cross-R1090-GC33, and Cross-R1090-YP7 for HepG2 cells and Ramos cells by FCM. Panel (A) shows the binding affinity for HepG2 cells and panel (B) shows the binding affinity for Ramos cells. The vertical axis represents MFI.

FIG. 11(A) shows the reactivity of each of various bispecific antibodies with HepG2 cells, and FIG. 11(B) shows the reactivity of each of various bispecific antibodies with Ramos cells. Similarly, FIG. 12(A) shows the reactivity of each of various bispecific antibodies with HepG2 cells, and FIG. 12(B) shows the reactivity of each of various bispecific antibodies with Ramos cells. The horizontal axis represents the antibody or the bispecific antibody, and the vertical axis represents MFI.

From the results, it was found that any of the bispecific antibodies binds to CD40 in the same way. It was also found that any of the bispecific antibodies retains binding affinity for GPC3 although the reactivity has decreased lower than that of the original anti-GPC3 antibody.

Figure 13:
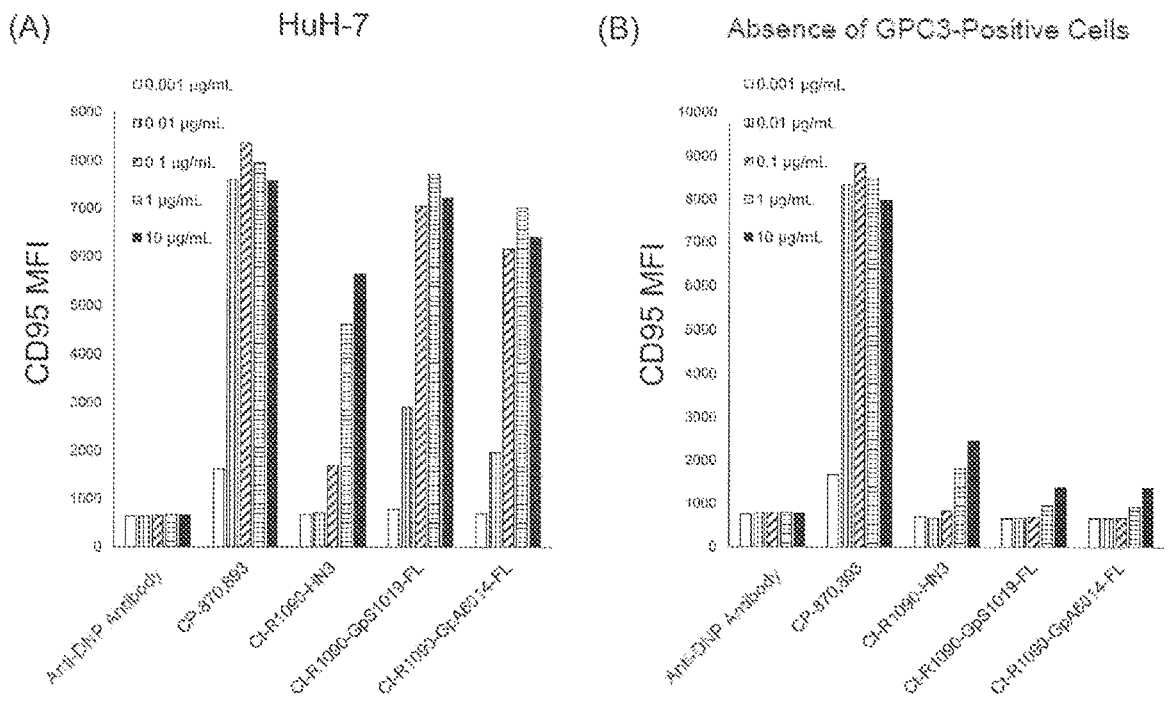
FIG. 13 shows the CD40 signaling inducing activity of each of various CD40-GPC3 bispecific antibodies (panel (A)) against Ramos cells under the coculture condition with HuH-7, and panel (B) shows the activity in the absence of HuH-7 (GPC3-positive cells). They show the binding activity of an anti-CD95 antibody against Ramos cells when each bispecific antibody was added at 10, 1, 0.1, 0.01, or 0.001 µg/mL. The vertical axis represents a mean fluorescence intensity (MFI) of CD95. For comparison, an anti-DNP antibody was used as the negative control antibody, and CP-870,893 which is an anti-CD40 agonistic antibody was used as the positive control antibody.

[Example 18] Evaluation of CD40 Agonistic Activity Using HuH-7 Cells or MC-38/hGPC3 Cells as GPC3-Positive Cells The CD40 agonistic activity of each of various bispecific antibodies produced in Example 16 was evaluated in the same manner as in Example 9. The results of comparing the CD40 agonistic activities of Ct-R1090-HN3, Ct-R1090-GpS1019-FL, and Ct-R1090-GpA6014-FL are shown in FIG. 13. FIG. 13(A) shows the results obtained using HuH-7 cells as the GPC3-positive cells, and FIG. 13(B) shows the results obtained in the absence of HuH-7 cells.

Figure 14:
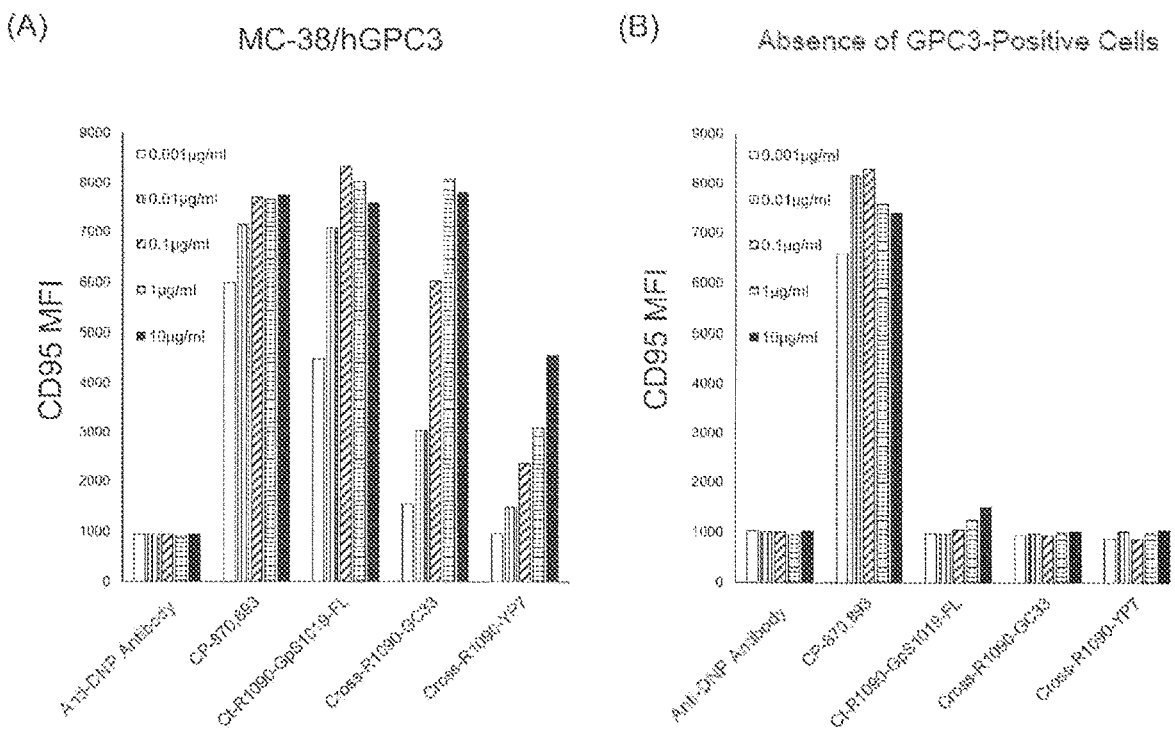
FIG. 14 shows the CD40 signaling inducing activity of each of various CD40-GPC3 bispecific antibodies (panel (A)) under the coculture condition with MC-38/hGPC3, and panel (B) shows the activity in the absence of MC-38/hGPC3 (GPC3-positive cells). They show the binding activity of an anti-CD95 antibody against Ramos cells when each bispecific antibody was added at 10, 1, 0.1, 0.01, or 0.001 µg/mL. The vertical axis represents a mean fluorescence intensity (MFI) of CD95. For comparison, an anti-DNP antibody was used as the negative control antibody, and CP-870,893 which is an anti-CD40 agonistic antibody was used as the positive control antibody.

The results of comparing the CD40 agonistic activities of Cross-R1090-GC33, Cross-R1090-YP7, Ct-R1090-GpS1019-FL, and Ct-R1090-GpA6014-FL are shown in FIGS. 14(A) and 14(B). FIG. 14(A) shows the results obtained using MC-38/hGPC3 cells as the GPC3-positive cells, and FIG. 14(B) shows the results obtained in the absence of MC-38/hGPC3 cells.

From the results, it was demonstrated that the CD40-GPC3 bispecific antibody of the present invention exhibits a higher agonistic activity than the CD40-GPC3 bispecific antibody using the conventional anti-GPC3 antibody HN3, GC33, or YP7 from a low concentration.

Any of the CD40-GPC3 bispecific antibodies of the present invention exhibited a stronger CD40 agonistic activity as compared with the bispecific antibodies using the conventional anti-GPC3 antibody. The epitope for the anti-GPC3 antibody used in the bispecific antibody of the present invention is contained in the amino acid sequence at positions 192 to 358 of human GPC3, which is a novel epitope different from the epitope for the conventional anti-GPC3 antibody. Therefore, it is presumed that the CD40-GPC3 bispecific antibody containing the GPC3 binding domain derived from the anti-GPC3 antibody that binds to the epitope contained at positions 192 to 358 in the amino acid sequence of human GPC3 exhibits a strong agonistic activity.

[Example 19] Evaluation of Agonistic Activity in Cancer-Bearing Mouse Model

Any of the CD40-GPC3 bispecific antibodies Ct-R1090S55A-GpS1019-FL and Ct-R1090S55A-GpA6014-FL and the anti-CD40 antibody CP-870,893 does not bind to mouse CD40, and therefore, in a study using a mouse model, a human CD40 BAC Tg mouse (hereinafter referred to as hCD40Tg mouse) in which a BAC vector containing human CD40 was introduced into a C57BL/6J Jcl mouse to express human CD40 was used.

The hCD40Tg mouse was produced by introducing a BAC clone (CTD-2532I19) (Invitrogen, Inc.) into a fertilized egg after purification. The produced hCD40Tg mouse was mated with a C57BL/6J Jcl mouse and subjected to a test after confirming that it had the human CD40 gene by a PCR method.

The MC-38/hGPC3 ($5 \times 10^6$ cells) produced in Example 12 was subcutaneously transplanted into the hCD40Tg mouse between day 10 and day 7. On day 0, the mice were divided into groups each consisting of 3 to 4 mice, and each CD40-GPC3 bispecific antibody or an antibody dilution buffer (0.05 mg/mL PS80, 10 mM sodium L-glutamate, 262 mM D-sorbitol, pH 5.5) as the negative control was administered through the tail vein. The antibody dose was set to 2 mg/kg in the case of Ct-R1090S55A-GpS1019-FL and 10 mg/kg in the case of Ct-R1090S55A-GpA6014-FL. A tumor was collected 3 days after the administration and homogenized using zirconia beads (Qiagen, Inc.), and RNA was extracted using RNeasy Plus Mini Kit (Qiagen, Inc.).

The obtained RNA was reverse transcribed using Superscript VILO (Thermo Fisher Scientific, Inc.), thereby obtaining cDNAs. By using the obtained cDNAs as templates, real-time PCR was performed by Taqman Assay (Thermo Fisher Scientific, Inc.) represented by Mm999999915_g1, Mm0128889_m1, Mm00711660_m1, Mm00444543_m1, and Mm00441891_m1 for mouse GAPDH, mouse IL-12b, mouse CD80, mouse CD86, and mouse CD40, respectively. The real-time PCR was performed using 7900HT (Thermo Fisher Scientific, Inc.), and the relative copy number of each gene with respect to the GAPDH and antibody dilution buffer (vehicle) administration groups was quantified by a ΔΔCt method.

Figure 15:
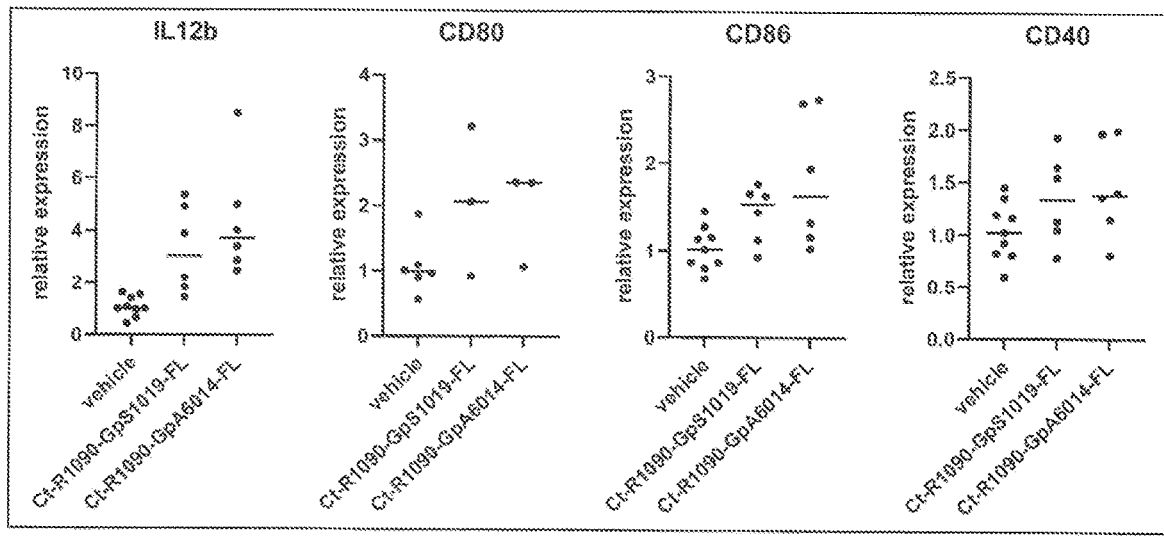
FIG. 15 shows a change in the expression of a CD40 signaling related gene after each of various CD40-GPC3 bispecific antibodies was administered in a tumor of an MC-38/hGPC3 cancer-bearing model using a human CD40 transgenic mouse. The expression of each gene was measured by real-time PCR, and a relative gene expression level with respect to a vehicle administration group calculated using a ΔΔCt method was plotted on the vertical axis.

The relative expression level of each gene by real-time PCR is shown in FIG. 15. The test was performed with N=3 to 4 per test, and the results obtained by integrating the test data for 2 to 3 times are shown.

As shown in FIG. 15, the expression of IL-12b, CD80, CD86, and CD40 increased in the administration group of each of the CD40-GPC3 bispecific antibodies Ct-R1090-GpS1019-FL and Ct-R1090-GpA6014-FL as compared with the vehicle administration group.

It is known that IL-12b, CD80, CD86, and CD40 are genes whose expression level increases when CD40 signaling is input to antigen-presenting cells. From this, it is considered that the CD40-GPC3 bispecific antibodies Ct-R1090-GpS1019-FL and Ct-R1090-GpA6014-FL activated CD40 signaling in antigen-presenting cells in the mouse tumor. Therefore, it is considered that the bispecific antibody of the present invention can exhibit a CD40 agonistic activity not only in vitro but also in a local tumor area in a living body.

[Example 20] Toxicity Test in Cancer-Bearing Mouse Model

In an MC-38/hGPC3 cancer-bearing model using the hCD40Tg mouse produced in the same manner as in Example 19, the effect of each of the CD40-GPC3 bispecific antibodies produced in Example 5 on a normal tissue was examined.

Each of the CD40-GPC3 bispecific antibody Ct-R1090S55A-GpS1019-FL, the anti-CD40 antibody CP-870,893, and an antibody dilution buffer as the negative control was administered to four hCD40Tg mice in each group through the tail vein, and the platelet count, the plasma aspartate aminotransferase (AST) concentration, and the plasma alanine aminotransferase (ALT) concentration 24 hours after the administration were measured. Ct-R1090S55A-GpS1019-FL was administered at 2 mg/kg or 10 mg/kg. It is difficult to administer CP-870,893 at 10 mg/kg due to its toxicity, and therefore, CP-870,893 was administered at 0.3 mg/kg, 1 mg/kg, or 3 mg/kg. The results are shown in FIGS. 16(A) to 16(C).

Figure 16:
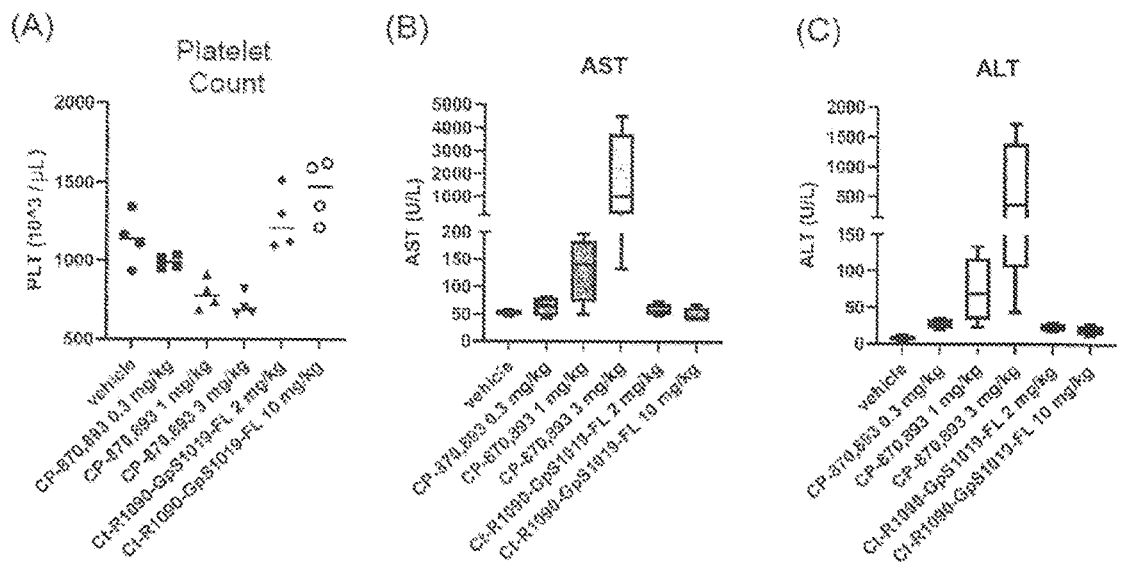
FIG. 16 shows values of platelet count in peripheral blood, AST, and ALT after each of various antibodies or bispecific antibodies (panels (A)-(C)) was administered in an MC-38/hGPC3 cancer-bearing human CD40 transgenic mouse.

As shown in FIGS. 16(A) to 16(C), in the administration group of the anti-CD40 antibody CP-870,893, after the administration, an increase in AST and ALT and a decrease in platelets were observed. On the other hand, in the administration group of the CD40-GPC3 bispecific antibody Ct-R1090S55A-GpS1019-FL, AST, ALT, and the platelet count were substantially at the same level as in the administration group of the antibody dilution buffer (vehicle) that is the negative control regardless of the dose.

From the above results, it was demonstrated that the CD40-GPC3 bispecific antibody of the present invention significantly decreases the systemic toxicity as compared with the preceding anti-CD40 agonistic antibody by exhibiting a CD40 agonistic activity only in the presence of GPC3-positive cells. From this, it can be expected that the bispecific antibody of the present invention exhibits a CD40 agonistic activity only in a GPC3-positive local tumor area and enhances immunity in the local tumor area while suppressing an adverse effect.

The present invention has been explained in detail using the specific aspects, but it is obvious to those skilled in the art that various changes and modifications can be made without departing from the spirit and scope of the present invention. The present application is based on a Japanese patent application filed on May 15, 2019 (Patent Application No. 2019-092297), which is incorporated by reference in its entirety.

Sequence Listing Free Text

SEQ ID NO: 1: nucleotide sequence of extracellular domain of human CD40
SEQ ID NO: 2: amino acid sequence of extracellular domain of human CD40
SEQ ID NO: 3: nucleotide sequence of extracellular domain of monkey CD40
SEQ ID NO: 4: amino acid sequence of extracellular domain of monkey CD40
SEQ ID NO: 5: full-length nucleotide sequence of human CD40
SEQ ID NO: 6: full-length amino acid sequence of human CD40
SEQ ID NO: 7: full-length nucleotide sequence of monkey CD40
SEQ ID NO: 8: full-length amino acid sequence of monkey CD40
SEQ ID NO: 9: nucleotide sequence of VL of L6
SEQ ID NO: 10: amino acid sequence of VL of L6
SEQ ID NO: 11: amino acid sequence of LCDR1 of L6
SEQ ID NO: 12: amino acid sequence of LCDR2 of L6
SEQ ID NO: 13: amino acid sequence of LCDR3 of L6
SEQ ID NO: 14: nucleotide sequence of VH of R1090S55A
SEQ ID NO: 15: amino acid sequence of VH of R1090S55A
SEQ ID NO: 16: amino acid sequence of HCDR1 of R1090S55A
SEQ ID NO: 17: amino acid sequence of HCDR2 of R1090S55A
SEQ ID NO: 18: amino acid sequence of HCDR3 of R1090S55A
SEQ ID NO: 19: nucleotide sequence of VH of 21.4.1
SEQ ID NO: 20: amino acid sequence of VH of 21.4.1
SEQ ID NO: 21: nucleotide sequence of VL of 21.4.1
SEQ ID NO: 22: amino acid sequence of VL of 21.4.1
SEQ ID NO: 23: nucleotide sequence of human GPC3-mFc
SEQ ID NO: 24: amino acid sequence of human GPC3-mFc
SEQ ID NO: 25: nucleotide sequence of mouse GPC3-mFc
SEQ ID NO: 26: amino acid sequence of mouse GPC3-mFc
SEQ ID NO: 27: nucleotide sequence of human GPC3-rFc
SEQ ID NO: 28: amino acid sequence of human GPC3-rFc
SEQ ID NO: 29: nucleotide sequence of mouse GPC3-rFc
SEQ ID NO: 30: amino acid sequence of mouse GPC3-rFc
SEQ ID NO: 31: amino acid sequence of soluble human GPC3
SEQ ID NO: 32: nucleotide sequence of human GPC3 GST
SEQ ID NO: 33: amino acid sequence of human GPC3-GST
SEQ ID NO: 34: nucleotide sequence of human GPC3-AA-hFc
SEQ ID NO: 35: amino acid sequence of human GPC3-AA-hFc
SEQ ID NO: 36: amino acid sequence of soluble mouse GPC3
SEQ ID NO: 37: nucleotide sequence of mouse GPC3-AA-hFc
SEQ ID NO: 38: amino acid sequence of mouse GPC3-AA-hFc
SEQ ID NO: 39: full-length nucleotide sequence of human GPC3
SEQ ID NO: 40: nucleotide sequence of VH of GpS1019
SEQ ID NO: 41: amino acid sequence of VH of GpS1019
SEQ ID NO: 42: amino acid sequence of HCDR1 of GpS1019
SEQ ID NO: 43: amino acid sequence of HCDR2 of GpS1019
SEQ ID NO: 44: amino acid sequence of HCDR3 of GpS1019
SEQ ID NO: 45: nucleotide sequence of VH of GpA6005
SEQ ID NO: 46: amino acid sequence of VH of GpA6005
SEQ ID NO: 47: amino acid sequence of HCDR1 of GpA6005
SEQ ID NO: 48: amino acid sequence of HCDR2 of GpA6005
SEQ ID NO: 49: amino acid sequence of HCDR3 of GpA6005
SEQ ID NO: 50: nucleotide sequence of VH of GpA6014
SEQ ID NO: 51: amino acid sequence of VH of GpA6014
SEQ ID NO: 52: amino acid sequence of HCDR1 of GpA6014
SEQ ID NO: 53: amino acid sequence of HCDR2 of GpA6014
SEQ ID NO: 54: amino acid sequence of HCDR3 of GpA6014
SEQ ID NO: 55: nucleotide sequence of VH of GpA6062
SEQ ID NO: 56: amino acid sequence of VH of GpA6062
SEQ ID NO: 57: amino acid sequence of HCDR1 of GpA6062
SEQ ID NO: 58: amino acid sequence of HCDR2 of GpA6062
SEQ ID NO: 59: amino acid sequence of HCDR3 of GpA6062
SEQ ID NO: 60: nucleotide sequence of VH of GpS3003
SEQ ID NO: 61: amino acid sequence of VH of GpS3003
SEQ ID NO: 62: amino acid sequence of HCDR1 of GpS3003
SEQ ID NO: 63: amino acid sequence of HCDR2 of GpS3003
SEQ ID NO: 64: amino acid sequence of HCDR3 of GpS3003
SEQ ID NO: 65: nucleotide sequence of VH of GPngs18
SEQ ID NO: 66: amino acid sequence of VH of GPngs18
SEQ ID NO: 67: amino acid sequence of HCDR1 of GPngs18
SEQ ID NO: 68: amino acid sequence of HCDR2 of GPngs18
SEQ ID NO: 69: amino acid sequence of HCDR3 of GPngs18
SEQ ID NO: 70: nucleotide sequence of VH of GPngs62
SEQ ID NO: 71: amino acid sequence of VH of GPngs62
SEQ ID NO: 72: amino acid sequence of HCDR1 of GPngs62
SEQ ID NO: 73: amino acid sequence of HCDR2 of GPngs62
SEQ ID NO: 74: amino acid sequence of HCDR3 of GPngs62
SEQ ID NO: 75: nucleotide sequence of light chain including L6 as VL
SEQ ID NO: 76: amino acid sequence of light chain including L6 as VL
SEQ ID NO: 77: amino acid sequence of heavy chain constant region of IgG4PE R409K
SEQ ID NO: 78: nucleotide sequence of heavy chain of GpS1019

SEQ ID NO: 79: amino acid sequence of heavy chain of GpS1019
SEQ ID NO: 80: nucleotide sequence of heavy chain of GpA6005
SEQ ID NO: 81: amino acid sequence of heavy chain of GpA6005
SEQ ID NO: 82: nucleotide sequence of heavy chain of GpA6014
SEQ ID NO: 83: amino acid sequence of heavy chain of GpA6014
SEQ ID NO: 84: nucleotide sequence of heavy chain of GpA6062
SEQ ID NO: 85: amino acid sequence of heavy chain of GpA6062
SEQ ID NO: 86: nucleotide sequence of heavy chain of GpS3003
SEQ ID NO: 87: amino acid sequence of heavy chain of GpS3003
SEQ ID NO: 88: nucleotide sequence of heavy chain of GPngs18
SEQ ID NO: 89: amino acid sequence of heavy chain of GPngs18
SEQ ID NO: 90: nucleotide sequence of heavy chain of GPngs62
SEQ ID NO: 91: amino acid sequence of heavy chain of GPngs62
SEQ ID NO: 92: nucleotide sequence of heavy chain constant region of IgG4PE R409K
SEQ ID NO: 93: nucleotide sequence of CH1 of IgG4
SEQ ID NO: 94: amino acid sequence of CH1 of IgG4
SEQ ID NO: 95: nucleotide sequence of heavy chain of Ct-R1090-GpS1019-FL
SEQ ID NO: 96: amino acid sequence of heavy chain of Ct-R1090-GpS1019-FL
SEQ ID NO: 97: nucleotide sequence of heavy chain of Ct-R1090-GpA6005-FL
SEQ ID NO: 98: amino acid sequence of heavy chain of Ct-R1090-GpA6005-FL
SEQ ID NO: 99: nucleotide sequence of heavy chain of Ct-R1090-GpA6014-FL
SEQ ID NO: 100: amino acid sequence of heavy chain of Ct-R1090-GpA6014-FL
SEQ ID NO: 101: nucleotide sequence of heavy chain of Ct-R1090-GpA6062-FL
SEQ ID NO: 102: amino acid sequence of heavy chain of Ct-R1090-GpA6062-FL
SEQ ID NO: 103: nucleotide sequence of heavy chain of Ct-R1090-GpS3003
SEQ ID NO: 104: amino acid sequence of heavy chain of Ct-R1090-GpS3003
SEQ ID NO: 105: nucleotide sequence of heavy chain of Ct-R1090-GPngs18
SEQ ID NO: 106: amino acid sequence of heavy chain of Ct-R1090-GPngs18
SEQ ID NO: 107: nucleotide sequence of heavy chain of Ct-R1090-GPngs62
SEQ ID NO: 108: amino acid sequence of heavy chain of Ct-R1090-GPngs62
SEQ ID NO: 109: nucleotide sequence of heavy chain of Ct-GpS1019-R1090
SEQ ID NO: 110: amino acid sequence of heavy chain of Ct-GpS1019-R1090
SEQ ID NO: 111: nucleotide sequence of heavy chain of Ct-GpA6005-R1090
SEQ ID NO: 112: amino acid sequence of heavy chain of Ct-GpA6005-R1090
SEQ ID NO: 113: nucleotide sequence of heavy chain of Ct-GpA6014-R1090
SEQ ID NO: 114: amino acid sequence of heavy chain of Ct-GpA6014-R1090
SEQ ID NO: 115: nucleotide sequence of heavy chain of Ct-GpA6062-R1090
SEQ ID NO: 116: amino acid sequence of heavy chain of Ct-GpA6062-R1090
SEQ ID NO: 117: nucleotide sequence of heavy chain of Ct-GpS3003-R1090
SEQ ID NO: 118: amino acid sequence of heavy chain of Ct-GpS3003-R1090
SEQ ID NO: 119: nucleotide sequence of heavy chain of Ct-GPngs18-R1090
SEQ ID NO: 120: amino acid sequence of heavy chain of Ct-GPngs18-R1090
SEQ ID NO: 121: nucleotide sequence of heavy chain of Ct-GPngs62-R1090
SEQ ID NO: 122: amino acid sequence of heavy chain of Ct-GPngs62-R1090
SEQ ID NO: 123: amino acid sequence of VH of GC33
SEQ ID NO: 124: amino acid sequence of VL of GG33
SEQ ID NO: 125: amino acid sequence of VH of YP7
SEQ ID NO: 126: amino acid sequence of VL of YP7
SEQ ID NO: 127: amino acid sequence of VH of HN3
SEQ ID NO: 128: amino acid sequence of GS linker
SEQ ID NO: 129: full-length amino acid sequence of human GPC3

The invention claimed is:

1. A bispecific antibody, which comprises an IgG portion comprising a first antigen binding domain, and also comprises a second antigen binding domain, in which the C terminus of a heavy chain of the IgG portion binds to the second antigen binding domain either directly or via a linker,
wherein the first antigen binding domain binds to human CD40 and comprises a VH comprising CDRs 1 to 3 comprising the amino acid sequences of SEQ ID NOs: 16 to 18, respectively, and a VL comprising CDRs 1 to 3 comprising the amino acid sequences of SEQ ID NOs: 11 to 13, respectively, and
wherein the second antigen binding domain binds to human glypican 3 (GPC3) and comprises a VL comprising CDRs 1 to 3 comprising the amino acid sequences of SEQ ID NOs: 11 to 13, respectively, and any one VH selected from the group consisting of the following (1a) to (1g);
(1a) a VH comprising CDRs 1 to 3 comprising the amino acid sequences of SEQ ID NOs: 42 to 44, respectively;
(1b) a VH comprising CDRs 1 to 3 comprising the amino acid sequences of SEQ ID NOs: 47 to 49, respectively;
(1c) a VH comprising CDRs 1 to 3 comprising the amino acid sequences of SEQ ID NOs: 52 to 54, respectively;
(1d) a VH comprising CDRs 1 to 3 comprising the amino acid sequences of SEQ ID NOs: 57 to 59, respectively;
(1e) a VH comprising CDRs 1 to 3 comprising the amino acid sequences of SEQ ID NOs: 62 to 64, respectively;
(1f) a VH comprising CDRs 1 to 3 comprising the amino acid sequences of SEQ ID NOs: 67 to 69, respectively; and
(1g) a VH comprising CDRs 1 to 3 comprising the amino acid sequences of SEQ ID NOs: 72 to 74, respectively.

2. The bispecific antibody according to claim 1, which divalently binds to each of human CD40 and human GPC3.

3. The bispecific antibody according to claim 1, wherein the C terminus of the heavy chain of the IgG portion directly binds to the second antigen binding domain.

4. The bispecific antibody according to claim 1, wherein the second antigen binding domain is Fab.

5. The bispecific antibody according to claim 1, which has CD40 agonistic activity.

6. The bispecific antibody according to claim 1, which exhibits CD40 agonistic activity only in the presence of a GPC3-expressing cell.

7. The bispecific antibody according to claim 1, wherein the antigen binding domain that binds to human CD40 comprises a VH comprising the amino acid sequence of SEQ ID NO: 15, and a VL comprising the amino acid sequence of SEQ ID NO: 10.

8. The bispecific antibody according to claim 1, wherein the antigen binding domain that binds to human GPC3 comprises a VL comprising the amino acid sequence of SEQ ID NO: 10, and any one VH selected from the group consisting of the following (2a) to (2g):
(2a) a VH comprising the amino acid sequence of SEQ ID NO: 41;
(2b) a VH comprising the amino acid sequence of SEQ ID NO: 46;
(2c) a VH comprising the amino acid sequence of SEQ ID NO: 51;
(2d) a VH comprising the amino acid sequence of SEQ ID NO: 56;
(2e) a VH comprising the amino acid sequence of SEQ ID NO: 61;
(2f) a VH comprising the amino acid sequence of SEQ ID NO: 66; and
(2g) a VH comprising the amino acid sequence of SEQ ID NO: 71.

9. The bispecific antibody according to claim 1, wherein the heavy chain constant region of the IgG portion comprises the amino acid sequence of SEQ ID NO: 77.

10. The bispecific antibody according to claim 1, which consists of two heavy chains comprising the amino acid sequence of any one selected from SEQ ID NOS: 96, 98, 100, 102 104, 106, and 108, and four light chains, wherein each light chain comprises a VL comprising the amino acid sequence of SEQ ID NO: 10.

11. A bispecific antibody fragment of the bispecific antibody according to claim 1.

12. A DNA encoding the bispecific antibody according to claim 1 or a bispecific antibody fragment of the bispecific antibody.

13. A recombinant vector, comprising the DNA according to claim 12.

14. A transformant strain obtained by introducing the recombinant vector according to claim 13 into a host cell.

15. A method for producing the bispecific antibody according to claim 1 or a bispecific antibody fragment of the bispecific antibody, characterized by culturing a transformant strain obtained by introducing a recombinant vector comprising a DNA encoding the bispecific antibody or the bispecific antibody fragment into a host cell in a culture medium to produce and accumulate the bispecific antibody or the bispecific antibody fragment in a culture, and collecting the bispecific antibody or the bispecific antibody fragment from the culture.

16. A method of treating a subject having disease associated with human CD40 and/or human GPC3, comprising administering an effective amount of the bispecific antibody according to claim 1 or a bispecific antibody fragment of the bispecific antibody to the subject.

17. The method according to claim 16, wherein the disease associated with at least one of human CD40 and/or human GPC3 is a cancer.

18. A derivative of a bispecific antibody, in which a radioisotope, a low-molecular weight drug, a high-molecular weight drug, a protein, or an antibody drug is bound chemically or through genetic engineering to the bispecific antibody according to claim 1 or a bispecific antibody fragment of the bispecific antibody.

19. A method of diagnosing a subject as having a disease associated with human CD40 and/or human GPC3, comprising administering the bispecific antibody according to claim 1 or a bispecific antibody fragment of the bispecific antibody to the subject and detecting or measuring a cell expressing human CD40 and/or human GPC3.

20. The method according to claim 19, wherein the disease associated with human CD40 and/or human GPC3 is a cancer.

\* \* \* \* \*